United States Patent
Entelis et al.

(10) Patent No.: US 11,546,448 B2
(45) Date of Patent: *Jan. 3, 2023

(54) SYSTEM AND METHOD FOR DATA COMPRESSION BASED ON DATA POSITION IN FRAMES STRUCTURE

(71) Applicant: Arilou Information Security Technologies Ltd., Ramat-Gan (IL)

(72) Inventors: Avraham Entelis, Jerusalem (IL); Gil Litichever, Modiin (IL); Moshe Karl, Petah Tikva (IL); Ziv Levi, Nahariya (IL)

(73) Assignee: ARILOU INFORMATION SECURITY TECHNOLOGIES LTD., Ramat-Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,105

(22) Filed: Mar. 19, 2022

(65) Prior Publication Data
US 2022/0224777 A1    Jul. 14, 2022

Related U.S. Application Data

(63) Continuation of application No. 17/420,749, filed as application No. PCT/IL2019/051301 on Nov. 27, 2019, now Pat. No. 11,323,548.

(Continued)

(51) Int. Cl.
*H04L 69/04* (2022.01)
*H04L 12/40* (2006.01)

(52) U.S. Cl.
CPC .............. *H04L 69/04* (2013.01); *H04L 12/40* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 4,464,650 A | 8/1984 | Eastman et al. |
| 4,558,302 A | 12/1985 | Welch |

(Continued)

FOREIGN PATENT DOCUMENTS

| EP | 2131501 A1 | 12/2009 |
| WO | 2001065439 A1 | 9/2001 |

(Continued)

OTHER PUBLICATIONS

International Search Report of PCT/IL2019/051301 dated Feb. 21, 2020.

(Continued)

*Primary Examiner* — Diane L Lo
(74) *Attorney, Agent, or Firm* — May Patents Ltd. c/o Dorit Shem-Tov

(57) ABSTRACT

Method and system for lossless and stateless compression scheme is used with a fixed-length data such as frames. Frames having a payload of M bits length are mapped into a payload of N bits length, where N<M. The N bits payload of each received frame is extracted, and mapped using a memory, PLD, or a processor, to reconstruct the uncompressed M bits payload, and to form the original frame. The reconstruction may use a set of N coefficients that are each multiplied by the corresponding received payload bit, and summarized modulo-2 to obtain the original pre-compressed M payload bits. The method and system may be used with a vehicle bus, such as Controller Area Network (CAN). The compressed frames may use the same or different protocol than the uncompressed ones, and may further carry an (Continued)

additional code such as metadata, error detection or correction code, or authentication related code.

51 Claims, 38 Drawing Sheets

Related U.S. Application Data

(60) Provisional application No. 62/873,029, filed on Jul. 11, 2019, provisional application No. 62/794,651, filed on Jan. 20, 2019.

(56) References Cited

U.S. PATENT DOCUMENTS

| | | | |
|---|---|---|---|
| 4,814,746 | A | 3/1989 | Miller et al. |
| 7,010,050 | B2 | 3/2006 | Maryanka |
| 7,091,876 | B2 | 8/2006 | Steger |
| 7,752,672 | B2 | 7/2010 | Karam et al. |
| 7,802,016 | B2 | 9/2010 | Eimers-Klose et al. |
| 8,700,626 | B2 | 4/2014 | Bedingfield |
| 8,909,412 | B2 | 12/2014 | Park et al. |
| 8,955,130 | B1 | 2/2015 | Kalintsev et al. |
| 9,172,635 | B2 | 10/2015 | Kim et al. |
| 9,172,771 | B1 | 10/2015 | Gross et al. |
| 9,219,499 | B2 | 12/2015 | Nasser |
| 9,280,501 | B2 | 3/2016 | Hopfner |
| 9,330,045 | B2 | 5/2016 | Muth et al. |
| 9,401,923 | B2 | 7/2016 | Valasek et al. |
| 9,450,911 | B2 | 9/2016 | Cha et al. |
| 9,471,528 | B2 | 10/2016 | Muth |
| 9,652,423 | B2 | 5/2017 | Monroe et al. |
| 9,705,699 | B2 | 7/2017 | Lee |
| 9,965,636 | B2 | 5/2018 | Litichever et al. |
| 10,140,450 | B1 | 11/2018 | Litichever et al. |
| 11,323,548 | B2 * | 5/2022 | Entelis .................... H04L 69/04 |
| 2007/0198144 | A1 | 8/2007 | Norris et al. |
| 2010/0332706 | A1 | 12/2010 | Hering |
| 2012/0278705 | A1 | 11/2012 | Yang et al. |
| 2014/0215491 | A1 | 7/2014 | Addepalli et al. |
| 2014/0380416 | A1 | 12/2014 | Adachi |
| 2015/0020152 | A1 | 1/2015 | Litichever et al. |
| 2015/0071115 | A1 | 3/2015 | Neff et al. |
| 2015/0193205 | A1 | 7/2015 | Boehl |
| 2015/0195297 | A1 | 7/2015 | Ben Noon et al. |
| 2015/0271201 | A1 | 9/2015 | Ruvio et al. |
| 2016/0020519 | A1 | 1/2016 | Kishikawa et al. |
| 2016/0381055 | A1 | 12/2016 | Galula et al. |
| 2017/0230385 | A1 | 8/2017 | Ruvio et al. |
| 2019/0058613 | A1 | 2/2019 | Maeda |
| 2021/0203526 | A1 | 7/2021 | Latham |

FOREIGN PATENT DOCUMENTS

| | | |
|---|---|---|
| WO | 2011139687 A1 | 11/2011 |
| WO | 2018104929 A1 | 6/2018 |

OTHER PUBLICATIONS

International Preliminary Report on Patentability of PCT/IL2019/051301 dated Apr. 30, 2021.
Wu Yujing et al., "Design and implementation of CAN data compression algorithm", 2014 IEEE International Symposium on circuits and systems (ISCAS), IEEE, Jun. 1, 2014, pp. 582-585 (4 pages).
Kelkar Supriya et al., "Boundary of Fifteen Compression algorithm for Controller Area Network based automotive applications", 2014 International Conference on circuits, systems, communication and information technology applications (CSCITA), IEEE, Apr. 4, 2014, pp. 162-167 (6 pages).
Kim Yeon-Jin et al., "4 Bit Data Arrangement Algorithm for CAN Compression", 2018 International SOC Design Conference (ISOCC), IEEE, Nov. 12, 2018, pp. 216-217 (2 pages).

IEEE Std 802.3bv-2017 entitled: "Amendment 9: Physical Layer Specifications and Management Parameters for 1000 Mb/s Operation Over Plastic Optical Fiber" approved Feb. 14, 2017 [ISBN 978-5044-3721-9] (140 pages).
IEEE Std 802.3bp-2016 entitled: "Amendment 4: Physical Layer Specifications and Management Parameters for 1 GB/s Operation over a Single Twisted-Pair Copper Cable" approved Jun. 30, 2016 [ISBN 978-1-5044-2288-8] (211 pages).
AIM Gmbh tutorial v2.3 dated Nov. 2010 entitled: "MIL-STD-1553 Tutorial" (82 pages).
Military standard MIL-STD-1553B dated Sep. 21, 1978 by the Department of Defense of U.S.A. entitled: "Aircraft Internal Time Division Command / Response Multiplex Data Bus" (44 pages).
Avionics Interface Technologies Doc. No. 40100001 (downloaded from the Internet on Nov. 2016) entitled: "ARINC 429 Protocol Tutorial" (28 pages).
ARINC Specification 429 prepared by Airlines Electronic Engineering Committee and published by Aeronautical Radio, Inc. entitled: "Mark 33 Digital Information Transfer System (DITS)—Part 1—Functional Description, Electrical Interface, Label Assignments and Word Formats", May 17, 2004 (309 pages).
ARINC 429 Bus Interface—DirectCore' v5.0 available from Actel Corporation (headquartered in Mountain-View, California, USA) described in Document No. 51700055-5/9.06 published Sep. 2006 (22 pages).
"Chapter 1: Mass Storage basics", downloaded Oct. 2011 from: http://www.lvr.com/files/usb_mass_storage_chapter_1.pdf, (24 pages).
White Paper "Blu-ray Disc Format, 4. Key Technologies", by Blu-ray Disc Founders, Aug. 2004 (8 pages).
Brochure entitled: "Blu-ray Technology—DISCover the infinite storage media", by DISC Archiving Systems B.V., 2010 (2 pages).
Whitepaper entitled: "Sustainable Archival Storage—The Benefits of Optical Archiving", by DISC Archiving Systems B.V., downloaded from www.disc-group.com, (17 pages).
Mehedi Hasan, "Hard-Disk Basics" compiled from pcguide.com, Dec. 2, 2005 (738 pages).
Martin B., Dell entitled: "DELL Solid State Disk (SSD) Drive—Storage Solutions for Select Poweredge Server", May 2009 (7 pages).
Janukowicz J., Reisel D., White-Paper entitled: "MLC Solid State Drives: Accelerating the Adoption of SSDs", IDC #213730, Sep. 2008 (11 pages).
Dufrasne B., Blum K, Dubberke U., IBM Corp. Redbooks Redpaper entitled: "DS8000: Introducing Solid State Drives" (2009) (20 pages).
Federal Information Processing Standards Publication—FIPS PUB 198-1 Standard entitled: "The Keyed-Hash Message Authentication Code (HMAC)", Jul. 2008 by U.S. Department of Commerce, National Institute of Standards and Technology (NIST) (13 pages).
IEEE Std 802.1X™-2010 [ISBN 978-0-7381-6145-7 STD96008] by IEEE Standard for Local and metropolitan area networks and entitled: "Port-Based Network Access Control", Feb. 5, 2010 (222 pages).
In IEEE Std 802.1AE™-2006 [ISBN 0-7381-4991-8 SS95549] by IEEE Standard for Local and metropolitan area networks and entitled: "Media Access Control (MAC) Security", Aug. 18, 2006 (154 pages).
IETF RFC 4301 entitled: "Security Architecture for the Internet Protocol", Dec. 2005 (101 pages).
IETF RFC 4309 entitled: "Using Advanced Encryption Standard (AES) CCM Mode with IPsec Encapsulating Security Payload (ESP)", Dec. 2005 (13 pages).
National Information Standards Organization (NISO) Booklet entitled: "Understanding Metadata" (ISBN: 1-880124-62-9) (20 pages).
IETF RFC 5013 entitled: "The Dublin Core Metadata Element Set", Aug. 2007 (9 pages).
IETF RFC 2731 entitled: "Encoding Dublin Core Metadata in HTML", Dec. 1999 (22 pages).
Manual "80186/80188 High-Integration 16-Bit Microprocessors" by Intel Corporation, 1995 (34 pages).
Manual "MC68360 Quad Integrated Communications Controller—User's Manual" by Motorola, Inc (962 pages).

(56) References Cited

OTHER PUBLICATIONS

Texas Instruments Incorporated [DS-TM4C123GH6PM-15842. 2741, SPMS376E, Revision 15842.2741 Jun. 2014], entitled: "Tiva™ TM4C123GH6PM Microcontroller—Data Sheet", published 2015 (1409 pages).
Carnegie Mellon University chapter entitled: "Introduction to Data Compression" by Guy E. Blelloch, dated Jan. 31, 2013 (55 pages).
Third Edition of a book entitled: "Introduction to Data Compression" authored by Khalid Sayood of the University of Nebraska [ISBN 13: 978-0-12-620862-7], published 2006 by Elsevier Inc. (703 pages).
University of Michigan paper entitled: "Dictionary-Based Compression for Long Time-Series Similarity" by Willis Lang, Michael Morse, and Jignesh M. Patel, downloaded from http://pages.cs.wisc.edu/ on Aug. 2014 (14 pages).
Pieter Maene, Johannes Gotzfried, Tilo Muller, Ruan de Clercq, Felix Freiling and Ingrid Verbauwhede, "Atlas: Application Confidentiality in Compromised Embedded Systems", published Jul. 2018 in IEEE Transactions on Dependable and Secure Computing PP(99):1-1 [DOI: 10.1109/TDSC.2018.2858257] (9 pages).
Hendrik Schweppe, Armin Zimmermann, and Daniel Grill, "Flexible In-Vehicle Stream Processing with Distributed Automotive Control Units for Engineering and Diagnosis", published Jun. 2008 in a conference: IEEE Third International Symposium on Industrial Embedded Systems—SIES 2008, Montpellier / La Grande Motte, France, Jun. 11-13, 2008 [DOI: 10.1109/SIES.2008.4577683] (9 pages).
Virgil D. Gligor and Pompiliu Donescu entitled: "Fast Encryption and Authentication: XCBC Encryption and XECB Authentication Modes" published 2002 by Springer-Verlag Berlin Heidelberg (17 pages).
Data sheet "±15kV ESD-Protected, 3.3V Quad RS-422 Transmitters" publication No. 19-2671 Rev.0 Oct. 2002 (14 pages).
Data sheet "±15kV ESD-Protected, 10Mbps, 3V/5V, Quad RS-422/RS-485 Receivers" publication No. 19-0498 Rev.1 Oct. 2000, (12 pages).
National Semiconductor Application Note 1031 publication AN012598, "TIA/EIA-422-B Overview", dated Jan. 2000 (7 pages).
B&B Electronics publication "RS-422 and RS-485 Application Note" dated Jun. 2006 (43 pages).
Data sheet "±15kV ESD-Protected, +5V RS-232 Transceivers" publication No. 19-0175 Rev.6 Mar. 2005 (25 pages).
National Semiconductor Application Note 1057 publication AN012882, "Ten ways to Bulletproof RS-485 Interfaces", dated Oct. 1996 (10 pages).
Data sheet "Fail-Safe, High-Speed (10Mbps), Slew-Rate-Limited RS-485/RS-422 Transceivers" publication No. 19-1138 Rev.3 Dec. 2005 (20 pages).
Book entitled: "Hacker's Delight", Second Edition, by Henry S. Warren, Jr., published 2013 by Pearson Education, Inc. [ISBN-13: 978-0-321-84268-8] (816 pages).
Presentation entitled: "Introduction to On Board Diagnostics (II)" downloaded on Nov. 2012 from: http://groups.engin.umd.umich.edu/vi/w2_workshops/OBD_ganesan_w2.pdf (148 pages).
Society of Automotive Engineers (SAE) J1962 standard "Diagnostic connector equivalent to ISO/DIS", Jan. 1995 (8 pages).
SAE J1850, Implementing the J1850 Protocol, by D. John Oliver (15 pages).
SAE International Surface Vehicle Standard J1979 entitled: "E/E Diagnostic Test Modes" (97 pages).
Standard Wire & Cable Co., "Technical Handbook & Catalog" Twelfth Edition published 2006 (299 pages).
The SAE International standard J3016, entitled: "Taxonomy and Definitions for Terms Related to On-Road Motor Vehicle Automated Driving Systems" [Revised Sep. 2016] (35 pages).
Robert Bosch GmbH (5th Edition) entitled: "Bosch Automotive Electric and Automotive Electronics" [ISBN—978-3-658-01783-5], Jul. 2007 (530 pages).

Vineet P. Aras of the Department of Electrical Engineering, Indian Institute of Technology Bombay, "Design of Electronic Control Unit (ECU) for Automobiles—Electronic Engine Management system", Jul. 2004 (51 pages).
National Instruments paper entitled: "ECU Designing and Testing using National Instruments Products", Nov. 7, 2009 (9 pages).
Brochure by Sensor-Technik Wiedemann Gmbh (headquartered in Kaufbeuren, Germany), "Control System Electronics", Mar. 4, 2011 (20 pages).
Data Sheet Document No. MPC5748G Rev. 2, entitled: "MPC5748 Microcontroller Datasheet", May 2014 (67 pages).
OSEK/VDX NM Concept & API 2.5.2 (Version 2.5.3, Jul. 26, 2004) entitled: "Open Systems and the Corresponding Interfaces for Automotive Electronics—Network Management—Concept and Application Programming Interface" (139 pages).
Wikipedia entitled: "Electronics" downloaded from en.wikibooks.org dated Mar. 15, 2015 (401 pages).
ISO 17356-1 standard (First edition) entitled: "Road vehicles—Open interface for embedded automotive applications—Part 1: General structure and terms, definitions and abbreviated terms", Jan. 15, 2005 (26 pages).
ISO 17356-2 standard (First edition) entitled: "Road vehicles—Open interface for embedded automotive applications—Part 2: OSEK/VDX specifications for binding OS, COM and NM", May 1, 2005 (8 pages).
ISO 17356-3 standard (First edition) entitled: "Road vehicles—Open interface for embedded automotive applications—Part 3: OSEK/VDX Operating System (OS)", Nov. 1, 2005 (7 pages).
ISO 17356-4 standard (First edition, Nov. 1, 2005) entitled: "Road vehicles—Open interface for embedded automotive applications—Part 4: OSEK/VDX Communication (COM)", Nov. 1, 2005 (64 pages).
Release 4.2.2 released Jan. 31, 2015 by the AUTOSAR consortium entitled: "Release 4.2 Overview and Revision History" (47 pages).
ISO 11992-1:2003 entitled: "Road vehicles—Interchange of digital information on electrical connections between towing and towed vehicles—Part 1: Physical and data-link layers", Apr. 15, 2003 (28 pages).
SAE J1939 Surface Vehicle Recommended Practice entitled: "Recommended Practice for a Serial Control and Communication Vehicle Network" Apr. 2000 (257 pages).
SAE J1939-01 Surface Vehicle Standard entitled: "Recommended Practice for Control and Communication Network for On-Highway Equipment" Sep. 2000 (7 pages).
SAE J1939-11 Surface Vehicle Recommended Practice entitled: "Physical Layer, 250K bits/s, Twisted Shielded Pair", Oct. 1999 (31 pages).
J1939-15 Surface Vehicle Recommended Practice entitled: "Reduced Physical Layer, 250K bits/s, Un-Shielded Twisted Pair (UTP)" Nov. 2003 (19 pages).
ISO 9141 entitled: "Road vehicles—Diagnostic systems" Feb. 1, 1994 (17 pages).
Application Note (AN1123-0-2/12(0) Rev. 0) by Analog Devices, Inc. entitled: "Controller Area Network (CAN) Implementation Guide—by Dr. Conal Watterson", 2012 (16 pages).
Product data sheets (document Identifier TJA1055, date of release: Dec. 6, 2013) entitled: "TJA1055 Enhanced fault-tolerant CAN transceiver—Rev. 5—Dec. 6, 2013—Product data sheet" (26 pages).
Product data sheets (document Identifier TJA1044, date of release: Dec. 6, 2013) entitled: "TJA1044 High-speed CAN transceiver with Standby mode—Rev. 4—Jul. 10, 2015—Product data sheet" (22 pages).
Datasheet SLLS557G (Nov. 2002—Revised Jan. 2015), entitled: "SN65HVD23x 3.3-V CAN Bus Transceivers" (35 pages).
Datasheet DocID15724 Rev. 9, entitled: "STM32F105xx STM32F107xx", Sep. 2015 (107 pages).
Robert Bosch GmbH entitled: CAN with Flexible Data-Rate Specification (Version 1.0), released on Apr. 17, 2012 (34 pages).
ICC 2013 CAN in Automation articles by Florian Hatwich entitled: "Bit Time Requirements for CAN FD" (6 pages).
ICC 2012 Florian Hatwich entitled: "CAN with Flexible Data-Rate" (9 pages).

(56) References Cited

OTHER PUBLICATIONS

National Instruments article published Aug. 1, 2018 entitled: "Understanding CAN with Flexible Data-Rate (CAN FD)" (2 pages).
Application Note AN4389 (document No. DocD025493 Rev 2) entitled: "SPC57472/SPC57EM80 Getting Started", 2014 (53 pages).
Data sheet DS20005284A [ISBN—978-1-63276-020-3] entitled: "MCP2561/2FD—High-Speed CAN Flexible Data Rate Transceiver", 2014 (32 pages).
ISO 15765-2:2004 standard (First Edition) entitled: "Road vehicles—Diagnostics on Controller Area Networks (CAN)—Part 2: Network layer services", Oct. 15, 2004 (41 pages).
SAE J2411_200002 entitled: "Single Wire Can Network for Vehicle Applications" (33 pages).
Freescale Semiconductor, Inc. described in a data-sheet Document No. MC33689 Rev. 8.0 (dated Sep. 2012) entitled: "System Basis Chip with LIN Transceiver" (31 pages).
Franzis Verlag Gmbh [ISBN—978-3-645-65061-8] edited by Prof. Dr. Ing. Andreas Grzemba entitled: "MOST—The Automotive Multimedia Network—From MOST25 to MOST 150", MOST Specification Rev. 3.0 E2 dated Jul. 2010 by MOST Cooperation (337 pages).
MOST Dynamic Specification by MOST Cooperation Rev. 3.0.2 dated Oct. 2012 entitled: "MOST—Multimedia and Control Networking Technology" (82 pages).
"LIN Specification Package—Revision 2.2A" by the LIN Consortium, Dec. 31, 2010 (194 pages).
Data sheet DS00001935A by Microchip Technology Incorporated entitled: "MOST150 INIC with USB 2.0 Device Port", 2015 (2 pages).
Data sheet PFL_OS8104A_V01_00_XX-4.fm published Aug. 2007 by Microchip Technology Incorporated entitled: "MOST Network Interface Controller", Aug. 2007 (2 pages).
FlexRay consortium publication entitled: "FlexRay Communications System—Protocol Specification—Version 3.0.1", Oct. 2010 (341 pages).
Carl Hanser Verlag Gmbh 2010 publication by Lorenz, Steffen entitled: "The FlexRay Electrical Physical Layer Evolution", (6 pages).
National Instruments Corporation Technical Overview Publication entitled: "FlexRay Automotive Communication Bus Overview", Aug. 21, 2009 (8 pages).
Product data sheet (document Identifier TJA1080A, date of release: Nov. 28, 2012) entitled: "TJA1080A FlexRay Transceiver—Rev. 6—Nov. 28, 2012—Product data sheet" (49 pages).
ISO 14230-1:1999 entitled: "Road vehicles—Diagnostic systems—Keyword Protocol 2000—Part 1: Physical layer" Mar. 15, 1999 (12 pages).
ISO 14230-2:1996 entitled: "Road vehicles—Diagnostic systems—Keyword Protocol 2000—Part 2: Data link layer" Dec. 16, 1996 (28 pages).
ISO 14230-3:1999 entitled: "Road vehicles—Diagnostic systems—Keyword Protocol 2000—Part 3: Application layer", Mar. 15, 1999 (11 pages).
ISO 14230-4:2000 entitled: "Road vehicles—Diagnostic systems—Keyword Protocol 2000—Part 4: Requirements for emission-related systems", Jun. 1, 2000 (10 pages).
Charles M. Kozierok, Colt Correa, Robert B. Boatright, and Jeffrey Quesnelle entitled: "Automotive Ethernet: The Definitive Guide", published 2014 by Interpid Control Systems [ISBN-13: 978-0-9905388-0-6] (207 pages).
White paper document No. 915-3510-01 Rev. A entitled: "Automotive Ethernet: An Overview", May 2014 by Ixia (20 pages).
Dr. Bernd Korber, "BroadR-Reach® Definitions for Communication Channel—Version 2.0", by the OPEN Alliance, Nov. 28, 2014 (30 pages).
J1939-21 Surface Vehicle Recommended Practice entitled: "Data Link Layer", Jul. 1994 (47 pages).
J1939-31 Surface Vehicle Recommended Practice entitled: "Network Layer", Dec. 1994 (27 pages).
J1939-81 Surface Vehicle Recommended Practice entitled: "Network Management", Jul. 1997 (39 pages).
J1939-71 Surface Vehicle Recommended Practice entitled: "Vehicle Application Layer (through Dec. 2004)", Aug. 1994 (686 pages).
J1939-73 Surface Vehicle Recommended Practice entitled: "Application Layer—Diagnostics", Feb. 1996 (158 pages).
J1939-74 Surface Vehicle Recommended Practice entitled: "Application—Configurable Messaging", Sep. 2004 (36 pages).
J1939-75 Surface Vehicle Recommended Practice entitled: "Application Layer—Generator Sets and Industrial", Dec. 2002 (37 pages).
Cisco Systems, Inc. Publication No. 1-587005-001-3 (Jun. 1999), "Internetworking Technologies Handbook", Chapter 7: "Ethernet Technologies", pp. 7-1 to 7-38, (38 pages).
Standard Microsystems Corporation (SMSC) data-sheet "LAN91C111 10/100 Non-PCI Ethernet Single Chip MAC + PHY" Data-Sheet, Rev. 15 (Feb. 20, 2004) (127 pages).
Owen Bishop entitled: "Electronics—Circuits and Systems" Fourth Edition, published 2011 by Elsevier Ltd. [ISBN—978-0-08-096634-2] (381 pages).
ISO 11898-1:2003 entitled: "Road vehicles—Controller area network (CAN)—Part 1: Data link layer and physical signalling" First edition, Dec. 1, 2003 (52 pages).
ISO 11898-2:2003 entitled: "Road vehicles—Controller area network (CAN)—Part 2: High-speed medium access unit" First edition, Dec. 1, 2003 (7 pages).
ISO 11898-3:2006 entitled: "Road vehicles—Controller area network (CAN)—Part 3: Low-speed, fault-tolerant, medium-dependent interface" First edition, Jun. 1, 2006 (11 pages).
ISO 11898-4:2004 entitled: "Road vehicles—Controller area network (CAN)—Part 4: Time-triggered communication", First edition, Aug. 1, 2004 (40 pages).
ISO 11898-5:2007 entitled: "Road vehicles—Controller area network (CAN)—Part 5: High-speed medium access unit with low-power mode", First edition, Jun. 15, 2007 (28 pages).
ISO 11898-6:2013 entitled: "Road vehicles—Controller area network (CAN)—Part 6: High-speed medium access unit with selective wake-up functionality", First edition, Nov. 1, 2013 (8 pages).

* cited by examiner

FIG. 2 (Prior Art)

| SAE level | Name | Narrative Definition | Execution of Steering and Acceleration/Deceleration | Monitoring of Driving Environment | Fallback Performance of Dynamic Driving Task | System Capability (Driving Modes) |
|---|---|---|---|---|---|---|
| Human driver monitors the driving environment | | | | | | |
| 0 | No Automation | the full-time performance by the human driver of all aspects of the dynamic driving task, even when enhanced by warning or intervention systems | Human driver | Human driver | Human driver | n/a |
| 1 | Driver Assistance | the driving mode-specific execution by a driver assistance system of either steering or acceleration/deceleration using information about the driving environment and with the expectation that the human driver perform all remaining aspects of the dynamic driving task | Human driver and system | Human driver | Human driver | Some driving modes |
| 2 | Partial Automation | the driving mode-specific execution by one or more driver assistance systems of both steering or acceleration/deceleration using information about the driving environment and with the expectation that the human driver perform all remaining aspects of the dynamic driving task | System | Human driver | Human driver | Some driving modes |
| Automated driving system ("system") monitors the driving environment | | | | | | |
| 3 | Conditional Automation | the driving mode-specific performance by an automated driving system of all the aspects of the dynamic driving task with the expectation that the human driver will respond appropriately to a request to intervene | System | System | Human driver | Some driving modes |
| 4 | High Automation | the driving mode-specific performance by an automated driving system of all the aspects of the dynamic driving task, even if a human driver does not respond appropriately to a request to intervene | System | System | System | Some driving modes |
| 5 | Full Automation | the full-time performance by an automated driving system of all the aspects of the dynamic driving task under all roadway and environmental conditions that can be managed by a human driver | System | System | System | All driving modes |

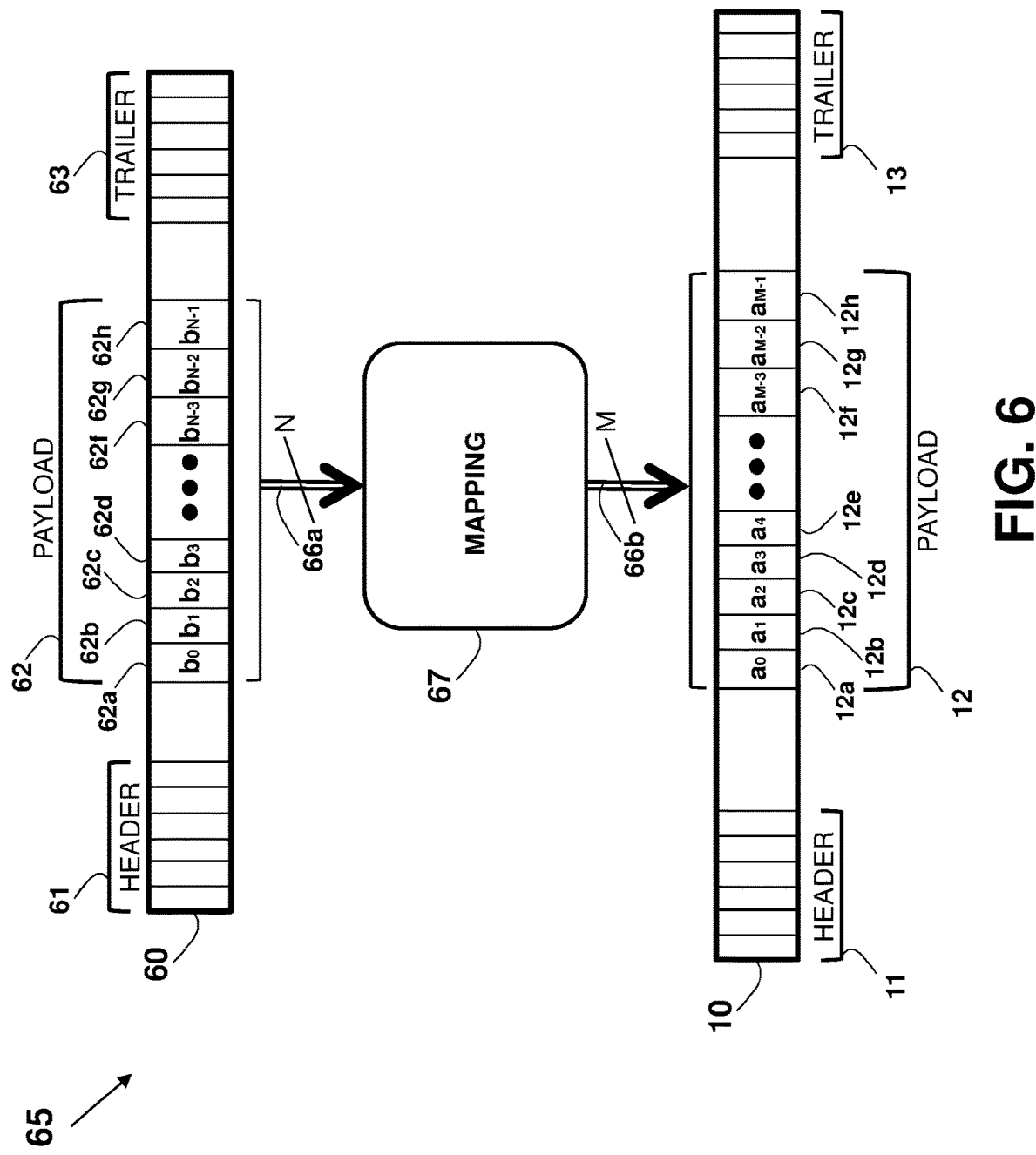

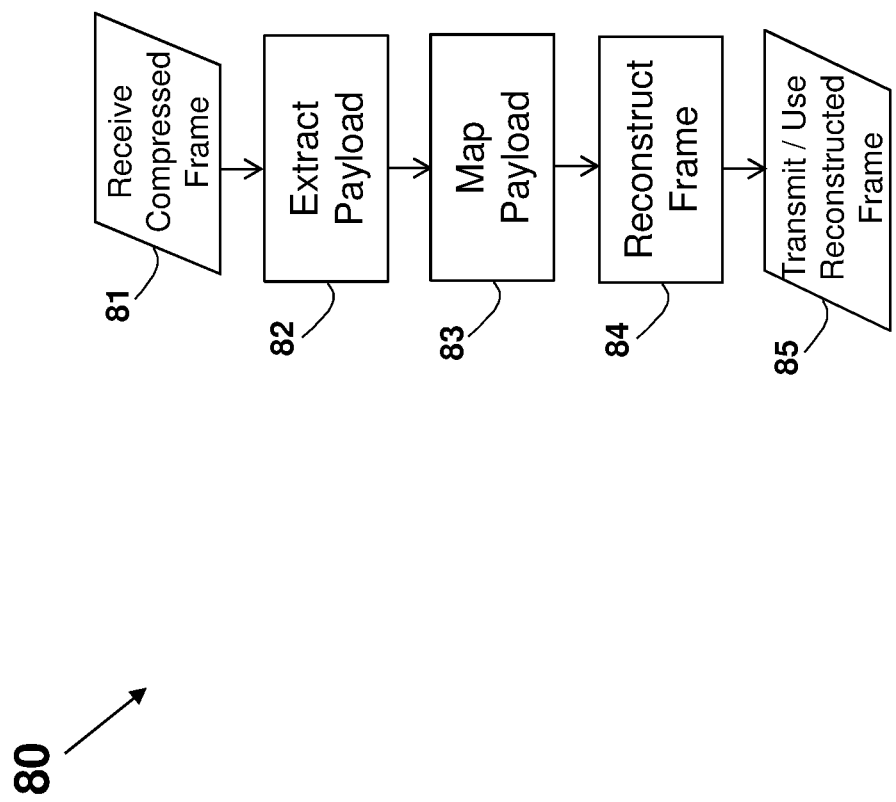

| SMPL # | a0 | a1 | a2 | a3 | ... | a9 | a10 | ... | aM-4 | aM-3 | aM-2 | aM-1 |
|---|---|---|---|---|---|---|---|---|---|---|---|---|
| #1 | 0 | 0 | 1 | 1 | ... | 1 | 1 | ... | | 0 | 0 | 0 |
| #2 | 0 | 0 | 1 | 0 | ... | 1 | 1 | ... | | 0 | 0 | 0 |
| #3 | 1 | 0 | 0 | 1 | ... | 1 | 0 | ... | | 0 | 1 | 1 |
| #4 | 1 | 0 | 0 | 0 | ... | 1 | 0 | ... | | 0 | 1 | 1 |
| ... | | | | | | | | | | | | |
| #32 | 1 | 0 | 0 | 1 | ... | 1 | 1 | ... | | 0 | 0 | 0 |
| #p | 0 | 0 | 1 | 1 | ... | 1 | 0 | ... | | 0 | 1 | 1 |

FIG. 15

| SMPL # | a0 | a2 | a3 | ... | a10 | ... | aM-4 | aM-2 | aM-1 |
|---|---|---|---|---|---|---|---|---|---|
| #1 | 0 | 1 | 1 | ... | 1 | ... | 0 | 0 | 0 |
| #2 | 0 | 1 | 0 | ... | 1 | ... | 0 | 0 | 0 |
| #3 | 1 | 0 | 1 | ... | 0 | ... | 1 | 1 | 1 |
| #4 | 1 | 0 | 0 | ... | 0 | ... | 1 | 1 | 1 |
| #32 | 1 | 0 | 1 | ... | 1 | ... | 1 | 0 | 0 |
| #p | 0 | 1 | 1 | ... | 0 | ... | 0 | 1 | 1 |

FIG. 15a

| SMPL # | #1 | #2 | #3 | #4 | ... | #32 | ... | #p |
|---|---|---|---|---|---|---|---|---|
| $a_0$ | 0 | 0 | 1 | 1 | ... | 1 | ●● | 0 |
| $a_3$ | 1 | 0 | 1 | 0 | | 1 | | 1 |
| ● | | | | | ● | | | |
| ● | | | | | ● | | | |
| ● | | | | | ● | | | |
| $a_{10}$ | 1 | 1 | 0 | 0 | | 1 | | 0 |
| ● | | | | | ● | | | |
| ● | | | | | ● | | | |
| ● | | | | | ● | | | |
| $a_{M-2}$ | 0 | 0 | 1 | 1 | | 0 | | 1 |
| $a_{M-1}$ | 0 | 0 | 1 | 1 | | 0 | | 1 |

FIG. 15b

| SMPL # | $a_0$ | $a_3$ | ... | $a_{10}$ | ... | $a_{M-1}$ |
|---|---|---|---|---|---|---|
| #1 | 0 | 1 | ● ● ● | 1 | ● ● ● | 0 |
| #2 | 0 | 0 | ● ● ● | 1 | ● ● ● | 0 |
| #3 | 1 | 1 | ● ● ● | 0 | ● ● ● | 1 |
| #4 | 1 | 0 | ● ● ● | 0 | ● ● ● | 1 |
| ● ● ● | ● ● ● | | ● ● ● | ● ● ● | ● ● ● | |
| #32 | 1 | 1 | ● ● ● | 1 | ● ● ● | 0 |
| ● ● | | | | | | |
| #p | 0 | 1 | ● ● ● | 0 | ● ● ● | 1 |

FIG. 15c

| SMPL # | a0 | a3 | ... | a10 | ... | aM-1 |
|---|---|---|---|---|---|---|
| #1 | 0 | 1→0 | • • • | 1→0 | • • • | 0 |
| #2 | 0 | 0→0 | | 1→1 | | 0 |
| #3 | 1 | 1→1 | | 0→0 | | 1 |
| #4 | 1 | 0→1 | | 0→1 | | 1 |
| ... | ••• | | | | | |
| #32 | 1 | 1→0 | | 1→0 | | 0 |
| #p | 0 | 1→1 | | 0→0 | | 1 |

FIG. 15d

| | 0 (161a) | 1 (161b) | 2 (161c) | 3 (161d) | 3' (161d') |
|---|---|---|---|---|---|
| $a_0$ (12a) | S | S | S | | |
| $a_1$ (12b) | S | '0' | '0' | | |
| $a_2$ (12c) | S | S | C0=1 | | |
| $a_3$ (12d) | S | S | S | | * |
| ⋮ | | | | | |
| $a_9$ (12i) | S | '1' | '1' | | |
| $a_{10}$ (12j) | S | S | S | | * |
| ⋮ | | | | | |
| $a_{M-4}$ (12k) | S | S | C0=0 | | |
| $a_{M-3}$ (12f) | S | '0' | '0' | | |
| $a_{M-2}$ (12g) | S | S | S | C(3,10)={0,2} | * |
| $a_{M-1}$ (12h) | S | S | S | | |

160a $$(*) = \begin{array}{lcl} (a_3, a_{10}, a_{M-2}) & \rightarrow & (b_3, b_{10}, b_{M-2}) \\ (0,0,0) & \rightarrow & (1,1,0) \\ (0,1,0) & \rightarrow & (0,1,0) \\ (1,0,0) & \rightarrow & (1,0,1) \\ (1,1,0) & \rightarrow & (0,0,1) \\ (0,0,1) & \rightarrow & (0,0,0) \\ (0,1,1) & \rightarrow & (0,1,1) \\ (1,0,1) & \rightarrow & (1,0,0) \\ (1,1,1) & \rightarrow & (1,1,1) \end{array}$$

S = Stay

FIG. 16a

SYSTEM AND METHOD FOR DATA COMPRESSION BASED ON DATA POSITION IN FRAMES STRUCTURE

RELATED APPLICATIONS

This patent application is a continuation application of U.S. patent application Ser. No. 17/420,749 filed on Jul. 6, 2021, which is a national phase application of a PCT Application No. PCT/IL2019/051301 that was filed on Nov. 27, 2019 and which claims the benefit of U.S. Provisional Application Ser. No. 62/794,651 that was filed on Jan. 20, 2019, and of U.S. Provisional Application Ser. No. 62/873,029 filed Jul. 11, 2019, which are all hereby incorporated herein by reference in their entirety.

TECHNICAL FIELD

This disclosure relates generally to an apparatus and method for data-link layer (OSI Layer 2) based compression and decompression, and in particular, but not exclusive, to compression or decompression based on data location within a frame, such as in automotive bus protocol.

BACKGROUND

Unless otherwise indicated herein, the materials described in this section are not prior art to the claims in this application, and are not admitted to be prior art by inclusion in this section.

The data layer, or layer 2, is the second layer of the seven-layer Open Systems Interconnection (OSI) model of computer networking. This layer is the protocol layer that transfers data between adjacent network nodes in a wide area network (WAN) or between nodes on the same local area network (LAN) segment. The data link layer provides the functional and procedural means to transfer data between network entities and might provide the means to detect and possibly correct errors that may occur in the physical layer. The data link layer is concerned with local delivery of frames between nodes on the same level of the network. Data-link frames, as these protocol data units are called, do not cross the boundaries of a local area network. Internetwork routing and global addressing are higher-layer functions, allowing data-link protocols to focus on local delivery, addressing, and media arbitration. Data-link protocols may specify how devices detect and recover from collisions, and may provide mechanisms to reduce or prevent them. Examples of data link protocols are Ethernet for local area networks (multi-node), the Point-to-Point Protocol (PPP), HDLC and ADCCP for point-to-point (dual-node) connections. In the Internet Protocol Suite (TCP/IP), the data link layer functionality is contained within the link layer, the lowest layer of the descriptive model.

A frame header typically contains source and destination addresses that indicate which device originated the frame and which device is expected to receive and process it. In contrast to the hierarchical and routable addresses of the network layer, layer-2 addresses are flat, meaning that no part of the address can be used to identify the logical or physical group to which the address belongs. The data link thus provides data transfer across the physical link. That transfer can be reliable or unreliable; many data-link protocols do not have acknowledgments of successful frame reception and acceptance, and some data-link protocols might not even have any form of checksum to check for transmission errors. In those cases, higher-level protocols must provide flow control, error checking, and acknowledgments and retransmission.

In some networks, such as IEEE 802 local area networks, the data link layer is described in more detail with media access control (MAC) and logical link control (LLC) sublayers; this means that the IEEE 802.2 LLC protocol can be used with all of the IEEE 802 MAC layers, such as Ethernet, token ring, IEEE 802.11, etc., as well as with some non-802 MAC layers such as FDDI. Other data-link-layer protocols, such as HDLC, are specified to include both sublayers, although some other protocols, such as Cisco HDLC, use HDLC's low-level framing as a MAC layer in combination with a different LLC layer. In the ITU-T G.hn standard, which provides a way to create a high-speed (up to 1 Gigabit/s) local area network using existing home wiring (power lines, phone lines and coaxial cables), the data link layer is divided into three sub-layers (application protocol convergence, logical link control and media access control).

The data link layer has two sublayers: Logical Link Control (LLC) and Media Access Control (MAC). The uppermost sublayer, LLC, multiplexes protocols running at the top of data link layer, and optionally provides flow control, acknowledgment, and error notification. The LLC provides addressing and control of the data link. It specifies which mechanisms are to be used for addressing stations over the transmission medium and for controlling the data exchanged between the originator and recipient machines.

MAC may refer to the sublayer that determines who is allowed to access the media at any one time (e.g., CSMA/CD). Other times it refers to a frame structure delivered based on MAC addresses inside. There are generally two forms of media access control: distributed and centralized. The Media Access Control sublayer also determines where one frame of data ends and the next one starts—frame synchronization. There are four means of frame synchronization: time based, character counting, byte stuffing and bit stuffing.

The time based approach simply puts a specified amount of time between frames. The major drawback of this is that new gaps can be introduced or old gaps can be lost due to external influences. Character counting simply notes the count of remaining characters in the frame's header. This method, however, is easily disturbed if this field gets faulty in some way, thus making it hard to keep up synchronization. Byte stuffing precedes the frame with a special byte sequence such as DLE STX and succeeds it with DLE ETX. Appearances of DLE (byte value 0x10) have to be escaped with another DLE. The start and stop marks are detected at the receiver and removed as well as the inserted DLE characters. Similarly, bit stuffing replaces these start and end marks with flag consisting of a special bit pattern (e.g. a 0, six 1 bits and a 0). Occurrences of this bit pattern in the data to be transmitted are avoided by inserting a bit. To use the example where the flag is 01111110, a '0' is inserted after 5 consecutive 1's in the data stream. The flags and the inserted 0's are removed at the receiving end. This makes for arbitrary long frames and easy synchronization for the recipient. Note that this stuffed bit is added even if the following data bit is '0', which could not be mistaken for a sync sequence, so that the receiver can unambiguously distinguish stuffed bits from normal bits.

The data link layers further includes mechanisms to detect and even recover from transmission errors. For a receiver to detect transmission error, the sender must add redundant information (in the form of bits) as an error detection code to the frame sent. When the receiver obtains a frame with an error detection code it re-computes it and verifies whether the received error detection code matches the computed error detection code. If they match the frame is considered to be valid. An error detection code can be defined as a function that computes the r (amount of redundant bits) corresponding to each string of N total number of bits. The simplest error detection code is the parity bit, which allows a receiver to detect transmission errors that have affected a single bit among the transmitted N+r bits. If there are two or more bits in error, the receiver may not be able to detect the transmission error.

Frame. A frame is a digital data transmission unit in computer networking and telecommunication. A frame typically includes frame synchronization features consisting of a sequence of bits or symbols that indicate to the receiver the beginning and end of the payload data within the stream of symbols or bits it receives. If a receiver is connected to the system in the middle of a frame transmission, it ignores the data until it detects a new frame synchronization sequence.

In the OSI model of computer networking, a frame is the protocol data unit at the data link layer. Frames are the result of the final layer of encapsulation before the data is transmitted over the physical layer. Each frame is separated from the next by an interframe gap. A frame is a series of bits generally composed of framing bits, the packet payload, and a frame check sequence. In telecommunications, specifically in Time-Division Multiplex (TDM) and Time-Division Multiple Access (TDMA) variants, a frame is a cyclically repeated data block that consists of a fixed number of time slots, one for each logical TDM channel or TDMA transmitter. In this context, a frame is typically an entity at the physical layer. The frame is also an entity for time-division duplex, where the mobile terminal may transmit during some timeslots and receive during others. Often, frames of several different sizes are nested inside each other. For example, when using Point-to-Point Protocol (PPP) over asynchronous serial communication, the eight bits of each individual byte are framed by start and stop bits, the payload data bytes in a network packet are framed by the header and footer, and several packets can be framed with frame boundary octets.

A schematic view of an exemplary frame 10 is shown in FIG. 1. The frame 10 is defined as starting with a header 11, including few bits, and ends with a trailer (also known as 'footer') 13 bits. The data carried by the frame 10 is referred to as payload 12, and is positioned between the header 11 and the trailer 13. In the example of the frame 10, the payload 12 comprises a most LSB bit (or position) $a_0$ 12a, which is followed by bit or location $a_1$ 12b, and then followed by bits (or locations) $a_2$ 12c, $a_3$ 12d, and $a_4$ 12e. The payload 12 ends with bits $a_{M-3}$ 12f, followed by bit or location $a_{M-2}$ 12g, and ending with the MSB bit or location $a_{M-1}$ 12h, totaling of M bits in the payload 12. While frame 10 is shown where the LSB bits (or locations) follow the header 11 and the MSB bits (or locations) precede the trailer 13, frames can equally use a reverse order, where MSB bits (or locations) that follow the header 11 and LSB bits (or locations) that precede the trailer 13. Few locations or bits may be group to form a field having a specific significance or indication, such as a field 'A' 14a shown to include the first LSB bits or locations $a_0$ 12a to $a_3$ 12d, and a field 'B' 14b shown to include the last two MSB bits $a_{M-2}$ 12g and $a_{M-1}$ 12h. Similarly, single bits may be used as specific indicators, such as bit or location $a_4$ 12e shown as an indicator 15.

Packet. A packet is the unit of data passed across the interface between the internet layer and the link layer. It typically includes an IP header and data, and a packet may be a complete IP datagram or a fragment of an IP datagram. A packet is typically a formatted unit of data carried by a packet-switched network. When data is formatted into packets, packet switching is possible and the bandwidth of the communication medium can be better shared among users than with circuit switching.

A packet consists of control information and user data, which is also known as the payload. Control information provides data for delivering the payload, for example: source and destination network addresses, error detection codes, and sequencing information. Typically, control information is found in packet headers and trailers. In the seven-layer OSI model of computer networking, packet strictly refers to a data unit at layer 3, the Network Layer. The correct term for a data unit at Layer 2, the Data Link Layer, is a frame, and at Layer 4, the Transport Layer, the correct term is a segment or datagram. For the case of TCP/IP communication over Ethernet, a TCP segment is carried in one or more IP packets, which are each carried in one or more Ethernet frames. Different communications protocols use different conventions for distinguishing between the elements and for formatting the data. For example, in Point-to-Point Protocol, the packet is formatted in 8-bit bytes, and special characters are used to delimit the different elements. Other protocols like Ethernet, establish the start of the header and data elements by their location relative to the start of the packet. Some protocols format the information at a bit level instead of a byte level. A network design can achieve two major results by using packets: error detection and multiple host addressing. A packet typically includes various fields such as addresses, Error detection and correction, hop counts, priority, length, and payload.

The addresses fields commonly relating to the routing of network packets requires two network addresses, the source address of the sending host, and the destination address of the receiving host. Error detection and correction is performed at various layers in the protocol stack. Network packets may contain a checksum, parity bits or cyclic redundancy checks to detect errors that occur during transmission. At the transmitter, the calculation is performed before the packet is sent. When received at the destination, the checksum is recalculated, and compared with the one in the packet. If discrepancies are found, the packet may be corrected or discarded. Any packet loss is dealt with by the network protocol. Under fault conditions packets can end up traversing a closed circuit. If nothing was done, eventually the number of packets circulating would build up until the network was congested to the point of failure. A time-to-live is a field that is decreased by one each time a packet goes through a network node. If the field reaches zero, routing has failed, and the packet is discarded. Ethernet packets have no time-to-live field and so are subject to broadcast radiation in the presence of a switch loop. There may be a field to identify the overall packet length. However, in some types of networks, the length is implied by the duration of transmission. Some networks implement quality of service, which can prioritize some types of packets above others. This field indicates which packet queue should be used; a high priority queue is emptied more quickly than lower priority queues at points in the network where congestion is occurring. In general, payload is the data that is carried on behalf of an application. It is usually of variable length, up to a maximum that is set by the network protocol and sometimes the equipment on the route. Some networks can break a larger packet into smaller packets when necessary.

Physical layer. The Open Systems Interconnection (OSI) model, which is defined by the International Organization for Standardization (ISO) and is maintained by the identification ISO/IEC 7498-1, includes seven-layers. The physical layer or layer 1 is the first and lowest layer. The physical layer consists of the basic networking hardware for transmission technologies of a network. It is a fundamental layer underlying the logical data structures of the higher level functions in a network. The physical layer defines the electrical and physical specifications of the data connection. It defines the relationship between a device and a physical transmission medium (e.g., a copper or fiber optical cable and radio frequency). This includes the layout of pins, voltages, line impedance, cable specifications, signal timing and similar characteristics for connected devices and frequency (5 GHz or 2.4 GHz etc.) for wireless devices. It is responsible for transmission and reception of unstructured raw data in a physical medium. It may define transmission mode as simplex, half-duplex, and full duplex. It further defines the network topology as bus, mesh, or ring being some of the most common.

The physical layer defines the means of transmitting raw bits rather than logical data packets over a physical link connecting network nodes. The bit stream may be grouped into code words or symbols and converted to a physical signal that is transmitted over a hardware transmission medium. The physical layer provides an electrical, mechanical, and procedural interface to the transmission medium. The major functions and services performed by the physical layer are bit-by-bit or symbol-by-symbol delivery, providing a standardized interface to physical transmission media, including mechanical specification of electrical connectors and cables, for example maximum cable length, electrical specification of transmission line signal level and impedance, radio interface, including electromagnetic spectrum frequency allocation and specification of signal strength, analog bandwidth, modulation, line coding, bit synchronization in synchronous serial communication, start-stop signaling and flow control in asynchronous serial communication, circuit switching, multiplexing, establishment and termination of circuit switched connections, carrier sense and collision detection (utilized by some level 2 multiple access protocols), equalization filtering, training sequences, pulse shaping and other signal processing of physical signals, forward error correction, bit-interleaving and other channel coding. The physical layer is also concerned with bit rate, point-to-point, multipoint or point-to-multipoint line configuration, physical network topology, for example bus, ring, mesh or star network, serial or parallel communication, simplex, half duplex or full duplex transmission mode, and auto-negotiation.

Medium. In a communication network, multiple devices or stations that implement some part of the communication protocol are communicating over a transmission medium, which is a transmission path along which a signal propagates, such as a wire pair, coaxial cable, waveguide, optical fiber, or radio path. Such a medium may include any material substance, such as fiber-optic cable, twisted-wire pair, coaxial cable, dielectric-slab waveguide, water, and air, which can be used for the propagation of signals, usually in the form of modulated radio, light, or acoustic waves, from one point to another. A free space is typically also considered as a transmission medium for electromagnetic waves, although it is not a material medium. A medium that consists of a specialized cable or other structure designed to carry alternating current of radio frequency, that is, currents with a frequency high enough that their wave nature must be taken into account, is referred to as a transmission line. Transmission lines are commonly used for purposes such as connecting radio transmitters and receivers with their antennas.

The transfer of information such as the digital data between two nodes in a network commonly makes use of a line driver for transmitting the signal to the conductors serving as the transmission medium connecting the two nodes, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors and pin identification and pin-out. In one example, the module circuit can use an industry or other standard used for interfacing serial binary data signals. Preferably, the line drivers, the line receivers, and their associated circuitry will be protected against Electro-Static Discharge (ESD), electromagnetic interference (EMI/EMC) and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC. A device that transmits data to a medium typically uses a line driver, which commonly includes an electronic amplifier as part of a circuit designed for a load such as a transmission line, and preferably optimized to the medium used. The output impedance of the amplifier typically matches the characteristic impedance of the transmission line. The line driver typically converts the logic levels used by the module internal digital logic circuits (e.g., CMOS, TTL, LSTTL and HCMOS) to a signal to be transmitted over the medium. At the receiving device, a line receiver is used which typically converts the received signal to the logic levels used by the module internal digital logic circuits (e.g., CMOS, TTL, LSTTL and HCMOS). A set of a line driver and a line receiver is commonly referred to as, or is part of, a transceiver (transmitter+receiver), and is used in nodes that both transmits digital data to the medium and receives digital data from the medium. In the case where the signal over the medium is modulated, a modem (a MOdulator-DEModulator) device is used, which encodes digital information onto an analog carrier signal by varying their amplitude, frequency, or phase of that carrier. The demodulator extracts digital information from a similarly modified carrier. A modem transforms digital signals into a form suitable for transmission over an analog medium.

Wire. An electrical wire is a single, usually cylindrical, flexible strand or rod of metal, typically for carrying electricity and telecommunications signals. Wire is commonly formed by drawing the metal through a hole in a die or draw plate, and wire gauges come in various standard sizes, as expressed in terms of a gauge number. Wire comes in solid core, stranded, or braided forms. Although usually circular in cross-section, wire can be made in square, hexagonal, flattened rectangular, or other cross-sections, either for decorative purposes, or for technical purposes such as high-efficiency voice coils in loudspeakers. A wire pair consists of two like conductors employed to form or serve an electric circuit.

Cable. An electrical cable is an assembly of one or more insulated conductors, or optical fibers, or a combination of both, within an enveloping jacket, where the conductors or fibers may be used singly or in groups. A typical electrical cable is made of two or more wires running side by side and bonded, twisted, or braided together to form a single assembly, the ends of which can be connected to two devices, enabling the transfer of electrical signals from one device to the other.

Wireline. Wireline or wired network uses conductors, typically metallic wire conductors, as the transmission medium. The transmission mediums used in common wirelines include twisted-pair, coaxial cable, stripline, and microstrip. Microstrip is a type of electrical transmission line, which can be fabricated using printed circuit board technology, and is used to convey microwave-frequency signals. It consists of a conducting strip separated from a ground plane by a dielectric layer known as the substrate. Microwave components such as antennas, couplers, filters, power dividers etc. can be formed from microstrip, with the entire device existing as the pattern of metallization on the substrate. A stripline circuit uses a flat strip of metal, which is sandwiched between two parallel ground planes, where the insulating material of the substrate forms a dielectric. The width of the strip, the thickness of the substrate and the relative permittivity of the substrate determine the characteristic impedance of the strip, which is a transmission line. Various cables are described in "*Technical Handbook & Catalog*" Twelfth Edition published 2006 by Standard Wire & Cable Co., which is incorporated in its entirety for all purposes as if fully set forth herein.

Topology. A wired network is defined by the specific physical arrangement of the elements (nodes) connected to a network, although the networks may differ in physical interconnections, distances between nodes, transmission rates, and/or signal types. Network topology is the arrangement of the various elements (links, nodes, etc.) of a computer network. Essentially, it is the topological structure of a network and may be depicted physically or logically. Physical topology is the placement of the various components of a network, including device location and cable installation, while logical topology illustrates how data flows within a network, regardless of its physical design. Distances between nodes, physical interconnections, transmission rates, or signal types may differ between two networks, yet their topologies may be identical. Traditionally, eight basic topologies are identified: point-to-point, bus, star, ring or circular, mesh, tree, hybrid, and daisy chain.

A point-to-point topology is a configuration where there are only nodes connected over a dedicated medium. In a bus topology (also known as linear topology), all nodes, i.e., stations, are connected together by a single medium. A fully connected topology (also known as fully connected mesh network), there is a direct path between any two nodes, so that with n nodes, there are n(n−1)/2 direct paths. In a ring topology, every node has exactly two branches connected to it. A ring topology is actually a bus topology in a closed loop, where data travels around the ring in one direction. When one node sends data to another, the data passes through each intermediate node on the ring until it reaches its destination. The intermediate nodes repeat (retransmit) the data to keep the signal strong. Every node is a peer; there is no hierarchical relationship of clients and servers. If one node is unable to retransmit data, it severs communication between the nodes before and after it in the bus.

A combination of any two or more network topologies is known as hybrid topology. A network topology in which peripheral nodes are connected to a central node, which rebroadcasts all transmissions received from any peripheral node to all peripheral nodes on the network, including the originating node, is referred to as star topology. All peripheral nodes may thus communicate with all others by transmitting to, and receiving from, the central node only. If the star central node is passive, the originating node must be able to tolerate the reception of an echo of its own transmission, delayed by the two-way transmission time, i.e., to and from the central node, plus any delay generated in the central node. An active star network has an active central node that usually has the means to prevent echo-related problems.

In local area networks where bus topology is used, each node is connected to a single cable, by the help of interface connectors. This central cable is the backbone of the network and is known as the bus. A signal from the source travels in both directions to all nodes connected on the bus cable until it finds the intended recipient. If the node address does not match the intended address for the data, the machine ignores the data. Alternatively, if the data matches the node address, the data is accepted. Because the bus topology consists of only one or two wire, it is rather inexpensive to implement when compared to other topologies. In a linear bus, all of the nodes of the network are connected to a common transmission medium which has exactly two endpoints (this is the 'bus', which is also commonly referred to as the backbone, or trunk)—all data that is transmitted between nodes in the network is transmitted over this common transmission medium and is able to be received by all nodes in the network simultaneously. In a star topology network, each network node is connected to a central hub with a point-to-point connection, so effectively every node is indirectly connected to every other node with the help of the hub. In star topology, every node is connected to a central node called hub, router or switch. The switch is the server and the peripherals are the clients. The network does not necessarily have to resemble a star to be classified as a star network, but all of the nodes on the network must be connected to one central device. All traffic that traverses the network passes through the central hub. The hub acts as a signal repeater. The star topology is considered the easiest topology to design and implement. An advantage of the star topology is the simplicity of adding additional nodes. The primary disadvantage of the star topology is that the hub represents a single point of failure.

An example of a multi-point 'bus' topology communication over a balanced line, such as according to RS-485, is shown in an arrangement 40 in FIG. 4. The wired communication medium 16 comprises two conductors or wires 14a and 14b, cooperatively connected in a point-to-point topology, and may form a balanced line such as a UTP or STP. Bus devices 'A' 41a, 'B' 41b, and 'C' 41c are connected at different points along the medium (or at the medium ends), and are respectively connected to the medium 16 by connectors 13a, 13b, and 13c. The bus devices 'A' 41a, 'B' 41b, and 'C' 41c respectively comprises balanced line drivers 41a, 41b, and 41c, and balanced line receivers 42a, 42b, and 42c, that may be part of respective transceivers 43a, 43b, and 43c, that are respectively connected to the connectors 13a, 13b, and 13c for coupling to the medium 16. Impedances such as resistors 19a and 19b are connected at both ends of the medium 16 as terminations for matching to the medium impedance for reducing signal reflections.

Vehicle. A vehicle is a mobile machine that transports people or cargo. Most often, vehicles are manufactured, such as wagons, bicycles, motor vehicles (motorcycles, cars, trucks, buses), railed vehicles (trains, trams), watercraft (ships, boats), aircraft and spacecraft. The vehicle may be designed for use on land, in fluids, or be airborne, such as bicycle, car, automobile, motorcycle, train, ship, boat, submarine, airplane, scooter, bus, subway, train, or spacecraft. A vehicle may consist of, or may comprise, a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane. Further, a vehicle may be a bicycle, a car, a motorcycle, a train, a ship, an aircraft, a boat, a spacecraft, a boat, a submarine, a dirigible, an electric scooter, a subway, a train, a trolleybus, a tram, a sailboat, a yacht, or an airplane.

A vehicle may be a land vehicle typically moving on the ground, using wheels, tracks, rails, or skies. The vehicle may be locomotion-based where the vehicle is towed by another vehicle or an animal. Propellers (as well as screws, fans, nozzles, or rotors) are used to move on or through a fluid or air, such as in watercrafts and aircrafts. The system described herein may be used to control, monitor or otherwise be part of, or communicate with, the vehicle motion system. Similarly, the system described herein may be used to control, monitor or otherwise be part of, or communicate with, the vehicle steering system. Commonly, wheeled vehicles steer by angling their front or rear (or both) wheels, while ships, boats, submarines, dirigibles, airplanes and other vehicles moving in or on fluid or air usually have a rudder for steering. The vehicle may be an automobile, defined as a wheeled passenger vehicle that carries its own motor, and primarily designed to run on roads, and have seating for one to six people. Typically, automobiles have four wheels, and are constructed to principally transport of people.

Human power may be used as a source of energy for the vehicle, such as in non-motorized bicycles. Further, energy may be extracted from the surrounding environment, such as solar powered car or aircraft, a street car, as well as by sailboats and land yachts using the wind energy. Alternatively or in addition, the vehicle may include energy storage, and the energy is converted to generate the vehicle motion. A common type of energy source is a fuel, and external or internal combustion engines are used to burn the fuel (such as gasoline, diesel, or ethanol) and create a pressure that is converted to a motion. Another common medium for storing energy are batteries or fuel cells, which store chemical energy used to power an electric motor, such as in motor vehicles, electric bicycles, electric scooters, small boats, subways, trains, trolleybuses, and trams.

Aircraft. An aircraft is a machine that is able to fly by gaining support from the air. It counters the force of gravity by using either static lift or by using the dynamic lift of an airfoil, or in a few cases, the downward thrust from jet engines. The human activity that surrounds aircraft is called aviation. Crewed aircraft are flown by an onboard pilot, but unmanned aerial vehicles may be remotely controlled or self-controlled by onboard computers. Aircraft may be classified by different criteria, such as lift type, aircraft propulsion, usage and others.

Aerostats are lighter than air aircrafts that use buoyancy to float in the air in much the same way that ships float on the water. They are characterized by one or more large gasbags or canopies filled with a relatively low-density gas such as helium, hydrogen, or hot air, which is less dense than the surrounding air. When the weight of this is added to the weight of the aircraft structure, it adds up to the same weight as the air that the craft displaces. Heavier-than-air aircraft, such as airplanes, must find some way to push air or gas downwards, so that a reaction occurs (by Newton's laws of motion) to push the aircraft upwards. This dynamic movement through the air is the origin of the term aerodyne. There are two ways to produce dynamic upthrust: aerodynamic lift and powered lift in the form of engine thrust.

Aerodynamic lift involving wings is the most common, with fixed-wing aircraft being kept in the air by the forward movement of wings, and rotorcraft by spinning wing-shaped rotors sometimes called rotary wings. A wing is a flat, horizontal surface, usually shaped in cross-section as an aerofoil. To fly, air must flow over the wing and generate lift. A flexible wing is a wing made of fabric or thin sheet material, often stretched over a rigid frame. A kite is tethered to the ground and relies on the speed of the wind over its wings, which may be flexible or rigid, fixed, or rotary.

Gliders are heavier-than-air aircraft that do not employ propulsion once airborne. Take-off may be by launching forward and downward from a high location, or by pulling into the air on a tow-line, either by a ground-based winch or vehicle, or by a powered "tug" aircraft. For a glider to maintain its forward air speed and lift, it must descend in relation to the air (but not necessarily in relation to the ground). Many gliders can 'soar'—gain height from updrafts such as thermal currents. Common examples of gliders are sailplanes, hang gliders and paragliders. Powered aircraft have one or more onboard sources of mechanical power, typically aircraft engines although rubber and man-power have also been used. Most aircraft engines are either lightweight piston engines or gas turbines. Engine fuel is stored in tanks, usually in the wings but larger aircraft also have additional fuel tanks in the fuselage.

A propeller aircraft use one or more propellers (airscrews) to create thrust in a forward direction. The propeller is usually mounted in front of the power source in tractor configuration but can be mounted behind in pusher configuration. Variations of propeller layout include contra-rotating propellers and ducted fans. A Jet aircraft use airbreathing jet engines, which take in air, burn fuel with it in a combustion chamber, and accelerate the exhaust rearwards to provide thrust. Turbojet and turbofan engines use a spinning turbine to drive one or more fans, which provide additional thrust. An afterburner may be used to inject extra fuel into the hot exhaust, especially on military "fast jets". Use of a turbine is not absolutely necessary: other designs include the pulse jet and ramjet. These mechanically simple designs cannot work when stationary, so the aircraft must be launched to flying speed by some other method. Some rotorcrafts, such as helicopters, have a powered rotary wing or rotor, where the rotor disc can be angled slightly forward so that a proportion of its lift is directed forwards. The rotor may, similar to a propeller, be powered by a variety of methods such as a piston engine or turbine. Experiments have also used jet nozzles at the rotor blade tips.

A vehicle may include a hood (a.k.a. bonnet), which is the hinged cover over the engine of motor vehicles that allows access to the engine compartment (or trunk on rear-engine and some mid-engine vehicles) for maintenance and repair. A vehicle may include a bumper, which is a structure attached, or integrated to, the front and rear of an automobile to absorb impact in a minor collision, ideally minimizing repair costs. Bumpers also have two safety functions: minimizing height mismatches between vehicles and protecting pedestrians from injury. A vehicle may include a cowling, which is the covering of a vehicle's engine, most often found on automobiles and aircraft. A vehicle may include a dashboard (also called dash, instrument panel, or fascia), which is a control panel placed in front of the driver of an automobile, housing instrumentation and controls for operation of the vehicle. A vehicle may include a fender that frames a wheel well (the fender underside). Its primary purpose is to prevent sand, mud, rocks, liquids, and other road spray from being thrown into the air by the rotating tire. Fenders are typically rigid and can be damaged by contact with the road surface. Instead, flexible mud flaps are used close to the ground where contact may be possible. A vehicle may include a quarter panel (a.k.a. rear wing), which is the body panel (exterior surface) of an automobile between a rear door (or only door on each side for two-door models) and the trunk (boot) and typically wraps around the wheel well. Quarter panels are typically made of sheet metal, but are sometimes made of fiberglass, carbon fiber, or fiber-reinforced plastic. A vehicle may include a rocker, which is the body section below the base of the door openings. A vehicle may include a spoiler, which is an automotive aerodynamic device whose intended design function is to 'spoil' unfavorable air movement across a body of a vehicle in motion, usually described as turbulence or drag. Spoilers on the front of a vehicle are often called air dams. Spoilers are often fitted to race and high-performance sports cars, although they have become common on passenger vehicles as well. Some spoilers are added to cars primarily for styling purposes and have either little aerodynamic benefit or even make the aerodynamics worse. The trunk (a.k.a. boot) of a car is the vehicle's main storage compartment. A vehicle door is a type of door, typically hinged, but sometimes attached by other mechanisms such as tracks, in front of an opening, which is used for entering and exiting a vehicle. A vehicle door can be opened to provide access to the opening, or closed to secure it. These doors can be opened manually, or powered electronically. Powered doors are usually found on minivans, high-end cars, or modified cars. Car glass includes windscreens, side and rear windows, and glass panel roofs on a vehicle. Side windows can be either fixed or be raised and lowered by depressing a button (power window) or switch or using a hand-turned crank.

Autonomous car. An autonomous car (also known as a driverless car, self-driving car, or robotic car) is a vehicle that is capable of sensing its environment and navigating without human input. Autonomous cars use a variety of techniques to detect their surroundings, such as radar, laser light, GPS, odometry, and computer vision. Advanced control systems interpret sensory information to identify appropriate navigation paths, as well as obstacles and relevant signage. Autonomous cars have control systems that are capable of analyzing sensory data to distinguish between different cars on the road, which is very useful in planning a path to the desired destination. Among the potential benefits of autonomous cars is a significant reduction in traffic collisions; the resulting injuries; and related costs, including a lower need for insurance. Autonomous cars are also predicted to offer major increases in traffic flow; enhanced mobility for children, the elderly, disabled and poor people; the relief of travelers from driving and navigation chores; lower fuel consumption; significantly reduced needs for parking space in cities; a reduction in crime; and the facilitation of different business models for mobility as a service, especially those involved in the sharing economy.

Modern self-driving cars generally use Bayesian Simultaneous Localization And Mapping (SLAM) algorithms, which fuse data from multiple sensors and an off-line map into current location estimates and map updates. SLAM with Detection and Tracking of other Moving Objects (DATMO), which also handles things such as cars and pedestrians, is a variant being developed by research at Google. Simpler systems may use roadside Real-Time Locating System (RTLS) beacon systems to aid localization. Typical sensors include LIDAR and stereo vision, GPS and IMU. Visual object recognition uses machine vision including neural networks.

The term 'Dynamic driving task' includes the operational (steering, braking, accelerating, monitoring the vehicle and roadway) and tactical (responding to events, determining when to change lanes, turn, use signals, etc.) aspects of the driving task, but not the strategic (determining destinations and waypoints) aspect of the driving task. The term 'Driving mode' refers to a type of driving scenario with characteristic dynamic driving task requirements (e.g., expressway merging, high speed, cruising, low speed traffic jam, closed-campus operations, etc.). The term 'Request to intervene' refers to notification by the automated driving system to a human driver that s/he should promptly begin or resume performance of the dynamic driving task.

The SAE International standard J3016, entitled: "*Taxonomy and Definitions for Terms Related to On-Road Motor Vehicle Automated Driving Systems*" [Revised September 2016], which is incorporated in its entirety for all purposes as if fully set forth herein, describes six different levels (ranging from none to fully automated systems), based on the amount of driver intervention and attentiveness required, rather than the vehicle capabilities. The levels are further described in a table 30 in FIG. 3. Level 0 refers to automated system issues warnings but has no vehicle control, while Level 1 (also referred to as "hands on") refers to driver and automated system that shares control over the vehicle. An example would be Adaptive Cruise Control (ACC) where the driver controls steering and the automated system controls speed. Using Parking Assistance, steering is automated while speed is manual. The driver must be ready to retake full control at any time. Lane Keeping Assistance (LKA) Type II is a further example of level 1 self-driving.

In Level 2 (also referred to as "hands off"), the automated system takes full control of the vehicle (accelerating, braking, and steering). The driver must monitor the driving and be prepared to immediately intervene at any time if the automated system fails to respond properly. In Level 3 (also referred to as "eyes off"), the driver can safely turn their attention away from the driving tasks, e.g. the driver can text or watch a movie. The vehicle will handle situations that call for an immediate response, like emergency braking. The driver must still be prepared to intervene within some limited time, specified by the manufacturer, when called upon by the vehicle to do so. A key distinction is between level 2, where the human driver performs part of the dynamic driving task, and level 3, where the automated driving system performs the entire dynamic driving task. Level 4 (also referred to as "mind off") is similar to level 3, but no driver attention is ever required for safety, i.e., the driver may safely go to sleep or leave the driver's seat. Self-driving is supported only in limited areas (geofenced) or under special circumstances, such as traffic jams. Outside of these areas or circumstances, the vehicle must be able to safely abort the trip, i.e., park the car, if the driver does not retake control. In Level 5 (also referred to as "wheel optional"), no human intervention is required. An example would be a robotic taxi.

An autonomous vehicle and systems having an interface for payloads that allows integration of various payloads with relative ease are disclosed in U.S. Patent Application Publication No. 2007/0198144 to Norris et al. entitled: "Networked multi-role robotic vehicle", which is incorporated in its entirety for all purposes as if fully set forth herein. There is a vehicle control system for controlling an autonomous vehicle, receiving data, and transmitting a control signal on at least one network. A payload is adapted to detachably connect to the autonomous vehicle, the payload comprising a network interface configured to receive the control signal from the vehicle control system over the at least one network. The vehicle control system may encapsulate payload data and transmit the payload data over the at least one network, including Ethernet or CAN networks. The payload may be a laser scanner, a radio, a chemical detection system, or a Global Positioning System unit. In certain embodiments, the payload is a camera mast unit, where the camera communicates with the autonomous vehicle control system to detect and avoid obstacles. The camera mast unit may be interchangeable, and may include structures for receiving additional payload components.

Automotive electronics. Automotive electronics involves any electrically-generated systems used in vehicles, such as ground vehicles. Automotive electronics commonly involves multiple modular ECUs (Electronic Control Unit) connected over a network such as Engine Control Modules (ECM) or Transmission Control Modules (TCM). Automotive electronics or automotive embedded systems are distributed systems, and according to different domains in the automotive field, they can be classified into Engine electronics, Transmission electronics, Chassis electronics, Active safety, Driver assistance, Passenger comfort, and Entertainment (or infotainment) systems.

One of the most demanding electronic parts of an automobile is the Engine Control Unit. Engine controls demand one of the highest real time deadlines, as the engine itself is a very fast and complex part of the automobile. The computing power of the engine control unit is commonly the highest, typically a 32-bit processor, that typically controls in real-time in a diesel engine the Fuel injection rate, Emission control, NOx control, Regeneration of oxidation catalytic converter, Turbocharger control, Throttle control, and Cooling system control. In a gasoline engine, the engine control typically involves Lambda control, OBD (On-Board Diagnostics), Cooling system control, Ignition system control, Lubrication system control, Fuel injection rate control, and Throttle control.

An engine ECU typically connects to, or includes, sensors that actively monitor in real-time engine parameters such as pressure, temperature, flow, engine speed, oxygen level and NOx level, plus other parameters at different points within the engine. All these sensor signals are analyzed by the ECU, which has the logic circuits to do the actual controlling. The ECU output is commonly connected to different actuators for the throttle valve, EGR valve, rack (in VGTs), fuel injector (using a pulse-width modulated signal), dosing injector, and more.

Transmission electronics involves control of the transmission system, mainly the shifting of the gears for better shift comfort and to lower torque interrupt while shifting. Automatic transmissions use controls for their operation, and many semi-automatic transmissions having a fully automatic clutch or a semi-auto clutch (declutching only). The engine control unit and the transmission control typically exchange messages, sensor signals and control signals for their operation. Chassis electronics typically includes many sub-systems that monitor various parameters and are actively controlled, such as ABS—Anti-lock Braking System, TCS—Traction Control System, EBD—Electronic Brake Distribution, and ESP—Electronic Stability Program. Active safety systems involve modules that are ready-to-act when there is a collision in progress, or used to prevent it when it senses a dangerous situation, such as Air bags, Hill descent control, and Emergency brake assist system. Passenger comfort systems involve, for example, Automatic climate control, Electronic seat adjustment with memory, Automatic wipers, Automatic headlamps—adjusts beam automatically, and Automatic cooling—temperature adjustment.

Infotainment systems include systems such as Navigation system, Vehicle audio, and Information access.

Automotive electric and electronic technologies and systems are described in a book published by Robert Bosch GmbH (5$^{th}$ Edition, July 2007) entitled: "*Bosch Automotive Electric and Automotive Electronics*" [ISBN—978-3-658-01783-5], which is incorporated in its entirety for all purposes as if fully set forth herein.

ECU. In automotive electronics, an Electronic Control Unit (ECU) is a generic term for any embedded system that controls one or more of the electrical system or subsystems in a vehicle such as a motor vehicle. Types of ECU include Electronic/engine Control Module (ECM) (sometimes referred to as Engine Control Unit—ECU, which is distinct from the generic ECU—Electronic Control Unit), Airbag Control Unit (ACU), Powertrain Control Module (PCM), Transmission Control Module (TCM), Central Control Module (CCM), Central Timing Module (CTM), Convenience Control Unit (CCU), General Electronic Module (GEM), Body Control Module (BCM), Suspension Control Module (SCM), Door Control Unit (DCU), Powertrain Control Module (PCM), Electric Power Steering Control Unit (PSCU), Seat Control Unit, Speed Control Unit (SCU), Suspension Control Module (SCM), Telematic Control Unit (TCU), Telephone Control Unit (TCU), Transmission Control Unit (TCU), Brake Control Module (BCM or EBCM; such as ABS or ESC), Battery management system, control unit, or control module.

A microprocessor or a microcontroller serves as a core of an ECU, and uses a memory such as SRAM, EEPROM, and Flash. An ECU is power fed by a supply voltage, and includes or connects to sensors using analog and digital inputs. In addition to a communication interface, an ECU typically includes a relay, H-Bridge, injector, or logic drivers, or outputs for connecting to various actuators.

ECU technology and applications is described in the M. Tech. Project first stage report (EE696) by Vineet P. Aras of the Department of Electrical Engineering, Indian Institute of Technology Bombay, dated July 2004, entitled: "*Design of Electronic Control Unit (ECU) for Automobiles—Electronic Engine Management system*", and in National Instruments paper published Nov. 7, 2009 entitled: "*ECU Designing and Testing using National Instruments Products*", which are both incorporated in their entirety for all purposes as if fully set forth herein. ECU examples are described in a brochure by Sensor-Technik Wiedemann Gmbh (headquartered in Kaufbeuren, Germany) dated 20110304 GB entitled "*Control System Electronics*", which is incorporated in its entirety for all purposes as if fully set forth herein. An ECU or an interface to a vehicle bus may use a processor such as the MPC5748G controller available from Freescale Semiconductor, Inc. (headquartered in Tokyo, Japan, and described in a data sheet Document Number MPC5748G Rev. 2, May 2014 entitled: "*MPC5748 Microcontroller Datasheet*", which is incorporated in its entirety for all purposes as if fully set forth herein.

OSEK/VDX. OSEK/VDX, formerly known as OSEK (*Offene Systeme und deren Schnittstellen für die Elektronik in Kraftfahrzeugen*; in English: "*Open Systems and their*

*Interfaces for the Electronics in Motor Vehicles*") OSEK is an open standard, published by a consortium founded by the automobile industry for an embedded operating system, a communications stack, and a network management protocol for automotive embedded systems.

OSEK was designed to provide a standard software architecture for the various electronic control units (ECUs) throughout a car.

The OSEK standard specifies interfaces to multitasking functions—generic I/O and peripheral access—and thus remains architecture dependent. OSEK systems are expected to run on chips without memory protection. Features of an OSEK implementation can be usually configured at compile-time. The number of application tasks, stacks, mutexes, etc., is statically configured; it is not possible to create more at run time. OSEK recognizes two types of tasks/threads/compliance levels: basic tasks and enhanced tasks. Basic tasks never block; they "run to completion" (coroutine). Enhanced tasks can sleep and block on event objects. The events can be triggered by other tasks (basic and enhanced) or interrupt routines. Only static priorities are allowed for tasks, and First-In-First-Out (FIFO) scheduling is used for tasks with equal priority. Deadlocks and priority inversion are prevented by priority ceiling (i.e. no priority inheritance). The specification uses ISO/ANSI-C-like syntax; however, the implementation language of the system services is not specified. OSEK/VDX Network Management functionality is described in a document by OSEK/VDX NM Concept & API 2.5.2 (Version 2.5.3, 26 Jul. 2004) entitled: "*Open Systems and the Corresponding Interfaces for Automotive Electronics—Network Management—Concept and Application Programming Interface*", which is incorporated in its entirety for all purposes as if fully set forth herein. Some parts of the OSEK are standardized as part of ISO 17356 standard series entitled: "*Road vehicles—Open interface for embedded automotive applications*", such as ISO 17356-1 standard (First edition, 2005 Jan. 15) entitled: "*Part 1: General structure and terms, definitions and abbreviated terms*", ISO 17356-2 standard (First edition, 2005 May 1) entitled: "*Part 2: OSEK/VDX specifications for binding OS, COM and NM*", ISO 17356-3 standard (First edition, 2005 Nov. 1) entitled: "*Part 3: OSEK/VDX Operating System (OS)*", and ISO 17356-4 standard (First edition, 2005 Nov. 1) entitled: "*Part 4: OSEK/VDX Communication (COM)*", which are all incorporated in their entirety for all purposes as if fully set forth herein.

AUTOSAR. AUTOSAR (Automotive Open System Architecture) is a worldwide development partnership of automotive interested parties founded in 2003. It pursues the objective of creating and establishing an open and standardized software architecture for automotive electronic control units excluding infotainment. Goals include the scalability to different vehicle and platform variants, transferability of software, the consideration of availability and safety requirements, a collaboration between various partners, sustainable utilization of natural resources, maintainability throughout the whole "Product Life Cycle".

AUTOSAR provides a set of specifications that describe basic software modules, defines application interfaces, and builds a common development methodology based on standardized exchange format. Basic software modules made available by the AUTOSAR layered software architecture can be used in vehicles of different manufacturers and electronic components of different suppliers, thereby reducing expenditures for research and development, and mastering the growing complexity of automotive electronic and software architectures. Based on this guiding principle, AUTOSAR has been devised to pave the way for innovative electronic systems that further improve performance, safety and environmental friendliness and to facilitate the exchange and update of software and hardware over the service life of the vehicle. It aims to be prepared for the upcoming technologies and to improve cost-efficiency without making any compromise with respect to quality.

AUTOSAR uses a three-layered architecture: Basic Software—standardized software modules (mostly) without any functional job itself that offers services necessary to run the functional part of the upper software layer; Runtime environment—Middleware which abstracts from the network topology for the inter- and intra-ECU information exchange between the application software components and between the Basic Software and the applications; and Application Layer—application software components that interact with the runtime environment. System Configuration Description includes all system information and the information that must be agreed between different ECUs (e.g. definition of bus signals). ECU extract is the information from the System Configuration Description needed for a specific ECU (e.g. those signals where a specific ECU has access to). ECU Configuration Description contains all basic software configuration information that is local to a specific ECU. The executable software can be built from this information, the code of the basic software modules and the code of the software components. The AUTOSAR specifications are described in Release 4.2.2 released 31 Jan. 2015 by the AUTOSAR consortium entitled: "*Release 4.2 Overview and Revision History*", which is incorporated in its entirety for all purposes as if fully set forth herein.

Vehicle bus. A vehicle bus is a specialized internal (in-vehicle) communications network that interconnects components inside a vehicle (e.g., automobile, bus, train, industrial or agricultural vehicle, ship, or aircraft). Special requirements for vehicle control such as assurance of message delivery, of non-conflicting messages, of minimum time of delivery, of low cost, and of EMF noise resilience, as well as redundant routing and other characteristics mandate the use of less common networking protocols. A vehicle bus typically connects the various ECUs in the vehicle. Common protocols include Controller Area Network (CAN), Local Interconnect Network (LIN) and others. Conventional computer networking technologies (such as Ethernet and TCP/IP) may as well be used.

Any in-vehicle internal network that interconnects the various devices and components inside the vehicle may use any of the technologies and protocols described herein. Common protocols used by vehicle buses include a Control Area Network (CAN), FlexRay, and a Local Interconnect Network (LIN). Other protocols used for in-vehicle are optimized for multimedia networking such as MOST (Media Oriented Systems Transport). The CAN is described in the Texas Instrument Application Report No. SLOA101A entitled: "*Introduction to the Controller Area Network (CAN)*", and may be based on, may be compatible with, or may be according to, ISO 11898 standards, ISO 11992-1 standard, SAE J1939 or SAE J2411 standards, which are all incorporated in their entirety for all purposes as if fully set forth herein. The LIN communication may be based on, may be compatible with, or according to, ISO 9141, and is described in "*LIN Specification Package—Revision 2.2A*" by the LIN Consortium, which are all incorporated in their entirety for all purposes as if fully set forth herein. In one example, the DC power lines in the vehicle may also be used as the communication medium, as described for example in U.S. Pat. No. 7,010,050 to Maryanka, entitled: "Signaling over Noisy Channels", which is incorporated in its entirety for all purposes as if fully set forth herein.

CAN. A controller area network (CAN bus) is a vehicle bus standard designed to allow microcontrollers and devices to communicate with each other in applications without a host computer. It is a message-based protocol, designed originally for multiplex electrical wiring within automobiles, but is also used in many other contexts. CAN bus is one of five protocols used in the on-board diagnostics (OBD)-II vehicle diagnostics standard. CAN is a multi-master serial bus standard for connecting Electronic Control Units [ECUs] also known as nodes. Two or more nodes are required on the CAN network to communicate. The complexity of the node can range from a simple I/O device up to an embedded computer with a CAN interface and sophisticated software. The node may also be a gateway allowing a standard computer to communicate over a USB or Ethernet port to the devices on a CAN network. All nodes are connected to each other through a two-wire bus. The wires are 120Ω nominal twisted pair. Implementing CAN is described in an Application Note (AN10035-0-2/12(0) Rev. 0) published 2012 by Analog Devices, Inc. entitled: "*Controller Area Network (CAN) Implementation Guide*—by Dr. Conal Watterson", which is incorporated in its entirety for all purposes as if fully set forth herein.

CAN transceiver is defined by ISO 11898-2/3 Medium Access Unit [MAU] standards, and in receiving, converts the levels of the data stream received from the CAN bus to levels that the CAN controller uses. It usually has protective circuitry to protect the CAN controller, and in transmitting state converts the data stream from the CAN controller to CAN bus compliant levels. An example of a CAN transceiver is Model No. TJA1055 or Model No. TJA1044 both available from NXP Semiconductors N.V. headquartered in Eindhoven, Netherlands, respectively described in Product data sheets (document Identifier TJA1055, date of release: 6 Dec. 2013) entitled: "*TJA1055 Enhanced fault-tolerant CAN transceiver—Rev.* 5-6 Dec. 2013—*Product data sheet*", and Product data sheets (document Identifier TJA1055, date of release: 6 Dec. 2013) entitled: "*TJA1044 High-speed CAN transceiver with Standby mode*—Rev. 4—10 Jul. 2015—*Product data sheet*", which are both incorporated in their entirety for all purposes as if fully set forth herein.

Another example of a CAN Transceiver is Model No. SN65HVD234D available from Texas Instruments Incorporated (Headquartered in Dallas, Tex., U.S.A.), described in Datasheet SLLS557G (NOVEMBER 2002—REVISED JANUARY 2015), entitled: "*SN65HVD23x 3.3-V CAN Bus Transceivers*", which is incorporated in its entirety for all purposes as if fully set forth herein. An example of a CAN controller is Model No. STM32F105Vc available from STMicroelectronics NV described in Datasheet DocID15724 Rev. 9, published September 2015 and entitled: "*STM32F105xx STM32F107xx*", which is incorporated in its entirety for all purposes as if fully set forth herein, which is part of the STM32F105xx connectivity line family that incorporates the high-performance ARM® Cortex®-M3 32-bit RISC core operating at a 72 MHz frequency, high-speed embedded memories (Flash memory up to 256 Kbytes and SRAM 64 Kbytes), and an extensive range of enhanced I/Os and peripherals connected to two APB buses. All devices offer two 12-bit ADCs, four general-purpose 16-bit timers plus a PWM timer, as well as standard and advanced communication interfaces: up to two I2Cs, three SPIs, two I2Ss, five USARTs, an USB OTG FS and two CANs.

A Controller Area Network (CAN) transceiver is disclosed in U.S. Pat. No. 9,471,528 to Muth entitled: "Controller area network (CAN) transceiver and method for operating a CAN transceiver", which is incorporated in its entirety for all purposes as if fully set forth herein. The CAN transceiver includes a CAN bus interface, a TXD interface, an RXD interface, a transmitter connected between the TXD interface and the CAN bus interface, a receiver connected between the RXD interface and the CAN bus interface, a traffic control system connected between the CAN bus interface, the TXD interface, and the RXD interface. The traffic control system detects the presence of CAN Flexible Data-rate (FD) traffic on the CAN bus interface and if the traffic control system detects the presence of CAN FD traffic on the CAN bus interface, the traffic controls system changes an operating state of the transceiver.

Embodiments of a device and method are disclosed in U.S. Pat. No. 9,330,045 to Muth et al. entitled: "Controller area network (CAN) device and method for controlling CAN traffic", which is incorporated in its entirety for all purposes as if fully set forth herein. In an embodiment, a CAN device is disclosed. The CAN device includes a TXD input interface, a TXD output interface, an RXD input interface, an RXD output interface, and a traffic control system connected between the TXD input and output interfaces and between the RXD input and output interfaces. The traffic control system is configured to detect the presence of CAN Flexible Data-rate (FD) traffic on the RXD input interface and if the traffic control system detects the presence of CAN FD traffic on the RXD input interface, disconnect the RXD input interface from the RXD output interface and disconnect the TXD input interface from the TXD output interface.

A network node is disclosed in U.S. Pat. No. 9,280,501 to Hopfner entitled: "Compatible network node, in particular, for can bus systems", which is incorporated in its entirety for all purposes as if fully set forth herein. The node including a device, in particular, an error detection logic, which is deactivated if it is detected that a signal according to a first protocol or a first version of a first protocol is received, and which is not deactivated if it is detected that a signal according to a second, different protocol or a second, different version of the first protocol is received.

Controller Area Network (CAN) communications apparatus and methods are presented in U.S. Pat. No. 9,652,423 to Monroe et al. entitled: "CAN and flexible data rate CAN node apparatus and methods for mixed bus CAN FD communications", which is incorporated in its entirety for all purposes as if fully set forth herein. The apparatus and methods are for CAN flexible data rate (CAN FD) communications in a mixed CAN network with CAN FD nodes and one or more non-FD CAN nodes, in which a CAN FD node wishing to transmit CAN FD frames sends a first predefined message requesting the non-FD CAN nodes to disable their transmitters before transmitting the CAN FD frames, and thereafter sends a second predefined message or a predefined signal to return the non-FD CAN nodes to normal operation.

Each node is able to send and receive messages, but not simultaneously. A message or Frame consists primarily of the ID (identifier), which represents the priority of the message, and up to eight data bytes. A CRC, acknowledge slot [ACK] and other overhead are also part of the message. The improved CAN FD extends the length of the data section to up to 64 bytes per frame. The message is transmitted serially onto the bus using a non-return-to-zero (NRZ) format and may be received by all nodes. The devices that are connected by a CAN network are typically sensors, actuators, and other control devices. These devices are connected to the bus through a host processor, a CAN controller, and a CAN transceiver. A terminating bias circuit is power and ground provided together with the data signaling in order to provide electrical bias and termination at each end of each bus segment to suppress reflections.

CAN data transmission uses a lossless bit-wise arbitration method of contention resolution. This arbitration method requires all nodes on the CAN network to be synchronized to sample every bit on the CAN network at the same time. While some call CAN synchronous, the data is transmitted without a clock signal in an asynchronous format. The CAN specifications use the terms "dominant" bits and "recessive" bits where dominant is a logical '0' (actively driven to a voltage by the transmitter) and recessive is a logical '1' (passively returned to a voltage by a resistor). The idle state is represented by the recessive level (Logical 1). If one node transmits a dominant bit and another node transmits a recessive bit, then there is a collision and the dominant bit "wins". This means there is no delay to the higher-priority message, and the node transmitting the lower priority message automatically attempts to re-transmit six bit clocks after the end of the dominant message. This makes CAN very suitable as a real time prioritized communications system.

The exact voltages for a logical level '0' or '1' depend on the physical layer used, but the basic principle of CAN requires that each node listen to the data on the CAN network including the data that the transmitting node is transmitting. If a logical 1 is transmitted by all transmitting nodes at the same time, then a logical 1 is seen by all of the nodes, including both the transmitting node(s) and receiving node(s). If a logical 0 is transmitted by all transmitting node(s) at the same time, then a logical 0 is seen by all nodes. If a logical 0 is being transmitted by one or more nodes, and a logical 1 is being transmitted by one or more nodes, then a logical 0 is seen by all nodes including the node(s) transmitting the logical 1. When a node transmits a logical 1 but sees a logical 0, it realizes that there is a contention and it quits transmitting. By using this process, any node that transmits a logical 1 when another node transmits a logical 0 "drops out" or loses the arbitration. A node that loses arbitration re-queues its message for later transmission and the CAN frame bit-stream continues without error until only one node is left transmitting. This means that the node that transmits the first 1, loses arbitration. Since the 11 (or 29 for CAN 2.0B) bit identifier is transmitted by all nodes at the start of the CAN frame, the node with the lowest identifier transmits more zeros at the start of the frame, and that is the node that wins the arbitration or has the highest priority.

The CAN protocol, like many networking protocols, can be decomposed into the following abstraction layers—Application layer, Object layer (including Message filtering and Message and status handling), and Transfer layer.

Most of the CAN standard applies to the transfer layer. The transfer layer receives messages from the physical layer and transmits those messages to the object layer. The transfer layer is responsible for bit timing and synchronization, message framing, arbitration, acknowledgement, error detection and signaling, and fault confinement. It performs Fault Confinement, Error Detection, Message Validation, Acknowledgement, Arbitration, Message Framing, Transfer Rate and Timing, and Information Routing.

The mechanical aspects of the physical layer (connector type and number, colors, labels, pin-outs) are not specified. As a result, an automotive ECU will typically have a particular-often custom—connector with various sorts of cables, of which two are the CAN bus lines. Nonetheless, several de facto standards for mechanical implementation have emerged, the most common being the 9-pin D-sub type male connector with the following pin-out: pin 2: CAN-Low (CAN-); pin 3: GND (Ground); pin 7: CAN-High (CAN+); and pin 9: CAN V+ (Power). This de facto mechanical standard for CAN could be implemented with the node having both male and female 9-pin D-sub connectors electrically wired to each other in parallel within the node. Bus power is fed to a node's male connector and the bus draws power from the node's female connector. This follows the electrical engineering convention that power sources are terminated at female connectors. Adoption of this standard avoids the need to fabricate custom splitters to connect two sets of bus wires to a single D connector at each node. Such nonstandard (custom) wire harnesses (splitters) that join conductors outside the node, reduce bus reliability, eliminate cable interchangeability, reduce compatibility of wiring harnesses, and increase cost.

Noise immunity on ISO 11898-2:2003 is achieved by maintaining the differential impedance of the bus at a low level with low-value resistors (120 ohms) at each end of the bus. However, when dormant, a low-impedance bus such as CAN draws more current (and power) than other voltage-based signaling buses. On CAN bus systems, balanced line operation, where current in one signal line is exactly balanced by current in the opposite direction in the other signal provides an independent, stable 0 V reference for the receivers. Best practice determines that CAN bus balanced pair signals be carried in twisted pair wires in a shielded cable to minimize RF emission and reduce interference susceptibility in the already noisy RF environment of an automobile. ISO 11898-2 provides some immunity to common mode voltage between transmitter and receiver by having a '0' V rail running along the bus to maintain a high degree of voltage association between the nodes. Also, in the de facto mechanical configuration mentioned above, a supply rail is included to distribute power to each of the transceiver nodes. The design provides a common supply for all the transceivers. The actual voltage to be applied by the bus and which nodes apply to it are application-specific and not formally specified. Common practice node design provides each node with transceivers which are optically isolated from their node host and derive a 5 V linearly regulated supply voltage for the transceivers from the universal supply rail provided by the bus. This usually allows operating margin on the supply rail sufficient to allow interoperability across many node types. Typical values of supply voltage on such networks are 7 to 30 V. However, the lack of a formal standard means that system designers are responsible for supply rail compatibility.

ISO 11898-2 describes the electrical implementation formed from a multi-dropped single-ended balanced line configuration with resistor termination at each end of the bus. In this configuration, a dominant state is asserted by one or more transmitters switching the CAN− to supply 0 V and (simultaneously) switching CAN+ to the +5 V bus voltage thereby forming a current path through the resistors that terminate the bus. As such, the terminating resistors form an essential component of the signaling system and are included not just to limit wave reflection at high frequency. During a recessive state, the signal lines and resistor(s) remain in a high impedances state with respect to both rails. Voltages on both CAN+ and CAN− tend (weakly) towards ½ rail voltage. A recessive state is only present on the bus when none of the transmitters on the bus is asserting a dominant state. During a dominant state the signal lines and resistor(s) move to a low impedance state with respect to the rails so that current flows through the resistor. CAN+ voltage tends to +5 V and CAN− tends to 0 V. Irrespective of signal state the signal lines are always in low impedance state with respect to one another by virtue of the terminating resistors at the end of the bus. Multiple access on CAN bus is achieved by the electrical logic of the system supporting just two states that are conceptually analogous to a 'wired OR' network.

The CAN is standardized in a standards set ISO 11898 entitled: "*Road vehicles—Controller area network (CAN)*" that specifies physical and datalink layer (levels 1 and 2 of the ISO/OSI model) of serial communication technology called Controller Area Network that supports distributed real-time control and multiplexing for use within road vehicles The standard ISO 11898-1:2015 entitled: "*Part 1: Data link layer and physical signalling*" specifies the characteristics of setting up an interchange of digital information between modules implementing the CAN data link layer. Controller area network is a serial communication protocol, which supports distributed real-time control and multiplexing for use within road vehicles and other control applications. The ISO 11898-1:2015 specifies the Classical CAN frame format and the newly introduced CAN Flexible Data Rate Frame format. The Classical CAN frame format allows bit rates up to 1 Mbit/s and payloads up to 8 byte per frame. The Flexible Data Rate frame format allows bit rates higher than 1 Mbit/s and payloads longer than 8 byte per frame. ISO 11898-1:2015 describes the general architecture of CAN in terms of hierarchical layers according to the ISO reference model for open systems interconnection (OSI) according to ISO/IEC 7498-1. The CAN data link layer is specified according to ISO/IEC 8802-2 and ISO/IEC 8802-3. ISO 11898-1:2015 contains detailed specifications of the following: logical link control sub-layer; medium access control sub-layer; and physical coding sub-layer.

The standard ISO 11898-2:2003 entitled: "*Part 2: High-speed medium access unit*" specifies the high-speed (transmission rates of up to 1 Mbit/s) medium access unit (MAU), and some medium dependent interface (MDI) features (according to ISO 8802-3), which comprise the physical layer of the controller area network (CAN): a serial communication protocol that supports distributed real-time control and multiplexing for use within road vehicles.

The standard ISO 11898-3:2006 entitled: "*Part 3: Low-speed, fault-tolerant, medium—dependent interface*" specifies characteristics of setting up an interchange of digital information between electronic control units of road vehicles equipped with the controller area network (CAN) at transmission rates above 40 kBit/s up to 125 kBit/s.

The standard ISO 11898-4:2004 entitled: "*Part 4: Time-triggered communication*" specifies time-triggered communication in the controller area network (CAN): a serial communication protocol that supports distributed real-time control and multiplexing for use within road vehicles. It is applicable to setting up a time-triggered interchange of digital information between electronic control units (ECU) of road vehicles equipped with CAN, and specifies the frame synchronization entity that coordinates the operation of both logical link and media access controls in accordance with ISO 11898-1, to provide the time-triggered communication schedule.

The standard ISO 11898-5:2007 entitled: "*Part 5: High-speed medium access unit with low-power mode*" specifies the CAN physical layer for transmission rates up to 1 Mbit/s for use within road vehicles. It describes the medium access unit functions as well as some medium dependent interface features according to ISO 8802-2. ISO 11898-5:2007 represents an extension of ISO 11898-2, dealing with new functionality for systems requiring low-power consumption features while there is no active bus communication. Physical layer implementations according to ISO 11898-5:2007 are compliant with all parameters of ISO 11898-2, but are defined differently within ISO 11898-5:2007. Implementations according to ISO 11898-5:2007 and ISO 11898-2 are interoperable and can be used at the same time within one network.

The standard ISO 11898-6:2013 entitled: "*Part 6: High-speed medium access unit with selective wake-up functionality*" specifies the controller area network (CAN) physical layer for transmission rates up to 1 Mbit/s. It describes the medium access unit (MAU) functions. ISO 11898-6:2013 represents an extension of ISO 11898-2 and ISO 11898-5, specifying a selective wake-up mechanism using configurable CAN frames. Physical layer implementations according to ISO 11898-6:2013 are compliant with all parameters of ISO 11898-2 and ISO 11898-5. Implementations according to ISO 11898-6:2013, ISO 11898-2 and ISO 11898-5 are interoperable and can be used at the same time within one network.

The standard ISO 11992-1:2003 entitled: "*Road vehicles—Interchange of digital information on electrical connections between towing and towed vehicles—Part 1: Physical and data-link layers*" specifies the interchange of digital information between road vehicles with a maximum authorized total mass greater than 3 500 kg, and towed vehicles, including communication between towed vehicles in terms of parameters and requirements of the physical and data link layer of the electrical connection used to connect the electrical and electronic systems. It also includes conformance tests of the physical layer.

The standard ISO 11783-2:2012 entitled: "*Tractors and machinery for agriculture and forestry—Serial control and communications data network—Part 2: Physical layer*" specifies a serial data network for control and communications on forestry or agricultural tractors and mounted, semi-mounted, towed or self-propelled implements. Its purpose is to standardize the method and format of transfer of data between sensors, actuators, control elements and information storage and display units, whether mounted on, or part of, the tractor or implement, and to provide an open interconnect system for electronic systems used by agricultural and forestry equipment. ISO 11783-2:2012 defines and describes the network's 250 kbit/s, twisted, non-shielded, quad-cable physical layer. ISO 11783-2 uses four unshielded twisted wires; two for CAN and two for terminating bias circuit (TBC) power and ground. This bus is used on agricultural tractors. It is intended to provide interconnectivity between the tractor and any agricultural implement adhering to the standard.

The standard J1939/11_201209 entitled: "*Physical Layer, 250 Kbps, Twisted Shielded Pair*" defines a physical layer having a robust immunity to EMI and physical properties suitable for harsh environments. These SAE Recommended Practices are intended for light- and heavy-duty vehicles on- or off-road as well as appropriate stationary applications which use vehicle derived components (e.g., generator sets). Vehicles of interest include but are not limited to: on- and off-highway trucks and their trailers; construction equipment; and agricultural equipment and implements.

The standard SAE J1939/15_201508 entitled: "*Physical Layer, 250 Kbps, Un-Shielded Twisted Pair (UTP)*" describes a physical layer utilizing Unshielded Twisted Pair (UTP) cable with extended stub lengths for flexibility in ECU placement and network topology. CAN controllers are now available which support the newly introduced CAN Flexible Data Rate Frame format (known as "CAN FD"). These controllers, when used on SAE J1939-15 networks, must be restricted to use only the Classical Frame format compliant to ISO 11898-1 (2003).

The standard SAE J2411_200002 entitled: "*Single Wire Can Network for Vehicle Applications*" defines the Physical Layer and portions of the Data Link Layer of the OSI model for data communications. In particular, this document specifies the physical layer requirements for any Carrier Sense Multiple Access/Collision Resolution (CSMA/CR) data link which operates on a single wire medium to communicate among Electronic Control Units (ECU) on road vehicles. Requirements stated in this document will provide a minimum standard level of performance to which all compatible ECUs and media shall be designed. This will assure full serial data communication among all connected devices regardless of the supplier. This document is to be referenced by the particular vehicle OEM Component Technical Specification which describes any given ECU, in which the single wire data link controller and physical layer interface is located. Primarily, the performance of the physical layer is specified in this document.

A specification for CAN FD (CAN with Flexible Data-Rate) version 1.0 was released on Apr. 17, 2012 by Robert Bosch GmbH entitled: CAN with Flexible Data-Rate Specification Version 1.0), and is incorporated in its entirety for all purposes as if fully set forth herein. This specification uses a different frame format that allows a different data length as well as optionally switching to a faster bit rate after the arbitration is decided. CAN FD is compatible with existing CAN 2.0 networks so new CAN FD devices can coexist on the same network with existing CAN devices. CAN FD is further described in iCC 2013 CAN in Automation articles by Florian Hatwich entitled: "*Bit Time Requirements for CAN FD*" and "*Can with Flexible Data-Rate*", and in National Instruments article published Aug. 1, 2014 entitled: "*Understanding CAN with Flexible Data-Rate (CAN FD)*", which are all incorporated in their entirety for all purposes as if fully set forth herein. In one example, the CAN FD interface is based on, compatible with, or uses, the SPC57EM80 controller device available from STMicroelectronics described in an Application Note AN4389 (document number DocD025493 Rev 2) published 2014 entitled: "*SPC57472/SPC57EM80 Getting Started*", which is incorporated in its entirety for all purposes as if fully set forth herein. Further, a CAN FD transceiver may be based on, compatible with, or use, transceiver model MCP2561/2FD available from Microchip Technology Inc., described in a data sheet DS20005284A published 2014 [ISBN—978-1-63276-020-3] entitled: "*MCP2561/2FD—High-Speed CAN Flexible Data Rate Transceiver*", which is incorporated in its entirety for all purposes as if fully set forth herein.

A fraud detection method for use in an in-vehicle network system including a plurality of electronic control units that communicate with one another via a bus in accordance with Controller Area Network (CAN) protocol is disclosed in U.S. Patent Application Publication No. 2016/020519 to Kishikawa et al. entitled: "Method for detecting fraudulent frame sent over an in-vehicle network system", which is incorporated in its entirety for all purposes as if fully set forth herein. A fraud detection method for use in an in-vehicle network system including a plurality of electronic control units that communicate with one another via a bus in accordance with Controller Area Network (CAN) protocol is provided. The method includes receiving at least one data frame sent to the bus, verifying a specific identifier in the received data frame only if the received data frame does not follow a predetermined rule regarding a transmission period and a state of a vehicle having the in-vehicle network system mounted therein is a predetermined state, detecting the received data frame as an authenticated data frame if the verification is successful, and detecting the received data frame as a fraudulent data frame if the verification fails.

CAN frame. A data frame having a standard ID format defined by the CAN protocol is illustrated in FIG. 2. The data frame includes an SOF (Start Of Frame) field, an ID field, an RTR (Remote Transmission Request) field, an IDE (Identifier Extension) field, a reservation bit "r", a DLC (Data Length Code) field, a data field, a CRC (Cyclic Redundancy Check) sequence field, a CRC delimiter field "DEL", an ACK (Acknowledgement) slot field, an ACK delimiter field "DEL", and an EOF (End Of Frame) field.

The SOF field is formed from one dominant bit. When the bus is idle, the state of the bus is recessive. By changing the state of the bus from recessive to dominant using SOF, the notice of start of frame transmission is given. The ID field is an 11-bit field. The ID field includes an ID (a message ID) that is a value indicating the type of data. In order to perform communication arbitration using the ID field, the design is such that if a plurality of nodes simultaneously start transmission, a frame having a lower ID value has a higher priority. RTR is a value for distinguishing a data frame from a remote frame. In data frames, the RTR field is formed from one dominant bit. Each of IDE and "r" is formed from one dominant bit. DLC is of 4 bits. DLC indicates the length of the data field. Note that IDE, "r", and DLC are collectively referred to as a "control field". The data field indicates the data to be transmitted, where the maximum length of the data field is 64 bits. The length can be controlled to 8 to 64 bits (multiple of 8 bits). The specification of data to be transmitted is not defined by the CAN protocol and is defined by the in-vehicle network system 10. Accordingly, the specification of the data depends on, for example, the type of vehicle and the manufacturer (the maker). The CRC sequence field is a 15-bit field. The CRC sequence is calculated using the transmitted values of SOF, the ID field, the control field, and the data field. The CRC delimiter is formed from one recessive bit. The CRC delimiter is a delimiter symbol that indicates termination of the CRC sequence. Note that the CRC sequence field and the CRC delimiter field are collectively referred to as a "CRC field".

The ACK slot field is a 1-bit field. The sender node sets the ACK slot to recessive and transmits data. If a receiver node successfully receives the data up to the CRC sequence, the receiver node sets the ACK slot to dominant and sends the data. The dominant has a priority over the recessive. Accordingly, if the ACK slot is dominant after transmission, the sender node can be aware that any one of the receiver nodes has successfully received the data. The ACK delimiter is formed from one recessive bit. The ACK delimiter is a delimiter symbol that indicates termination of ACK. The EOF field is formed from 7 recessive bits. EOF indicates termination of the data frame.

ISO 15765-2. ISO-TP (Transport Layer) is described in ISO 15765-2:2004 standard (First Edition 2004-10-15) entitled: "*Road vehicles—Diagnostics on Controller Area Networks (CAN)—Part 2: Network layer services*", which is incorporated in its entirety for all purposes as if fully set forth herein. ISO-TP specifies a transport protocol and network layer services tailored to meet the requirements of CAN-based vehicle network systems on controller area networks as specified in ISO 11898-1. It has been defined in accordance with the diagnostic services established in ISO 14229-1 and ISO 15031-5 but is not limited to use with them and is also compatible with most other communication needs for in-vehicle networks. ISO 11898-1 specifies variable length CAN frames with a maximum payload size dependent on the protocol device used. A CLASSICAL CAN protocol device can transmit/receive frames with payload sizes ranging from 0 bytes to 8 bytes per frame. A CAN FD (flexible data rate) protocol device can transmit/receive frames with payload sizes from 0 bytes to 64 bytes. A CAN FD protocol device is also capable of transmitting/receiving CLASSICAL CAN frames.

In the OSI Model. ISO-TP covers the layer 3 (network layer) and 4 (transport layer). The most common application for ISO-TP is the transfer of diagnostic messages with OBD-2 equipped vehicles using KWP2000 and UDS, but is used broadly in other application-specific CAN implementations. ISO-TP can be operated with its own addressing as so-called Extended Addressing or without address using only the CAN ID (so-called Normal Addressing). Extended addressing uses the first data byte of each frame as an additional element of the address, reducing the application payload by one byte. For clarity the protocol description below is based on Normal Addressing with eight byte CAN frames. In total, six types of addressing are allowed by the ISO 15765-2 Protocol. ISO-TP prepends one or more metadata bytes to the payload data in the eight byte CAN frame, reducing the payload to seven or fewer bytes per frame. The metadata is called the Protocol Control Information, or PCI. The PCI is one, two or three bytes. The initial field is four bits indicating the frame type, and implicitly describing the PCI length.

The diagnostic communication over controller area network (DoCAN) protocol supports the standardized service primitive interface as specified in ISO 14229-2 (UDS). ISO 15765-2 standard provides the transport protocol and network layer services to support different application-layer implementations such as enhanced vehicle diagnostics (emissions-related system diagnostics beyond legislated functionality, non-emissions-related system diagnostics), emissions-related on-board diagnostics (OBD) as specified in ISO 15031, world-wide harmonized on-board diagnostics (WWH-OBD) as specified in ISO 27145, and end of life activation on on-board pyrotechnic devices (ISO 26021). The transport protocol specifies an unconfirmed communication.

LIN. LIN (Local Interconnect Network) is a serial network protocol used for communication between components in vehicles. The LIN communication may be based on, compatible with, or is according to, ISO 9141, and is described in "LIN Specification Package—Revision 2.2A" by the LIN Consortium (dated Dec. 31, 2010), which is incorporated in its entirety for all purposes as if fully set forth herein. The LIN standard is further standardized as part of ISO 17987-1 to 17987-7 standards. LIN may be used also over the vehicle's battery power-line with a special DC-LIN transceiver. LIN is a broadcast serial network comprising 16 nodes (one master and typically up to 15 slaves). All messages are initiated by the master with at most one slave replying to a given message identifier. The master node can also act as a slave by replying to its own messages, and since all communications are initiated by the master it is not necessary to implement a collision detection. The master and slaves are typically microcontrollers, but may be implemented in specialized hardware or ASICs in order to save cost, space, or power. Current uses combine the low-cost efficiency of LIN and simple sensors to create small networks that can be connected by a backbone network. (i.e., CAN in cars).

The LIN bus is an inexpensive serial communications protocol, which effectively supports remote application within a car's network, and is particularly intended for mechatronic nodes in distributed automotive applications, but is equally suited to industrial applications. The protocol's main features are single master, up to 16 slaves (i.e. no bus arbitration), Slave Node Position Detection (SNPD) that allows node address assignment after power-up, Single wire communications up to 19.2 kbit/s @ 40 meter bus length (in the LIN specification 2.2 the speed up to 20 kbit/s), Guaranteed latency times, Variable length of data frame (2, 4 and 8 byte), Configuration flexibility, Multi-cast reception with time synchronization, without crystals or ceramic resonators, Data checksum and error detection, Detection of defective nodes, Low cost silicon implementation based on standard UART/SCI hardware, Enabler for hierarchical networks, and Operating voltage of 12 V. LIN is further described in U.S. Pat. No. 7,091,876 to Steger entitled: "Method for Addressing the Users of a Bus System by Means of Identification Flows", which is incorporated in its entirety for all purposes as if fully set forth herein.

Data is transferred across the bus in fixed form messages of selectable lengths. The master task transmits a header that consists of a break signal followed by synchronization and identifier fields. The slaves respond with a data frame that consists of between 2, 4 and 8 data bytes plus 3 bytes of control information. The LIN uses Unconditional Frames, Event-triggered Frames, Sporadic Frames, Diagnostic Frames, User-Defined Frames, and Reserved Frames.

Unconditional Frames always carry signals and their identifiers are in the range 0 to 59 (0x00 to 0x3b) and all subscribers of the unconditional frame shall receive the frame and make it available to the application (assuming no errors were detected), and Event-triggered Frame, to increase the responsiveness of the LIN cluster without assigning too much of the bus bandwidth to the polling of multiple slave nodes with seldom occurring events. The first data byte of the carried unconditional frame shall be equal to a protected identifier assigned to an event-triggered frame. A slave shall reply with an associated unconditional frame only if its data value has changed. If none of the slave tasks responds to the header, the rest of the frame slot is silent and the header is ignored. If more than one slave task responds to the header in the same frame slot a collision will occur, and the master has to resolve the collision by requesting all associated unconditional frames before requesting the event-triggered frame again. Sporadic Frame is transmitted by the master as required, so a collision cannot occur. The header of a sporadic frame shall only be sent in its associated frame slot when the master task knows that a signal carried in the frame has been updated. The publisher of the sporadic frame shall always provide the response to the header. Diagnostic Frame always carry diagnostic or configuration data and they always contain eight data bytes. The identifier is either 60 (0x3C), called master request frame, or 61(0x3D), called slave response frame. Before generating the header of a diagnostic frame, the master task asks its diagnostic module if it shall be sent or if the bus shall be silent. The slave tasks publish and subscribe to the response according to their diagnostic module. User-Defined Frame carry any kind of information. Their identifier is 62 (0x3E). The header of a user-defined frame is usually transmitted when a frame slot allocated to the frame is processed. Reserved Frame are not be used in a LIN 2.0 cluster, and their identifier is 63 (0x3F).

The LIN specification was designed to allow very cheap hardware-nodes being used within a network. The LIN specification is based on ISO 9141:1989 standard entitled: "*Road vehicles—Diagnostic systems—Requirements for interchange of digital information*" that Specifies the requirements for setting up the interchange of digital information between on-board Electronic Control Units (ECUs) of road vehicles and suitable diagnostic testers. This communication is established in order to facilitate inspection, test diagnosis and adjustment of vehicles, systems and ECUs. It does not apply when system-specific diagnostic test equipment is used. The LIN specification is further based on ISO 9141-2:1994 standard entitled: "*Road vehicles—Diagnostic systems—Part 2: CARB requirements for interchange of digital information*" that involves vehicles with nominal 12 V supply voltage, describes a subset of ISO 9141:1989, and specifies the requirements for setting-up the interchange of digital information between on-board emission-related electronic control units of road vehicles and the SAE OBD II scan tool as specified in SAE J1978. It is a low-cost, single-wire network, where microcontrollers with either UART capability or dedicated LIN hardware are used. The microcontroller generates all needed LIN data by software and is connected to the LIN network via a LIN transceiver (simply speaking, a level shifter with some add-ons). Working as a LIN node is only part of the possible functionality. The LIN hardware may include this transceiver and works as a pure LIN node without added functionality. As LIN Slave nodes should be as cheap as possible, they may generate their internal clocks by using RC oscillators instead of crystal oscillators (quartz or a ceramic). To ensure the baud rate-stability within one LIN frame, the SYNC field within the header is used. An example of a LIN transceiver is IC Model No. 33689D available from Freescale Semiconductor, Inc. described in a data-sheet Document Number MC33689 Rev. 8.0 (dated September 2012) entitled: "*System Basis Chip with LIN Transceiver*", which is incorporated in its entirety for all purposes as if fully set forth herein.

The LIN-Master uses one or more predefined scheduling tables to start the sending and receiving to the LIN bus. These scheduling tables contain at least the relative timing, where the message sending is initiated. One LIN Frame consists of the two parts header and response. The header is always sent by the LIN Master, while the response is sent by either one dedicated LIN-Slave or the LIN master itself. Transmitted data within the LIN is transmitted serially as eight-bit data bytes with one start & stop-bit and no parity. Bit rates vary within the range of 1 kbit/s to 20 kbit/s. Data on the bus is divided into recessive (logical HIGH) and dominant (logical LOW). The time normal is considered by the LIN Masters stable clock source, the smallest entity is one bit time (52 μs @ 19.2 kbit/s).

Two bus states Sleep—mode and active—are used within the LIN protocol. While data is on the bus, all LIN-nodes are requested to be in active state. After a specified timeout, the nodes enter Sleep mode and will be released back to active state by a WAKEUP frame. This frame may be sent by any node requesting activity on the bus, either the LIN Master following its internal schedule, or one of the attached LIN Slaves being activated by its internal software application. After all nodes are awakened, the Master continues to schedule the next Identifier.

MOST. MOST (Media Oriented Systems Transport) is a high-speed multimedia network technology optimized for use in automotive applications, and may be used for applications inside or outside the car. The serial MOST bus uses a ring topology and synchronous data communication to transport audio, video, voice and data signals via plastic optical fiber (POF) (MOST25, MOST150) or electrical conductor (MOST50, MOST150) physical layers. The MOST specification defines the physical and the data link layer as well as all seven layers of the ISO/OSI-Model of data communication. Standardized interfaces simplify the MOST protocol integration in multimedia devices. For the system developer, MOST is primarily a protocol definition. It provides the user with a standardized interface (API) to access device functionality, and the communication functionality is provided by driver software known as MOST Network Services. MOST Network Services include Basic Layer System Services (Layer 3, 4, 5) and Application Socket Services (Layer 6). They process the MOST protocol between a MOST Network Interface Controller (NIC), which is based on the physical layer, and the API (Layer 7).

A MOST network is able to manage up to 64 MOST devices in a ring configuration. Plug and play functionality allows MOST devices to be easily attached and removed. MOST networks can also be set up in virtual star network or other topologies. Safety critical applications use redundant double ring configurations. In a MOST network, one device is designated the timing master, used to continuously supply the ring with MOST frames. A preamble is sent at the beginning of the frame transfer. The other devices, known as timing followers, use the preamble for synchronization. Encoding based on synchronous transfer allows constant post-sync for the timing followers.

MOST25 provides a bandwidth of approximately 23 megabaud for streaming (synchronous) as well as package (asynchronous) data transfer over an optical physical layer. It is separated into 60 physical channels. The user can select and configure the channels into groups of four bytes each. MOST25 provides many services and methods for the allocation (and deallocation) of physical channels. MOST25 supports up to 15 uncompressed stereo audio channels with CD-quality sound or up to 15 MPEG-1 channels for audio/video transfer, each of which uses four Bytes (four physical channels). MOST also provides a channel for transferring control information. The system frequency of 44.1 kHz allows a bandwidth of 705.6 kbit/s, enabling 2670 control messages per second to be transferred. Control messages are used to configure MOST devices and configure synchronous and asynchronous data transfer. The system frequency closely follows the CD standard. Reference data can also be transferred via the control channel. Some limitations restrict MOST25's effective data transfer rate to about 10 kB/s. Because of the protocol overhead, the application can use only 11 of 32 bytes at segmented transfer and a MOST node can only use one third of the control channel bandwidth at any time.

MOST50 doubles the bandwidth of a MOST25 system and increases the frame length to 1024 bits. The three established channels (control message channel, streaming data channel, and packet data channel) of MOST25 remain the same, but the length of the control channel and the sectioning between the synchronous and asynchronous channels are flexible. Although MOST50 is specified to support both optical and electrical physical layers, the available MOST50 Intelligent Network Interface Controllers (INICs) only support electrical data transfer via Unshielded Twisted Pair (UTP).

MOST150 was introduced in October 2007 and provides a physical layer to implement Ethernet in automobiles. It increases the frame length up to 3072 bits, which is about 6 times the bandwidth of MOST25. It also integrates an Ethernet channel with adjustable bandwidth in addition to the three established channels (control message channel, streaming data channel, and packet data channel) of the other grades of MOST. MOST150 also permits isochronous transfer on the synchronous channel. Although the transfer of synchronous data requires a frequency other than the one specified by the MOST frame rate, it is also possible with MOST150. MOST150's advanced functions and enhanced bandwidth will enable a multiplex network infrastructure capable of transmitting all forms of infotainment data, including video, throughout an automobile. The optical transmission layer uses Plastic Optical Fibers (POF) with a core diameter of 1 mm as transmission medium, in combination with light emitting diodes (LEDs) in the red wavelength range as transmitters. MOST25 only uses an optical Physical Layer. MOST50 and MOST150 support both optical and electrical Physical Layers.

The MOST protocol is described in a book published 2011 by Franzis Verlag Gmbh [ISBN— 978-3-645-65061-8] edited by Prof. Dr. Ing. Andreas Grzemba entitled: "*MOST—The Automotive Multimedia Network—From MOST25 to MOST 150*", in MOST Dynamic Specification by MOST Cooperation Rev. 3.0.2 dated October 2012 entitled: "*MOST—Multimedia and Control Networking Technology*", and in MOST Specification Rev. 3.0 E2 dated July 2010 by MOST Cooperation, which are all incorporated in their entirety for all purposes as if fully set forth herein.

MOST Interfacing may use a MOST transceiver, such as IC model No. OS81118 available from Microchip Technology Incorporated (headquartered in Chandler, Ariz., U.S.A.) and described in a data sheet DS00001935A published 2015 by Microchip Technology Incorporated entitled: "*MOST150 INIC with USB 2.0 Device Port*", or IC model No. OS8104A also available from Microchip Technology Incorporated and described in a data sheet PFL_OS8104A_V01_00_XX-4.fm published August 2007 by Microchip Technology Incorporated entitled: "*MOST Network Interface Controller*", which are both incorporated in their entirety for all purposes as if fully set forth herein.

FlexRay. FlexRay™ is an automotive network communications protocol developed by the FlexRay Consortium to govern on-board automotive computing. The FlexRay consortium disbanded in 2009, but the FlexRay standard is described in a set of ISO standards, ISO 17458 entitled: "*Road vehicles—FlexRay communications system*", including ISO 17458-1:2013 standard entitled: "*Part 1: General information and use case definition*", ISO 17458-2:2013 standard entitled: "*Part 2: Data link layer specification*", ISO 17458-3:2013 standard entitled: "*Part 3: Data link layer conformance test specification*", ISO 17458-4:2013 standard entitled: "*Part 4: Electrical physical layer specification*", and ISO 17458-5:2013 standard entitled: "*Part 5: Electrical physical layer conformance test specification*".

FlexRay supports high data rates, up to 10 Mbit/s, explicitly supports both star and "party line" bus topologies, and can have two independent data channels for fault-tolerance (communication can continue with reduced bandwidth if one channel is inoperative). The bus operates on a time cycle, divided into two parts: the static segment and the dynamic segment. The static segment is pre-allocated into slices for individual communication types, providing a stronger real-time guarantee than its predecessor CAN. The dynamic segment operates more like CAN, with nodes taking control of the bus as available, allowing event-triggered behavior. FlexRay specification Version 3.0.1 is described in FlexRay consortium October 2010 publication entitled: "*FlexRay Communications System—Protocol Specification—Version 3.0.1*", which is incorporated in its entirety for all purposes as if fully set forth herein. The FlexRay physical layer is described in Carl Hanser Verlag Gmbh 2010 publication (Automotive 2010) by Lorenz, Steffen entitled: "*The FlexRay Electrical Physical Layer Evolution*", and in National Instruments Corporation Technical Overview Publication (Aug. 21, 2009) entitled: "*FlexRay Automotive Communication Bus Overview*", which are both incorporated in their entirety for all purposes as if fully set forth herein.

FlexRay system consists of a bus and processors (Electronic control unit, or ECUs), where each ECU has an independent clock. The clock drift must be not more than 0.15% from the reference clock, so the difference between the slowest and the fastest clock in the system is no greater than 0.3%. At each time, only one ECU writes to the bus, and each bit to be sent is held on the bus for 8 sample clock cycles. The receiver keeps a buffer of the last 5 samples, and uses the majority of the last 5 samples as the input signal. Single-cycle transmission errors may affect results near the boundary of the bits, but will not affect cycles in the middle of the 8-cycle region. The value of the bit is sampled in the middle of the 8-bit region. The errors are moved to the extreme cycles, and the clock is synchronized frequently enough for the drift to be small (Drift is smaller than 1 cycle per 300 cycles, and during transmission the clock is synchronized more than once every 300 cycles). An example of a FlexRay transceiver is model TJA1080A available from NXP Semiconductors N.V. headquartered in Eindhoven, Netherlands, described in Product data sheet (document Identifier TJA1080A, date of release: 28 Nov. 2012) entitled: "*TJA1080A FlexRay Transceiver—Rev. 6—28 Nov. 2012—Product data sheet*", which is incorporated in its entirety for all purposes as if fully set forth herein.

Further, the vehicular communication system employed may be used so that vehicles may communicate and exchange information with other vehicles and with roadside units, may allow for cooperation and may be effective in increasing safety such as sharing safety information, safety warnings, as well as traffic information, such as to avoid traffic congestion. In safety applications, vehicles that discover an imminent danger or obstacle in the road may inform other vehicles directly, via other vehicles serving as repeaters, or via roadside units. Further, the system may help in deciding right to pass first at intersections, and may provide alerts or warning about entering intersections, departing highways, discovery of obstacles, and lane change warnings, as well as reporting accidents and other activities in the road. The system may be used for traffic management, allowing for easy and optimal traffic flow control, in particular in the case of specific situations such as hot pursuits and bad weather. The traffic management may be in the form of variable speed limits, adaptable traffic lights, traffic intersection control, and accommodating emergency vehicles such as ambulances, fire trucks and police cars.

The vehicular communication system may further be used to assist the drivers, such as helping with parking a vehicle, cruise control, lane keeping, and road sign recognition. Similarly, better policing and enforcement may be obtained by using the system for surveillance, speed limit warning, restricted entries, and pull-over commands. The system may be integrated with pricing and payment systems such as toll collection, pricing management, and parking payments. The system may further be used for navigation and route optimization, as well as providing travel-related information such as maps, business location, gas stations, and car service locations.

Similarly, the system may be used for emergency warning system for vehicles, cooperative adaptive cruise control, cooperative forward collision warning, intersection collision avoidance, approaching emergency vehicle warning (Blue Waves), vehicle safety inspection, transit or emergency vehicle signal priority, electronic parking payments, commercial vehicle clearance and safety inspections, in-vehicle signing, rollover warning, probe data collection, highway-rail intersection warning, and electronic toll collection.

OBD. On-Board Diagnostics (OBD) refers to a vehicle's self-diagnostic and reporting capability. OBD systems give the vehicle owner or repair technician access to the status of the various vehicle subsystems. Modern OBD implementations use a standardized digital communications port to provide real-time data in addition to a standardized series of diagnostic trouble codes, or DTCs, which allow one to rapidly identify and remedy malfunctions within the vehicle. Keyword Protocol 2000, abbreviated KWP2000, is a communications protocol used for on-board vehicle diagnostics systems (OBD). This protocol covers the application layer in the OSI model of computer networking. KWP2000 also covers the session layer in the OSI model, in terms of starting, maintaining and terminating a communications session, and the protocol is standardized by International Organization for Standardization as ISO 14230.

One underlying physical layer used for KWP2000 is identical to ISO 9141, with bidirectional serial communication on a single line called the K-line. In addition, there is an optional L-line for wakeup. The data rate is between 1.2 and 10.4 kilobaud, and a message may contain up to 255 bytes in the data field. When implemented on a K-line physical layer, KWP2000 requires special wakeup sequences: 5 baud wakeup and fast-initialization. Both of these wakeup methods require timing critical manipulation of the K-line signal, and are therefore not easy to reproduce without custom software. KWP2000 is also compatible on ISO 11898 (Controller Area Network) supporting higher data rates of up to 1 Mbit/s. CAN is becoming an increasingly popular alternative to K-line because the CAN bus is usually present in modern-day vehicles and thus removing the need to install an additional physical cable. Using KWP2000 on CAN with ISO 15765 Transport/Network layers is most common. Also using KWP2000 on CAN does not require the special wakeup functionality.

KWP2000 can be implemented on CAN using just the service layer and session layer (no header specifying length, source and target addresses is used and no checksum is used); or using all layers (header and checksum are encapsulated within a CAN frame). However using all layers is overkill, as ISO 15765 provides its own Transport/Network layers.

ISO 14230-1:2012 entitled: "*Road vehicles—Diagnostic communication over K-Line (DoK-Line)—Part 1: Physical layer*", which is incorporated in its entirety for all purposes as if fully set forth herein, specifies the physical layer, based on ISO 9141, on which the diagnostic services will be implemented. It is based on the physical layer described in ISO 9141-2, but expanded to allow for road vehicles with either 12 V DC or 24 V DC voltage supply.

ISO 14230-2:2013 entitled: "*Road vehicles—Diagnostic communication over K-Line (DoK-Line)—Part 2: Data link layer*", which is incorporated in its entirety for all purposes as if fully set forth herein, specifies data link layer services tailored to meet the requirements of UART-based vehicle communication systems on K-Line as specified in ISO 14230-1. It has been defined in accordance with the diagnostic services established in ISO 14229-1 and ISO 15031-5, but is not limited to use with them, and is also compatible with most other communication needs for in-vehicle networks. The protocol specifies an unconfirmed communication. The diagnostic communication over K-Line (DoK-Line) protocol supports the standardized service primitive interface as specified in ISO 14229-2. ISO 14230-2:2013 provides the data link layer services to support different application layer implementations like: enhanced vehicle diagnostics (emissions-related system diagnostics beyond legislated functionality, non-emissions-related system diagnostics); emissions-related OBD as specified in ISO 15031, SAE J1979-DA, and SAE J2012-DA. In addition, ISO 14230-2:2013 clarifies the differences in initialization for K-line protocols defined in ISO 9141 and ISO 14230. This is important since a server supports only one of the protocols mentioned above and the client has to handle the coexistence of all protocols during the protocol-determination procedure.

The application layer is described in ISO 14230-3:1999 entitled: "*Road vehicles—Diagnostic systems—Keyword Protocol 2000—Part 3: Application layer*", and the requirements for emission-related systems are described in ISO 14230-4:2000 entitled: "*Road vehicles—Diagnostic systems—Keyword Protocol 2000—Part 4: Requirements for emission-related systems*", which are both incorporated in their entirety for all purposes as if fully set forth herein.

Automotive Ethernet. Automotive Ethernet refers to the use of an Ethernet-based network for connections between in-vehicle electronic systems, and typically defines a physical network that is used to connect components within a car using a wired network. Ethernet is a family of computer networking technologies commonly used in Local Area Networks (LAN), Metropolitan Area Networks (MAN) and Wide Area Networks (WAN). It was commercially introduced in 1980 and first standardized in 1983 as IEEE 802.3, and has since been refined to support higher bit rates and longer link distances. The Ethernet standards comprise several wiring and signaling variants of the OSI physical layer in use with Ethernet. Systems communicating over Ethernet divide a stream of data into shorter pieces called frames. Each frame contains source and destination addresses, and error-checking data so that damaged frames can be detected and discarded; most often, higher-layer protocols trigger retransmission of lost frames. As per the OSI model, Ethernet provides services up to and including the data link layer. Since its commercial release, Ethernet has retained a good degree of backward compatibility. Features such as the 48-bit MAC address and Ethernet frame format have influenced other networking protocols. Simple switched Ethernet networks, while a great improvement over repeater-based Ethernet, suffer from single points of failure, attacks that trick switches or hosts into sending data to a machine even if it is not intended for it, scalability and security issues with regard to switching loops, broadcast radiation and multicast traffic, and bandwidth choke points where a lot of traffic is forced down a single link.

Advanced networking features in switches use shortest path bridging (SPB) or the spanning-tree protocol (STP) to maintain a loop-free, meshed network, allowing physical loops for redundancy (STP) or load-balancing (SPB). Advanced networking features also ensure port security, provide protection features such as MAC lockdown and broadcast radiation filtering, use virtual LANs to keep different classes of users separate while using the same physical infrastructure, employ multilayer switching to route between different classes, and use link aggregation to add bandwidth to overloaded links and to provide some redundancy. IEEE 802.1aq (shortest path bridging) includes the use of the link-state routing protocol IS-IS to allow larger networks with shortest path routes between devices.

A data packet on an Ethernet link is called an Ethernet packet, which transports an Ethernet frame as its payload. An Ethernet frame is preceded by a preamble and Start Frame Delimiter (SFD), which are both part of the Ethernet packet at the physical layer. Each Ethernet frame starts with an Ethernet header, which contains destination and source MAC addresses as its first two fields. The middle section of the frame is payload data including any headers for other protocols (for example, Internet Protocol) carried in the frame. The frame ends with a frame check sequence (FCS), which is a 32-bit cyclic redundancy check used to detect any in-transit corruption of data. Automotive Ethernet is described in a book by Charles M. Kozierok, Colt Correa, Robert B. Boatright, and Jeffrey Quesnelle entitled: "*Automotive Ethernet: The Definitive Guide*", published 2014 by Intrepid Control Systems [ISBN-13: 978-0-9905388-0-6], and in a white paper document No. 915-3510-01 Rev. A published May 2014 by Ixia entitled: "*Automotive Ethernet: An Overview*", which are both incorporated in their entirety for all purposes as if fully set forth herein. 100BaseT1. 100BASE-T1 (and upcoming 1000Base-T1) is an Ethernet automotive standard, standardized in IEEE 802.3bw-2015 Clause 96 and entitled: "*802.3bw-2015—IEEE Standard for Ethernet Amendment 1: Physical Layer Specifications and Management Parameters for* 100 *Mb/s Operation over a Single Balanced Twisted Pair Cable* (100*BASE-T1)*". The data is transmitted over a single copper pair, 3 bits per symbol (PAM3), and it supports only full-duplex, transmitting in both directions simultaneously. The twisted-pair cable is required to support 66 MHz, with a maximum length of 15 m. The standard is intended for automotive applications or when Fast Ethernet is to be integrated into another application.

BroadR-Reach®. BroadR-Reach® technology is an Ethernet physical layer standard designed for use in automotive connectivity applications. BroadR-Reach® technology allows multiple in-vehicle systems to simultaneously access information over unshielded single twisted pair cable, intended for reduced connectivity costs and cabling weight. Using BroadR-Reach® technology in automotive enables the migration from multiple closed applications to a single open, scalable Ethernet-based network within the automobile. This allows automotive manufacturers to incorporate multiple electronic systems and devices, such as advanced safety features (i.e. 360-degree surround view parking assistance, rear-view cameras and collision avoidance systems) and comfort and infotainment features. The automotive-qualified BroadR-Reach® Ethernet physical layer standard can be combined with IEEE 802.3 compliant switch technology to deliver 100 Mbit/s over unshielded single twisted pair cable.

The BroadR-Reach automotive Ethernet standard realizes simultaneous transmit and receive (i.e., full-duplex) operations on a single-pair cable instead of the half-duplex operation in 100BASE-TX, which uses one pair for transmit and one for receive to achieve the same data rate. In order to better de-correlate the signal, the digital signal processor (DSP) uses a highly optimized scrambler when compared to the scrambler used in 100BASE-TX. This provides a robust and efficient signaling scheme required by automotive applications. The BroadR-Reach automotive Ethernet standard uses a signaling scheme with higher spectral efficiency than that of 100BASE-TX. This limits the signal bandwidth of Automotive Ethernet to 33.3 MHz, which is about half the bandwidth of 100BASE-TX. A lower signal bandwidth improves return loss, reduces crosstalk, and ensures that BroadR-Reach® automotive Ethernet standard passes the stringent automotive electromagnetic emission requirements. The physical layer of BroadR-Reach® is described in a specification authored by Dr. Bernd Korber and published Nov. 28, 2014 by the OPEN Alliance, entitled: "*BroadR-Reach® Definitions for Communication Channel—Version* 2.0", which is incorporated in its entirety for all purposes as if fully set forth herein. IEEE 802.3bv™. Changes to IEEE Std 802.3-2015 that adds Clause 115 and Annex 115A are described in IEEE Std 802.3bv-2017 entitled: "*Amendment* 9: *Physical Layer Specifications and Management Parameters for* 1000 *Mb/s Operation Over Plastic Optical Fiber*" approved 14 Feb. 2017 [ISBN 978-5044-3721-9], which is incorporated in its entirety for all purposes as if fully set forth herein. This amendment adds point-to-point 1000 Mb/s Physical Layer (PHY) specifications and management parameters for operation on duplex plastic optical fiber (POF) targeting use in automotive, industrial, home-network, and other applications.

IEEE 802.3 bp™. Changes to IEEE Std 802.3-2015 that adds Clause 97 and Clause 98 are described in IEEE Std 802.3 bp-2016 entitled: "*Amendment* 4: *Physical Layer Specifications and Management Parameters for* 1 *Gb/s Operation over a Single Twisted-Pair Copper Cable*" approved 30 Jun. 2016 [ISBN 978-1-5044-2288-8], which is incorporated in its entirety for all purposes as if fully set forth herein. This amendment adds point-to-point 1 Gb/s Physical Layer (PHY) specifications and management parameters for operation on a single balanced twisted-pair copper cable in automotive and other applications not utilizing the structured wiring plant.

A method and a device for recording data or for transmitting stimulation data, which are transmitted in Ethernet-based networks of vehicles, are described in U.S. Patent Application No. 2015/0071115 to Neff et al. entitled: "Data Logging or Stimulation in Automotive Ethernet Networks Using the Vehicle Infrastructure", which is incorporated in its entirety for all purposes as if fully set forth herein. A method for recording data is described, wherein the data are transmitted from a transmitting control unit to a receiving control unit of a vehicle via a communication system of the vehicle. The communication system comprises an Ethernet network, wherein the data are conducted from a transmission component to a reception component of the Ethernet network via a transmission path, and wherein the data are to be recorded at a logging component of the Ethernet network, which does not lie on the transmission path. The method comprises the configuration of an intermediate component of the Ethernet network, which lies on the transmission path, to transmit a copy of the data as logging data to the logging component; and the recording of the logging data at the logging component.

A backbone network system for a vehicle enables high-speed and large-capacity data transmission between integrated control modules mounted in the vehicle, such that communication can be maintained through another alternative communication line when an error occurs in a specific communication line, is described in U.S. Pat. No. 9,172,635 to Kim et al. entitled: "Ethernet backbone network system for vehicle and method for controlling fail safe of the ethernet backbone network system", which is incorporated in its entirety for all purposes as if fully set forth herein. The backbone network system enables various kinds of integrated control modules mounted in the vehicle to perform large-capacity and high-speed communications, based on Ethernet communication, by connecting domain gateways of the integrated control modules through an Ethernet backbone network, and provides a fast fail-safe function so that domain gateways can perform communications through another communication line when an error occurs in a communication line between the domain gateways.

A system and method for managing a vehicle Ethernet communication network are disclosed in U.S. Pat. No. 9,450,911 to CHA et al. entitled: "System and method for managing ethernet communication network for use in vehicle", which is incorporated in its entirety for all purposes as if fully set forth herein. More specifically, each unit in a vehicle Ethernet communication network is configured to initially enter a power-on (PowerOn) mode when is applied to each unit of the vehicle to initialize operational programs. Once powered on, each unit enters a normal mode in which a node for each unit participates in a network to request the network. Subsequently, each unit enters a sleep indication (SleepInd) mode where other nodes are not requested even though the network has already been requested by the other nodes. A communication mode is then terminated at each unit and each unit enters a wait bus sleep (WaitBusSleep) mode in which all nodes connected to the network are no longer in communication and are waiting to switch to sleep mode. Finally, each unit is powered off to prevent communication between units in the network.

A system that includes an on-board unit (OBU) in communication with an internal subsystem in a vehicle on at least one Ethernet network and a node on a wireless network, is disclosed in U.S. Patent Application Publication No. 2014/0215491 to Addepalli et al. entitled: "System and method for internal networking, data optimization and dynamic frequency selection in a vehicular environment", which is incorporated in its entirety for all purposes as if fully set forth herein. A method in one embodiment includes receiving a message on the Ethernet network in the vehicle, encapsulating the message to facilitate translation to Ethernet protocol if the message is not in Ethernet protocol, and transmitting the message in Ethernet protocol to its destination. Certain embodiments include optimizing data transmission over the wireless network using redundancy caches, dictionaries, object contexts databases, speech templates and protocol header templates, and cross layer optimization of data flow from a receiver to a sender over a TCP connection. Certain embodiments also include dynamically identifying and selecting an operating frequency with least interference for data transmission over the wireless network.

In example of a vehicle bus, such as a CAN bus, is shown in an arrangement 50 in FIG. 5. The network is typically in a vehicle, where the wired communication medium 16b comprises two conductors or wires 54a and 54b, cooperatively connected in a multi-point ('bus') topology. ECUs 'A' 56a, 'B' 56b, and 'C' 56c are connected at different points along the medium (or at the medium ends), and are respectively connected to the medium 16b by connectors 55a, 55b, and 55c. The ECUs 'A' 56a, 'B' 56b, and 'C' 56c respectively comprises balanced line drivers 51a, 51b, and 51c, and balanced line receivers 52a, 52b, and 52c, that may be part of respective CAN bus transceivers 53a, 53b, and 53c, that are respectively connected to the connectors 55a, 55b, and 55c for coupling to the medium 16b. CAN Controllers 57a, 57b, and 57c are respectively coupled to the CAN transceivers 53a, 53b, and 53c, for handling the lower layers of the CAN protocol. Impedances such as resistors 19a and 19b are connected at both ends of the medium 16b as terminations for matching to the medium impedance for reducing signal reflections.

A vehicle bus may consist of, or may comprise, an avionics bus, used as a data bus in military, commercial and advanced models of civilian aircraft. Common avionics data bus protocols, with their primary application, include Aircraft Data Network (ADN) that is an Ethernet derivative for Commercial Aircraft, Avionics Full-Duplex Switched Ethernet (AFDX) that is a specific implementation of ARINC 664 (ADN) for Commercial Aircraft, ARINC 429: "Generic Medium-Speed Data Sharing for Private and Commercial Aircraft", ARINC 664, ARINC 629 used in Commercial Aircraft (such as Boeing 777), ARINC 708: "Weather Radar for Commercial Aircraft", ARINC 717: "Flight Data Recorder for Commercial Aircraft", ARINC 825 that is a CAN bus for commercial aircraft (for example Boeing 787 and Airbus A350), IEEE 1394b used in some Military Aircraft, MIL-STD-1553 and MIL-STD-1760 for Military Aircraft, and Time-Triggered Protocol (TTP): Boeing 787 Dreamliner, Airbus A380, Fly-By-Wire Actuation Platforms from Parker Aerospace.

MIL-STD-1553. MIL-STD-1553 is a military standard published by the United States Department of Defense that defines the mechanical, electrical, and functional characteristics of a serial data bus. It was originally designed as an avionic data bus for use with military avionics, but has also become commonly used in spacecraft on-board data handling (OBDH) subsystems, both military and civil. It features multiple (commonly dual) redundant balanced line physical layers, a (differential) network interface, time division multiplexing, half-duplex command/response protocol, and can handle up to 30 Remote Terminals (devices). The MIL-STD-1553 is standardized as a Military standard MIL-STD-1553B dated 21 Sep. 1978 by the Department of Defense of U.S.A. entitled: "Aircraft Internal Time Division Command/Response Multiplex Data Bus", and is described in AIM Gmbh tutorial v2.3 dated November 2010 entitled: "MIL-STD-1553 Tutorial", which are both incorporated in their entirety for all purposes as if fully set forth herein.

A single bus consists of a wire pair with 70-85Ω impedance at 1 MHz. Where a circular connector is used, its center pin is used for the high (positive) Manchester bi-phase signal. Transmitters and receivers couple to the bus via isolation transformers, and stub connections branch off using a pair of isolation resistors and, optionally, a coupling transformer, for reducing the impact of a short circuit and assures that the bus does not conduct current through the aircraft. A Manchester code is used to present both clock and data on the same wire pair and to eliminate any DC component in the signal (which cannot pass the transformers). The bit rate is 1.0 megabit per second (1 bit per µs). The combined accuracy and long-term stability of the bit rate is only specified to be within ±0.1%; the short-term clock stability must be within ±0.01%. The peak-to-peak output voltage of a transmitter is 18-27 V. The bus can be made dual or triply redundant by using several independent wire pairs, and then all devices are connected to all buses. There is provision to designate a new bus control computer in the event of a failure by the current master controller. Usually, the auxiliary flight control computer(s) monitor the master computer and aircraft sensors via the main data bus. A different version of the bus uses optical fiber, which weighs less and has better resistance to electromagnetic interference, including EMP.

A MIL-STD-1553 multiplex data bus system consists of a Bus Controller (BC) controlling multiple Remote Terminals (RT) all connected together by a data bus providing a single data path between the Bus Controller and all the associated Remote Terminals. There may also be one or more Bus Monitors (BM); however, Bus Monitors are specifically not allowed to take part in data transfers, and are only used to capture or record data for analysis, etc. In redundant bus implementations, several data buses are used to provide more than one data path, i.e. dual redundant data bus, tri-redundant data bus, etc. All transmissions onto the data bus are accessible to the BC and all connected RTs. Messages consist of one or more 16-bit words (command, data, or status). The 16 bits comprising each word are transmitted using Manchester code, where each bit is transmitted as a 0.5 µs high and 0.5 µs low for a logical 1 or a low-high sequence for a logical 0. Each word is preceded by a 3 µs sync pulse (1.5 µs low plus 1.5 µs high for data words and the opposite for command and status words, which cannot occur in the Manchester code) and followed by an odd parity bit. Practically each word could be considered as a 20-bit word: 3 bit for sync, 16 bit for payload and 1 bit for odd parity control. The words within a message are transmitted contiguously and there has to be a minimum of a 4 µs gap between messages. However, this inter-message gap can be, and often is, much larger than 4 µs, even up to 1 ms with some older Bus Controllers. Devices have to start transmitting their response to a valid command within 4-12 µs and are considered to not have received a command or message if no response has started within 14 µs.

ARINC 429. ARINC 429, also known as "*Mark*33 *Digital Information Transfer System* (*DITS*)" and as Aeronautical Radio INC. (ARINC), is the technical standard for the predominant avionics data bus used on most higher-end commercial and transport aircraft. It defines the physical and electrical interfaces of a two-wire data bus and a data protocol to support an aircraft's avionics local area network. ARINC 429 is a data transfer standard for aircraft avionics, and uses a self-clocking, self-synchronizing data bus protocol (Tx and Rx are on separate ports). The physical connection wires are twisted pairs carrying balanced differential signaling. Data words are 32 bits in length and most messages consist of a single data word. Messages are transmitted at either 12.5 or 100 kbit/s to other system elements that are monitoring the bus messages. The transmitter constantly transmits either 32-bit data words or the NULL state. A single wire pair is limited to one transmitter and no more than 20 receivers. The protocol allows for self-clocking at the receiver end, thus eliminating the need to transmit clocking data. The ARINC 429 unit of transmission is a fixed-length 32-bit frame, which the standard refers to as a 'word'. The bits within an ARINC 429 word are serially identified from Bit Number 1 to Bit Number 32 or simply Bit 1 to Bit 32. The fields and data structures of the ARINC 429 word are defined in terms of this numbering. The ARINC 429 is described in Avionics Interface Technologies Doc. No. 40100001 (downloaded from the Internet on November 2016) entitled: "*ARINC* 429 *Protocol Tutorial*", and in an ARINC Specification 429 prepared by Airlines Electronic Engineering Committee and published May 17, 2004 by Aeronautical Radio, Inc. entitled: "*Mark* 33 *Digital Information Transfer System* (*DITS*)—*Part* 1—*Functional Description, Electrical Interface, Label Assignments and Word Formats*", which are both incorporated in their entirety for all purposes as if fully set forth herein. ARINC 429 interface may use '*ARINC* 429 *Bus Interface—DirectCore*' v5.0 available from Actel Corporation (headquartered in Mountain-View, Calif., USA) described in Document No. 51700055-5/9.06 published September 2006, which is incorporated in its entirety for all purposes as if fully set forth herein.

Memory. The terms "memory" and "storage" are used interchangeably herein and refer to any physical component that can retain or store information (that can be later retrieved) such as digital data on a temporary or permanent basis, typically for use in a computer or other digital electronic device. A memory can store computer programs or any other sequence of instructions, or data such as files, text, numbers, audio and video, as well as any other form of information represented as a string of bits or bytes. The physical means of storing information may be electrostatic, ferroelectric, magnetic, acoustic, optical, chemical, electronic, electrical, or mechanical. A memory may be in a form of Integrated Circuit (IC, a.k.a. chip or microchip). Alternatively or in addition, the memory may be in the form of a packaged functional assembly of electronic components (module). Such module may be based on a PCB (Printed Circuit Board) such as PC Card according to Personal Computer Memory Card International Association (PCMCIA) PCMCIA 2.0 standard, or a Single In-line Memory Module (SIMM) (or DIMM) which is standardized under the JEDEC JESD-21C standard. Further, a memory may be in the form of a separately rigidly enclosed box such as a hard-disk drive.

Semiconductor memory may be based on Silicon-On-Insulator (SOI) technology, where a layered silicon-insulator-silicon substrate is used in place of conventional silicon substrates in semiconductor manufacturing, especially microelectronics, to reduce parasitic device capacitance and thereby improving performance. SOI-based devices differ from conventional silicon-built devices in that the silicon junction is above an electrical insulator, typically silicon dioxide or sapphire (these types of devices are called silicon on sapphire, or SOS, and are less common). SOI-Based memories include Twin Transistor RAM (TTRAM) and Zero-capacitor RAM (Z-RAM).

A memory may be a volatile memory, where a continuous power is required to maintain the stored information such as RAM (Random Access Memory), including DRAM (Dynamic RAM) or SRAM (Static RAM), or alternatively be a non-volatile memory which does not require a maintained power supply, such as Flash memory, EPROM, EEPROM and ROM (Read-Only Memory). Volatile memories are commonly used where long-term storage is required, while non-volatile memories are more suitable where fast memory access is required. Volatile memory may be dynamic, where the stored information is required to be periodically refreshed (such as re-read and then re-written) such as DRAM, or alternatively may be static, where there is no need to refresh as long as power is applied, such as RAM. In some cases, a small battery is connected to a low-power consuming volatile memory, allowing its use as a non-volatile memory.

A memory may be read/write (or mutable storage) memory where data may be overwritten more than once and typically at any time, such as RAM and Hard Disk Drive (HDD). Alternatively, a memory may be an immutable storage where the information is retained after being written once. Once written, the information can only be read and typically cannot be modified, sometimes referred to as Write Once Read Many (WORM). The data may be written at the time of manufacture of the memory, such as mask-programmable ROM (Read Only Memory) where the data is written into the memory a part of the IC fabrication, CD-ROM (CD—Compact Disc) and DVD-ROM (DVD—Digital Versatile Disk, or Digital Video Disk). Alternately, the data may be once written to the "write once storage" at some point after manufacturing, such as Programmable Read-Only Memory (PROM) or CD-R (Compact Disc-Recordable).

A memory may be accessed using "random access" scheme, where any location in the storage can be accessed at any moment in typically the same time, such as RAM, ROM or most semiconductor-based memories. Alternatively, a memory may be of "sequential access" type, where the pieces of information are gathered or stored in a serial order, and therefore the time to access a particular piece of information or a particular address depends upon which piece of information was last accessed, such as magnetic tape-based storage. Common memory devices are location-addressable, where each individually accessible unit of data in storage is selected using its numerical memory address. Alternatively, a memory may be file-addressable, where the information is divided into files of variable length, and a file is selected by using a directory or file name (typically a human readable name), or may be content-addressable, where each accessible unit of information is selected based on the stored content (or part of). File addressability and content addressability commonly involves additional software (firmware), hardware, or both.

Various storage technologies are used for the medium (or media) that actually holds the data in the memory. Commonly in use are semiconductor, magnetic, and optical mediums. Semiconductor based medium is based on transistors, capacitors or other electronic components in an IC, such as RAM, ROM and Solid-State Drives (SSDs). A currently popular non-volatile semiconductor technology is based on a flash memory, and can be electrically erased and reprogrammed. The flash memory is based on NOR- or NAND-based single-level cells (SLC) or multi-level cells (MLC), made from floating-gate transistors. Non-limiting examples of applications of flash memory include personal and laptop computers, PDAs, digital audio players (MP3 players), digital cameras, mobile phones, synthesizers, video games consoles, scientific instrumentation, industrial robotics and medical electronics. The magnetic storage uses different types of magnetization on a magnetic or a ferromagnetic coated surface as a medium for storing the information. The information is accessed by read/write heads or other transducers. Non-limiting examples of magnetic-based memory are Floppy disk, magnetic tape data storage and HDD.

In optical storage, typically an optical disc is used that stores information in deformities on the surface of a circular disc, and the information is read by illuminating the surface with a laser diode and observing the reflection. The deformities may be permanent (read only media), formed once (write once media) or reversible (recordable or read/write media). Non-limiting examples of read-only storage, commonly used for mass distribution of digital information such as music, audio, video or computer programs, include CD-ROM, BD-ROM (BD—Blu-ray Disc) and DVD-ROM. Non-limiting examples of write-once storage are CD-R, DVD-R, DVD+R, and BD-R, and non-limiting examples of recordable storage are CD-RW (Compact Disc-ReWritable), DVD-RW, DVD+RW, DVD-RAM, and BD-RE (Blu-ray Disc Recordable Erasable). Another non-limiting example is magneto-optical disc storage, where the magnetic state of a ferromagnetic surface stores the information, which can be read optically. 3D optical data storage is an optical data storage, in which information can be recorded and/or read, with three-dimensional resolution.

A storage medium may be removable, designed to be easily removed from, and easily installed or inserted into the computer by a person, typically without the need for any tool, and without needing to power off the computer or the associated drive. Such a capability allows for archiving, transporting data between computers, and buying and selling software. The medium may be read using a reader or player that reads the data from the medium, may be written by a burner or writer, or may be used for writing and reading by a writer/reader commonly referred to as a drive. Commonly in the case of magnetic or optical based mediums, the medium has the form factor of a disk, which is typically a round plate on which the data is encoded, respectively known as magnetic disc and optical disk. The machine that is associated with reading data from and writing data onto a disk is known as a disk drive. Disk drives may be internal (integrated within the computer enclosure) or may be external (housed in a separate box that connects to the computer). Floppy disks, that can be read from or written on by a floppy drive, are a non-limiting example of removable magnetic storage medium, and CD-RW (Compact Disc-ReWritable) is a non-limiting example of a removable optical disk. A commonly-used non-volatile removable semiconductor based storage medium is referred to as a memory card. A memory card is a small storage device, commonly based on flash memory, and can be read by a suitable card reader.

A memory may be accessed via a parallel connection or bus (wherein each data word is carried in parallel on multiple electrical conductors or wires), such as PATA, PCMCIA or EISA, or via serial bus (such as bit-serial connections) such as USB or Ethernet based on IEEE802.3 standard, or a combination of both. The connection may further be wired in various topologies such as multi-drop (electrical parallel), point-to-point, or daisy-chain. A memory may be powered via a dedicated port or connector, or may be powered via a power signal carried over the bus, such as SATA or USB.

A memory may be provided according to a standard, defining its form factor (such as its physical size and shape) and electrical connections (such as power and data interface). A standard-based memory may be easily inserted to, or removed from, a suitable corresponding slot (a.k.a. expansion slots) of a computer or other digital device. In one non-limiting example, a memory card using a PC Card form factor according to PCMCIA 2.0 (or JEIDA 4.1) is used that is suitable for mounting into a corresponding PCMCIA-compatible slot, supporting 16 or 32-bit width interface, and connected via 68 pin connectors. Similarly, CardBus according to PCMCIA 5.0 may be used. In one non-limiting example, the memory is in the form of SD (Secure Digital) Card, based on standard by SD Card Association (SDA), which is commonly used in many small portable devices such as digital video camcorders, digital cameras, audio players and mobile phones. Other types of memory cards may be equally used, such as CompactFlash (CF), MiniSD card, MicroSD Card, and xD-Picture Card.

In another non-limiting example, a memory may be provided as a USB drive (such as a USB Flash drive), which is a portable enclosed card that plugs into a computer USB port and communicates with a USB host. Such flash-based memory drives are commonly referred to as "thumb drives", "jump drives", and "memory sticks". Such USB mass storage devices and others are described in "*Chapter 1: Mass Storage basics*", downloaded October 2011 from: http://www.lvr.com/files/usb_mass_storage_chapter_1.pdf, which is incorporated in its entirety for all purposes as if fully set forth herein. In another non-limiting example, the memory is designed to fit into a drive bay in a computer enclosure. Commonly such drive bays are standard-sized, and used to store disk drives. The drives may be usually secured with screws or using a tool-less fasteners. A current popular standard is the 3.5 inches (3.5") bays, which dimensions are specified in SFF standard specifications SFF-8300 and SFF-8301, which were incorporated into the EIA (Electronic Industries Association) standard EIA-470.

Traditionally, computer-related storage was categorized to main memory, secondary and tertiary storages, having different latency (access time), capacity, and size. The main memory (or primary memory or internal memory) referred to the memory that was directly accessible by the CPU, and typically stored the program to be executed by the processor. The secondary storage (or external memory or auxiliary storage) referred to a memory which was not directly accessible to the CPU and thus required input/output channels, commonly offering larger storage capacity than the main memory. The tertiary storage involved mass storage media, commonly associated with a dismount removable media, used for archiving rarely accessed information. The latency of accessing a particular location is typically nanoseconds for primary storage, milliseconds for secondary storage, and seconds for tertiary storage. The capacity of a memory is commonly featured in bytes (B), where the prefix 'K' is used to denote kilo=$2^{10}$=$1024^1$=1024, the prefix 'M' is used to denote mega=$2^{20}$=$1024^2$=1,048,576, the prefix 'G' is used to denote giga=$2^{30}$=$1024^3$=1,073,741,824, and the prefix 'T' is used to denote tera=$2^{40}$=$1024^4$=1,099,511,627,776.

A memory may be Direct-Attached Storage (DAS), where the memory is directly connected to a host, computer, server, or workstation, commonly without a network in between. Common examples involve a number of Hard Disk Drives (HDDs) connected to a processor or a computer through a Host Bus Adapter (HBA). Commonly, serial and point-to-point connections are used, such as SATA, eSATA, SCSI, SAS and Fibre Channel. Alternatively, a memory can be part of a Network-Attached Storage (NAS), and a self-contained file level storage (typically arranged as a server) may be connected to a network, providing data sharing to other devices (such as heterogeneous clients), commonly via a network device such as a hub, switch or router. NAS is specialized for its task by its hardware, software, or both, and thus provides faster data access, easier administration, and simple configuration. NAS is typically associated with an LAN, and provides an Ethernet interface based on IEEE802.3 standard may be used such as 10/100BaseT, 1000BaseT/TX (gigabit Ethernet), 10 gigabit Ethernet (10GE or 10 GbE or 10 GigE per IEEE Standard 802.3ae-2002as standard), 40 Gigabit Ethernet (40 GbE), or 100 Gigabit Ethernet (100 GbE as per Ethernet standard IEEE P802.3ba). In another alternative, a memory may be part of a Storage Area Network (SAN), which is a high-speed (commonly dedicated) network (or sub-network) for sharing storage devices, such as disk arrays, tape libraries and optical jukeboxes. The SAN allows multiple computers or servers to access multiple storage devices using a network such as WAN or LAN. SAN often utilizes a Fibre Channel fabric topology, made up of a number of Fibre Channel switches.

Blu-ray Disc (official abbreviation BD) is an optical disc storage medium designed to supersede the DVD format, where blue laser is used to read the disc, allowing information to be stored at a greater density than is possible with the longer-wavelength red laser used for DVDs. The disc diameter is 120 mm and the disc thickness is 1.2 mm of plastic optical disc, the same size as DVDs and CDs. Blu-ray Discs contain 25 GB (23.31 GiB) per layer, with dual layer discs (50 GB) being the norm for feature-length video discs. Triple layer discs (100 GB) and quadruple layers (128 GB) are available for BD-XL Blu-ray re-writer drives. The Blu-ray technology and its uses are described in the White Paper "Blu-ray Disc Format, 4. Key Technologies", by Blu-ray Disc Founders, August 2004, in the brochure entitled: "*Blu-ray Technology—DISCover the infinite storage media*", by DISC Archiving Systems B.V., 2010, and in a Whitepaper entitled: "*Sustainable Archival Storage—The Benefits of Optical Archiving*", by DISC Archiving Systems B.V., downloaded from www.disc-group.com, which are all incorporated in their entirety for all purposes as if fully set forth herein.

Today, Hard Disk Drives (HDD) are used as secondary storage in general purpose computers, such as desktop personal computers and laptops. An HDD is a non-volatile, random access digital data storage device, featuring rotating rigid platters on a motor-driven spindle within a protective enclosure. The enclosure may be internal to the computer system enclosure, or external. Data is magnetically read from, and written to, the platter by read/write heads that float on a film or air above the platters. The HDDs are typically interfaced using high-speed interfaces, commonly of a serial type. Common HDDs structure, characteristics, operation, form factors, and interfacing are described in "*Hard-Disk Basics*" compiled from PCGUIDE.COM by Mehedi Hasan, which is incorporated in its entirety for all purposes as if fully set forth herein. Most SSDs include a controller that incorporates the electronics that bridge the NAND memory components to the host computer. The controller is an embedded processor that executes firmware-level code and is one of the most important factors of SSD performance. Functions performed by the controller include Error correction (ECC), Wear leveling, Bad block mapping, Read scrubbing and read disturb management, Read and write caching, and Garbage collection. Information about SSD technology, marketing and applications are provided in Martin B., Dell entitled: "*DELL Solid State Disk (SSD) Drive—Storage Solutions for Select Poweredge Server*", May 2009, in Janukowicz J., Reisel D., White-Paper entitled: "*MLC Solid State Drives: Accelerating the Adoption of SSDs*", IDC #213730, September 2008, and in Dufrasne B., Blum K, Dubberke U., IBM Corp. Redbooks Redpaper entitled: "*DS8000: Introducing Solid State Drives*" (2009), which are all incorporated in their entirety for all purposes as if fully set forth herein.

PLD. A Programmable Logic Device (PLD) is an electronic component used to build reconfigurable circuits. A PLD may be reconfigured by programming in the field by a user to provide a logic function. Examples of PLDs include PAL (Programmable Array Logic), GAL (Generic Array Logic), CPLD (Complex Programmable Logic Device), and FPGA (Field-Programmable Gate Array). A PLD is effectively a combination of a logic device and a memory device, where the memory is used to store the pattern that was given to the chip during programming. The memory is typically electrically programmable and erasable, may be volatile or non-volatile, and is commonly an integrated circuit using common storage technology such as Silicon antifuses, SRAM, EPROM or EEPROM cells, or Flash memory. Further, the memory may be internal to the PLD or external to it. The programming typically uses a programming language such as Verilog and VHDL.

A CPLD is a PLD with complexity between that of PALs and FPGAs, and architectural features of both. The building block of a CPLD is the macrocell, which contains logic implementing disjunctive normal form expressions and more specialized logic operations, thus forming the logic functions with sea-of-gates (for example, a sum of products). Typically, a CPLD contain on-chip non-volatile memory. An FPGA is a PLD that contains programmable logic components called "logic blocks", and a hierarchy of reconfigurable interconnects that allow the blocks to be wired together. Logic blocks can be configured to perform complex combinational functions, or merely simple logic gates like AND and XOR. In most FPGAs, the logic blocks also include memory elements, which may be simple flip-flops or complete blocks of memory. In many cases, an FPGA uses a memory external to the component.

PLDs such as CPLD and FPGA are field programmable, allowing a user to change the logic per specific needs, and further for updating the programming by storing a new content into the PLD associated memory, being internal or external to the device. A processor (or a direct memory) is connected to the PLD associated memory, and writes the programming content into it. In case of malware in the system or an error in the communication link, the written content may be damaged, similar to the above discussion regarding writing to a peripheral device such as an HDD.

Message Authentication. Authentication refers to the act of confirming the truth of an attribute of a single piece of data claimed true by an entity. In contrast with identification, which refers to the act of stating or otherwise indicating a claim purportedly attesting to a person or thing's identity, authentication is the process of actually confirming that identity. Authentication typically involves verifying the validity of at least one form of identification. Message authentication or data origin authentication is a property that a message has not been modified while in transit (data integrity) and that the receiving party can verify the source of the message.

Message authentication is typically achieved by using Message Authentication Codes (MACs), Authenticated Encryption (AE), or digital signatures. The Message Authentication Code, also known as digital authenticator, is used as an integrity check based on a secret key shared by two parties to authenticate information transmitted between them. It is typically based on using a cryptographic hash or symmetric encryption algorithm, and the authentication key is only shared by at least two parties or two communicating devices but it will fail in the existence of a third party since the algorithm will no longer be effective in detecting forgeries. In addition, the key must also be randomly generated to avoid its recovery through brute force searches and related key attacks designed to identify it from the messages transiting the medium.

Message Authentication Code (MAC). A message authentication code (MAC), sometimes known as a tag, refers to a cryptographic checksum that results from passing data through a message authentication algorithm. Typically a MAC is a short piece of information used to authenticate a message, to confirm that the message came from the stated sender (its authenticity) and has not been changed. The MAC value protects both a message's data integrity as well as its authenticity, by allowing verifiers (who also possess the secret key) to detect any changes to the message content. Commonly, a message authentication code consists of three algorithms: A key generation algorithm selects a key from the key space uniformly at random; a signing algorithm efficiently returns a tag given the key and the message; and a verifying algorithm efficiently verifies the authenticity of the message given the key and the tag. That is, return accepted when the message and tag are not tampered with or forged, and otherwise return rejected.

A MAC function typically resists existential forgery under chosen-plaintext attacks. This means that even if an attacker has access to an oracle which possesses the secret key and generates MACs for messages of the attacker's choosing, the attacker cannot guess the MAC for other messages (which were not used to query the oracle) without performing infeasible amounts of computation. MACs differ from digital signatures as MAC values are both generated and verified using the same secret key. This implies that the sender and receiver of a message must agree on the same key before initiating communications, as is the case with symmetric encryption. For the same reason, MACs do not provide the property of non-repudiation offered by signatures specifically in the case of a network-wide shared secret key: any user who can verify a MAC is also capable of generating MACs for other messages. In contrast, a digital signature is generated using the private key of a key pair, which is public-key cryptography. Since this private key is only accessible to its holder, a digital signature proves that a document was signed by none other than that holder. Thus, digital signatures do offer non-repudiation. However, non-repudiation can be provided by systems that securely bind key usage information to the MAC key; the same key is in the possession of two people, but one has a copy of the key that can be used for MAC generation while the other has a copy of the key in a hardware security module that only permits MAC verification.

MAC algorithms can be constructed from other cryptographic primitives, like cryptographic hash functions (as in the case of HMAC) or from block cipher algorithms (OMAC, CBC-MAC and PMAC). However many of the fastest MAC algorithms like UMAC and VMAC are constructed based on universal hashing. Additionally, the MAC algorithm can deliberately combine two or more cryptographic primitives, so as to maintain protection even if one of them is later found to be vulnerable. For instance, in Transport Layer Security (TLS), the input data is split in halves that are each processed with a different hashing primitive (MD5 and SHA-1) then XORed together to output the MAC.

The FEDERAL INFORMATION PROCESSING STANDARDS PUBLICATION—FIPS PUB 198-1 Standard entitled: "*The Keyed-Hash Message Authentication Code (HMAC)*" published 2008 by U.S. Department of Commerce, National Institute of Standards and Technology (NIST), which is incorporated in its entirety for all purposes as if fully set forth herein, describes a keyed-Hash Message Authentication Code (HMAC), a mechanism for message authentication using cryptographic hash functions. HMAC can be used with any iterative Approved cryptographic hash function, in combination with a shared secret key. A Keyed-hash message authentication code (HMAC) refers to a message authentication code that uses a cryptographic key in conjunction with a hash function. A Cryptographic key (key) is typically a parameter used in conjunction with a cryptographic algorithm that determines the specific operation of that algorithm. In this Standard, the cryptographic key is used by the HMAC algorithm to produce a MAC on the data, and Hash function refers to a mathematical function that maps a string of arbitrary length (up to a pre-determined maximum size) to a fixed length string.

Message Authentication Code (MAC) algorithms are data integrity mechanisms that compute a short string (the Message Authentication Code or MAC) as a complex function of every bit of the data and of a secret key. Their main security property is unforgeability: someone who does not know the secret key should not be able to predict the MAC on any new data string. MAC algorithms can be used to provide data integrity. Their purpose is the detection of any unauthorized modification of the data such as deletion, insertion, or transportation of items within data. This includes both malicious and accidental modifications. MAC algorithms can also provide data origin authentication. This means that they can provide assurance that a message has been originated by an entity in possession of a specific secret key. ISO/IEC 9797-1:2011 entitled: "*Information technology—Security techniques—Message Authentication Codes (MACs)—Part 1: Mechanisms using a block cipher*" specifies six MAC algorithms that use a secret key and an n-bit block cipher to calculate an m-bit MAC, and may be applied to the security services of any security architecture, process, or application. ISO/IEC 9797-2:2011 entitled: "*Information technology—Security techniques—Message Authentication Codes (MACs)—Part 2: Mechanisms using a dedicated hash-function*" specifies three MAC algorithms that are based on a dedicated hash-function and three MAC algorithms that use a secret key and a hash-function (or its round-function) with an n-bit result to calculate an m-bit MAC. The strength of the data integrity mechanism and message authentication mechanism is dependent on the length (in bits) k and secrecy of the key, on the length (in bits) n of the hash-function and its strength, on the length (in bits) m of the MAC, and on the specific mechanism. The first mechanism specified in ISO/IEC 9797-2:2011 is commonly known as MDx-MAC. It calls the complete hash-function once, but it makes a small modification to the round-function by adding a key to the additive constants in the round-function. The second mechanism specified in ISO/IEC 9797-2:2011 is commonly known as HMAC. It calls the complete hash-function twice. The third mechanism specified in ISO/IEC 9797-2:2011 is a variant of MDx-MAC that takes as input only short strings (at most 256 bits). It offers a higher performance for applications that work with short input strings only.

IEEE 802.1X. Port-based Network Access Control (PNAC) allows a network administrator to restrict the use of IEEE 802 LAN service access points (ports) to secure communication between authenticated and authorized devices. An architecture, functional elements, and protocols that support mutual authentication between the clients of ports attached to the same LAN and secure communication between the ports are described in IEEE Std 802.1X™-2010 Published 5 Feb. 2010 [ISBN 978-0-7381-6145-7 STD96008] by IEEE Standard for Local and metropolitan area networks and entitled: "*Port-Based Network Access Control*", which is incorporated in its entirety for all purposes as if fully set forth herein.

IEEE 802.1X defines the encapsulation of the Extensible Authentication Protocol (EAP) over IEEE 802, which is known as "EAP over LAN"—EAPOL. The EAPOL protocol was also modified for use with IEEE 802.1AE ("MACsec") and IEEE 802.1AR (Secure Device Identity, DevID) in IEEE 802.1X-2010 to support service identification and optional point to point encryption over the local LAN segment. IEEE 802.1X authentication involves three parties: a supplicant, an authenticator, and an authentication server. The supplicant is a client device (such as a laptop) that wishes to attach to the LAN/WLAN. The term 'supplicant' is also used interchangeably to refer to the software running on the client that provides credentials to the authenticator. The authenticator is a network device, such as an Ethernet switch or wireless access point; and the authentication server is typically a host running software supporting the RADIUS and EAP protocols. In some cases, the authentication server software may be running on the authenticator hardware.

The authenticator acts like a security guard to a protected network. The supplicant (i.e., client device) is not allowed access through the authenticator to the protected side of the network until the supplicant's identity has been validated and authorized. With IEEE 802.1X port-based authentication, the supplicant provides credentials, such as user name/password or digital certificate, to the authenticator, and the authenticator forwards the credentials to the authentication server for verification. If the authentication server determines the credentials are valid, the supplicant (client device) is allowed to access resources located on the protected side of the network. EAPOL operates at the network layer on top of the data link layer, and in Ethernet II framing protocol has an EtherType value of 0x888E.

IEEE 802.1X-2001 defines two logical port entities for an authenticated port—the "controlled port" and the "uncontrolled port". The controlled port is manipulated by the 802.1X PAE (Port Access Entity) to allow (in the authorized state) or prevent (in the unauthorized state) network traffic ingressing and egressing to/from the controlled port. The uncontrolled port is used by the 802.1X PAE to transmit and receive EAPOL frames.

A typical authentication procedure consists of: (1) Initialization—On detection of a new supplicant, the port on the switch (authenticator) is enabled and set to the "unauthorized" state. In this state, only 802.1X traffic is allowed; other traffic, such as the Internet Protocol (and with that TCP and UDP), is dropped; (2) Initiation—To initiate authentication the authenticator will periodically transmit EAP-Request Identity frames to a special Layer 2 address (01:80:C2:00:00:03) on the local network segment. The supplicant listens on this address, and on receipt of the EAP-Request Identity frame it responds with an EAP-Response Identity frame containing an identifier for the supplicant such as a User ID. The authenticator then encapsulates this Identity response in a RADIUS Access-Request packet and forwards it on to the authentication server. The supplicant may also initiate or restart authentication by sending an EAPOL-Start frame to the authenticator, which will then reply with an EAP-Request Identity frame; (3) Negotiation—(Technically EAP negotiation) The authentication server sends a reply (encapsulated in a RADIUS Access-Challenge packet) to the authenticator, containing an EAP Request specifying the EAP Method (The type of EAP based authentication it wishes the supplicant to perform). The authenticator encapsulates the EAP Request in an EAPOL frame and transmits it to the supplicant. At this point the supplicant can start using the requested EAP Method, or do an NAK ("Negative Acknowledgement") and respond with the EAP Methods it is willing to perform; and (4) Authentication—If the authentication server and supplicant agree on an EAP Method, EAP Requests and Responses are sent between the supplicant and the authentication server (translated by the authenticator) until the authentication server responds with either an EAP-Success message (encapsulated in a RADIUS Access-Accept packet), or an EAP-Failure message (encapsulated in a RADIUS Access-Reject packet). If authentication is successful, the authenticator sets the port to the "authorized" state and normal traffic is allowed, if it is unsuccessful the port remains in the "unauthorized" state. When the supplicant logs off, it sends an EAPOL-logoff message to the authenticator, the authenticator then sets the port to the "unauthorized" state, once again blocking all non-EAP traffic.

IEEE 802.1AE. MAC Security standard (also known as MACsec) defines connectionless data confidentiality and integrity for media access independent protocols, and is described in IEEE Std 802.1AE™-2006 Published 18 Aug. 2006 [ISBN 0-7381-4991-8 SS95549] by IEEE Standard for Local and metropolitan area networks and entitled: "*Media Access Control (MAC) Security*", which is incorporated in its entirety for all purposes as if fully set forth herein. MAC Security (MACsec), as defined by this standard, allows authorized systems that attach to and interconnect LANs in a network to maintain confidentiality of transmitted data and to take measures against frames transmitted or modified by unauthorized devices.

The IEEE 802.1AE standard specifies the implementation of a MAC Security Entities (SecY) that can be thought of as part of the stations attached to the same LAN, providing secure MAC service to the client. The standard defines MACsec frame format, which is similar to the Ethernet frame, but includes additional fields: Security Tag, which is an extension of the EtherType, Message authentication code (ICV), and Secure Connectivity Associations that represent groups of stations connected via unidirectional Secure Channels. Security Associations within each secure channel— Each association uses its own key (SAK), and more than one association is permitted within the channel for the purpose of key change without traffic interruption (standard requires devices to support at least two). A default cipher suite of GCM-AES-128 (Galois/Counter Mode of Advanced Encryption Standard cipher with 128-bit key), and GCM-AES-256 using a 256 bit key is also defined the standard.

Security tag inside each frame in addition to EtherType includes: association number within the channel, packet number to provide unique initialization vector for encryption and authentication algorithms as well as protection against replay attack, and optional LAN-wide secure channel identifier (not required on point-to-point links).

The IEEE 802.1AE (MACsec) standard specifies a set of protocols to meet the security requirements for protecting data traversing Ethernet LANs. MACsec allows unauthorized LAN connections to be identified and excluded from communication within the network. In common with IPsec and SSL, MACsec defines a security infrastructure to provide data confidentiality, data integrity and data origin authentication. By assuring that a frame comes from the station that claimed to send it, MACSec can mitigate attacks on Layer 2 protocols.

IPsec. Internet Protocol Security (IPsec) is a network protocol suite that authenticates and encrypts the packets of data sent over a network. IPsec includes protocols for establishing mutual authentication between agents at the beginning of the session and negotiation of cryptographic keys to use during the session. IPsec can protect data flows between a pair of hosts (host-to-host), between a pair of security gateways (network-to-network), or between a security gateway and a host (network-to-host). Internet Protocol security (IPsec) uses cryptographic security services to protect communications over Internet Protocol (IP) networks, and supports network-level peer authentication, data-origin authentication, data integrity, data confidentiality (encryption), and replay protection. IPsec is described in IETF RFC 4301 entitled: "*Security Architecture for the Internet Protocol*" and in IETF RFC 4309 entitled: "*Using Advanced Encryption Standard (AES) CCM Mode with IPsec Encapsulating Security Payload (ESP)*", both published on December 2005 and which are both incorporated in their entirety for all purposes as if fully set forth herein.

IPsec is an end-to-end security scheme operating in the Internet Layer of the Internet Protocol Suite, while some other Internet security systems in widespread use, such as Transport Layer Security (TLS) and Secure Shell (SSH), operate in the upper layers at the Transport Layer (TLS) and the Application layer (SSH), and can automatically secure applications at the IP layer. The IPsec suite is an open standard. IPsec uses the following protocols to perform various functions: Authentication Headers (AH) provides connectionless data integrity and data origin authentication for IP datagrams and provides protection against replay attacks; Encapsulating Security Payloads (ESP) provides confidentiality, data-origin authentication, connectionless integrity, an anti-replay service (a form of partial sequence integrity), and limited traffic-flow confidentiality; Security Associations (SA) provides the bundle of algorithms and data that provide the parameters necessary for AH and/or ESP operations. The Internet Security Association and Key Management Protocol (ISAKMP) provides a framework for authentication and key exchange, with actual authenticated keying material provided either by manual configuration with pre-shared keys, Internet Key Exchange (IKE and IKEv2), Kerberized Internet Negotiation of Keys (KINK), or IPSECKEY DNS records.

Metadata. The term "metadata", as used herein, refers to data that describes characteristics, attributes, or parameters of other data, in particular, files (such as program files) and objects. Such data is typically structured information that describes, explains, locates, and otherwise makes it easier to retrieve and use an information resource. Metadata typically includes structural metadata, relating to the design and specification of data structures or "data about the containers of data"; and descriptive metadata about individual instances of application data or the data content. Metadata may include the means of creation of the data, the purpose of the data, time and date of creation, the creator or author of the data, the location on a computer network where the data were created, and the standards used.

For example, metadata associated with a computer word processing file might include the title of the document, the name of the author, the company to whom the document belongs, the dates that the document was created and last modified, keywords which describe the document, and other descriptive data. While some of this information may also be included in the document itself (e.g., title, author, and data), metadata may be a separate collection of data that may be stored separately from, but associated with, the actual document. One common format for documenting metadata is eXtensible Markup Language (XML). XML provides a formal syntax, which supports the creation of arbitrary descriptions, sometimes called "tags." An example of a metadata entry might be <title>War and Peace</title>, where the bracketed words delineate the beginning and end of the group of characters that constitute the title of the document that is described by the metadata. In the example of the word processing file, the metadata (sometimes referred to as "document properties") is entered manually by the author, the editor, or the document manager.

The metadata concept is further described in a National Information Standards Organization (NISO) Booklet entitled: "*Understanding Metadata*" (ISBN: 1-880124-62-9), in the IETF RFC 5013 entitled: "*The Dublin Core Metadata Element Set*", and in the IETF RFC 2731 entitled: "*Encoding Dublin Core Metadata in HTML*", which are all incorporated in their entirety for all purposes as if fully set forth herein. An extraction of metadata from files or objects is described in a U.S. Pat. No. 8,700,626 to Bedingfield, entitled: "Systems, Methods and Computer Products for Content-Derived Metadata", and in a U.S. Patent Application Publication 2012/0278705 to Yang et al., entitled: "System and Method for Automatically Extracting Metadata from Unstructured Electronic Documents", which are both incorporated in their entirety for all purposes as if fully set forth herein.

Metadata can be stored either internally in the same file, object, or structure as the data (this is also called internal or embedded metadata), or externally in a separate file or field separated from the described data. A data repository typically stores the metadata detached from the data, but can be designed to support embedded metadata approaches. Metadata can be stored in either human-readable or binary form. Storing metadata in a human-readable format such as XML can be useful because users can understand and edit it without specialized tools, however, these formats are rarely optimized for storage capacity, communication time, and processing speed. A binary metadata format enables efficiency in all these respects but requires special libraries to convert the binary information into a human-readable content.

Error detection. Error detection refers to the detection of errors caused by noise or other impairments during transmission from the transmitter to the receiver. Error detection typically enables reliable delivery of digital data over unreliable communication channels. Many communication channels are subject to channel noise, and thus errors may be introduced during transmission from the source to a receiver. Error-detection schemes typically involve adding some redundancy (i.e., some extra data) to a message, which receivers can use to check consistency of the delivered message, and to recover data that has been determined to be corrupted. Error-detection and correction schemes can be either systematic or non-systematic. In a systematic scheme, the transmitter sends the original data, and attaches a fixed number of check bits (or parity data), which are derived from the data bits by some deterministic algorithm. If only error detection is required, a receiver can simply apply the same algorithm to the received data bits and compare its output with the received check bits; if the values do not match, an error has occurred at some point during the transmission. In a system that uses a non-systematic code, the original message is transformed into an encoded message carrying the same information and that has at least as many bits as the original message.

Error detection is commonly realized using a suitable hash function (or checksum algorithm). A hash function adds a fixed-length tag to a message, which enables receivers to verify the delivered message by recomputing the tag and comparing it with the one provided. There exists a vast variety of different hash function designs. However, some are of particularly widespread use because of either their simplicity or their suitability for detecting certain kinds of errors (e.g., the cyclic redundancy check's performance in detecting burst errors).

Parity. A parity bit is a bit that is added to a group of source bits to ensure that the number of set bits (i.e., bits with value 1) in the outcome is even or odd. It is a very simple scheme that can be used to detect single or any other odd number (i.e., three, five, etc.) of errors in the output. An even number of flipped bits will make the parity bit appear correct even though the data is erroneous. Extensions and variations on the parity bit mechanism are horizontal redundancy checks, vertical redundancy checks, and "double," "dual," or "diagonal" parity (used in RAID-DP).

Checksum. A checksum of a message is a modular arithmetic sum of message code words of a fixed word length (e.g., byte values). The sum may be negated by means of a ones'-complement operation prior to transmission to detect errors resulting in all-zero messages. Checksum schemes include parity bits, check digits, and longitudinal redundancy checks. Some checksum schemes, such as the Damm algorithm, the Luhn algorithm, and the Verhoeff algorithm, are specifically designed to detect errors commonly introduced by humans in writing down or remembering identification numbers.

CRC. A Cyclic Redundancy Check (CRC) is an error-detecting code commonly used in digital networks and storage devices to detect accidental changes to raw data. Blocks of data entering these systems get a short check value attached, based on the remainder of a polynomial division of their contents. On retrieval, the calculation is repeated and, in the event the check values do not match, corrective action can be taken against data corruption. CRCs can be used for error correction. The check (data verification) value is a redundancy (it expands the message without adding information) and the algorithm is based on cyclic codes, and because the check value has a fixed length, the function that generates it is occasionally used as a hash function. CRCs are commonly based on the theory of cyclic error-correcting codes. Specification of a CRC code requires definition of a generator polynomial, where this polynomial becomes the divisor in a polynomial long division, which takes the message as the dividend and in which the quotient is discarded and the remainder becomes the result. The important caveat is that the polynomial coefficients are calculated according to the arithmetic of a finite field, so the addition operation can always be performed bitwise-parallel (there is no carry between digits). The length of the remainder is always less than the length of the generator polynomial, which therefore determines how long the result can be.

In practice, all commonly used CRCs employ the Galois field of two elements, GF(2). The two elements are usually called 0 and 1, comfortably matching computer architecture. A CRC is called an n-bit CRC when its check value is n bits long. For a given n, multiple CRCs are possible, each with a different polynomial. Such a polynomial has highest degree n, which means it has n+1 terms. In other words, the polynomial has a length of n+1; its encoding requires n+1 bits. Note that most polynomial specifications either drop the MSB or LSB, since they are always 1. The simplest error-detection system, the parity bit, is in fact a trivial 1-bit CRC: it uses the generator polynomial x+1 (two terms), and has the name CRC-1. A CRC-enabled device calculates a short, fixed-length binary sequence, known as the check value or CRC, for each block of data to be sent or stored and appends it to the data, forming a codeword. When a codeword is received or read, the device either compares its check value with one freshly calculated from the data block, or equivalently, performs a CRC on the whole codeword and compares the resulting check value with an expected residue constant. If the CRC values do not match, then the block contains a data error. The device may take corrective action, such as rereading the block or requesting that it be sent again. Otherwise, the data is assumed to be error-free (though, with some small probability, it may contain undetected errors; this is the fundamental nature of error-checking).

In one example, the corruption is achieved by transmitting a signal that changes the value of a single bit in the message. This single bit change renders a CRC error, which may be used by the receiving devices as an indicator of an invalidated or corrupted message that needs to be ignored. Alternatively or in addition, multiple bits, which may be carried sequentially or non-sequentially in the message (frame or packet), are changed by the transmitted corrupting signal. Alternatively or in addition, the corrupting signal may change a value in one or more fields in the frame (or packet), rendering this field non-legitimate according to the agreed upon or used communication protocol. In one example, such as in a CAN protocol, the corrupting signal may generate a sequence of six or more consecutive identical bits when received by the devices over the bus, known to be a standard CAN error frame. Further, one or more defined flags in the message, such as error flag may be set by the corrupting signal. When the message uses recessive ('1') and dominant ('0') (non-recessive) bits, the corrupting signal may convert a recessive bit (or multiple bits) to a dominant one, or may convert a dominant bit (or multiple bits) to a recessive one.

Error correction. Error correction refers to the detection of errors and reconstruction of the original, error-free data, and in many cases enables reconstruction of the original data. Error Correcting Code (ECC) is used for controlling errors in data over unreliable or noisy communication channels. The principle is based on that the sender encodes the message with a redundant in the form of an ECC. The redundancy allows the receiver to detect a limited number of errors that may occur anywhere in the message, and often to correct these errors without retransmission. ECC gives the receiver the ability to correct errors without needing a reverse channel to request retransmission of data, but at the cost of a fixed, higher forward channel bandwidth.

The two main categories of ECC codes are block codes and convolutional codes. Block codes work on fixed-size blocks (packets) of bits or symbols of predetermined size. Practical block codes can generally be hard-decoded in polynomial time to their block length. Convolutional codes work on bit or symbol streams of arbitrary length. They are most often soft decoded with the Viterbi algorithm, though other algorithms are sometimes used. Viterbi decoding allows asymptotically optimal decoding efficiency with increasing constraint length of the convolutional code, but at the expense of exponentially increasing complexity. A convolutional code that is terminated is also a 'block code' in that it encodes a block of input data, but the block size of a convolutional code is generally arbitrary, while block codes have a fixed size dictated by their algebraic characteristics. Types of termination for convolutional codes include "tail-biting" and "bit-flushing".

Error correction may generally be realized in two different ways: Automatic Repeat Request (ARQ) (sometimes also referred to as backward error correction)—This is an error control technique whereby an error detection scheme is combined with requests for retransmission of erroneous data. Every block of data received is checked using the error detection code used, and if the check fails, retransmission of the data is requested—this may be done repeatedly, until the data can be verified. In Forward error correction (FEC): The sender encodes the data using an Error-Correcting Code (ECC) prior to transmission. The additional information (redundancy) added by the code is used by the receiver to recover the original data. In general, the reconstructed data is what is deemed the "most likely" original data. ARQ and FEC may be combined, such that minor errors are corrected without retransmission, and major errors are corrected via a request for retransmission: this is called hybrid automatic repeat-request (HARQ). A random-error-correcting code based on minimum distance coding can provide a strict guarantee on the number of detectable errors, but it may not protect against a preimage attack. A repetition code, described in the section below, is a special case of error-correcting code: although rather inefficient, a repetition code is suitable in some applications of error correction and detection due to its simplicity.

An apparatus for protecting a vehicle electronic system is disclosed in U.S. Patent Application Publication No. 2015/0020152 to Litichever et al. entitled: "Security system and method for protecting a vehicle electronic system", which is incorporated in its entirety for all purposes as if fully set forth herein. The protecting is by selectively intervening in the communications path in order to prevent the arrival of malicious messages at ECUs, in particular at the safety critical ECUs. The security system includes a filter, which prevents illegal messages sent by any system or device communicating over a vehicle communications bus from reaching their destination. The filter may, at its discretion according to preconfigured rules, send messages as is, block messages, change the content of the messages, request authentication or limit the rate such messages can be delivered, by buffering the messages and sending them only in preconfigured intervals.

A system for providing security to an in-vehicle communication network is disclosed in U.S. Patent Application Publication No. 2015/0195297 to BEN NOON et al. entitled: "Global automotive safety system", which is incorporated in its entirety for all purposes as if fully set forth herein. The system comprising: a data monitoring and processing hub; and at least one module configured to monitor messages in communication traffic propagating in a vehicle's in-vehicle network, the network having a bus and at least one node connected to the bus, the module comprising: a communication interface configured to support communication with the hub; a memory having software comprising data characterizing messages that the at least one node transmits and receives during normal operation of the node; at least one communication port via which the module receives and transmits messages configured to be connected to a portion of the in-vehicle network; a processor that processes messages received via the port from the portion of the in-vehicle network responsive to the software in the memory to: identify an anomalous message in the received messages indicative of exposure of the in-vehicle network to damage from a cyber-attack; determine an action to be taken by the module that affects the anomalous message; and transmit data responsive to the anomalous message to the hub for processing by the hub via the communication interface.

A system and method for providing security to a network may include maintaining, by a processor, a model of an expected behavior of data communications over the in-vehicle communication network are disclosed in U.S. Patent Application Publication No. 2016/0381059 to GALULA et al. entitled: "SYSTEM AND METHOD FOR TIME BASED ANOMALY DETECTION IN AN IN-VEHICLE COMMUNICATION NETWORK", which is incorporated in its entirety for all purposes as if fully set forth herein. The method comprises receiving, by the processor, a message sent over the network; determining, by the controller, based on the model and based on a timing attribute of the message, whether or not the message complies with the model; and if the message does not comply with the model then performing, by the processor, at least one action related to the message.

A system and method for providing security to a network are disclosed in U.S. Patent Application Publication No. 2016/0381055 to GALULA et al. entitled: "SYSTEM AND METHOD FOR PROVIDING SECURITY TO A COMMUNICATION NETWORK", which is incorporated in its entirety for all purposes as if fully set forth herein. The method may include identifying a message sent over a network, the message related to a data transfer from an initiator to a target node, and transmitting, over the network, at least one disruptive message that causes the data transfer to fail.

A system and method for detection of at least one cyber-attack on one or more vehicles are disclosed in U.S. Patent Application Publication No. 2017/0230385 to Ruvio et al. entitled: "Vehicle correlation system for cyber attacks detection and method thereof", which is incorporated in its entirety for all purposes as if fully set forth herein. The system and method including steps of transmitting and/or receiving by a first on-board agent module installed within one or more vehicles and/or a second on-board agent module installed within road infrastructure and in a range of communication with said first on-board agent module metadata to and/or from an on-site and/or remote cloud-based detection server including a correlation engine; detecting cyber-attacks based on correlation calculation between the metadata received from one or more first agent module installed within vehicles and/or from one or more second agent modules installed within road infrastructure; indicating a probability of a cyber-attack against one or more vehicle based on correlation calculation; initiating blocking of vehicle-to-vehicle communication to present and/or stop a spread of an identified threat.

A device for detection and prevention of an attack on a vehicle via its communication channels is disclosed in U.S. Patent Application Publication No. 2015/0271201 to Ruvio et al. entitled: "Device for detection and prevention of an attack on a vehicle", which is incorporated in its entirety for all purposes as if fully set forth herein. The device having: an input-unit configured to collect real-time and/or offline data from various sources such as sensors, network based services, navigation applications, the vehicles electronic control units, the vehicle's bus-networks, the vehicle's sub-systems, and on board diagnostics; a database, for storing the data; a detection-unit in communication with the input-unit; and an action-unit, in communication with the detection unit, configured for sending an alert via the communication channels and/or prevent the attack, by breaking or changing the attacked communication channels. The detection-unit is configured to simultaneously monitor the content, the meta-data and the physical-data of the data and detect the attack.

A connection detection apparatus is disclosed in U.S. Patent Application Publication No. 2014/0380416 to Adachi entitled: "Connection detection apparatus and in-vehicle relay apparatus", which is incorporated in its entirety for all purposes as if fully set forth herein. The apparatus includes a gateway to which communication lines are connected, and which detects whether an unauthorized communication device has been connected to the communication lines. The gateway samples a signal several times from each of the communication lines, and generates waveform information, such as an eye pattern in which the waveforms are superimposed on one another. Furthermore, the gateway has stored normal waveform information therein, such as a mask generated based on the eye pattern at normal times. The gateway compares the generated waveform information with the stored waveform information, and recognizes that the waveform information is abnormal if it does not sufficiently match the normal waveform information. If the waveform information is abnormal, it is determined that an unauthorized communication device has been connected to one or more of the communication lines.

A system and method for detecting an intrusion or a bug in a vehicle data transmission system is disclosed in U.S. Pat. No. 8,955,130 to Kalintsev et al. entitled: "Method for protecting vehicle data transmission system from intrusions", which is incorporated in its entirety for all purposes as if fully set forth herein. A hardware-software complex (HSC) is used to find a bug or intrusion device in a vehicle electronic system. The HSC is connected to CAN-buses in the vehicle and also scans radio waves, which can be used to transmit data to a bug. This complex is a self-teaching CAN-system used to monitor and block harmful commands in the vehicle. Each vehicle (of each model, type and settings) has its own reference bus data (parameters), which is used to detect added modules and malicious data sent over the vehicle's CAN bus.

A method for detecting threats or attacks on an automobile network, is disclosed in U.S. Pat. No. 9,401,923 to Valasek et al. entitled: "Electronic system for detecting and preventing compromise of vehicle electrical and control systems", which is incorporated in its entirety for all purposes as if fully set forth herein. The automobile network is connected to a plurality of electronic components and an attack monitoring unit including a processor, the method including: monitoring, by the processor of the attack monitoring unit, data messages transmitted on the automobile network; determining, by the processor of the attack monitoring unit, whether at least one data message among the data messages transmitted on the mobile network is a threat to one or more of the plurality of electronic components on the automobile network; and when it is determined, by the processor, that the at least one data message is a threat, performing at least one action based on the threat.

Methods and apparatus for physical layer security of a network communications link are disclosed in U.S. Pat. No. 7,752,672 to Karam et al. entitled: "Methods and apparatus for physical layer security of a network communications link", which is incorporated in its entirety for all purposes as if fully set forth herein. A communications port of a network communications device maintains capability information indicating that under normal operating conditions a communications link is capable of operating in a secure mode in which communications signals of the communications link are unintelligible to an intruder having an unauthorized physical connection (e.g. tap) to the communications link. During operation, the port detects occurrence of a link event of a type that can invoke an automatic communications-mode control mechanism to change the operating of the communications link to a non-secure mode in which communications signals of the communications link are intelligible to such an intruder. An example is Ethernet auto-negotiation, which can change from relatively secure 1000BaseT signaling to relatively non-secure 10/100BaseT signaling. Based on the capability information, the port responds to the link event by preventing the automatic communications mode control mechanism from changing the operating of the communications link to the non-secure mode.

Processor. The term "processor" is used herein to include, but not limited to, any integrated circuit or any other electronic device (or collection of electronic devices) capable of performing an operation on at least one instruction, including, without limitation, a microprocessor (µP), a microcontroller (µC), a Digital Signal Processor (DSP), or any combination thereof. A processor may further be a Reduced Instruction Set Core (RISC) processor, a Complex Instruction Set Computing (CISC) microprocessor, a Microcontroller Unit (MCU), or a CISC-based Central Processing Unit (CPU). The hardware of the processor may be integrated onto a single substrate (e.g., silicon "die"), or distributed among two or more substrates.

A non-limiting example of a processor may be 80186 or 80188 available from Intel Corporation located at Santa Clara, Calif., USA. The 80186 and its detailed memory connections are described in the manual "80186/80188 High-Integration 16-Bit Microprocessors" by Intel Corporation, which is incorporated in its entirety for all purposes as if fully set forth herein. Other non-limiting example of a processor may be MC68360 available from Motorola Inc. located at Schaumburg, Ill., USA. The MC68360 and its detailed memory connections are described in the manual "MC68360 Quad Integrated Communications Controller—User's Manual" by Motorola, Inc., which is incorporated in its entirety for all purposes as if fully set forth herein. While exampled above regarding an address bus having an 8-bit width, other widths of address buses are commonly used, such as the 16-bit, 32-bit and 64-bit. Similarly, while exampled above regarding a data bus having an 8-bit width, other widths of data buses are commonly used, such as 16-bit, 32-bit and 64-bit width. In one example, the processor consists of, comprises, or is part of, Tiva™ TM4C123GH6PM Microcontroller available from Texas Instruments Incorporated (Headquartered in Dallas, Tex., U.S.A.), described in a data sheet published 2015 by Texas Instruments Incorporated [DS-TM4C123GH6PM-15842.2741, SPMS376E, Revision 15842.2741 June 2014], entitled: "Tiva™ TM4C123GH6PM Microcontroller—Data Sheet", which is incorporated in its entirety for all purposes as if fully set forth herein, and is part of Texas Instrument's Tiva™ C Series microcontrollers family that provide designers a high-performance ARM® Cortex™-M-based architecture with a broad set of integration capabilities and a strong ecosystem of software and development tools. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions by integrating application-specific peripherals and providing a comprehensive library of software tools which minimize board costs and design-cycle time. Offering quicker time-to-market and cost savings, the Tiva™ C Series microcontrollers are the leading choice in high-performance 32-bit applications. Targeting performance and flexibility, the Tiva™ C Series architecture offers an 80 MHz Cortex-M with FPU, a variety of integrated memories and multiple programmable GPIO. Tiva™ C Series devices offer consumers compelling cost-effective solutions.

Compression. Data compression, also known as source coding and bit-rate reduction, involves encoding information using fewer bits than the original representation. Compression can be either lossy or lossless. Lossless compression reduces bits by identifying and eliminating statistical redundancy, so that no information is lost in lossless compression. Lossy compression reduces bits by identifying unnecessary information and removing it. The process of reducing the size of a data file is commonly referred to as a data compression. A compression is used to reduce resource usage, such as data storage space or transmission capacity. Data compression is further described in a Carnegie Mellon University chapter entitled: "Introduction to Data Compression" by Guy E. Blelloch, dated Jan. 31, 2013, and in a Third Edition of a book entitled: "Introduction to Data Compression" authored by Khalid Sayood of the University of Nebraska [ISBN 13: 978-0-12-620862-7], published 2006 by Elsevier Inc., which are both incorporated in their entirety for all purposes as if fully set forth herein.

In a scheme involving lossy data compression, some loss of information is acceptable. For example, dropping of a nonessential detail from a data can save storage space. Lossy data compression schemes may be informed by research on how people perceive the data involved. For example, the human eye is more sensitive to subtle variations in luminance than it is to variations in color. JPEG image compression works in part by rounding off nonessential bits of information. There is a corresponding trade-off between preserving information and reducing size. A number of popular compression formats exploit these perceptual differences, including those used in music files, images, and video.

Lossy image compression is commonly used in digital cameras, to increase storage capacities with minimal degradation of picture quality. Similarly, DVDs use the lossy MPEG-2 Video codec for video compression. In lossy audio compression, methods of psychoacoustics are used to remove non-audible (or less audible) components of the audio signal. Compression of human speech is often performed with even more specialized techniques; speech coding, or voice coding, is sometimes distinguished as a separate discipline from audio compression. Different audio and speech compression standards are listed under audio codecs. Voice compression is used in Internet telephony, for example, and audio compression is used for CD ripping and is decoded by audio player.

Lossless compression is a class of data compression algorithms that allows the original data to be perfectly reconstructed from the compressed data, and 1 algorithms usually exploit statistical redundancy to represent data more concisely without losing information, so that the process is reversible. By contrast, lossy compression permits reconstruction only of an approximation of the original data, though usually with improved compression rates (and therefore reduced file sizes). Lossless compression is used in cases where it is important that the original and the decompressed data be identical, or where deviations from the original data would be unfavourable. Typical examples are executable programs, text documents, and source code. Some image file formats, like PNG or GIF, use only lossless compression, while others like TIFF and MNG may use either lossless or lossy methods. Lossless audio formats are most often used for archiving or production purposes, while smaller lossy audio files are typically used on portable players and in other cases where storage space is limited or exact replication of the audio is unnecessary.

Most lossless compression programs do two things in sequence: the first step generates a statistical model for the input data, and the second step uses this model to map input data to bit sequences in such a way that "probable" (e.g. frequently encountered) data will produce shorter output than "improbable" data. The primary encoding algorithms used to produce bit sequences are Huffman coding (also used by DEFLATE) and arithmetic coding. Arithmetic coding achieves compression rates close to the best possible for a particular statistical model, which is given by the information entropy, whereas Huffman compression is simpler and faster but produces poor results for models that deal with symbol probabilities close to 1. There are two primary ways of constructing statistical models: in a static model, the data is analyzed and a model is constructed, then this model is stored with the compressed data. This approach is simple and modular, but has the disadvantage that the model itself can be expensive to store, and also that it forces using a single model for all data being compressed, and so performs poorly on files that contain heterogeneous data. Adaptive models dynamically update the model as the data is compressed. Both the encoder and decoder begin with a trivial model, yielding poor compression of initial data, but as they learn more about the data, performance improves. Most popular types of compression used in practice now use adaptive coders.

Lossless compression typically is based on real-world data that has statistical redundancy. The Lempel-Ziv (LZ) compression methods are among the most popular algorithms for lossless storage. DEFLATE is a variation on LZ optimized for decompression speed and compression ratio, and is used in PKZIP, Gzip and PNG. The LZW (Lempel-Ziv-Welch) method is commonly used in GIF images, and is described in IETF RFC 1951. The LZ methods use a table-based compression model where table entries are substituted for repeated strings of data. For most LZ methods, this table is generated dynamically from earlier data in the input. The table itself is often Huffman encoded (e.g., SHRI, LZX). Typical modern lossless compressors use probabilistic models, such as prediction by partial matching.

Lempel-Ziv-Welch (LZW) is an example of lossless data compression algorithm created by Abraham Lempel, Jacob Ziv, and Terry Welch. The algorithm is simple to implement, and has the potential for very high throughput in hardware implementations. It was the algorithm of the widely used Unix file compression utility compress, and is used in the GIF image format. The LZW and similar algorithms are described in U.S. Pat. No. 4,464,650 to Eastman et al. entitled: "Apparatus and Method for Compressing Data Signals and Restoring the Compressed Data Signals", in U.S. Pat. No. 4,814,746 to Miller et al. entitled: "Data Compression Method", and in U.S. Pat. No. 4,558,302 to Welch entitled: "High Speed Data Compression and Decompression Apparatus and Method", which are all incorporated in their entirety for all purposes as if fully set forth herein.

A class of lossless data compression algorithms is based on using dictionaries, and operates by searching for matches between the text to be compressed and a set of strings contained in a data structure (called the 'dictionary') maintained by the encoder. When the encoder finds such a match, it substitutes a reference to the string's position in the data structure.

Some dictionary coders use a 'static dictionary', one whose full set of strings is determined before coding begins and does not change during the coding process. This approach is most often used when the message or set of messages to be encoded is fixed and large. A dictionary is often built from redundancy extracted from a data environment (various input streams) which dictionary is then used statically to compress a further input stream. For example, a dictionary may be built from old English texts then is used to compress a book. More common are methods where the dictionary starts in some predetermined state, but the contents change during the encoding process, based on the data that has already been encoded.

Both the LZ77 and LZ78 algorithms work on this principle, where in LZ77, a circular buffer called the "sliding window" holds the last N bytes of data processed, which serves as the dictionary, effectively storing every substring that has appeared in the past N bytes as dictionary entries. Instead of a single index identifying a dictionary entry, two values are needed: the length, indicating the length of the matched text, and the offset (also called the distance), indicating that the match is found in the sliding window starting offset bytes before the current text. LZ78 uses a more explicit dictionary structure; at the beginning of the encoding process, the dictionary only needs to contain entries for the symbols of the alphabet used in the text to be compressed, but the indexes are numbered in order to leave spaces for many more entries. At each step of the encoding process, the longest entry in the dictionary that matches the text is found, and its index is written to the output; the combination of that entry and the character that followed it in the text is then added to the dictionary as a new entry. An example of a dictionary-based compression is described in an University of Michigan paper entitled: "*Dictionary-Based Compression for Long Time-Series Similarity*" by Willis Lang, Michael Morse, and Jignesh M. Patel, downloaded from http://pages.cs.wisc.edu/ on August 2014, which is incorporated in its entirety for all purposes as if fully set forth herein.

A security system for protecting a vehicle electronic system is disclosed in U.S. Pat. No. 9,965,636 to Litichever et al. entitled: "Security system and method for protecting a vehicle electronic system", which is incorporated in its entirety for all purposes as if fully set forth herein. The security system selectively intervening in the communications path in order to prevent the arrival of malicious messages at ECUs, in particular at the safety critical ECUs. The security system includes a filter which prevents illegal messages sent by any system or device communicating over a vehicle communications bus from reaching their destination. The filter may, at its discretion according to preconfigured rules, send messages as is, block messages, change the content of the messages, request authentication or limit the rate such messages can be delivered, by buffering the messages and sending them only in preconfigured intervals.

A method of real-time data security of a communications bus is disclosed in U.S. Pat. No. 10,140,450 to Litichever et al. entitled: "Vehicle communications bus data security", which is incorporated in its entirety for all purposes as if fully set forth herein. The method comprising the steps of: reading at least an early portion of a message being transmitted over a communications bus, determining whether the message is suspicious, according to at least one rule applied on the read early portion of the message, and upon determining that the message is suspicious, corrupting at least a part of the message.

An analyzer for monitoring a configuration of a wired network medium that is used for communication between multiple devices is described in Patent Cooperation Treaty (PCT) International Patent Application WO 2018104929A1 to Litichever et al. entitled: "System and method for using signal waveform analysis for detecting a change in a wired network", which is incorporated in its entirety for all purposes as if fully set forth herein. The configuration change includes an additional device tapping to the medium for eavesdropping, or the substituting one of the devices. The analyzer is connected to the medium for receiving, storing, and analyzing waveforms of the physical-layer signals propagated over the medium. The analysis includes comparing the received signals to reference signals, and notifying upon detecting a difference according to pre-set criteria. The analysis may be time or frequency-domain based, and may use a feed-forward Artificial Neural Network (ANN). The wired network may be an automotive or in-vehicle network, PAN, LAN, MAN, or WAN, may use balanced or unbalanced signaling, and may be configured as point-to-point or multi-point topology. The analyzer may be connected at an end of the medium, and may be integrated with one of the devices.

An apparatus and a method for processing sensor data for a vehicle using an unified data format eXtensible Markup Language in process of data communication between various vehicle sensors and a vehicle application system are disclosed in U.S. Pat. No. 8,909,412 to Park et al. entitled: "Apparatus and method for processing sensor data for vehicle using extensible markup language", which is incorporated in its entirety for all purposes as if fully set forth herein. The apparatus or the method facilitates transmit and receive data processing in terms of a vehicle network of the sensors and the application system are provided. The apparatus for processing the sensor data for the vehicle using the XML includes a plurality of vehicle sensors installed inside the vehicle for detecting a change of physical quantity and providing a detection signal; a sensor transducer for converting the detection signal of the vehicle sensors to an electrical analog signal; a signal conditioning unit for amplifying the electrical analog signal to a measurable signal; an Analog/Digital Converter (ADC) for converting the amplified analog signal to sensor data of a digital signal; a frame generator for generating and providing the sensor data converted to the digital signal per frame; and a sensor data converter comprising a Dynamic data Exchange Channel (DEC) for batch-processing the sensor data input from the frame generator per frame, in an XML format. The DEC of the sensor data converter defines a structure of the sensor data using a schema of the XML and converts the sensor data format to the XML format at the same time.

Atlas implemented based on the LEON3 softcore processor, including toolchain extensions for developers, is disclosed in a paper entitled: "*Atlas: Application Confidentiality in Compromised Embedded Systems*" by Pieter Maene, Johannes Gotzfried, Tilo Muller, Ruan de Clercq, Felix Freiling and Ingrid Verbauwhede published July 2018 in IEEE Transactions on Dependable and Secure Computing PP(99):1-1 [DOI: 10.1109/TDSC.2018.2858257], which is incorporated in its entirety for all purposes as if fully set forth herein. Due to the requirements of the Internet-of-Things, modern embedded systems have become increasingly complex, running different applications. In order to protect their intellectual property as well as the confidentiality of sensitive data they process, these applications have to be isolated from each other. Traditional memory protection and memory management units provide such isolation, but rely on operating system support for their configuration. However, modern operating systems tend to be vulnerable and cannot guarantee confidentiality when compromised. The paper present Atlas, a hardware-based security architecture, complementary to traditional memory protection mechanisms, ensuring code and data confidentiality through transparent encryption, even when the system software has been exploited. Atlas relies on its zero-software trusted computing base to protect against system-level attackers and also supports secure shared memory. The described FPGA-based evaluation shows minimal cycle overhead at the cost of a reduced maximum frequency.

A method for selectively pre-processing and recording sensor data for engineering testing purposes in vehicles. In order to condense data, methodologies from the domain of sensor networks and stream processing are applied, which results in a reduction of the quantity of data, while maintaining information quality, is described in a paper entitled: "Flexible In-Vehicle Stream Processing with Distributed Automotive Control Units for Engineering and Diagnosis" by Hendrik Schweppe, Armin Zimmermann, and Daniel Grill, published June 2008 in a conference: IEEE Third International Symposium on Industrial Embedded Systems—SIES 2008, Montpellier/La Grande Motte, France, 11-13 Jun. 2008 [DOI: 10.1109/SIES.2008.4577683], which is incorporated in its entirety for all purposes as if fully set forth herein. A situation-dependent modification of recording parameters allows for a detailed profiling of vehicle-related errors. We developed a data-flow oriented model, in which data streams are connected by processing nodes. These nodes filter and aggregate the data and can be connected in nearly any order, which permits a successive composition of the aggregation and recording strategy. The integration with an event-condition-action model provides adaptability of the processing and recording, depending on the state of the vehicle. In a proof-of-concept system, which we implemented on top of the automotive diagnostic protocols KWP and UDS, the feasibility of the approach was shown. The target platform was an embedded on-board computer that is connected to the OBD-II interface of the vehicle. As the scope of recording can be adjusted flexibly, the recording system can not only be used for diagnostic purposes, but also serves objectives in development, quality assurance, and even marketing.

Method for generating an output of a random source of a random generator is disclosed in U.S. Patent Application Publication No. 2015/0193205 to Boehl entitled: "A method for generating an output of a random source", which is incorporated in its entirety for all purposes as if fully set forth herein. In the method the random source is sampled using at least two sampling units in such a way that an output signal is generated in each case, and the output signals of each sampling unit are each processed by a processing unit.

A transmission of binary data over a network (16, 17) between a transmission host (A) and a receiving host (B) is described in Patent Cooperation Treaty (PCT) International Patent Application WO 2001065439 A1 to Roy et al. entitled: "A technique for data compression by decoding binary encoded data", which is incorporated in its entirety for all purposes as if fully set forth herein. The transmission host (A) receives packets of data including data in a first format (34) which may be ASCII formatted and contain 6 bits-per-byte words, and including data which had an original binary format (35) containing greater than 6 bits-per-byte words (such as 8 bits-per-byte) and which has been encoded (37) (such as Unencoded) to 6 bits-per-byte words. The transmission host (A) searches the packets and identifies the encoded data (37) and reverse codes (38) the encoded data to its original binary format (35), before transmitting the data on a suitable network transmission media (16, 17) that can transmit both ASCII formatted data (34) and data (35) having greater than 6 bit-per-byte formats. The transmission host (A) also includes an application packet demultiplexer (21) for separating the incoming data according its application such as HTTP, NNTP, FTP, etc. The transmitting host (A) includes an identifier in the packets for identifying the reverse coded data. The receiving host responds to the identifier and may encode the previously reverse coded data (B).

An apparatus and method for determining whether a text is deceptive is described in Patent Cooperation Treaty (PCT) International Patent Application WO 2011139687A1 to Chandramouli et al. entitled: "Systems and methods for automatically detecting deception in human communications expressed in digital form", which is incorporated in its entirety for all purposes as if fully set forth herein. The apparatus and method have a computer programmed with software that automatically analyzes a text message in digital form for deceptiveness by at least one of statistical analysis of text content to ascertain and evaluate psycholinguistic cues that are present in the text message, IP geo-location of the source of the message, gender analysis of the author of the message, authorship similarity analysis, and analysis to detect coded/camouflaged messages.

The computer has access to truth data against which the veracity of the text message can be compared and a graphical user interface through which a user of the system can control the system and receive results concerning the deceptiveness of the text message analyzed by the system. The computer may be connectable to the Internet and may obtain the text to be analyzed either under the control of the user or automatically.

The eXtended Ciphertext Block Chaining (XCBC) and the eXtended Electronic Codebook (XECB) encryption schemes or modes of encryption that can detect encrypted-message forgeries with high probability even when used with typical noncryptographic Manipulation Detection Code (MDC) functions (e.g., bitwise exclusive-or and cyclic redundancy code (CRC) functions) is presented in a paper by Virgil D. Gligor and Pompiliu Donescu entitled: "*Fast Encryption and Authentication: XCBC Encryption and XECB Authentication Modes*" published 2002 by Springer-Verlag Berlin Heidelberg, which is incorporated in its entirety for all purposes as if fully set forth herein. These modes detect encrypted-message forgeries at low cost in performance, power, and implementation, and preserve both message secrecy and integrity in a single pass over the message data. Their performance and security scale directly with those of the underlying block cipher function. The paper also presents the XECB message authentication (XECB-MAC) modes that have all the operational properties of the XOR-MAC modes (e.g., fully parallel and pipelined operation, incremental updates, and out-of-order verification), and have better performance. They are intended for use either stand-alone or with encryption modes that have similar properties (e.g., counter-based XOR encryption). However, the XECB-MAC modes have higher upper bounds on the probability of adversary's success in producing a forgery than the XOR-MAC modes.

A method for run time zero byte compression of data on a communication bus of a vehicle includes determining a number of zero bytes provided in a data frame, is disclosed in U.S. Pat. No. 9,219,499 to Nasser entitled: "Run time compression method for a vehicle communication bus", which is incorporated in its entirety for all purposes as if fully set forth herein. When there are enough zero bytes, an encoding byte is generated that maps the locations of the zero bytes in the data frame. A data length code related to the number of non-zero data bytes and the encoding byte is provided in a device header. The data length code has a value less than an uncompressed data frame. The compressed data frame is transmitted with the encoding byte and the uncompressed non-zero data bytes. To decompress the compressed data frame, the encoding byte maps the locations of the zero bytes for a data frame. The non-zero data bytes are then provided at the proper locations to recreate the data frame.

Systems and methods for compressing data in a network system communicated across a network are disclosed in U.S. Pat. No. 9,172,771 to Gross et al. entitled: "System and methods for compressing data based on data link characteristics", which is incorporated in its entirety for all purposes as if fully set forth herein. The network system may determine a data link characteristic for a data link between a source and a destination. A compression algorithm may be selected from among a plurality of compression algorithms based on the data link characteristic. A chunk of data may be compressed, using the selected compression algorithm, to be communicated over the data link. A compression ratio of the compressed chunk and the chunk uncompressed may be compared to a compression threshold. The compressed chunk may be provided, using the control circuitry, if the compression ratio is greater or equal to the compression threshold. The chunk uncompressed may be provided if the first compression ratio is less than to the first compression threshold.

A data compression and decompression method and a data processing apparatus are disclosed in European Patent Application No. EP 2131501A1 to Richert entitled: "Data compression and decompression method and data processing apparatus", which is incorporated in its entirety for all purposes as if fully set forth herein. In a data compression method, data is retrieved from a data block (160). A packet type is selected from a plurality of packet types based on whether the data includes a predetermined number of repetitions of a data sequence (169). A data packet (171-173, 191) is generated from the data, the data packet (171-173, 191) including control information (174, 175a, 175c, 176, 177a, 177c, 178) set based on the packet type and size information (174, 175b, 177b) set based on a storage space containing the control information (174, 175a, 175c, 176, 177a, 177c, 178).

In consideration of the foregoing, it would be an advancement to provide a method or a system for Layer-2 based compression that is based on fixed length block or frame, is lossless, is stateless, or any combination thereof. Such compression may be simple, secure, cost-effective, reliable, easy to use, use minimally added overhead, minimally increases CPU workload or processing time, has a minimum part count, minimum hardware, and/or uses existing and available components, protocols, programs and applications for providing better security and additional functionalities, and provides a better user experience.

SUMMARY

A method herein may provide a lossless and stateless compression scheme. Any method herein may be used with a group of multiple frames that may be according to a first protocol and may include, such as in a fixed location in the frames, a fixed length payload consisting of M bits, and the number of values in the first payload may be equal to, or less than, $2^N$ possible values. Any method herein may comprise receiving a plurality of frames according to a second protocol, that may include a fixed length payload consisting of N bits, and for each of a received first frame out of the plurality of frames: identifying and extracting a first N-bit payload from the received first frame; mapping the first payload to a second payload consisting of M bits, wherein M>N and the mapping comprises associating a single N-bit value to a single M-bit value; constructing a second frame according to the first protocol that includes the second M-bit payload and is part of the group; and using or sending the constructed second frame.

Any method or steps herein may be performed in a first device, the first device may comprise software and a processor for executing the software, and part of, or all of, any steps herein may be performed by the processor. Any method or steps herein may be used with a second device distinct from the first device, and any sending herein may comprise sending the second frame to the second device.

Any device herein, such as the first or second device, may consist of, or may comprise, a vehicle. Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV).

Any device herein, such as the first or second device, may consist of, may be integrated with, or may be part of, an Electronic Control Unit (ECU) in a vehicle. Any Electronic Control Unit (ECU) herein may be selected from the group consisting of Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module. Any method or ECU herein may further comprise executing software, an operating-system, or a middleware, that may comprise, or may use OSEK/VDX, International Organization for Standardization (ISO) 17356-1, ISO 17356-2, ISO 17356-3, ISO 17356-4, ISO 17356-5, or AUTOSAR standard. Alternatively or in addition, the software may comprises, may use, or may be based on, an operating-system or a middleware, that comprises, or uses OSEK/VDX, International Organization for Standardization (ISO) 17356-1, ISO 17356-2, ISO 17356-3, ISO 17356-4, ISO 17356-5, or AUTOSAR standard. At least one of any received frames herein, such as the first frames, may comprise Q N-bit first payloads. Each of most of, or all of, the received first frames may comprise multiple N-bit first payloads, and the identifying and extracting may comprise identifying and extracting of the Q first N-bit payloads from the received first frame, and mapping the first payload to a second payload consisting of M bits. Any constructing herein may comprise constructing multiple second frame according to the first protocol each including respective one of the second M-bit payloads, and any using or sending herein may comprise using or sending each of the multiple constructed second frames. The multiple constructed second frames may be carried or encapsulated using a standard protocol that may consist of, may include, may be based on, or may be according to, an Open Systems Interconnection (OSI) Layer-3 or Layer-4 standard protocol, which may consist of, may include, may be based on, or may be according to, ISO 15765-2:2004 ISO-TP (Transport Layer) standard.

The first protocol may be identical to, similar to, or different from, the second protocol. Each of the first and second protocols may include, may be based on, or may be according to, an OSI Layer-2 protocol that may consist of, or may be part of, the first protocol, and may be identical to, or different from, the OSI layer-2 protocol that may consist of, or may be part of, the second protocol. Any protocol herein, such as the first or the second protocol, may consist of, may include, may be based on, or may be according to, an Open Systems Interconnection (OSI) Layer-3 or Layer-4 standard protocol, that may consist of, may include, may be based on, or may be according to, ISO 15765-2:2004 ISO-TP (Transport Layer) standard.

Any ratio M/N herein may be equal to, may be less than, or may be higher than, 1.1, 1.2, 1.5, 2, 2.5, 3, 3.5, 5, 7, 10, 15, 20, 30, 50, or 100. Alternatively or in addition, any ratio $2^M/2^N=2^{M-N}$ herein may be equal to, may be less than, or may be higher than, 2, 4, 8, 16, 32, 64, 128, 256, 512, 1024, or 2048. Any N or M herein may be equal to, may be less than, or may be higher than, 4, 8, 12, 16, 32, 64, 128, 256, 512, or 1024.

Any method herein may be used with a number Q, where Q>1 and Q<M. Any mapping herein may comprise calculating a value of at least one of the M bits or locations of the second payload based on the values of Q−1 locations or bits in the N bits or locations of the first payload. Any number Q herein may be 2, 3, 4, 5, 6, 8, 10, 12, 15, or 20, and any method herein may be repeated for all Q from 2 to M−1. Any calculating herein may be based on, or may use, Boolean operation of the Q−1 locations or bits. Any calculating may be repeated, and any calculated value of the at least one of the M bits or locations may be used for calculating another at least one of the M bits or locations. Any method herein may be used with a function that maps values of Q−1 bits to Q bits. At least one of the received first frames may comprise a first field that may comprise the location of each of the at least one of the M bits or locations of the second payload and a respective second field that may comprise a value for each of the at least one of the M bits or locations, and any mapping herein may comprise calculating a value of at least one of the M bits or locations of the second payload based on the value of the respective second field. The first or second field may be carried in a field defined by the second protocol, which may consist of, may employ, may use, may be based on, or may be compatible with, a Controller Area Network (CAN), and wherein the first or second field consists of, employs, uses, is based on, or is compatible with, a Data Length Code (DLC) field.

Any calculating herein may comprise mapping the value of the Q−1 locations or bits to a value of Q bits, and the Q bits may be assigned to Q locations or bits in the M bits or locations of the second payload. Any constructing herein, such as the construction of the first frame for at least one of the received first frames, may comprise generating a second field that may comprise the location of at least one of the at least one of the M bits or locations of the second payload and a third field that may comprise a respective value of the at least one of the M bits or locations of the second payload. The second or third field may be carried in a field defined by the second protocol, which may consist of, may employ, may use, may be based on, or may be compatible with, a Controller Area Network (CAN), and wherein the second or third field consists of, employs, uses, is based on, or is compatible with, a Data Length Code (DLC) field.

Any method herein may further comprise receiving or obtaining an additional frame according to the second protocol that may include a payload consisting of M bits; constructing an additional second frame according to the first protocol that may include the received M-bit unchanged payload; and using or sending the constructed additional second frame. Alternatively or in addition, each of the received plurality of frames may include an indicator bit value. Any method herein may further comprise receiving or obtaining an additional frame according to the second protocol that may include a payload consisting of M bits, responsive to the indicator bit value, constructing an additional second frame according to the first protocol that may include the received M-bit unchanged payload; and using or sending the constructed additional second frame.

Any method herein may further comprise receiving or obtaining an additional frame according to the second protocol that includes a payload consisting of M bits that is not part of the group of multiple frames; constructing an additional first frame according to the second protocol that includes the received M-bit unchanged payload; and using or sending the constructed additional first frame. Any method herein may further comprise generating an indicator bit and encapsulating the indicator bit in the additional first frame in a field defined by a protocol, such as the second protocol. Any protocol herein, such as the second protocol may consist of, may employ, may use, may be based on, or may be compatible with, a Controller Area Network (CAN), and any field herein may consists of, may employ, may use, may be based on, or may be compatible with, a Data Length Code (DLC) field.

Any method herein may be used with a memory that may have N address lines or bits input and M data lines or bits output. Any mapping herein may comprise applying or writing the N-bit payload value as address and reading the M-bit value as output data. Any memory herein may be a volatile or a non-volatile memory, and may consist of, or may comprise, Hard Disk Drive (HDD), Solid State Drive (SSD), Random Access Memory (RAM), SRAM, Dynamic RAM (DRAM), Transistor RAM (TTRAM), Zero-capacitor RAM (Z-RAM), Read-Only Memory (ROM), Programmable ROM (PROM), EPROM, EEPROM, Flash-based memory, Compact Disc-ReWritable (CD-RW), Digital Versatile Disk, or Digital Video Disk RW (DVD-RW), DVD+RW, DVD-RAM BD-RE, Compact Disc ROM (CD-ROM), BD-ROM, or DVD-ROM.

Alternatively or in addition, any mapping herein may use, or may be based on, a combinatorial logic that may use digital logic gates. Any combinatorial logic herein may comprise, or may consist of, a Programmable Logic Device (PLD), that may comprise, may consist of, or may be based on, Programmable Array Logic (PAL), Generic Array Logic (GAL), Complex Programmable Logic Device (CPLD), or Field-Programmable Gate Array (FPGA). Any method herein may be used with software or firmware and a processor that may execute the software or firmware, and any combinatorial logic herein may be calculated or performed by the processor.

Any mapping or associating herein may comprise calculating a Boolean logic using logic gates for each one of the M bits or locations of the second payload, that may be based on one or more of the N bits or locations of the first payload. At least one of the M bits or locations of the second payload may be assigned as '0' or '1' for any received first payload. For example, the number of bits or locations from the M bits or locations of the second payload that may be assigned as '0' or '1' for any received first payload may be equal to, less than, or more than, 2, 3, 4, 5, 7, 10, 15, 20, 30, 50, 70, or 100. Alternatively or in addition, the number of bits or locations from the M bits or locations of the second payload that may be assigned as '0' or '1' for any received first payload may be equal to, less than, or more than, 1%, 2%, 3%, 5%, 7%, 10%, 15%, 20%, 25%, 30%, 50%, 60%, or 70% of the M bits or locations.

Alternatively or in addition, at least one of the M bits or locations of the second payload may be assigned the same or complement value of a selected location in the first payload. For example, at least 2, 3, 4, 5, 7, 10, 15, 20, 30, 50, 70, or 100 of the M bits or locations of the second payload may be assigned the same or complement value of one or more selected locations in the first payload. Alternatively or in addition, at least at least 1%, 2%, 3%, 5%, 7%, 10%, 15%, 20%, 25%, 30%, 50%, 60%, or 70% of the M bits or locations of the second payload may be assigned the same or complement value of one or more selected locations in the first payload.

Alternatively or in addition, at least one of the M bits or locations of the second payload may be calculated using two of the N bits or locations of the first payload. Alternatively or in addition, at least one of the M bits or locations of the second payload may be calculated using three or more of the N bits or locations of the first payload. Alternatively or in addition, at least one of the M bits or locations of the second payload may be calculated using all of the N bits or locations of the first payload, and each of the M bits or locations of the second payload may be calculated using all of the N bits or locations of the first payload.

Any method or mapping (or associating) herein may be used with a stored set of coefficients ($c_0, c_1, c_2, c_3, \ldots c_{N-3}, c_{N-2}, c_{N-1}, c_N$), and at least one of the N bits or locations of the first payload may be calculated using the set of coefficients and the N bits or locations of the first payload defined as ($b_0, b_1, b_2, b_3, \ldots b_{N-3}, b_{N-2}, b_{N-1}$). Alternatively or in addition, any method or mapping herein may be used with M stored sets of coefficients, and each of the N bits or locations of the first payload may be calculated using a respective set of coefficients and the N bits or locations of the first payload. Further, any method or mapping herein may be used with a memory having N address lines or bits input and N+1 data lines or bits output and storing all sets of coefficients, and any mapping herein may comprise applying or writing the N-bit payload value as address and reading the N+1 bit value as coefficients output data.

Alternatively or in addition, at least one of the N bits or locations of the first payload may be calculated as (where the '$\oplus$' is a XOR operation and the '$\cdot$' is an AND operation):

$$c \oplus$$
$$c_0 \cdot b_0 \oplus c_1 \cdot b_1 \oplus \ldots \oplus c_{N-1} \cdot b_{N-1} \oplus$$
$$c_{0,1} \cdot b_0 \cdot b_1 \oplus c_{0,2} \cdot b_0 \cdot b_2 \oplus \ldots \oplus c_{N-2,N-1} \cdot b_{N-2} \cdot b_{N-1} \oplus$$
$$\ldots$$
$$c_{0,1,\ldots N-2} \cdot b_0 \cdot b_1 \ldots \cdot b_{N-2} \oplus \ldots \oplus c_{1,2,\ldots,N-2,N-1} \cdot b_1 \cdot \ldots \cdot b_{N-2} \cdot b_{N-1}.$$

Alternatively or in addition, at least one of the N bits or locations of the first payload may be calculated be means of the formula rewritten with some or all of other two-input Boolean operators, such as 'AND', 'OR', NAND', 'NOR', 'XOR', or 'NXOR', and which is equivalent to the above formula with only 'AND' and 'XOR' operations. It is noted that the 'XOR', and the '+' (a modulo-2 summation) are the same for a one-bit number. Alternatively or in addition, at least one of the N bits or locations of the first payload may be calculated as $c_0*b_0+c_1*b_1+c_2*b_2+c_3*b_3+ \ldots c_{N-3}*b_{N-3}+c_{N-2}*b_{N-2}+c_{N-1}*b_{N-1}+c_N$, wherein the '*' may be a two-input Boolean operator, such as 'AND', 'OR', NAND', 'NOR', 'XOR', or 'NXOR', and the '+' operator may be a modulo-2 summation.

Alternatively or in addition, at least one of the N bits or locations of the first payload may be calculated be means of the formula rewritten with some or all of other two-input Boolean operators, such as 'AND', 'OR', NAND', 'NOR', 'XOR', or 'NXOR', and which is equivalent to the above formula with only 'AND' and 'XOR' operations. It is noted that the 'XOR', and the '+' (a modulo-2 summation) are the same for a one-bit number. Alternatively or in addition, at least one of the N bits or locations of the first payload is calculated as $c_0 \oplus b_0 + c_1 \oplus b_1 + c_2 \oplus b_2 + c_3 \oplus b_3 + \ldots c_{N-3} \oplus b_{N-3} + c_{N-2} \oplus b_{N-2} + c_{N-1} \oplus b_{N-1} + c_N$, where the '$\oplus$' is a XOR operation.

Any frame herein, such as part of, or all of, the received plurality of frames, may further include a code in a fixed length code field distinct from the fixed length payload consisting of N bits, and any method herein may further comprise, for each of the received first frame that may include the code, identifying and extracting the code from any received frame, such as the received first frame. The second protocol may define a fixed length payload consisting of Q bits, and the code field length may be equal to, or may be less than, Q−N. Further, N may be equal to M (N=M) herein.

Any code or field herein may relate to, or may be associated with, any payload herein such as the first or second payload. Any using or sending herein may comprise using, or basing on, the extracted code from the code field. Any code herein may comprise a metadata that may be according to, may be based on, or may be compatible with, eXtensible Markup Language (XML). Any method herein may be used with an error detecting scheme, and any code herein may comprise an error detecting code for detecting errors in the first or second payload, such as one or more parity bits, a checksum, or a Cyclic Redundancy Code (CRC). Alternatively or in addition, any method herein may be used with a Forward Error Correction (FEC) scheme, and any code herein may comprise an Error-Correcting Code (ECC) for correcting errors in the first or second payload. Alternatively or in addition, any method herein may be used with an authentication scheme, and any code herein may support, may be part of, or may be associated with, the authentication scheme. Any authentication scheme herein may use, may comprise, may be based on, or may be compatible with, Extensible Authentication Protocol (EAP), IEEE 802.1X-2010 or IEEE 802.1AE-2006. Alternatively or in addition, any code herein may support, may be part of, or may be associated with, a digital signature. Further, any authentication scheme herein may use, may comprise, may be based on, or may be compatible with, Authenticated Encryption (AE) or Message Authentication Code (MAC), and any code herein may support, may be part of, or may be associated with, a Message Authentication Code (MAC), a Keyed-Hash Message Authentication Code (HMAC), an Encryption Key identification, a frame counter, a Key exchange information, or a random number. Any method herein may further comprise authenticating any received frame by using the code according to the authentication scheme.

Any method herein may provide a lossless and stateless compression scheme. Any method herein may be used with a group of multiple frames that may be according to a second protocol and may include a fixed length payload consisting of M bits, and the number of values in the first payload may be equal to, or may be less than, $2^N$ possible values. Any method herein may comprise receiving or obtaining a plurality of frames. For each of a received second frame out of the plurality of frames, the method may comprise identifying and extracting a second M-bit payload from the received second frame; coding the second payload to a first payload consisting of N bits (M>N), by respectively mapping the extracted second payload M-bit value to a single N-bit value; constructing a first frame according to the second protocol that includes the first N-bit payload; and using or sending the constructed first frame. Any method herein may be used with a memory having M address lines or bits input and N data lines or bits output. Any mapping herein may comprise applying or writing the M-bit payload value as address and reading the N-bit value as output data. Any mapping herein may comprise identifying M−N bit locations, and may further comprise compacting by shifting a first register storing the second M-bit payload so that the identified bit locations are removed.

Any protocol herein, such as the first protocol or the second protocol, may use, may be according to, or may comprise, a vehicle bus protocol. Any data link layer or any physical layer signaling herein of any vehicle bus protocol herein may be according to, may be based on, may use, or may be compatible with, ISO 11898-1:2015 or standard. Any vehicle bus herein may use, or may be compatible with, a multi-master, serial protocol using acknowledgement, arbitration, and error-detection schemes, and any vehicle bus herein may consist of, may employ, may use, may be based on, or may be compatible with, a Controller Area Network (CAN). Any CAN herein may be according to, may be based on, may use, or may be compatible with, a standard selected from the group consisting of ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), or SAE J2411_200002. Further, Any CAN herein may be according to, may be based on, may use, or may be compatible with, Flexible Data-Rate (CAN FD) protocol. Alternatively or in addition, any vehicle bus herein may consist of, may employ, may use, may be based on, or may be compatible with, a Local Interconnect Network (LIN) standard, that may be according to, may be based on, may use, or may be compatible with, a standard selected from a group consisting of ISO 9141-2:1994, ISO 9141:1989, ISO 17987-1, ISO 17987-2, ISO 17987-3, ISO 17987-4, ISO 17987-5, ISO 17987-6, and ISO 17987-7. Alternatively or in addition, any vehicle bus herein may consist of, may employ, may use, may be based on, or may be compatible with, FlexRay protocol standard, that may be according to, may be based on, may use, or may be compatible with, ISO 17458-1:2013, ISO 17458-2:2013, ISO 17458-3:2013, ISO 17458-4:2013, or ISO 17458-5:2013. Alternatively or in addition, any vehicle bus herein may consist of, may employ, may use, may be based on, or may be compatible with, Media Oriented Systems Transport (MOST) protocol, that may be according to, may be based on, may use, or may be compatible with, MOST25, MOST50, and MOST150. Alternatively or in addition, any vehicle bus herein may consist of, may employ, may use, may be based on, or may be compatible with, automotive Ethernet that may use a single twisted pair, and may be according to, may be based on, may use, or may be compatible with, IEEE802.3 100BaseT1, IEEE802.3 1000BaseT1, BroadR-Reach®, or IEEE 802.3bw-2015 standard. Alternatively or in addition, any vehicle bus herein may consist of, may employ, may use, may be based on, or may be compatible with, an avionics data bus standard, that may be according to, may be based on, may use, or may be compatible with, Aircraft Data Network (ADN), Avionics Full-Duplex Switched Ethernet (AFDX), Aeronautical Radio INC. (ARINC) 664, ARINC 629, ARINC 708, ARINC 717, ARINC 825, MIL-STD-1553B, MIL-STD-1760, or Time-Triggered Protocol (TTP).

Any network herein may be a wired network where the transmission medium comprises, consists of, or may be part of, two or more conductors, which may comprise, may consist of, or may be part of, a stripline, a microstrip, two wires, or a cable. Any receiving herein may comprise receiving from a first physical medium, such as from any wired network, and any sending herein may comprise sending to a second physical medium, such as to any wired network. The first physical medium may be different from, identical to, or the same as, the second physical medium.

Any medium herein, such as the first or second medium, may comprise, may consist of, or may be part of, a twisted wire pair that comprises, or consists of, two individually insulated solid or stranded conductors or wires, and the twisted wire pair may comprise, or may consist of, an Unshielded Twisted Pair (UTP) or a Shielded Twisted Pair (STP). Any twisted wire pair herein may be according to, may be based on, may be compatible with, or may use, ISO/IEC 11801:2002 or ANSI/TIA/EIA-568-B.2-2001 standard, and any STP herein be according to, may be based on, may be compatible with, or may use, F/UTP, S/UTP, or SF/UTP. Further, any twisted wire pair herein may be according to, may be part of, may be based on, may be compatible with, or may use, Category 3, Category 5, Category 5e, Category 6, Category 6A, Category 7, Category 7A, Category 8.1, or Category 8.2 cable. Alternatively or in addition, any wired network herein may comprise, may consist of, or may be part of, a coaxial cable, and the coaxial cable may comprise a dielectric materials are commonly used are foamed polyethylene (FPE), solid polyethylene (PE), polyethylene foam (PF), polytetrafluoroethylene (PTFE), or air space polyethylene (ASP).

Any wired network topology herein may be a point-to-point, bus, star, ring or circular, mesh, tree, hybrid, or daisy chain topology. Alternatively or in addition, the wired network topology may be a point-to-point topology between two nodes connected to the medium ends, and the communication may be unidirectional, half-duplex, or full-duplex. The connecting to the medium may comprise connecting to one of the ends of the medium, or connecting at a point that may be distinct from an end of the medium. The medium may comprise, or may consist of, an unbalanced line, signals carried over the medium may employ single-ended signaling, and the signals may use single-ended signaling that may be based on, may be according to, or may be compatible with, RS-232 or RS-423 standards. Alternatively or in addition, the medium may comprise, or may consist of, a balanced line, and signals may be carried over the medium may employ differential signaling, that may be based on, may be according to, or may be compatible with, RS-232 or RS-423 standards. Further, the communication over the medium may use serial or parallel transmission. Any method herein may further comprise transmitting and receiving digital data over the wired network by a wired transceiver coupled to the connector.

Any network herein may be frame or packet based. The topology of any wired network herein may be based on, or may use, point-to-point, bus, star, ring or circular, mesh, tree, hybrid, or daisy chain topology. Any two nodes may be connected in a point-to-point topology, and any communication herein between two nodes may be unidirectional, half-duplex, or full-duplex. Any medium herein may comprise, or may consist of, an unbalanced line, and any signals herein may be carried over the medium employing single-ended signaling, that may be based on, may be according to, or may be compatible with, RS-232 or RS-423 standards. Alternatively or in addition, any medium herein may comprises, or may consist of, a balanced line, and any signals herein may be carried over the medium employing differential signaling, that may be based on, may be according to, or may be compatible with, RS-232 or RS-423 standards. Any communication over a medium herein may use serial or parallel transmission.

Any network herein may be a Personal Area Network (PAN), any connector herein may be a PAN connector, and any transceiver herein may be a PAN transceiver. Alternatively or in addition, any network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any network herein may be according to, may be compatible with, or may be based on, a Serial Peripheral Interface (SPI) bus, Inter-Integrated Circuit (FC) bus, or 1-Wire bus.

Any method herein may be used for lossless or for stateless compressing of a first M-bit set to a second M–S bit set, and any method herein may be used multiple M-bit sets that may include the first M-bit set. Further, any method herein may comprise calculating correlation information between two or more M-bit locations in the multiple M-bit sets; obtaining the first M-bit set at a first device; forming, in the first device, the second M–S bit set using the correlation information; sending, by the first device, the second M–S bit set to a second device; receiving, by the second device, the second M–S bit set; and constructing the first M-bit set from the received second M–S bit set using the correlation information. Any method herein may comprise minimizing the multiple M-bit sets by removing a set that is identical to another set of the multiple sets.

Any method herein may be used with a first protocol that may define frames that may include a fixed length payload consisting of M bits. The first M-bit set and each of the multiple M-bit sets may be a payload in a frame according to the first protocol. The obtaining of the first M-bit set at a first device may comprise receiving, by the first device, a frame that comprises as a payload the first M-bit set, or may comprise extracting, by the first device, the first M-bit set from the received frame. Alternatively or in addition, the obtaining of the first M-bit set at a first device may comprise may comprise generating of the multiple M-bit sets according to, or based on, the first protocol. Alternatively or in addition, any method herein may comprise receiving of the multiple M-bit sets, and the receiving may comprise receiving from a communication medium multiple frames that include the multiple M-bit sets as payloads, and may further comprise extracting the multiple M-bit sets from the received frames.

The number of the sets in any multiple M-bit sets herein may be equal to, less than, or higher than, 3, 4, 5, 7, 10, 15, 20, 30, 50, 100, 200, 500, 1,000, 2,000, 5,000, 10,000, 20,000, 50,000, 100,000, 200,000, 500,000, or 1,000,000. Alternatively or in addition, the number of the sets in any multiple M-bit sets herein may be equal to, or less than, 0.1%, 0.2%, 0.5%, 1%, 2%, 3%, 5%, 10%, 15%, 20%, 30%, or 50% of $2^M$. Further, the number of the sets in any multiple M-bit sets herein may be equal to, or less than, $2^{M-S}$.

Any method herein may be used with a first protocol that may define frames that may include a fixed length payload that may be consisting of M bits. Any first M-bit set herein and each of any multiple M-bit sets herein may be a payload in a frame according to the first protocol. Any first protocol herein may be according to, may be based on, may use, or may be compatible with, a vehicle bus protocol. Any data link layer or a physical layer signaling herein of any vehicle bus protocol herein may be according to, may be based on, may uses, or may be compatible with, ISO 11898-1:2015 or standard. Any vehicle bus herein may use, or may be compatible with, a multi-master, serial protocol using acknowledgement, arbitration, and error-detection schemes, such as any vehicle bus that may consist of, may employ, may use, may be based on, or may be compatible with, a Controller Area Network (CAN) protocol, and Any CAN herein may be is according to, may be based on, may use, or may be compatible with, a standard that may be selected from the group consisting of ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, On-Board Diagnostics (OBD), and SAE J2411_200002.

Further, any CAN herein may be according to, may be based on, may use, or may be compatible with, Flexible Data-Rate (CAN FD) protocol. Alternatively or in addition, any vehicle bus herein may be according to, may be based on, may use, or may be compatible with, a Local Interconnect Network (LIN) standard that may be according to, may be based on, may use, or may be compatible with, a standard selected from a group consisting of ISO 9141-2:1994, ISO 9141:1989, ISO 17987-1, ISO 17987-2, ISO 17987-3, ISO 17987-4, ISO 17987-5, ISO 17987-6, and ISO 17987-7. Alternatively or in addition, any vehicle bus herein may be according to, may be based on, may use, or may be compatible with, FlexRay protocol standard that may be according to, may be based on, may use, or may be compatible with, a standard selected from a group consisting of ISO 17458-1:2013, ISO 17458-2:2013, ISO 17458-3:2013, ISO 17458-4:2013, or ISO 17458-5:2013. Alternatively or in addition, any vehicle bus herein may be according to, may be based on, may use, or may be compatible with, Media Oriented Systems Transport (MOST) protocol, that may be according to, may be based on, may use, or may be compatible with, a standard selected from a group consisting of MOST25, MOST50, and MOST150.

Alternatively or in addition, any vehicle bus herein may be according to, may be based on, may use, or may be compatible with, automotive Ethernet that may use a single twisted pair and may be according to, may be based on, may use, or may be compatible with, IEEE802.3 100BaseT1, IEEE802.3 1000BaseT1, BroadR-Reach®, or IEEE 802.3bw-2015 standard. Alternatively or in addition, any vehicle bus herein may be according to, may be based on, may use, or may be compatible with, avionics data bus standard may be according to, may be based on, may use, or may be compatible with, Aircraft Data Network (ADN), Avionics Full-Duplex Switched Ethernet (AFDX), Aeronautical Radio INC. (ARINC) 664, ARINC 629, ARINC 708, ARINC 717, ARINC 825, MIL-STD-1553B, MIL-STD-1760, or Time-Triggered Protocol (TTP).

Any ratio M/(M−S) value herein may be equal to, or may be more than, 1.1, 1.2, 1.5, 2, 2.5, 3, 3.5, 5, 7, 10, 15, 20, 30, 50, or 100. Alternatively or in addition, the ratio M/(M−S) value herein may be less than 1.2, 1.5, 2, 2.5, 3, 3.5, 5, 7, 10, 15, 20, 30, 50, or 100. Alternatively or in addition, the ratio $2^M/2^{M-S}=2^S$ value may be equal to, or may be more than, 2, 4, 8, 16, 32, 64, 128, 256, 512, 1024, or 2048, or may be less than 4, 8, 16, 32, 64, 128, 256, 512, 1024, or 2048. Any M−S value herein may be equal to, or may be more than, 4, 8, 12, 16, 32, 64, 128, 256, 512, or 1024. Alternatively or in addition, any M−S value herein may be less than 8, 12, 16, 32, 64, 128, 256, 512, or 1024. Any M value herein may be equal to, or may be more than, 4, 8, 12, 16, 32, 64, 128, 256, 512, or 1024. Alternatively or in addition, any M value herein may be less than 8, 12, 16, 32, 64, 128, 512, or 1024.

Any method herein may be used with an M-bit code that may be part of the correlation information. Any method may further comprise for each one of the M locations checking whether the same value of bits in the location in all of the multiple M-bit sets carry the same value; marking the location in which the same value of bits in the location in all of the multiple M-bit sets carry the same value; responsive to determining that all bit values in all of the multiple M-bit sets in '0', assigning '0' to the respective location in the M-bit code; and responsive to determining that all bit values in all of the multiple M-bit sets in '1', assigning '1' to the respective location in the M-bit code. Any number of marked locations herein may be S. Any forming of the second M−S bit set herein may comprise removing the marked S locations from the first M-bit set, and any constructing herein may comprise assigning the respective value in the code to the marked S locations.

Any method herein may be used with an M-bit code that may be part of the correlation information. Any method herein may further comprise, for each pair of first and second distinct locations of the M locations: checking whether the second location carries the same or the complement value of bits of the first location in all of the multiple M-bit sets; marking the second location which carries the same or the complement value of bits of the first location in all of the multiple M-bit sets; responsive to determining that the second location carries the same value of bits of the first location in all of the multiple M-bit sets, assigning '0' and the first location identifier to the respective location in the M-bit code; and responsive to determining that the second location carries the complement value of bits of the first location in all of the multiple M-bit sets, assigning '1' and the first location identifier to the respective location in the M-bit code, and any number of marked locations may be S. Any forming of the second M−S bit set may comprise removing the marked S locations from the first M-bit set, and any constructing herein may comprise assigning the value of each of the marked locations to be the same value as the location identified by the respective identifier in the M-bit code if '0' is respectively assigned, and any constructing herein may comprise assigning the value of each of the marked locations to be the complement value as the location identified by the respective identifier in the M-bit code if '1' is respectively assigned.

Any method herein may further comprise selecting distinct Q distinct locations of the M locations, where Q>1 and Q<M; checking whether a first one of the locations can be represented as a function of the other Q−1 locations in the multiple M-bit sets; and responsive to determining that first one of the locations can be represented as a function of the other Q−1 locations marking the first location and storing the function as part of the correlation information and the forming of the second M−S bit set comprises removing the marked first locations from the first M-bit set. There may be equal to, or less than, $2^{Q-1}$ different values of the distinct Q distinct locations in the multiple M-bit sets, and any function herein may be a Boolean function. Alternatively or in addition, there may be equal to, or less than, $2^{Q-1}$ different values of the distinct Q distinct locations in the multiple M-bit sets, and (Q-1) bits distinct values may be assigned to each of the $2^{Q-1}$ different values. Any correlation information herein may comprise the assignment of the (Q-1) bits distinct values to the corresponding $2^{Q-1}$ different values, and the values in the non-marked locations may be replaced with the (Q-1) bits distinct values according to the assignment. Any steps of any method herein may be repeated after the replacing, and may further be repeated for all possible selecting of distinct Q distinct locations from the M locations, where Q>1 and Q<M, or may be repeated for all possible Q values from Q=2 to Q=M-1.

Any device herein may be used for a lossless and stateless de-compression scheme, and may further be used with a group of multiple frames that are according to a first protocol and includes, in a fixed location in the frames, a fixed length payload consisting of M bits. The number of values in the first payload may be equal to, or may be less than, $2^N$ possible values. Any device herein may comprise a connector for connecting to a vehicle bus; a receiver coupled to the connector for receiving from the vehicle bus a plurality of frames according to a second protocol that include a fixed length payload consisting of N bits; a software and a processor for executing the software; a memory coupled to the processor for storing a set of rules; a transmitter coupled to the processor for sending a second frame according to the first protocol to another device; and a single enclosure housing the connector, the receiver, the processor, the memory, and the transmitter. Any processor herein may be operative in real-time, for each of a received first frame out of the plurality of frames, to identify and extract a first N-bit payload from the received first frame, to map the first payload to a second payload consisting of M bits (M>N), by respectively associating a single M-bit value to the extracted first payload N-bit value, and to construct the second frame that includes the second M-bit payload and is part of the group.

A non-transitory computer readable medium may include computer executable instructions stored thereon, wherein the instructions may include any step or steps, any method, or any flow chart described herein. Any method or apparatus herein may perform any step or steps, any method, or any flow chart described herein.

The above summary is not an exhaustive list of all aspects of the present invention. Indeed, the inventor contemplates that his invention includes all systems and methods that can be practiced from all suitable combinations and derivatives of the various aspects summarized above, as well as those disclosed in the detailed description below, and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

Figure 2:
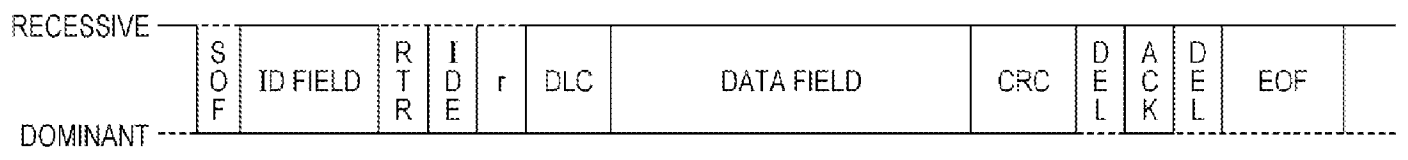

FIG. 2 illustrates schematically a data frame format as defined by a Controller Area Network (CAN) protocol;

FIG. 3 illustrates a table of the various classification levels of autonomous car is according to the Society of Automotive Engineers (SAE) J3016 standard;

FIG. 6 illustrates schematically general reconstructing a frame from a received compressed frame;

FIG. 8 illustrates schematically a simplified flowchart of reconstructing an original frame from a received compressed frame;

FIG. 14-1 illustrates schematically a simplified flowchart of forming of a compression scheme from obtained samples using samples modifying;

FIG. 15 illustrates schematically an example of a table of obtained samples before any compression stage;

FIG. 15a illustrates schematically an example of a table of obtained samples after first stage of a single location compression;

FIG. 15b illustrates schematically an example of a table of obtained samples after first stage of two locations compression;

FIG. 15c illustrates schematically an example of a table of obtained samples after first stage of three locations compression without samples modifying;

FIG. 15d illustrates schematically an example of a table of obtained samples after first stage of three locations compression using samples modifying;

FIG. 16a illustrates schematically another example of developing compression code after various stages of compression;

DETAILED DESCRIPTION

Figure 1:
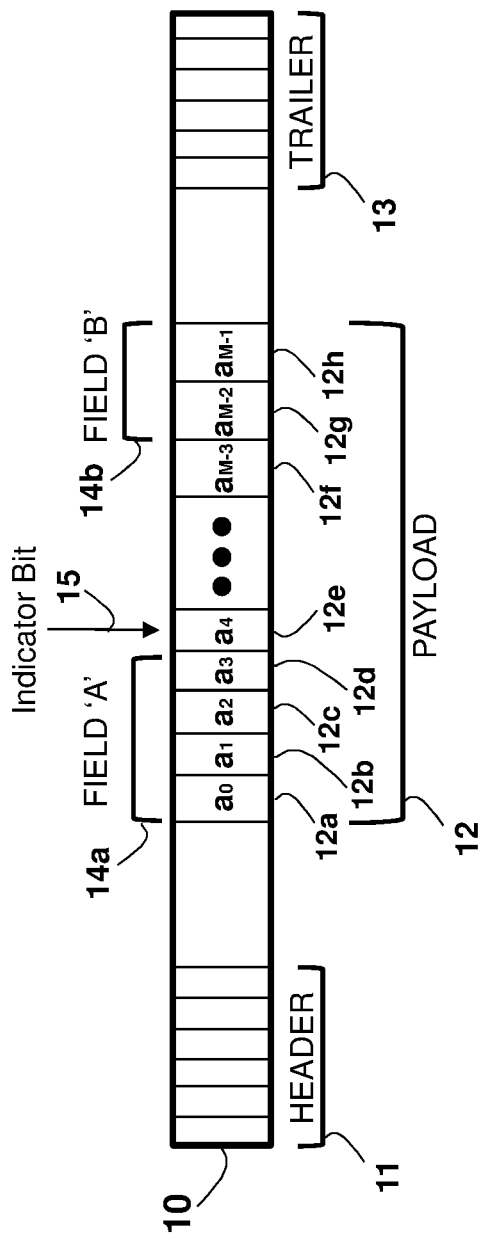
FIG. 1 illustrates schematically a data frame format.

The principles and operation of an apparatus according to the present invention may be understood with reference to the figures and the accompanying description wherein similar components appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (even in the case of using different suffix, such as 5, *a*, 5*b* and 5*c*) refer to functions or actual devices that are either identical, substantially similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, a reference to "a component surface" includes reference to one or more of such surfaces. The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The transfer of digital data signals between two devices, systems, or components, commonly makes use of a line driver for transmitting the signal to the conductors serving as the transmission medium connecting the two modules, and a line receiver for receiving the transmitted signal from the transmission medium. The communication may use a proprietary interface or preferably an industry standard, which typically defines the electrical signal characteristics such as voltage level, signaling rate, timing and slew rate of signals, voltage withstanding levels, short-circuit behavior, and maximum load capacitance. Further, the industry standard may define the interface mechanical characteristics such as the pluggable connectors, and pin identification and pin-out. In one example, the module circuit can use an industry or other standard used for interfacing serial binary data signals. Preferably the line drivers and line receivers and their associated circuitry will be protected against electrostatic discharge (ESD), electromagnetic interference (EMI/EMC), and against faults (fault-protected), and employs proper termination, failsafe scheme and supports live insertion. Preferably, a point-to-point connection scheme is used, wherein a single line driver is communicating with a single line receiver. However, multi-drop or multi-point configurations may as well be used. Further, the line driver and the line receiver may be integrated into a single IC (Integrated Circuit), commonly known as transceiver IC.

A line driver typically converts the logic levels used by the module internal digital logic circuits (e.g., CMOS, TTL, LSTTL and HCMOS) to a signal to be transmitted. In order to improve the common-mode noise rejection capability, and to allow higher data rates, a balanced and differential interface may be used. For example, a balanced interface line driver may be an RS-422 driver such as RS-422 transmitter MAX3030E, available from Maxim Integrated Products, Inc. of Sunnyvale, Calif., U.S.A., described in the data sheet "*±15 kV ESD-Protected, 3.3V Quad RS-422 Transmitters*" publication number 19-2671 Rev. 0 October 2002, which is incorporated in its entirety for all purposes as if fully set forth herein. A line receiver typically converts the received signal to the logic levels used by the module internal digital logic circuits (e.g., CMOS, TTL, LSTTL and HCMOS). For example, industry standard TIA/EIA-422 (a.k.a. RS-422) can be used for a connection, and the line receiver may be an RS-422 compliant line receiver, such as RS-422 receiver MAX3095, available from Maxim Integrated Products, Inc. of Sunnyvale, Calif., U.S.A., described in the data sheet "*±15 kV ESD-Protected, 10 Mbps, 3V/5V, Quad RS-422/RS-485 Receivers*" publication number 19-0498 Rev. 1 October 2000, which is incorporated in its entirety for all purposes as if fully set forth herein. American national standard ANSI/TIA/EIA-422-B (formerly RS-422) and its international equivalent ITU-T Recommendation V.11 (also known as X.27), are technical standards that specify the "electrical characteristics of the balanced voltage digital interface circuit". These technical standards provide for data transmission, using balanced or differential signaling, with unidirectional/non-reversible, terminated or non-terminated transmission lines, point to point. Overview of the RS-422 standard can be found in National Semiconductor Application Note 1031 publication AN012598 dated January 2000 and titled: "*TIA/EIA-422-B Overview*" and in B&B Electronics publication "*RS-422 and RS-485 Application Note*" dated June 2006, which are incorporated in their entirety for all purposes as if fully set forth herein.

A transmission scheme may be based on the serial binary digital data standard Electronic Industries Association (EIA) and Telecommunications Industry Association (TIA) EIA/TIA-232, also known as Recommended Standard RS-232 and ITU-T (The Telecommunication Standardization Sector (ITU-T) of the International Telecommunication Union (ITU)) V.24 (formerly known as CCITT Standard V.24). Similarly, RS-423 based serial signaling standard may be used. For example, RS-232 transceiver MAX202E may be used, available from Maxim Integrated Products, Inc. of Sunnyvale, Calif., U.S.A., described in the data sheet "±12 kV ESD-Protected, +5V RS-232 Transceivers" publication number 19-0175 Rev. 6 March 2005, which is incorporated in its entirety for all purposes as if fully set forth herein.

A 2-way communication interface may use the EIA/TIA-485 (formerly RS-485), which supports balanced signaling and multipoint/multi-drop wiring configurations. Overview of the RS-422 standard can be found in National Semiconductor Application Note 1057 publication AN012882 dated October 1996 and titled: "Ten ways to Bulletproof RS-485 Interfaces", which is incorporated in their entirety for all purposes as if fully set forth herein. In this case, RS-485 supporting line receivers and line driver are used, such as for example, RS-485 transceiver MAX3080 may be used, available from Maxim Integrated Products, Inc. of Sunnyvale, Calif., U.S.A., described in the data sheet "Fail-Safe, High-Speed (10 Mbps), Slew-Rate-Limited RS-485/RS-422 Transceivers" publication number 19-1138 Rev. 3 December 2005, which is incorporated in its entirety for all purposes as if fully set forth herein.

The payload 12 of the frame 10 includes M bits (or locations), hence may represent theoretical $2^M$ different values. However, practically the carried values are not random and not all the permutations are actually used. For example, the field 'A' 14a includes 4 locations or bits, hence may carry 16 values, ranging from 0 to 15. However, a protocol may define only few of these values (such as only 0 to 12), and few values may be reserved or used only for special purposes. Similarly, indication bits, such as indicator bit 15, may be of fixed value according to a standard for alignment or synchronization purposes. In another example, a field of 8 bits may be used to carry a value of a magnitude ranging from 0 to 255, such as a sensor output value. However, in actual implementation only the values from 56 to 178 are actually used. Furthermore, there may interdependency between two or more field in the frame 10, so that not all possible values are actually used for the field combinations.

Further, a protocol may be designed to various applications, and thus includes options for many possible values. However, when used in a specific application, some of the possible values in the fields may not be practically used. For example, the CAN protocol is used for both automotive and industrial applications. When used in a specific automotive application, not all the possible options of the fields may be actually used. Furthermore, a specific vehicle manufacturer, or in a specific vehicle model by a manufacturer, may only use part of the protocol options. In addition, a specific installation, such as in a specific car by a specific owner, may further use a more limited set of the possible variants offered by the standard. In an example of an ambient temperature sensor, a vehicle used in a 'cold' state, such as in Alaska, may use only a lower part of the temperature range, while when the same vehicle is used in a 'hot' state such as California, may use only a higher part of the same temperature range.

Since not all of the theoretical $2^M$ different values may be actually used, a compression scheme may be used, where the M bits of the payload 12 are represented by N bits (or locations), and wherein N<M. For example, it may be beneficial to compress (by coding or by dictionary-based compression) 64-bit long numbers (data blocks) from a certain set (such as payload carried over a CAN bus) to a shorter data format. For example, if a set size s is less than 264 elements, an s-long dictionary may be compiled, which will contain all unique elements of the set. The maximal length of such 'compressed' length will be log 2(s) bits. In one example, only 64·s bits of memory to hold the whole dictionary may be required. Such compression may preferably be lossless (inversible compression), and may preferably be stateless—such as on the basis of a frame-by-frame basis (and not depending upon any former received frame or frames), and may be based on the locations of data or bits in the frame structure. The compression may be based on that there are some general patterns and correlations between bits in different positions in frames in a specific application or installation that may results in a payload data that includes some regularities and is not entirely random.

A schematic arrangement or method 65 of reconstructing by using de-compression of the frame 10 from a received compressed frame 60 is shown in FIG. 6. The frame 60 is defined as starting with a header 61, including few bits, and ends with a trailer (also known as 'footer') 63 bits. The data carried by the frame 60 is referred to as payload 62, and is positioned between the header 61 and the trailer 63. In the example of the frame 60, the payload 62 comprises a most LSB bit (or position) $b_0$ 62a, which is followed by bit or location $b_1$ 62b, and then followed by bits (or locations) $b_2$ 62c and $b_3$ 62d. The payload 62 ends with bits $b_{N-3}$62f, followed by bit or location $b_{N-2}$ 62g, and ending with the MSB bit or location $b_{N-1}$62h, totaling of N bits in the payload 62. While frame 60 is shown where the LSB bits (or locations) follow the header 61 and the MSB bits (or locations) precede the trailer 63, frames can equally use a reverse order, where MSB bits (or locations) that follow the header 61 and LSB bits (or locations) that precede the trailer 63. It is assumed that the number of combination of values in the payload 12 of the frame 10 is equal to, or less than, $2^N$, so a compression is obtained since N<M.

The N bits forming the payload 62 of the frame 60 are orderly extracted from the frame 60, and are fed as input 66a, via a bus, a physical connection, or as software or firmware variable, to a mapping block or functionality 67. For each value of the input 66a, the mapping functionality 67 assign a set of M bits, which are fed via output 66b to form the payload 12 of the original frame 10 (before being compressed).

The mapping functionality 67 may be implemented using a memory 67a as shown in an arrangement 65a shown in FIG. *a*, where the memory 67a serves as a Look-Up Table (LUT). In such a configuration, the input N bits 66a are used as an input providing an address to the memory 66a, and the data stored at the input address is the M bits output 66b.

In one example, the compression is stateless. Hence not dependent upon any former data, but rather may be represented as a combinatorial logic applied to the input N bits 66a, to produce the M bits output 66b. Such combinatorial logic may be implemented using logic gates that perform a logical operation on one or more binary inputs and produces binary outputs.

Logic gates are primarily implemented using diodes or transistors acting as electronic switches. With amplification, logic gates can be cascaded in the same way that Boolean functions can be composed, allowing the construction of a physical model of all of Boolean logic, and therefore, all of the algorithms and mathematics that can be described with Boolean logic. Logic circuits include such devices as multiplexers, registers, Arithmetic Logic Units (ALUs), and computer memory. In modern practice, most gates are made from field-effect transistors (FETs), particularly metal-oxide-semiconductor field-effect transistors (MOSFETs). Compound logic gates AND-OR-Invert (AOI) and OR-AND-Invert (OAI) are often employed in circuit design because their construction using MOSFETs is simpler and more efficient than the sum of the individual gates.

Hence, alternatively or in addition to using a memory, a PLD 67a may be used for obtaining the required M bits output 66b as a function of the N bits input 66a. For example, the lookup table functionality may be implemented with a multiplexer whose select lines are driven by the address signal and whose inputs are the values of the elements contained in the array. These values can either be hard-wired, as in an ASIC which purpose is specific to a function, or provided by D latches which allow for configurable values. An n-bit LUT can encode any n-input Boolean function by storing the truth table of the function in the LUT. This is an efficient way of encoding Boolean logic functions.

In the example shown in the arrangement 65a, a hardware only implementation may be used to implement the mapping functionality 67, such as a memory or PLD 67a. Alternatively or in addition, a mapping functionality 67b may be based on a processor 64 and a memory 69 as shown in an arrangement 65b in FIG. b. The received N bits on input 66a are stored in a temporary input memory 68a, which may be a register, a shift register, a buffer, or any other memory suitable to store the received N bits. The memory 69 includes firmware or software for operating the processor 64, and further store the transfer function relating the compression, so that the processor 64 may apply the de-compression information stored in the memory 69 to the data in the register 68a, and provide an output M bits to an output register 68b (or other temporary memory), to be fed to the output 66b. For example, the processor 64 may calculate a bit at a time and sequentially write the calculated bits to the register 68b.

Figure 7:
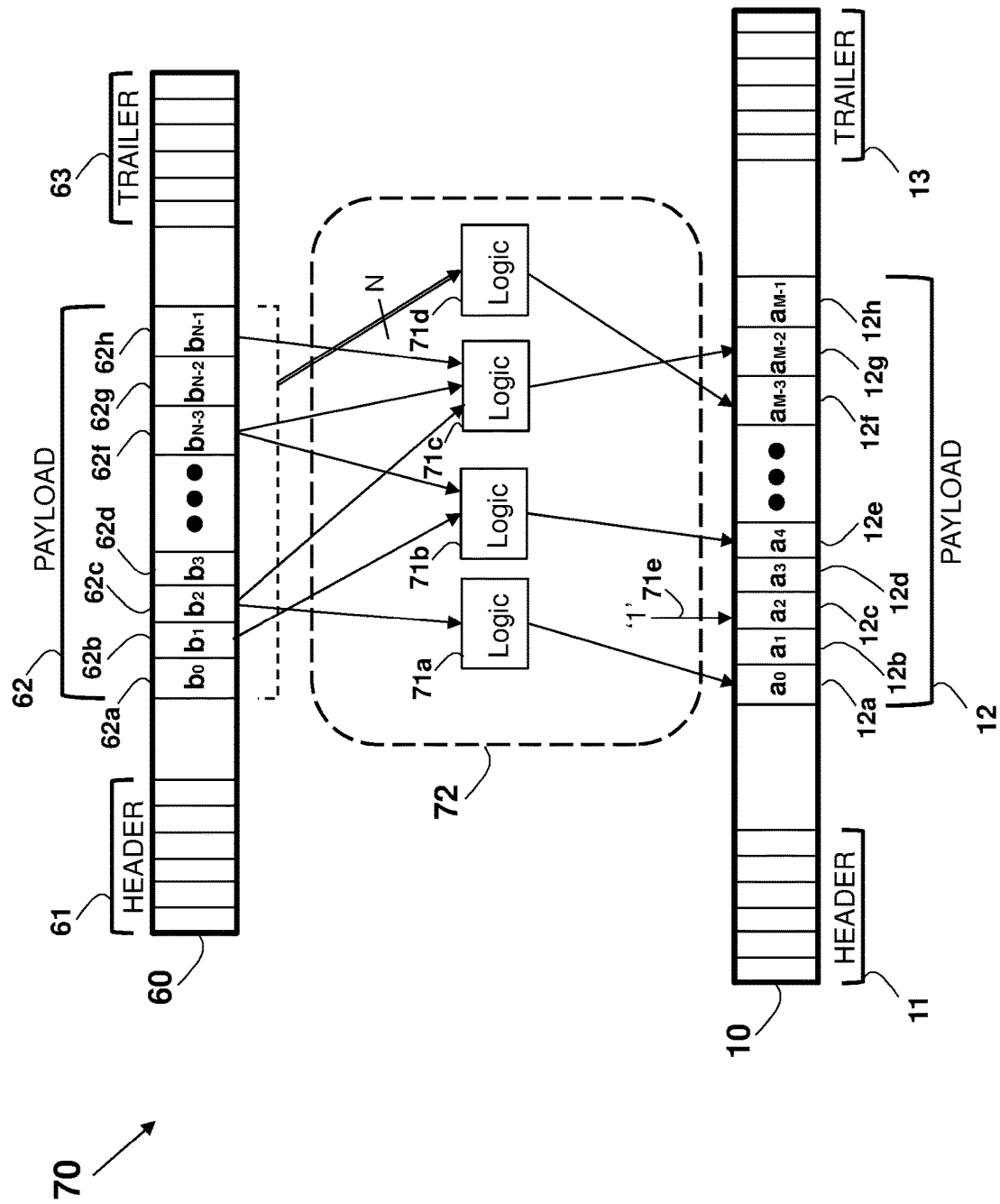
FIG. 7 illustrates schematically general reconstructing a frame from a received compressed frame using a combinatorial logic.
Figure 7A:
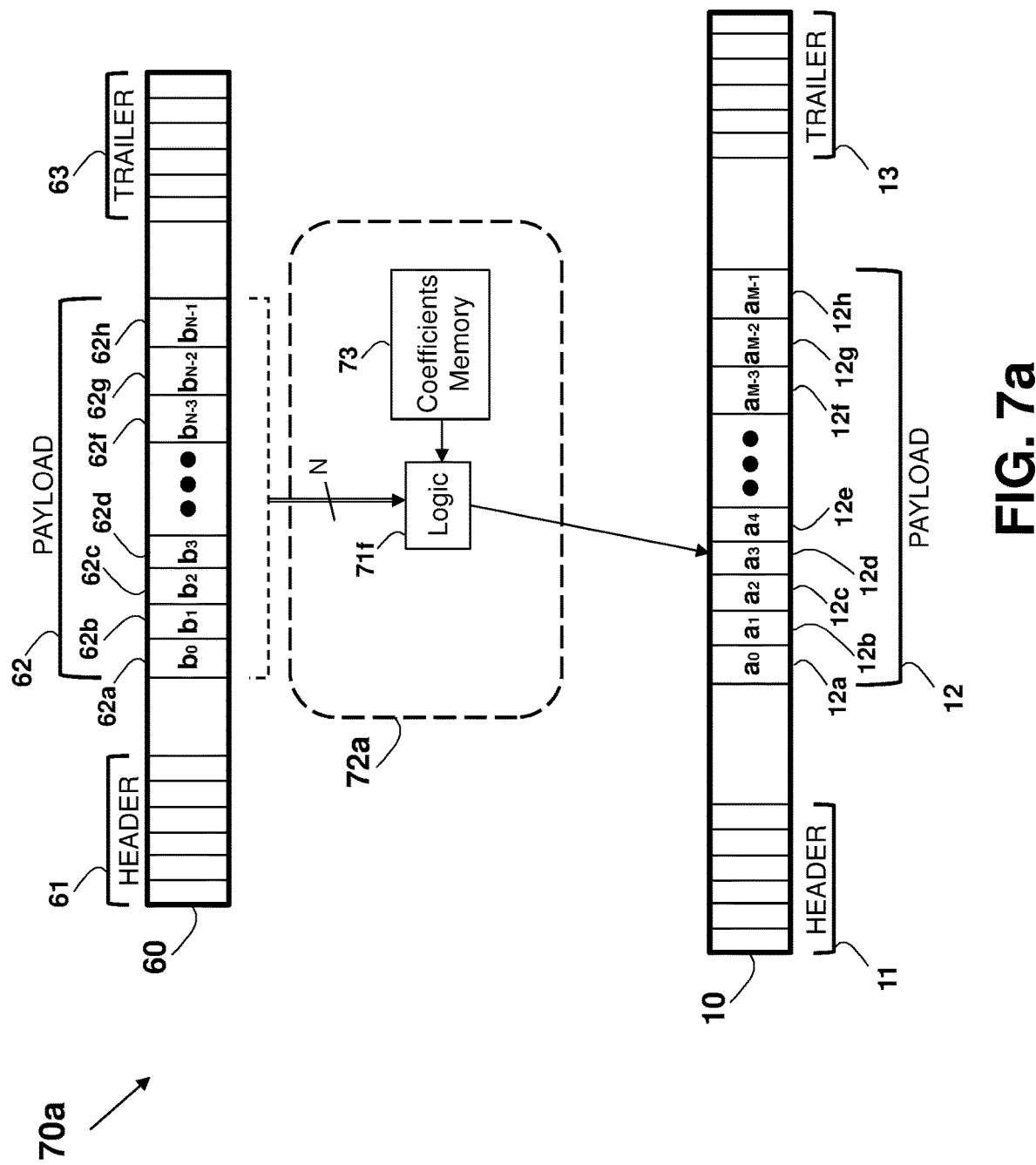
FIG. 7a illustrates schematically general reconstructing a frame from a received compressed frame using a combinatorial logic based on stored coefficients.

An example of using logic gates to implement a combinatorial function 72 to form the mapping functionality 67 is described in an arrangement 70 shown in FIG. 7. In one example, one or more bits, such as indicator bits, may be assigned a fixed value, such as '0' or '1'. In such a case, the mapping functionality 72 output the fixed value to the relevant location. For example, the location $a_2$ 12c is shown as being always assign a value of '1' via an output 71e. Further, one or more bits may be assigned a value depending on only a single input bit. For example, the location $a_0$ 12a is shown as being affected only by the input $b_2$ 62c. In such a case, a logic circuit 71a having a single input and a single output is used, which may transfer the actual value of the input bit or its inverse value. Similarly, one or more bits may be assigned a value depending on two input bits. For example, the location $a_4$ 12e is shown as being affected only by the two inputs $b_1$ 62b and $b_{N-3}$ 62f. In such a case, a logic circuit 71b having two inputs and a single output is used, which may perform any Boolean action on the two inputs, such as 'AND', 'OR', 'NAND', 'NOR', 'XOR', or 'NXOR'. Similarly, one or more bits may be assigned a value depending on three input bits. For example, the location $a_{M-2}$ 12g is shown as being affected only by the three inputs $b_2$ 62c, $b_{N-3}$ 62f, and $b_{N-1}$ 62h. In such a case, a logic circuit 71c having three inputs and a single output is used, which may perform any Boolean action on the three inputs. Similarly, one or more bits may be assigned a value depending on all N input bits. In such a case, a logic circuit 71d having N inputs and a single output is used, which may perform any Boolean action on the N inputs as required.

While in the example of the arrangement 70 shown in FIG. 7 a single location or bit $a_2$ 12c is assigned a fixed '1' value 71e regardless of any other bit or location in the payload 62, any number of bits or locations may equally be set to a fixed value of '1' or '0', regardless of any other bit or location in the payload 62. For example, the number of bits or locations from the M bits or locations of the payload 12 that may be assigned as '0' or '1' for any compressed payload 62 may be equal to, less than, or more than, 2, 3, 4, 5, 7, 10, 15, 20, 30, 50, 70, or 100. Alternatively or in addition, the number of bits or locations from the M bits or locations of the payload 12 that may be assigned as '0' or '1' for any compressed payload 62 may be equal to, less than, or more than, 1%, 2%, 3%, 5%, 7%, 10%, 15%, 20%, 25%, 30%, 50%, 60%, or 70% of the M bits or locations.

In a general case, each output may be represented and mapped by a mapper 72a (that acts as a decoder or a de-compressor) as being dependent of all N input bits using a set of N+1 coefficients, as illustrated in an arrangement 70a shown in FIG. a. The set of N+1 coefficients (for each output bit) is stored in a coefficients memory 73, and is used by the logic block or functionality 71f. In the example of the arrangement 70a, only a single output bit $a_3$ 12d is illustrated for simplicity sake, while practically a set of N+1 coefficients is stored and used for each one of the M output bits, requiring the coefficients memory 73 to store M*(N+1) coefficients.

Any polynomial coefficients (referring to each term between two summations has more than one $b_i$) scheme may be used. In one example, while calculating the output bit $a_3$ 12d by the logic block 71f that is shown in the arrangement 70a in FIG. a, the one-bit coefficients set may be designated as $(c, c_0, c_1, \ldots, c_{N-1}, c_{0,1}, c_{0,2}, \ldots, c_{N-2, N-1}, c_{0,1,2}, \ldots, c_{0,1,\ldots,N-2}, \ldots, c_{1,2,\ldots,N-2,N-1})$, where the subset $(c_0, c_1, \ldots, c_{N-1}, c_{0,1}, c_{0,2}, \ldots, c_{N-2, N-1}, c_{0,1,2}, \ldots, c_{0,1,\ldots,N-2}, \ldots, c_{1,2,\ldots,N-2,N-1})$ corresponds to the N input bits $(b_0, b_1, b_2, b_3, \ldots b_{N-3}, b_{N-2}, b_{N-1})$ and c is an additional and independent coefficient. The calculation by the logic block 71f may be according to:

$$a_3 = $$
$$c \oplus$$
$$c_0 \cdot b_0 \oplus c_1 \cdot b_1 \oplus \ldots \oplus c_{N-1} \cdot b_{N-1} \oplus$$
$$c_{0,1} \cdot b_0 \cdot b_1 \oplus c_{0,2} \cdot b_0 \cdot b_2 \oplus \ldots \oplus c_{N-2,N-1} \cdot b_{N-2} \cdot b_{N-1} \oplus$$
$$\ldots$$
$$c_{0,1,\ldots N-2} \cdot b_0 \cdot b_1 \ldots \cdot b_{N-2} \oplus \ldots \oplus c_{1,2,\ldots,N-2,N-1} \cdot b_1 \cdot \ldots \cdot b_{N-2} \cdot b_{N-1},$$

where the summation '$\oplus$' is the modulo-2 summation.

Any polynomial coefficients scheme may be used. In one example, while calculating the output bit $a_3$ 12d by the logic block 71f that is shown in the arrangement 70a in FIG. a, the coefficients set may be designated as $(c_0, c_1, c_2, c_3, \ldots c_{N-3}, c_{N-2}, c_{N-1}, c_N)$, where the subset $(c_0, c_1, c_2, c_3, \ldots c_{N-3}, c_{N-2}, c_{N-1})$ corresponds to the N input bits $(b_0, b_1, b_2, b_3, \ldots b_{N-3}, b_{N-2}, b_{N-1})$ and $c_N$ is an additional and independent coefficient. The calculation by the logic block 71f may be according to: $a_3 = c_0 * b_0 + c_1 * b_1 + c_2 * b_2 + c_3 * b_3 + \ldots c_{N-3} * b_{N-3} + c_{N-2} * b_{N-2} + c_{N-1} * b_{N-1} + c_N$, where the summation is modulo-2 summation. Alternatively, the XOR function or operation (designated as '$\oplus$') may be used, to obtain $a_3 = c_0 \oplus b_0 + c_1 \oplus b_1 + c_2 \oplus b_2 + c_3 \oplus b_3 + \ldots c_{N-3} \oplus b_{N-3} + c_{N-2} \oplus b_{N-2} + c_{N-1} \oplus b_{N-1} + c_N$.

Figure 4:
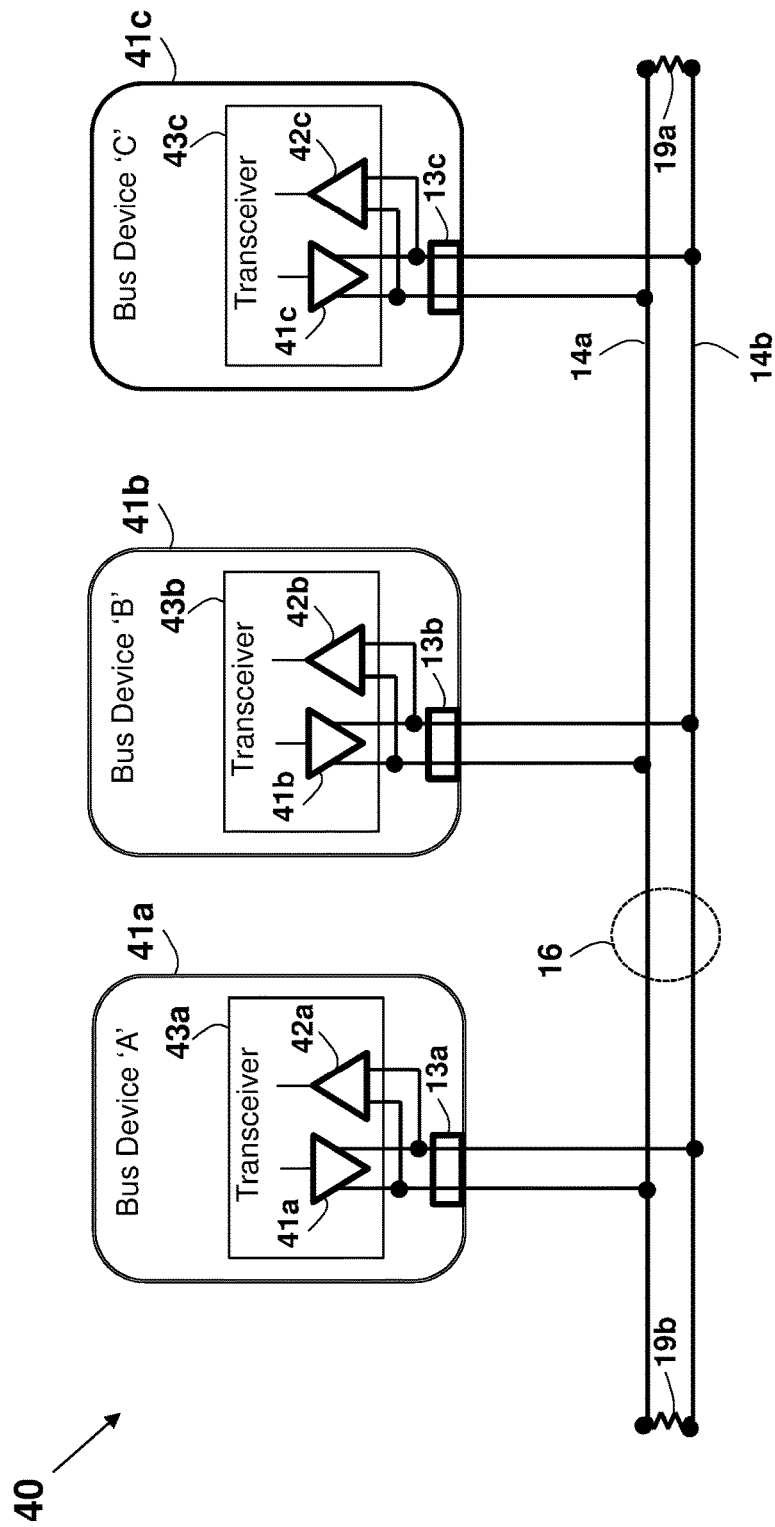
FIG. 4 illustrates schematically a block diagram of a balanced multi-point (bus) wired network.
Figure 5:
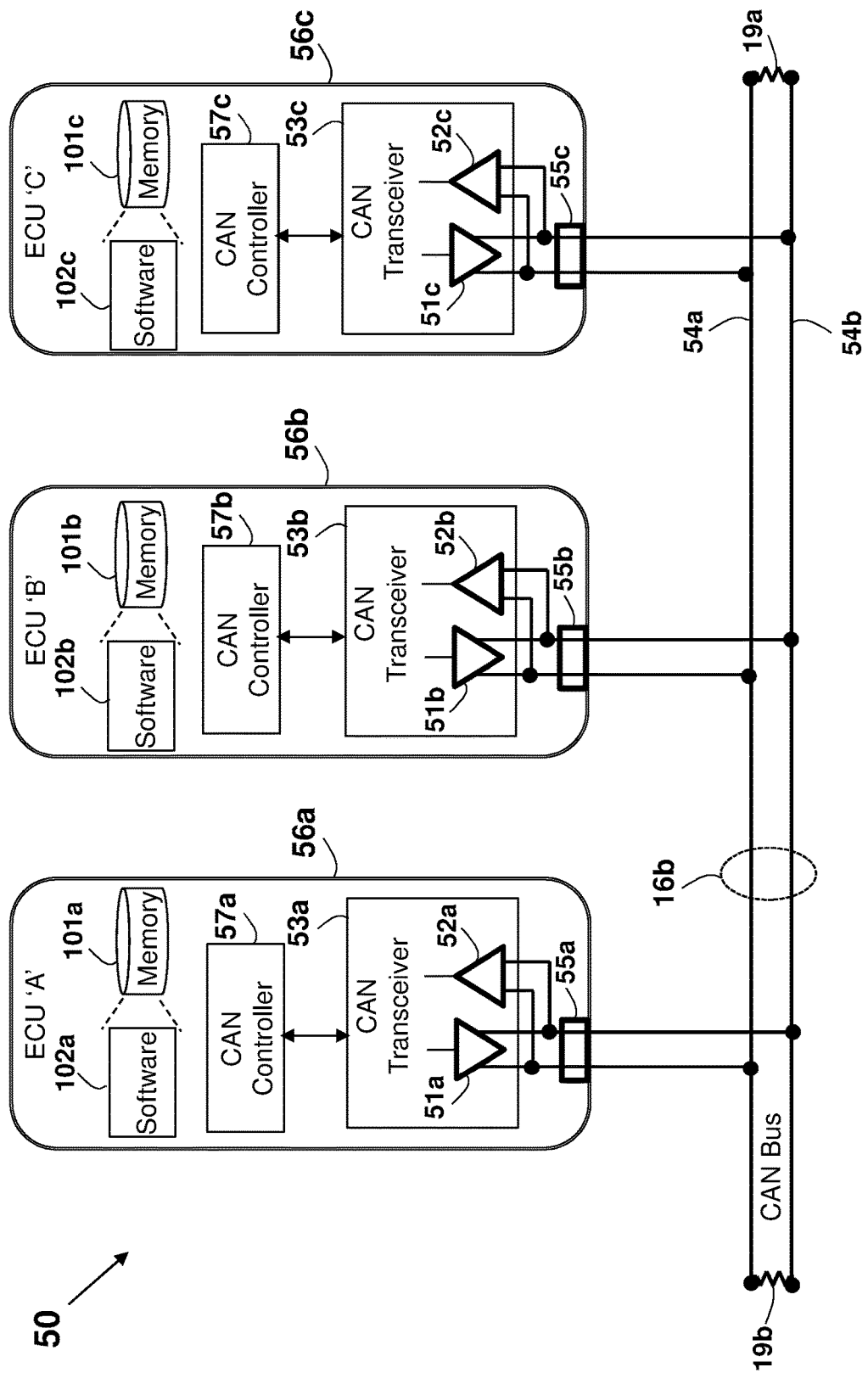
FIG. 5 illustrates schematically a block diagram of an automotive bus using a Controller Area Network (CAN) connecting multiple ECUs.

An example of a flow chart 80 of reconstructing a frame from a compressed version is shown in FIG. 8. A compressed frame, such as the frame 60 described in FIG. 6, is received as part of a "Receive Compressed Frame" step 81. The frame may be received from a communication medium, using any physical layer (OSI Layer 1) standard or protocol, such as the medium 16 shown in the arrangement 40 in FIG. 4, and may use a transceiver such as the transceiver 43a in the device 41a. The received compressed frame is Layer-2 handled, such as by a framer or controller 57a as part of the device 56a shown in FIG. 5. The payload 62 is identified and extracted as part of an "Extract Payload" step 82. The extracted payload 62 is then mapped into an output that provides the original and uncompressed payload 12 as part of a "Map Payload" step 83. The mapped payload 12 is then embedded to reconstruct the original frame 10, using Layer-2 handling, as part of a "Reconstruct Frame" step 84, and the reconstructed frame 10 may be used as part of a "Transmit/Use Reconstructed Frame" step 85. For example, the reconstructed frame 10 may be transmitted over a communication medium using any physical layer scheme.

The compressed frame 60 received as part of the "Receive Compressed Frame" step 81, may be according to, or based on, a protocol, such as any OSI Layer-2 protocol, that may be the same or different from the protocol used by the constructed frame 10 as part the "Reconstruct Frame" step 84. For example, the same or different frame structure, data rate, fields and indicators locations and definitions may be used. In the case wherein different protocols are used, the flow chart 80 may be part of, or may further include, a protocol conversion scheme. Any protocol herein, may consist of, may include, may be based on, or may be according to, an Open Systems Interconnection (OSI) Layer-3 or Layer-4 standard protocol, that may consist of, may include, may be based on, or may be according to, ISO 15765-2 standard, such as ISO 15765-2:2004 ISO-TP (Transport Layer) standard.

In one example, the ratio M/N may be used as a compression ratio that may be used quantify the reduction in the data representation size produced by the compression algorithm or method herein. Such a ration affectively estimates or measures the data rate reduction of carrying the data or the payload. For example, the ration M/N may be equal to, more than, or less than, 1.1, 1.2, 1.5, 2, 2.5, 3, 3.5, 5, 7, 10, 15, 20, 30, 50, or 100.

Alternatively or in addition, the ratio $2^M/2^N = 2^{M-N}$ may be used as a compression ratio that may be used quantify the reduction in the data representation size produced by the compression algorithm or method herein. Such a ration affectively estimates or measures the number of possible values in the output before compression versus the number of possible values after compression. For example, the ration $2^{M-N}$ may be equal to, more than, or less than, 2, 4, 8, 16, 32, 64, 128, 256, 512, 1024, or 2048.

The number N of bits in the payload 62 may be equal to, more than, or less than, 4, 8, 12, 16, 32, 64, 128, 256, 512, or 1024. Similarly, the number M of bits in the payload 12 may be equal to, more than, or less than, 4, 8, 12, 16, 32, 64, 128, 256, 512, or 1024.

In one example, the flow chart 80 is executed in real-time. For example, a frame received as part of the "Receive Compressed Frame" step 81 is immediately handled (as practical), and processed 'as it happens' as described in the flow chart 80 fast enough to keep up with the frame receiving rate. In one exemplary scenario, the full handling of a received frame as part of the "Receive Compressed Frame" step 81 is completed before the completion of the receiving of a next received frame. Further, the average or temporary rate of the transmitting or using the constructed frames as part of the "Transmit/Use Reconstructed Frame" step 85 is equal to, or higher than, the rate of frames reception as part of the "Receive Compressed Frame" step 81. Any compression herein may be a dictionary-based compression.

Figure 9:
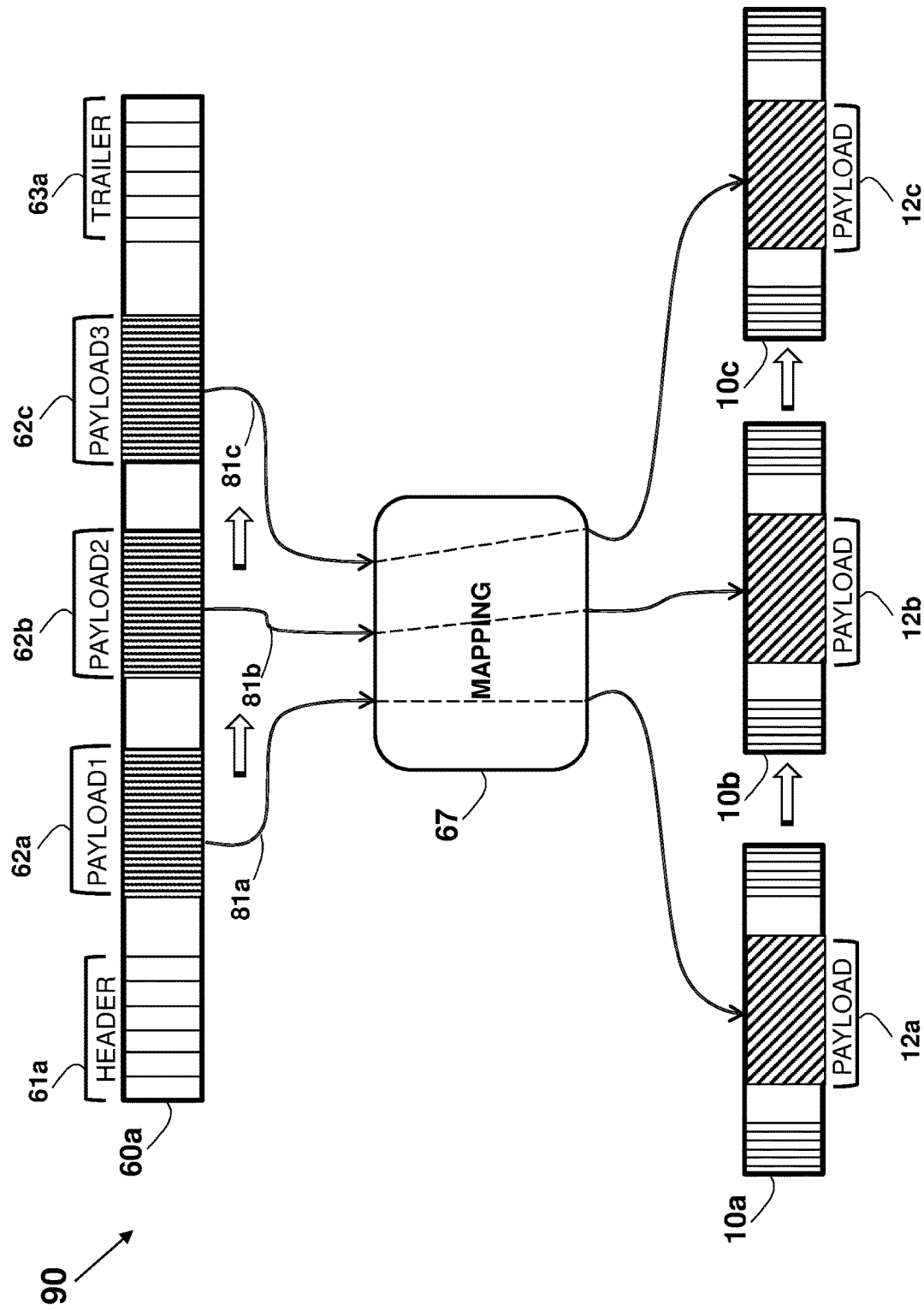
FIG. 9 illustrates schematically general reconstructing three frames from a received single compressed frame.

The arrangement 65 shown in FIG. 6 illustrates a single received compressed frame 60 that is used to reconstruct a single original frame 10 using a mapping functionality 67. In order to achieve a better efficiency or a higher data rate, a single compressed frame may include compressed information that is a compressed version of multiple payloads associated with multiple frames. Such an arrangement 90 is shown in FIG. 9, where a single received frame 60a, corresponding to the frame 60 described above, includes three compressed payloads, designated as a PAYLOAD1 62a, a PAYLOAD2 62b, and a PAYLOAD3 62c, each may corresponds to the payload 62 described above. First, the first payload PAYLOAD1 62a is fed (shown as a line 81a) to the mapping functionality 67, and an output uncompressed payload 12a is used to reconstruct a first original (uncompressed) frame 10a. Second, the second payload PAYLOAD2 62b is fed (shown as a line 81b) to the mapping functionality 67, and an output uncompressed payload 12b is used to reconstruct a second original frame 10b, and third, the third payload PAYLOAD3 62c is fed (shown as a line 81c) to the mapping functionality 67, and an output uncompressed payload 12c is used to reconstruct a third original frame 10c. Such configuration may be particularly effective if M/N<3. For example, in case where M=64 and N=16, the payload size of the frame 60a may be 3*16=48 bits, which may be implemented as a frame of 64 bits payload, and each reconstructed frame 10a, 10b, and 10c includes a 64 bits payload. Since the non-payload part of the compressed frame 60a includes a single header 61a and a single trailer 63a are used only as part of the frame 60a, the efficiency is improved over using three such headers and trailers.

While the configuration exampled in the arrangement 90 involves compression of three frames into a single compressed frame, any number of such compression may be used, such as including payloads of 2, 4, 5, 6, 7, 8, 10, 15, 20, 50, 70, or 100 uncompressed frames.

Carrying or encapsulating of multiple payloads or frames as part of a single message (such as a single packet) or in multiple messages (such as multiple packets), or the carrying or encapsulating carrying a single payload or frame in a single message (such as a single packet) or in multiple messages (such as multiple packets), may be according to any OSI layer 3 (Network Layer) or Layer 4 (Transport Layer) standard or non-standard protocol. In one example, the protocol may be according to, compatible with, based on, or use, ISO 15765-2 protocol, such as ISO 15765-2:2004 ISO-TP (Transport Layer) standard.

Few of the methods described herein allows for carrying of frames over a communication medium that are shortened in length/size, yet carrying the required information, by using a compressed version of it. In one example, the shortened frames may be used to carry additional information. For example, the arrangement 65 above describes the frame 60 as carrying the payload 62 consisting of N bits or locations. The protocol used to carry the frame 60 may dictate a fixed payload length of Q bits, thus Q–N bits or location are vacated or not used. In the case where the frame 10 is using the same protocol as the frame 60, then Q=M, and the number of empty locations in the fame 60 may be calculated as M–N. In such a case, an additional information field that uses up to Q–N (or M–N) bits may be carried over the compressed frame 60, in addition to carrying the primary data that was compressed. In case where the additional information utilizes less than the Q–N (or M–N) bits, an affective compression may still be achieved.

In a numerical example, the frames 60 and 10 are both using a protocol that uses a fixed-length payload of 64 bits (Q=M=64). Assuming a bit (or data rate) compression ratio of 4, the compressed payload 62 requires only (64/4=) N=16 bits, leaving up to 64−16=48 bits for carrying additional information. Assuming only 16 bits are used for the additional information, then the affective total payload carried in the frame 60 is 32 bits, reflecting an affective compression ratio of 2 (=64/32). The frame 60 may then be carried as 32 bits only payload, providing both a compression benefit and the benefit of carrying additional information.

Figure 10:
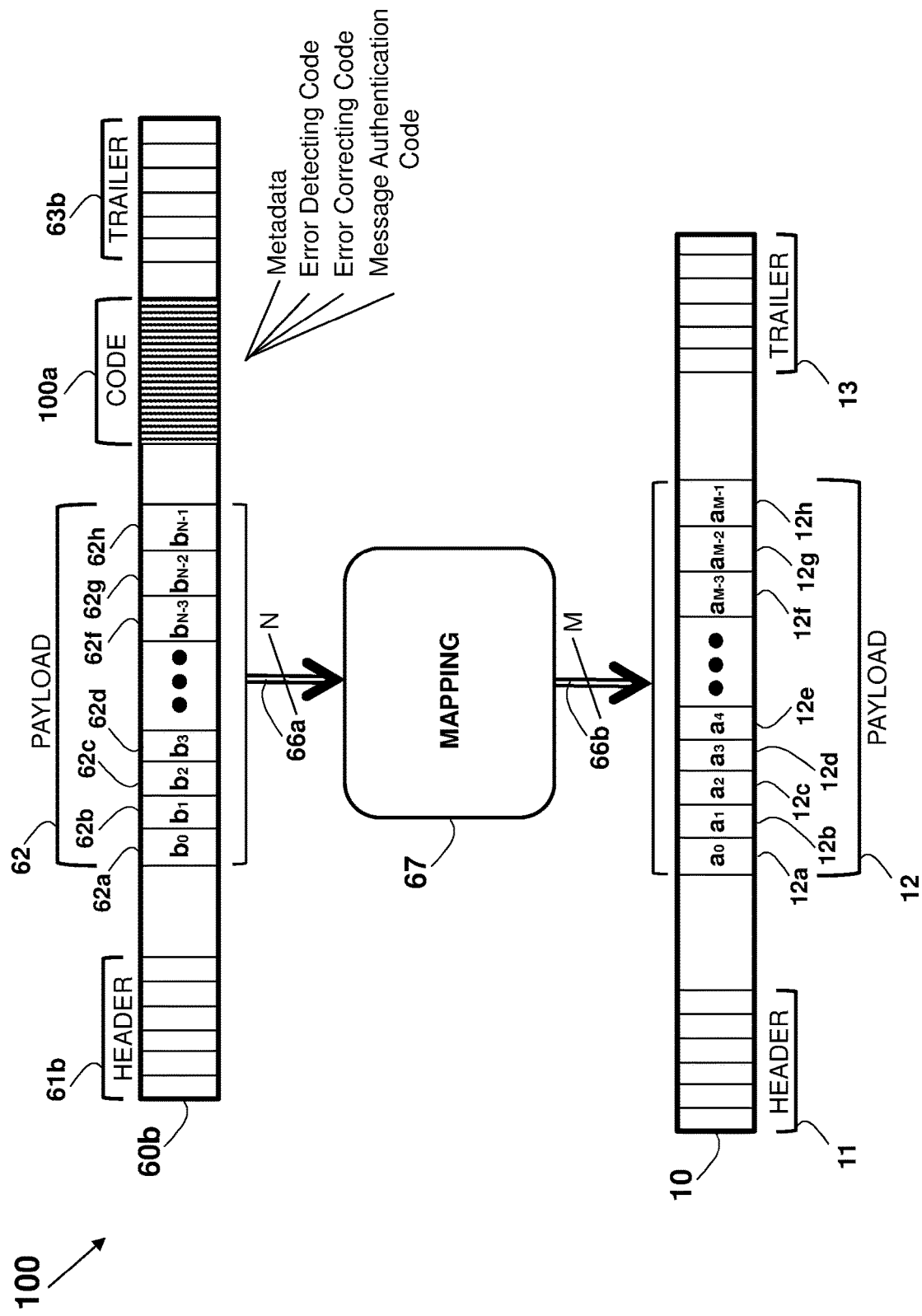
FIG. 10 illustrates schematically general reconstructing a frame from a received compressed frame that includes an added code field.

An example of a frame 60b that carries an additional information 100a is illustrated in an arrangement 100 shown in FIG. 10, where the additional information 100a is designated as 'CODE' field. The code field 100a may carry information that may be related to the payload 62, may be related to the frame 60b, or may be related to the communication network, protocol, or medium, carrying the frame 60b. In one example, the code field 100a is used for Layer-2 handling of the frame 60b, such as adding features or functionalities that are not defined, or are not mandatory, in the protocol used to carry the frame 60b. Alternatively or in addition, the code field 100a may be used for support, features, or functionalities relating to OSI Layer-3, Layer-4, Layer-5, Layer-6, or Layer-7.

In one example, the code field 100a is used to carry metadata, which may relate to the payload 62 carried in the same frame, or metadata of other information or file. Such metadata may be in XML format. Alternatively or in addition, additional information carried in the frame 60b may be used for implementing any error detecting scheme, and the code 100a may include one or more parity bits, a checksum, or a CRC. The code 100a may be used to detect errors in any information or message, such as in the whole frame 60b, the whole frame 10, the payload 62, or the payload 12. Alternatively or in addition, additional information carried in the frame 60b may be used for implementing any error correcting scheme, such as a Forward error correction (FEC), and the code 100a may include an Error-Correcting Code (ECC). The code 100a may then be used to correct errors in any information or message, such as in the whole frame 60b, the whole frame 10, the payload 62, or the payload 12.

Alternatively or in addition, an authentication scheme may be used, and the code field 100a is used to carry information for supporting the authenticity of the frame 60b (or of the frame 10). For example, the authentication scheme may use, or be based on, Message Authentication Code (MAC), Authenticated Encryption (AE), or digital signatures, and the code carried in the code field 100a may comprise a cryptographic key, a digital signature, or a MAC, such as HMAC. Further, additional information may be carried in the code field 100a for supporting the authentication scheme, such as Encryption Key identification, replay attack countermeasures such as counters, Key exchange information such as Random numbers, or supporting data if an additional frame is required, such as a frame sequence number. MAC may also be implemented by adding a known number to plaintext and then encrypting the whole frame with optional additional information as described for the MAC algorithm.

Figure 11:
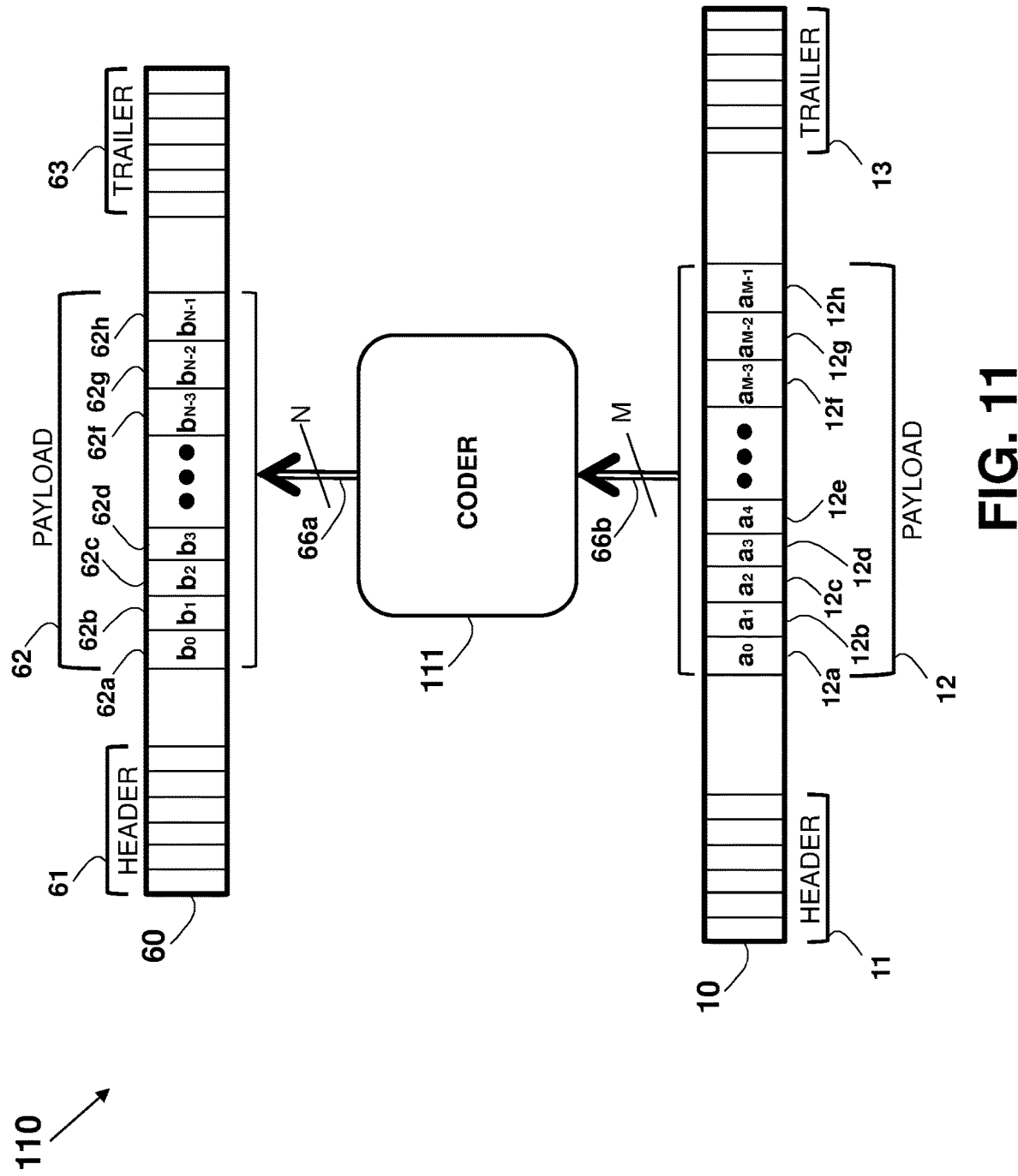
FIG. 11 illustrates schematically general compressing of a frame from a received uncompressed frame.

Generally, the compression of the frame 10 to obtain a compressed frame 60 may be performed by reversing the steps or direction of the de-compression scheme described herein. A schematic arrangement or method 110 of constructing by using decompression of the frame 60 from an obtained or received compressed frame 10 is shown in FIG. 11.

The M bits forming the payload 12 of the frame 10 are orderly extracted from the frame 10, and are fed as input 66b, via a bus, a physical connection, or as software or firmware variable, to a coder block or functionality 111. For each value of the input 66b, the coder functionality 111 assign a set of N bits, which are fed via output 66a to form the payload 62 of the compressed frame 60.

Figure 11A:
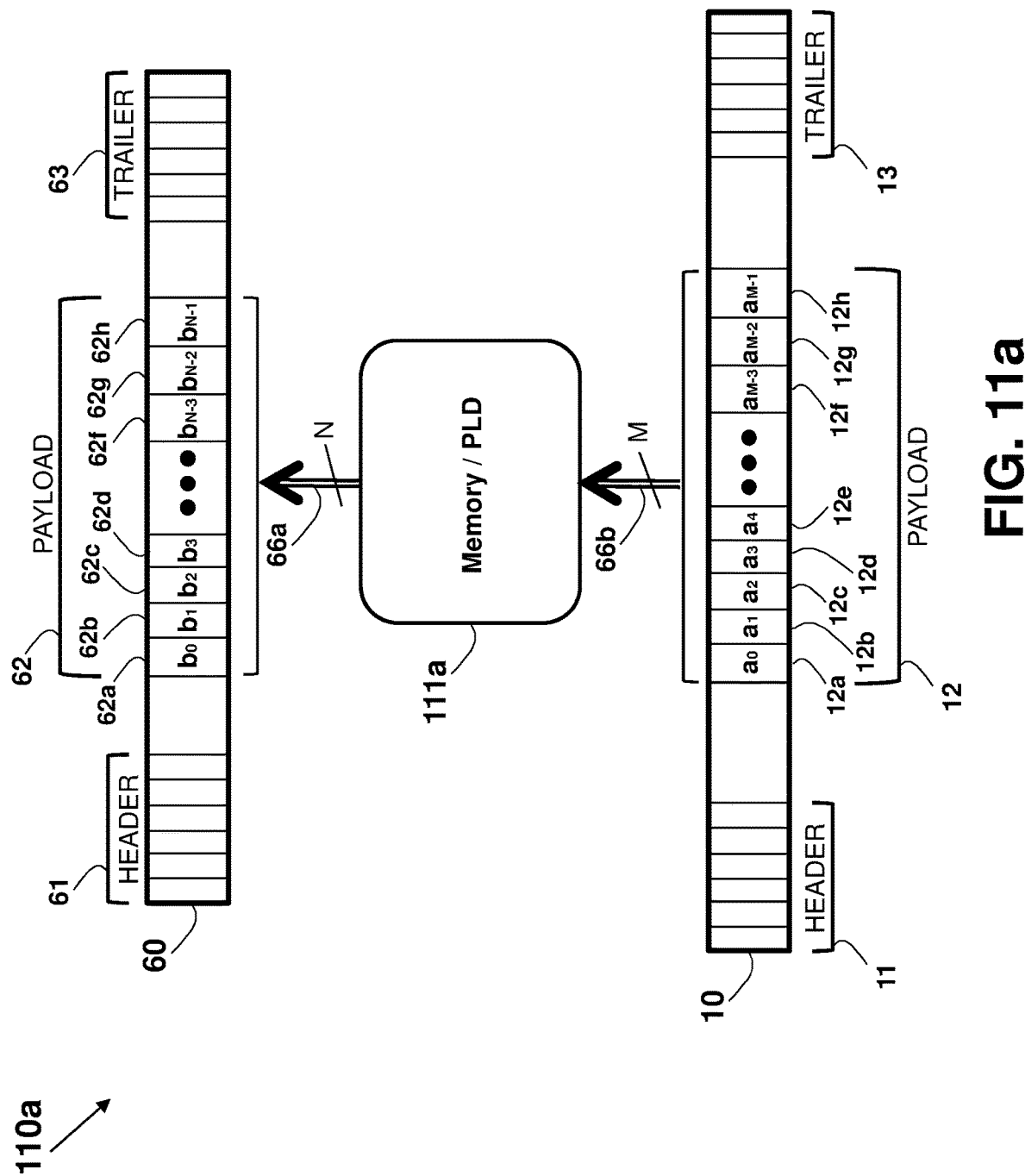
FIG. 11a illustrates schematically general compressing of a frame from a received uncompressed frame using a memory or PLD.

The mapping functionality 111 may be implemented using a memory 111a as shown in an arrangement 110a shown in FIG. 11a, where the memory 111a serves as a Look-Up Table (LUT). In such a configuration, the input M bits 66b are used as an input providing an address to the memory 111a, and the data stored at the input address is the N bits output 66a.

In one example, the compression is stateless. Hence not dependent upon any former data, but rather may be represented as a combinatorial logic applied to the input M bits 66b, to produce the N bits output 66a. Such combinatorial logic may be implemented using logic gates that perform a logical operation on one or more binary inputs and produces binary outputs.

Logic gates are primarily implemented using diodes or transistors acting as electronic switches. With amplification, logic gates can be cascaded in the same way that Boolean functions can be composed, allowing the construction of a physical model of all of Boolean logic, and therefore, all of the algorithms and mathematics that can be described with Boolean logic. Logic circuits include such devices as multiplexers, registers, Arithmetic Logic Units (ALUs), and computer memory. In modern practice, most gates are made from field-effect transistors (FETs), particularly metal-oxide-semiconductor field-effect transistors (MOSFETs). Compound logic gates AND-OR-Invert (AOI) and OR-AND-Invert (OAI) are often employed in circuit design because their construction using MOSFETs is simpler and more efficient than the sum of the individual gates.

Hence, alternatively or in addition to using a memory, a PLD 111a may be used for obtaining the required N bits output 66a as a function of the M bits input 66b. For example, the lookup table functionality may be implemented with a multiplexer whose select lines are driven by the address signal and whose inputs are the values of the elements contained in the array. These values can either be hard-wired, as in an ASIC which purpose is specific to a function, or provided by D latches which allow for configurable values. An n-bit LUT can encode any n-input Boolean function by storing the truth table of the function in the LUT. This is an efficient way of encoding Boolean logic functions.

Figure 11B:
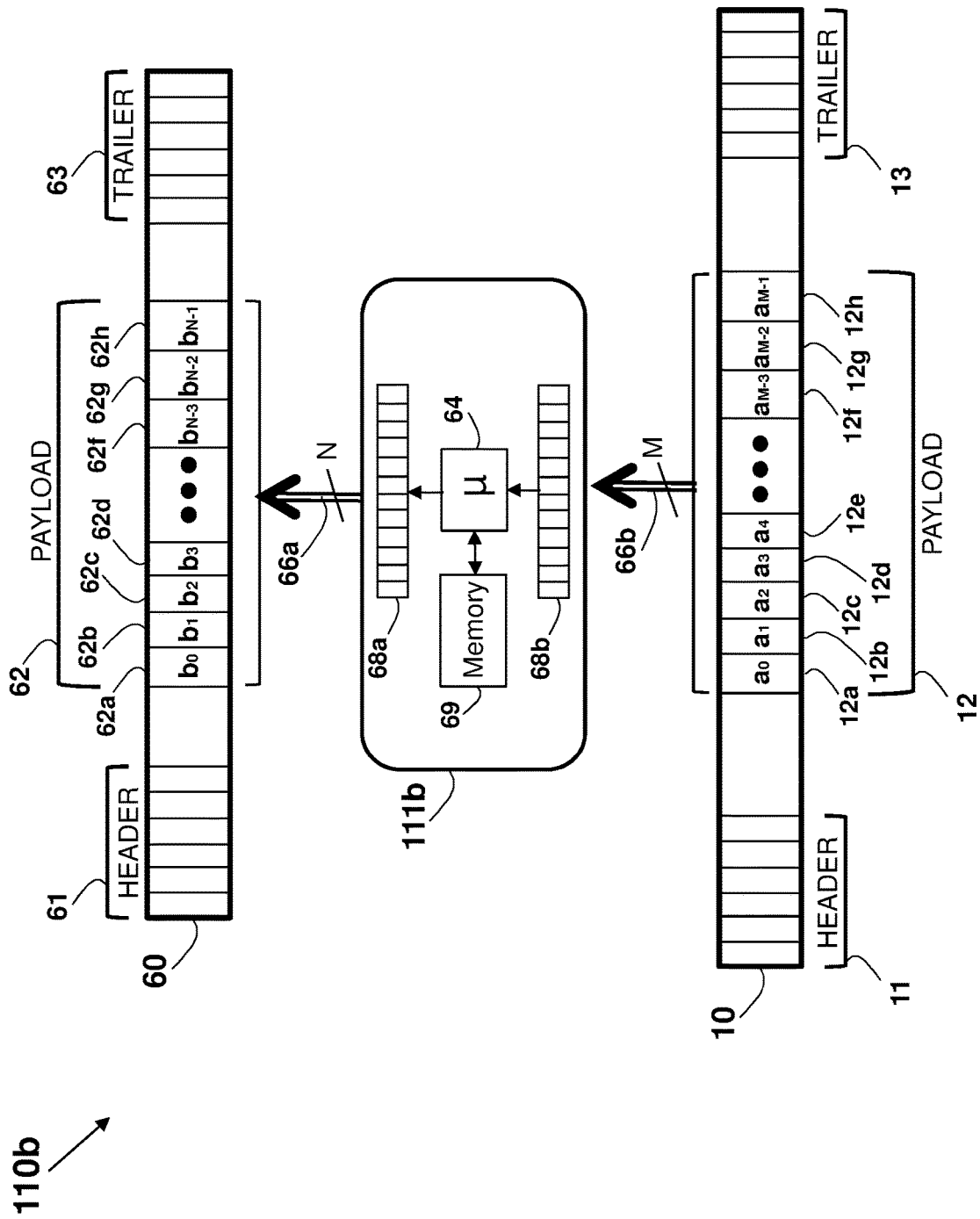
FIG. 11b illustrates schematically general compressing of a frame from a received uncompressed frame using a processor.

In the example shown in the arrangement 110a, a hardware only implementation may be used to implement the coder functionality 111, such as a memory or PLD 111a. Alternatively or in addition, a coder functionality 111b may be based on a processor 64 and a memory 69 as shown in an arrangement 110b in FIG. 11b. The received M bits on input 66b are stored in a temporary input memory 68b, which may be a register, a shift register, a buffer, or any other memory suitable to store the received N bits. The memory 69 includes firmware or software for operating the processor 64, and further store the transfer function relating the compression, so that the processor 64 may apply the compression information stored in the memory 69 to the data in the register 68b, and provide an output N bits to an output register 68a (or other temporary memory), to be fed to the output 66*a*. For example, the processor 64 may calculate a bit at a time and sequentially write the calculated bits to the register 68*a*.

Figure 10A:
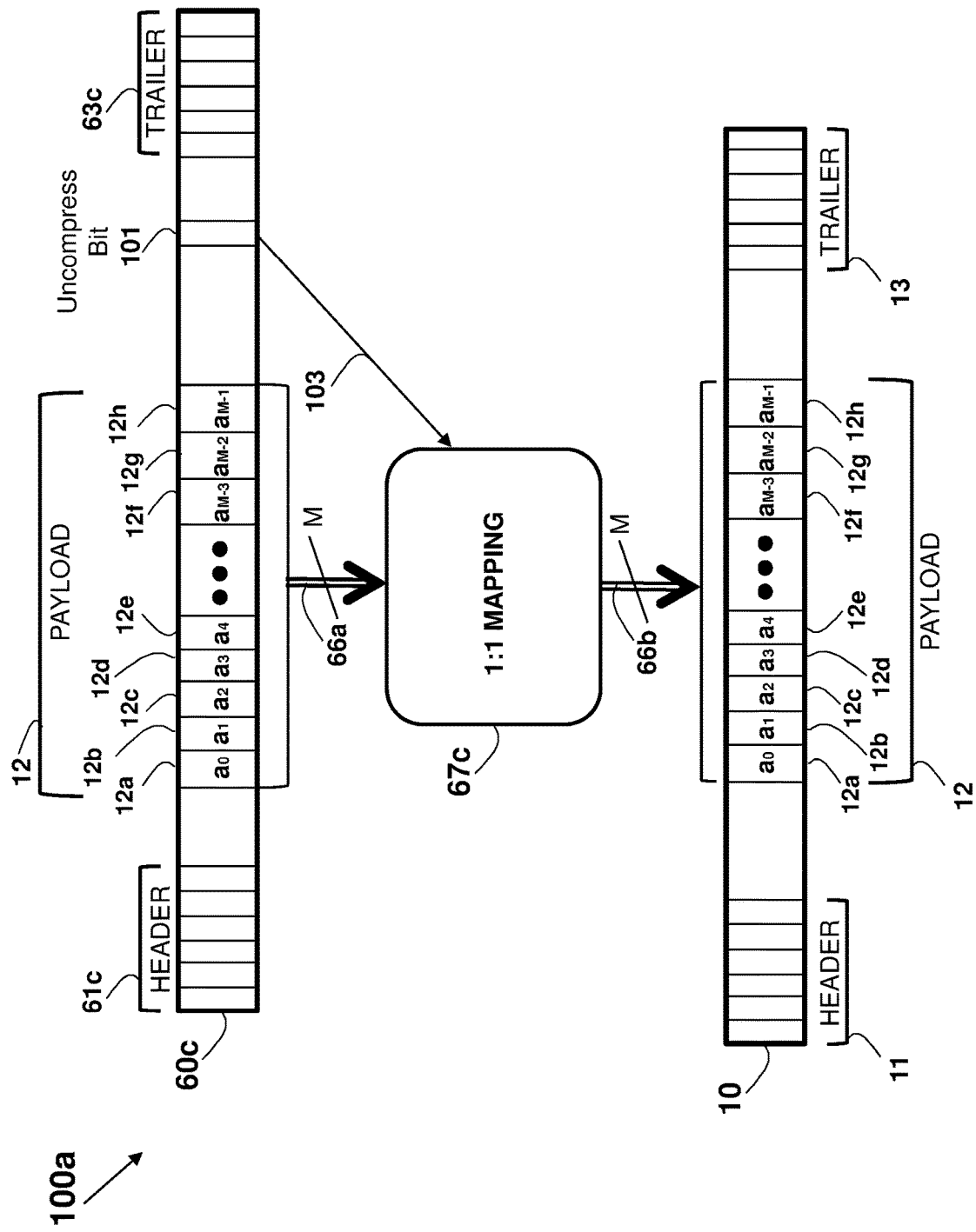
FIG. 10a illustrates schematically general reconstructing an unchanged frame from a received compressed frame having an indicator.
Figure 11C:
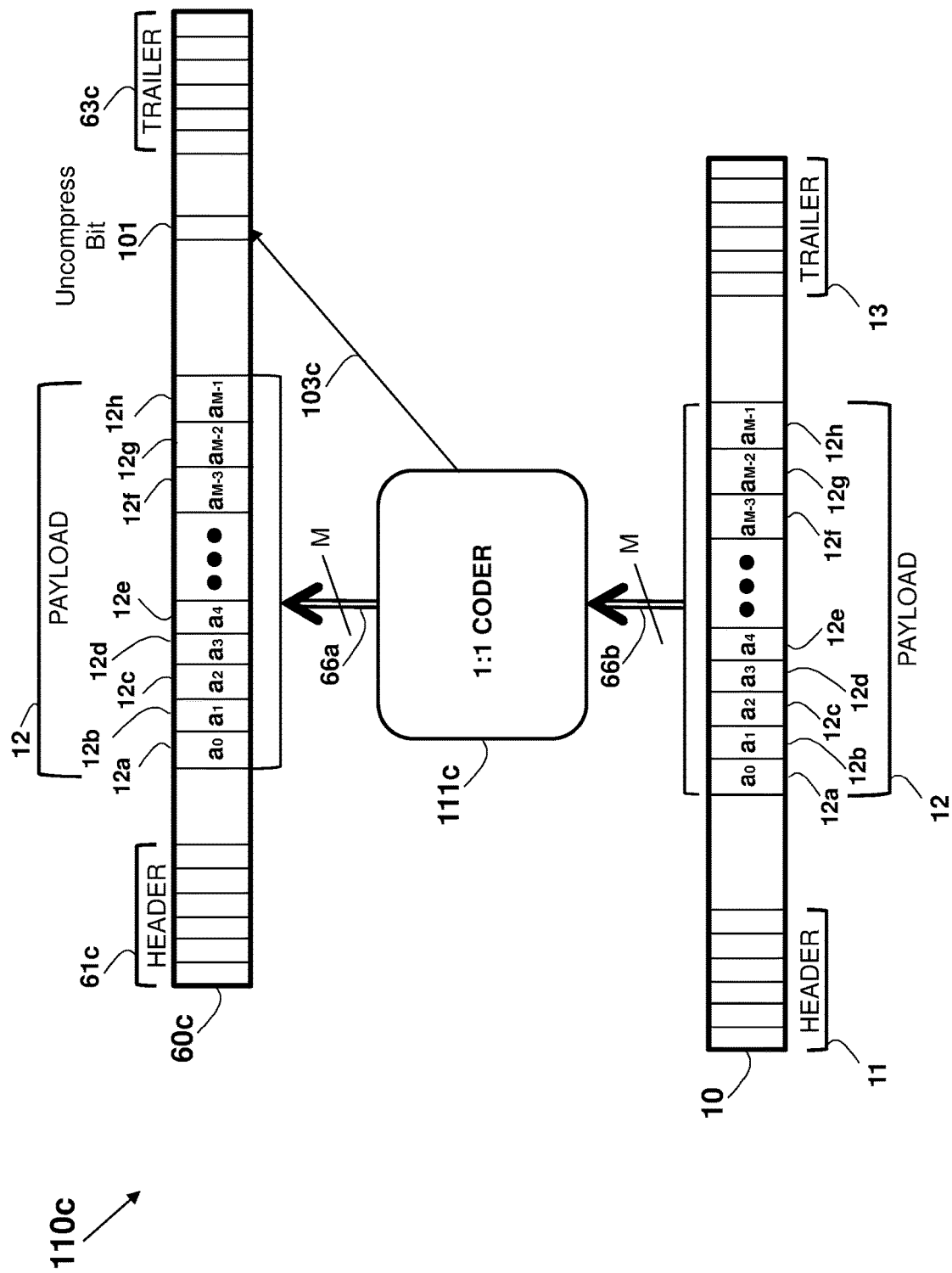
FIG. 11c illustrates schematically general uncompressing of a frame from a received uncompressed frame and generating an indicator.

The compression scheme herein assumes that the number of possible permutations of the payload 12 having M bits is equal or less than $2^N$, and thus may be represented by N bits payload 62. However, while in general this may be the case, occasionally (preferably seldom) a received payload may be beyond the expected $2^N$ possible permutations. In such a case, the described compression may not be viable. Handling such a preferably rare case is described as part of an arrangement 110*c* shown in FIG. 11*c*. When a received payload 12 cannot be compressed, it may be copied without any manipulation or compression to an output 'compressed' frame 60*c* (that is actually uncompressed), that further comprises a respective suitable header 61*c* and a respective suitable trailer 63*c*. The coder 111*c* is actually a 1:1 (same to same unchanged mapping) mapper that only transfer the payload 12 without any manipulation or change to the output frame 60*c*. In order to notify the receiver that the frame 60*c* comprises the unchanged or uncompressed payload 12, the frame may further include an indicator 'Uncompress Bit' 101 (generated by the 1:1 coder 111*c*). For example, when this bit is set, it represents that the payload 12 carried is the original one and is thus uncompressed, while when this bit is reset, it represents that the payload 62 carried in the original one and is thus compressed according to rules described herein. The expanding of the frame 60*c* by a receiver is illustrated in an arrangement 100*a* shown in FIG. 10*a*. Upon recognizing the receipt of the frame 60*c* having the indicator bit 101, the 1:1 mapping 67*c* functionality is employed, which ignore any other rules but only transfer the received payload 12 unchanged to the uncompressed original frame 10. The compression efficiency is reduced according to the number of frames having payloads that cannot be compressed. For example, in the case the number of payloads that cannot be compressed is 1% of the received frames, than the compression efficiency is reduced by 1%.

Figure 14:
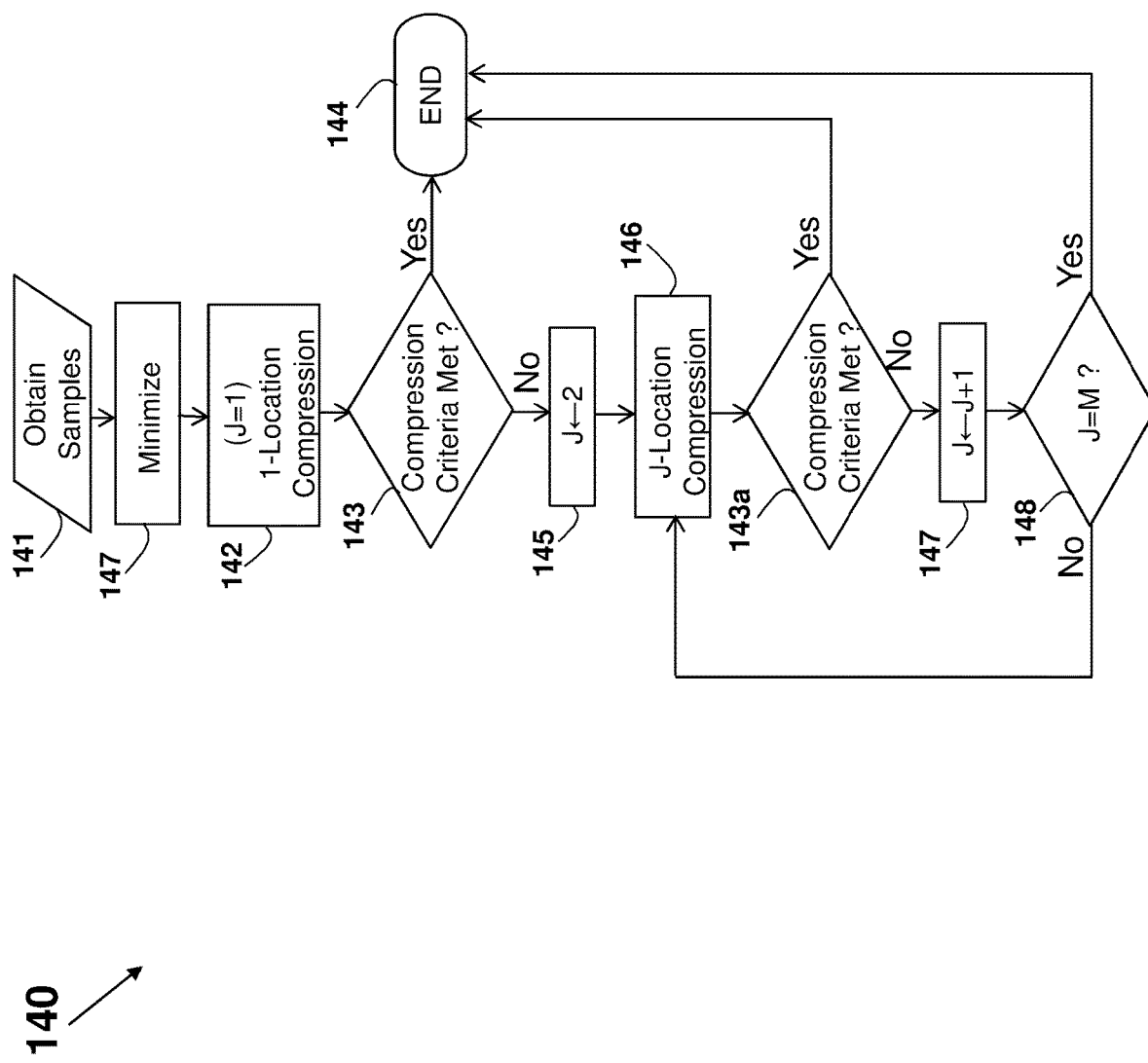
FIG. 14 illustrates schematically a simplified flowchart of forming of a compression scheme from obtained samples.
Figures 1, 14:
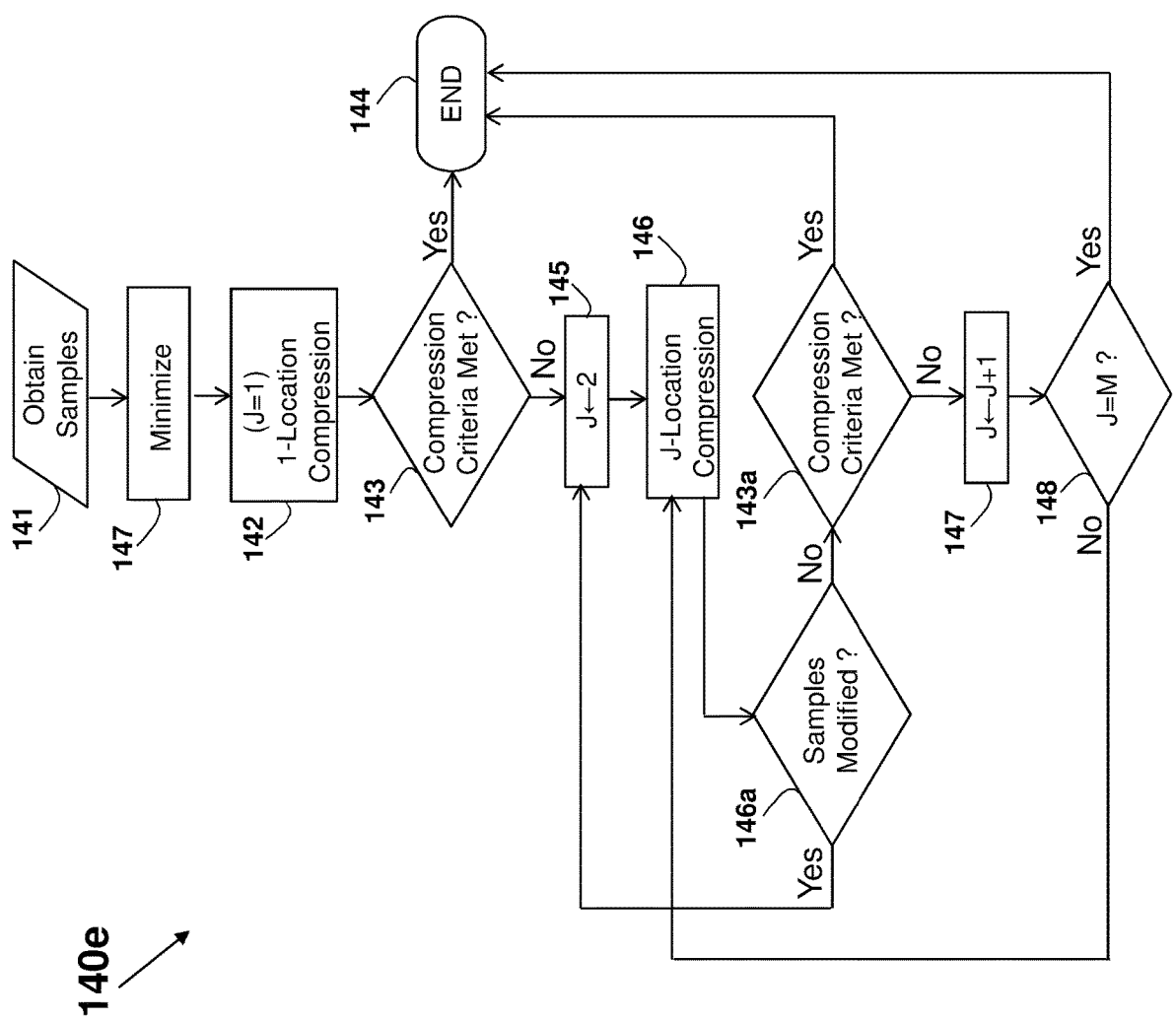
Figure 14A:
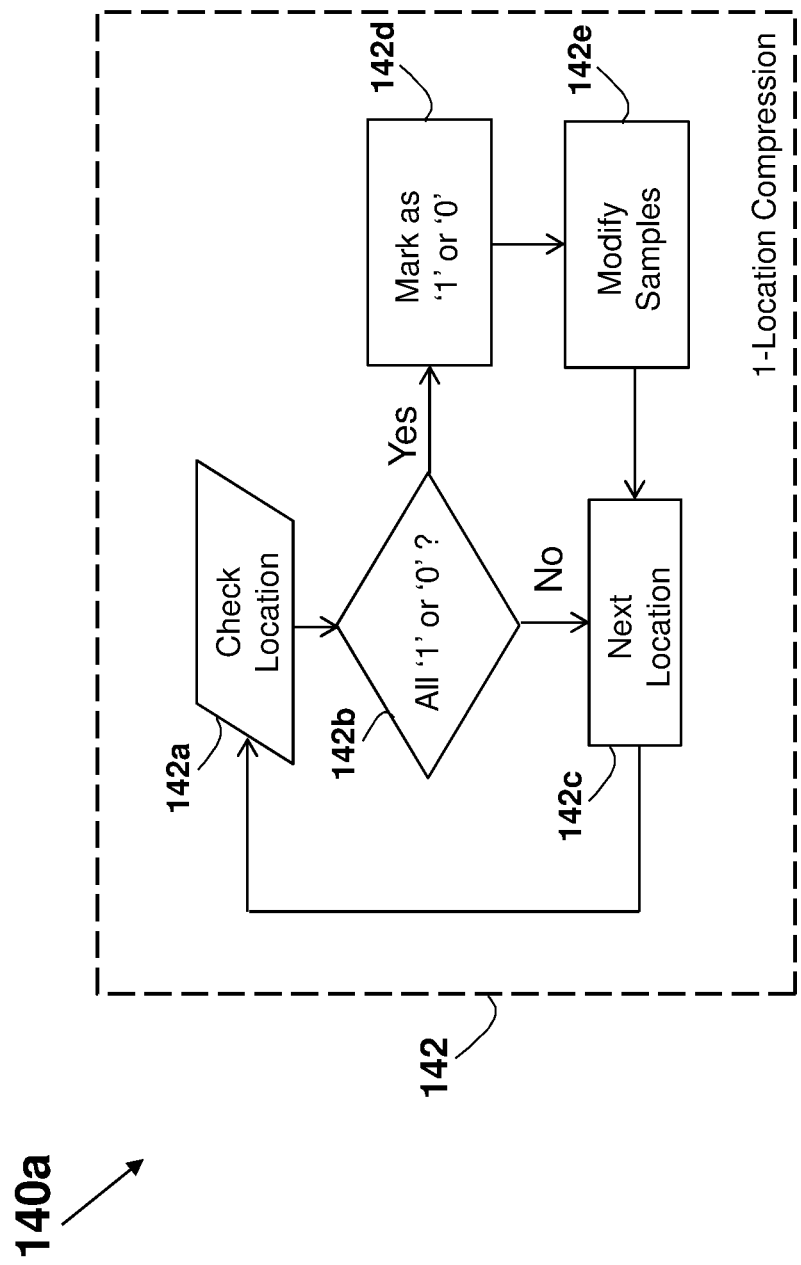
FIG. 14a illustrates schematically a simplified flowchart of forming of a compression scheme using a single location.
Figure 14B:
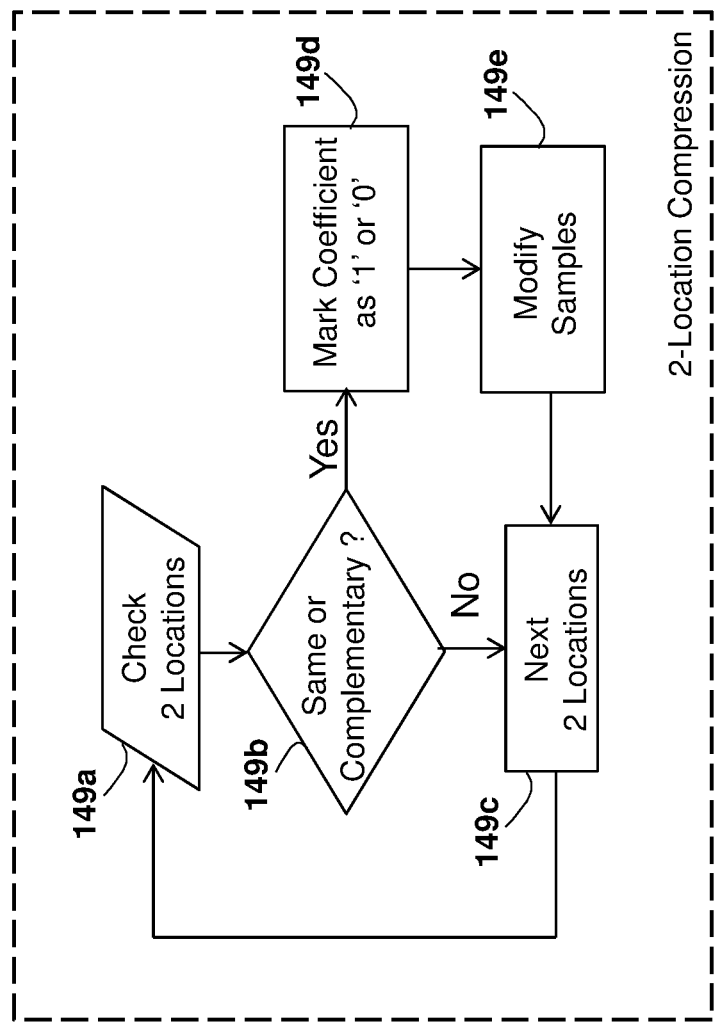
FIG. 14b illustrates schematically a simplified flowchart of forming of a compression scheme using two locations.
Figure 14C:
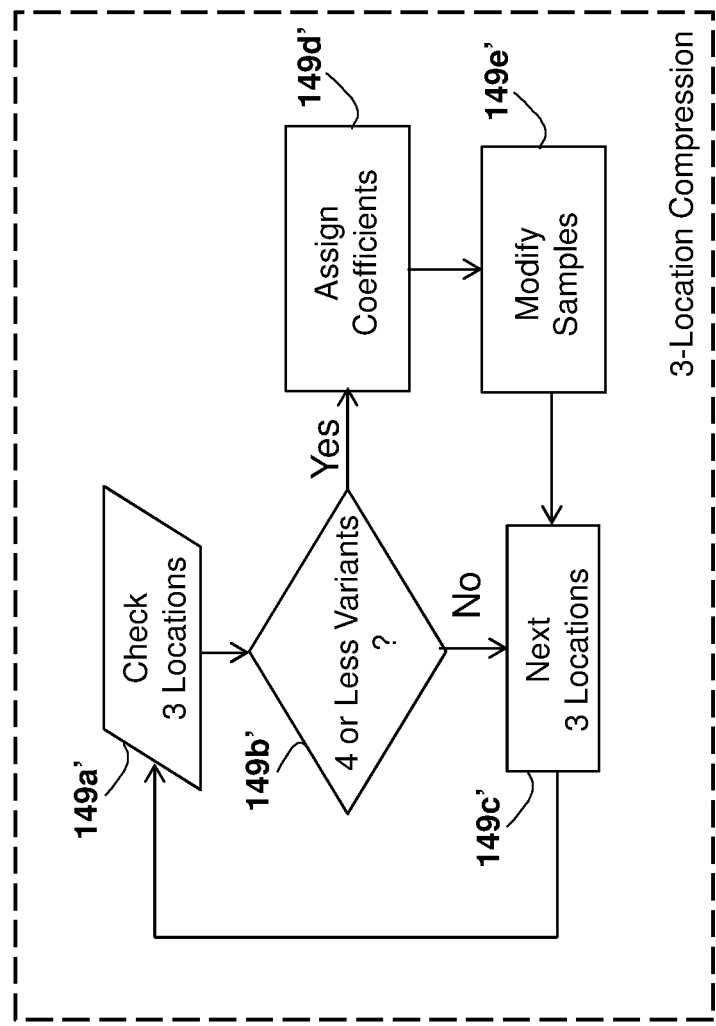
FIG. 14c illustrates schematically a simplified flowchart of forming of a compression scheme using three locations.
Figure 14D:
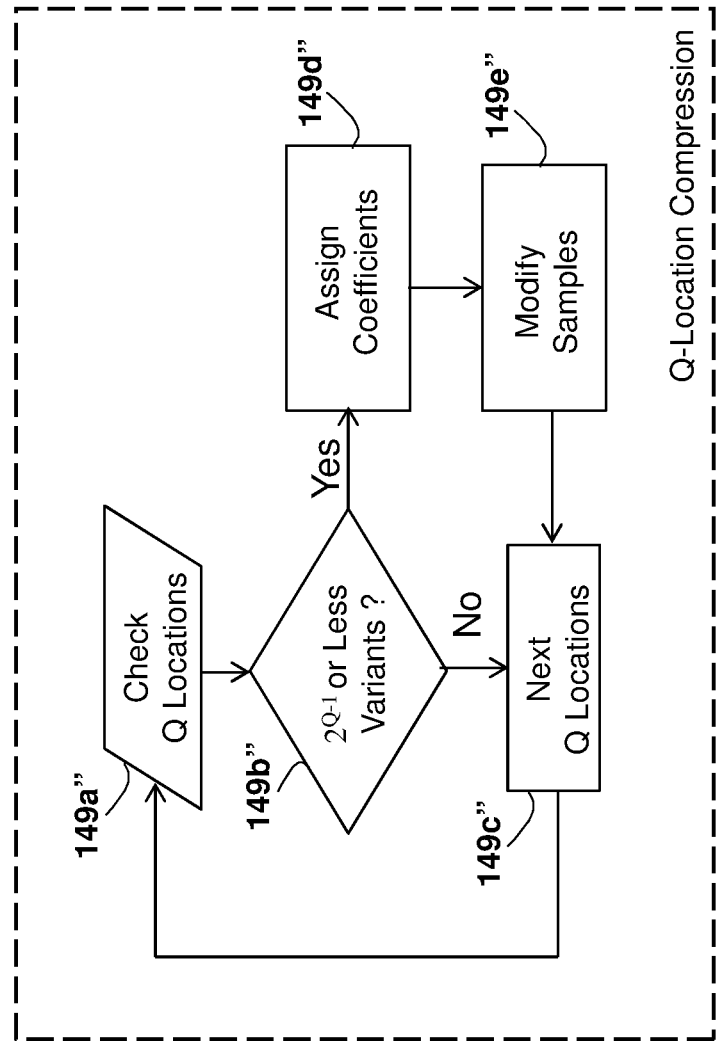
FIG. 14d illustrates schematically a simplified flowchart of forming of a compression scheme using Q locations.

The 'Q-Location Compression' flow chart 140*d* shown in FIG. 14*d* assumes that the number of possible permutations of the Q locations in the uncompressed payload 12 is equal or less than $2^{Q-1}$, and thus may be represented by Q-1 (or less) bits in payload 62. However, while in general this may be the case, occasionally (preferably seldom) a received payload may include a value in the selected Q locations that is beyond the expected $2^{Q-1}$ possible values. In such a case, the described compression may not be viable. For example, in case of 3 locations based compression, the three locations (r,p,q) involves eight possible values or variants are (0,0,0), (0,0,1), (0,1,0), (0,1,1), (1,0,0), (1,0,1), (1,1,0) and (1,1,1). In case only 4 values are expected, such as (0,0,0), (0,1,1), (1,0,1) and (1,1,1), then these 4 values may be represented by 2 bits, such as (r, q), and the value of location 1 may be calculated from these 2 values. However, in case where a received payload includes the value (1,1,0) in the three locations (r,p,q), the mechanism to determine the value of the q location is not suitable anymore.

Figure 11D:
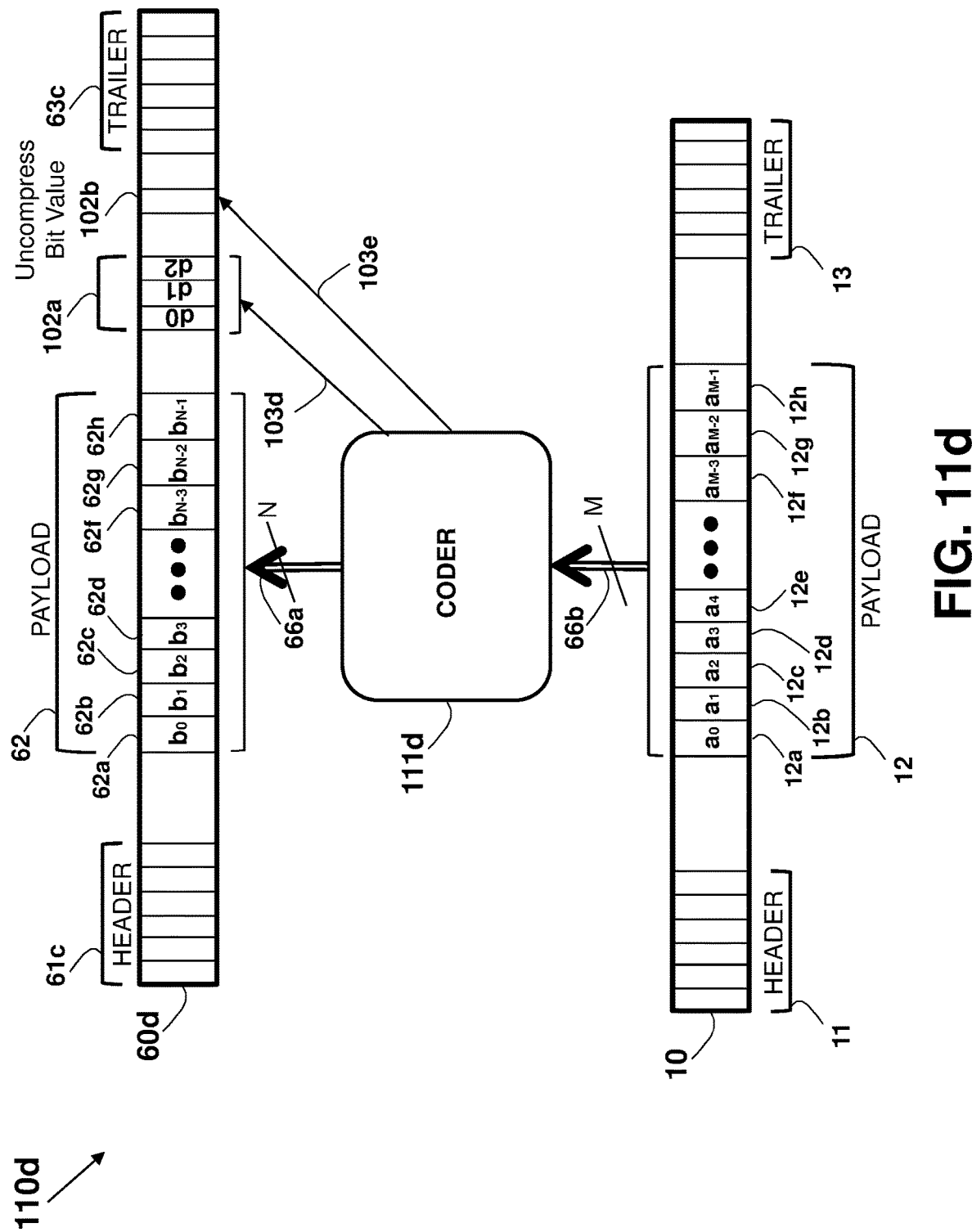
FIG. 11d illustrates schematically general compressing of a frame from a received uncompressed frame except a bit associated with an indicator.

Handling such a preferably rare case is described as part of an arrangement 110*d* shown in FIG. 11*d*. When a set of locations (such as three locations (r,p,q)) in the received payload 12 cannot be properly compressed, a bit in a location (or few bits in few locations) whose value results in an error using the compression scheme is identified, and the location identification is added to a dedicated field in the output compressed frame. In the above example, the location of bit q is identified and encapsulated into a specific field in an output frame. In the example of arrangement 110*d* shown in FIG. 11*d*, an indicator field 102*a* is shown in an output compressed frame 60*d*, having a respective header 61*c* and a respective trailer 63*c*. The indicator field 102*a*, generated 103*d* by a coder 111*d*, indicates the location of the bit that is expected to result in an error value using the regular compression scheme. The coder 111*d* may include the functionality of any coder described herein, in addition to handling the case where the input payload is not part of the expected range designed or planned to be properly compressed. In the example of the frame 60*d*, the field 102*a* includes only three bits, thus may identify only up to 8 locations (M−N=8) in the uncompressed payload 12. Any number of bits may be equally used, for example based on the number of locations that are reduced as part of the compression process. For example, in case of M−N=16, 4 bits may be required, and in case of M−N−32, 5 bits may be required. The value of the bit (location) identified by the location field 102*a* is provided by a separate Uncompressed Bit Value indicator bit 102*b*. The value of the bit in the location identified by the field 102*a* is determined by the value 102*b* set 103*e* by the coder 111*d*, and overruling or bypassing the compression scheme determined. In the example above, the value of the location q is set by the value carried in the bit value 102*b* and not based on the values of locations (r,p).

Figure 10B:
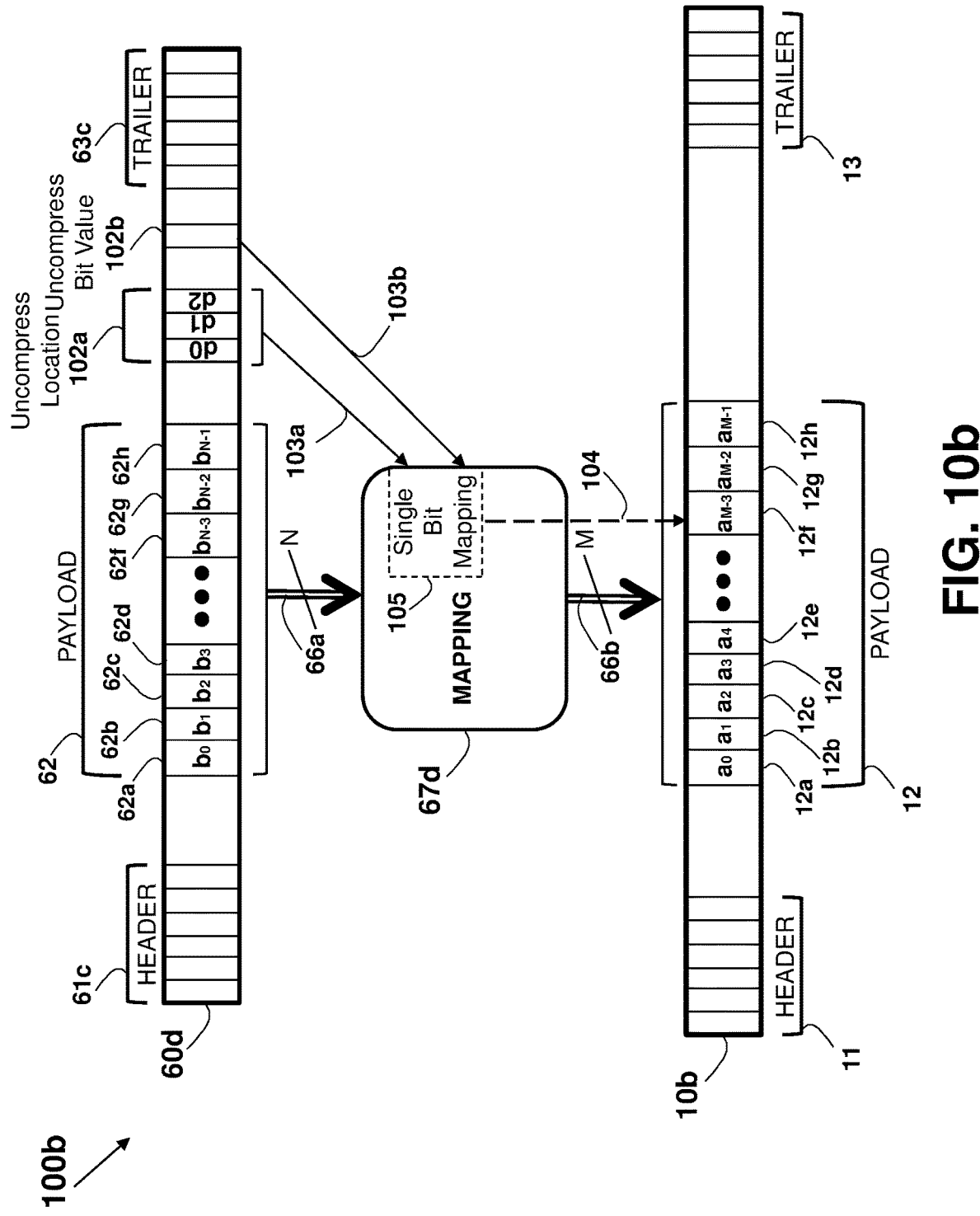
FIG. 10b illustrates schematically general reconstructing a frame from a received compressed frame and setting a bit according to an indicator.

The expanding of the frame 60*d* by a receiver is illustrated in an arrangement 100*b* shown in FIG. 10*b*. Upon recognizing the receipt of the frame 60*d* having the indicator location bits 102*a*, a mapping functionality 67*d* is employed, which performs the mapping functionality as described herein, except for the location identified by the field 102*a*. A single bit mapping functionality 105 that is part of the mapper 67*d* use the bit value 103*b* carried in the field 102*b* to determine 104 the value of the bit in the location indicated 103*a* by the field 102*a*. In the example shown in the arrangement 100*b*, the location $a_{M-3}$ 12*f* is identified in the field 102*a*, and as such its value is set 104 by the bit value 102*b*, and not by the compression scheme. The compression efficiency is reduced according to the number of frames having locations that cannot be compressed according to the regular compression scheme herein. While the arrangement 110*d* in FIG. 11*d* and the corresponding arrangement 100*b* in FIG. 10*b* are exampled using a single field 102*a* that identify a single location whose value is determined according to the value carried in the Bit Value field 102*b*, any number of locations may be similarly identified, and their corresponding values may be determined using multiple bit value locations or fields.

The location field 102*a*, the bit value field 102*b*, and the uncompress bit indicator 101, includes information that allows for overcoming issues in the compression scheme. In addition to support the case where the defined compression scheme is not suitable or provides an erroneous result, such fields or indicators may be used for other purposes for supplementing, supporting, or correcting used compression schemes. In one example, such fields or indicator may be in addition to the field or indicators that are part of the frames (such as frames 10 or 60) standard structure. Alternatively or in addition, such fields or indicator may be part of, or may use, the field or indicators that are integral part of the frames (such as frames 10 or 60) standard structure. In the example of using CAN bus standard, the DLC field may be used, and may include, may consists of, or may be indicator of, the location field 102*a*, the bit value field 102*b*, the uncompress bit indicator 101, or any combination thereof.

Figure 13:
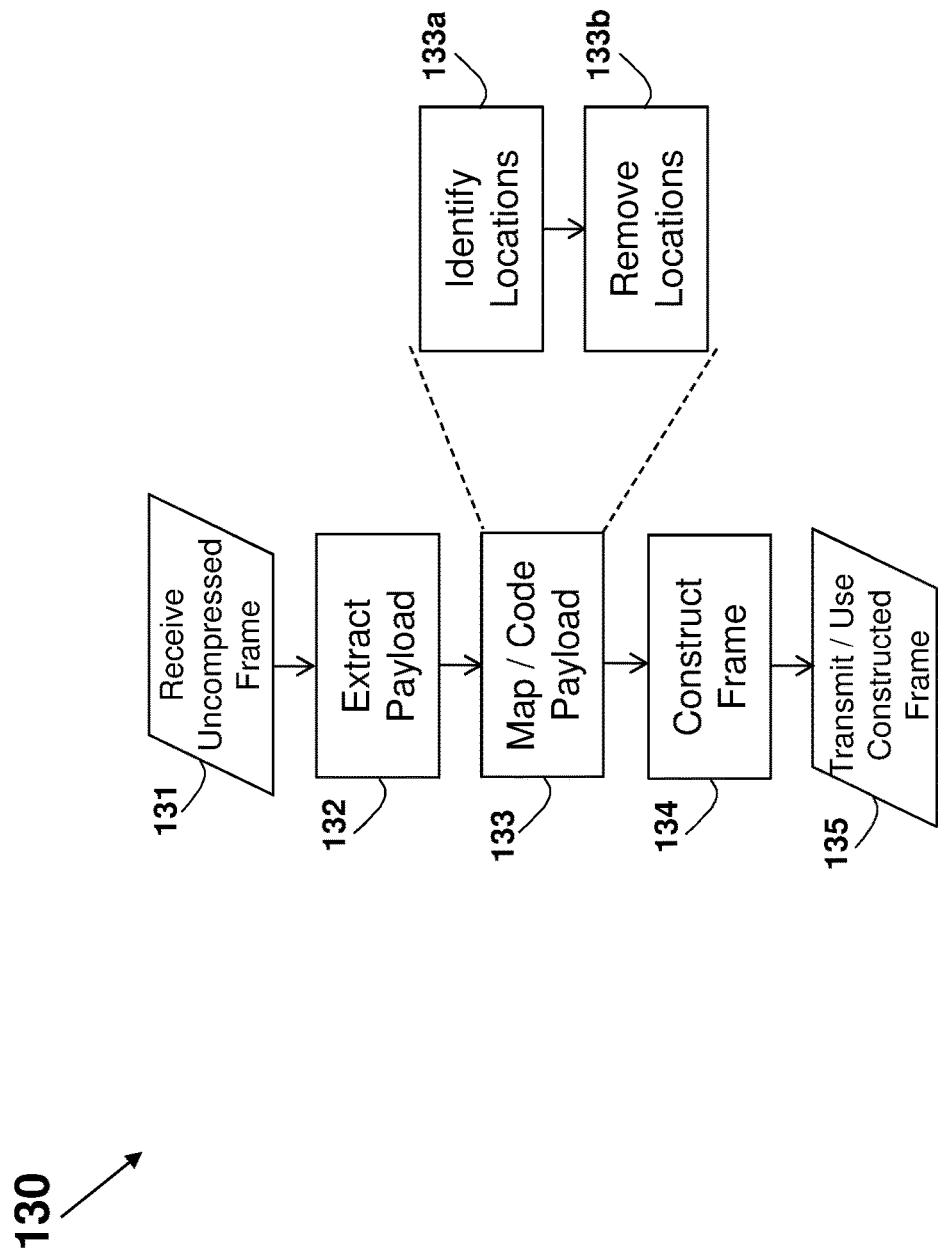
FIG. 13 illustrates schematically a simplified flowchart of compressing an original frame into a compressed frame.

An example of a flow chart 130 of compressing a frame to form a compressed version is shown in FIG. 13, which is in general the reverse order of the flow chart 80 shown in FIG. 8. An uncompressed frame, such as the frame 10 described in FIG. 11, is received as part of a "Receive Uncompressed Frame" step 131. The frame may be received from a communication medium, using any physical layer (OSI Layer 1) standard or protocol, such as the medium 16 shown in the arrangement 40 in FIG. 4, and may use a transceiver such as the transceiver 43*a* in the device 41*a*. The received uncompressed frame is Layer-2 handled, such as by a framer or controller 57*a* as part of the device 56*a* shown in FIG. 5. The payload 12 is identified and extracted as part of an "Extract Payload" step 132. The extracted payload 12 is then compressed or encoded into an output that provides the compressed payload 62 as part of a "Map/Code Payload" step 133. The compressed payload 62 is then embedded to form the compressed frame 60, using Layer-2 handling, as part of a "Construct Frame" step 134, and the constructed frame 60 may be used as part of a "Transmit/Use Constructed Frame" step 135. For example, the reconstructed frame 60 may be transmitted over a communication medium using any physical layer scheme, so it may be received as part of the "Receive Compressed Frame" step 81.

The compressed frame 60 formed as part of the "Construct Frame" step 134, may be according to, or based on, a protocol, such as any OSI Layer-2 protocol, that may be the same or different from the protocol used by the compressed frame 60 as part the "Receive Uncompressed Frame" step 131. In one example, the flow chart 130 is executed in real-time. For example, a frame received as part of the "Receive Uncompressed Frame" step 131 is immediately handled (as practical), and compressed 'as it happens' as described in the flow chart 130 fast enough to keep up with the frame receiving rate. In one exemplary scenario, the full handling of a received frame as part of the "Receive Uncompressed Frame" step 131 is completed before the completion of the receiving of a next received frame. Further, the average or temporary rate of the transmitting or using the constructed frames as part of the "Transmit/Use Constructed Frame" step 135 is equal to, or higher than, the rate of frames reception as part of the "Receive Uncompressed Frame" step 131.

Figure 6A:
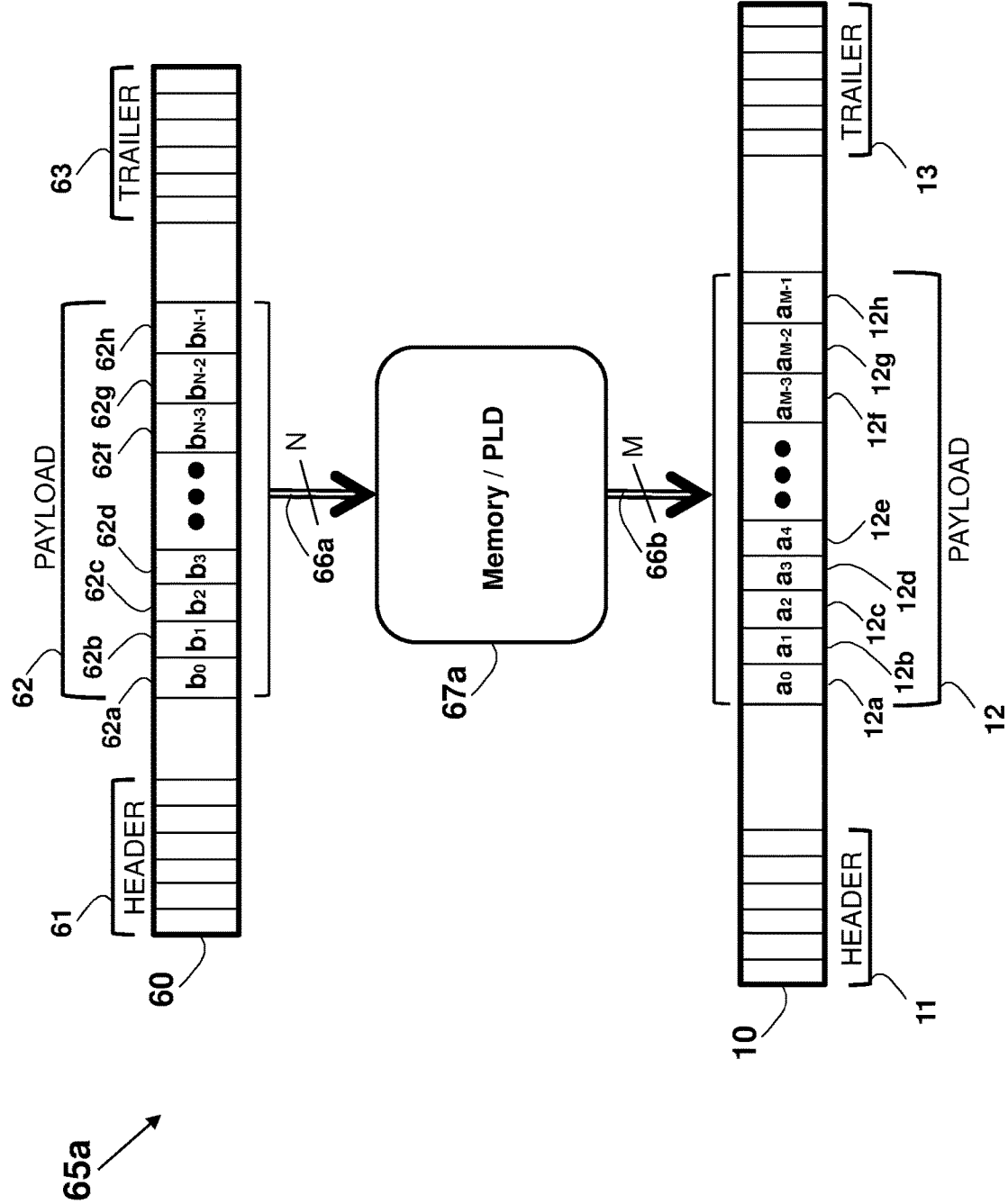
FIG. 6a illustrates schematically general reconstructing a frame from a received compressed frame using a memory or PLD.
Figure 6B:
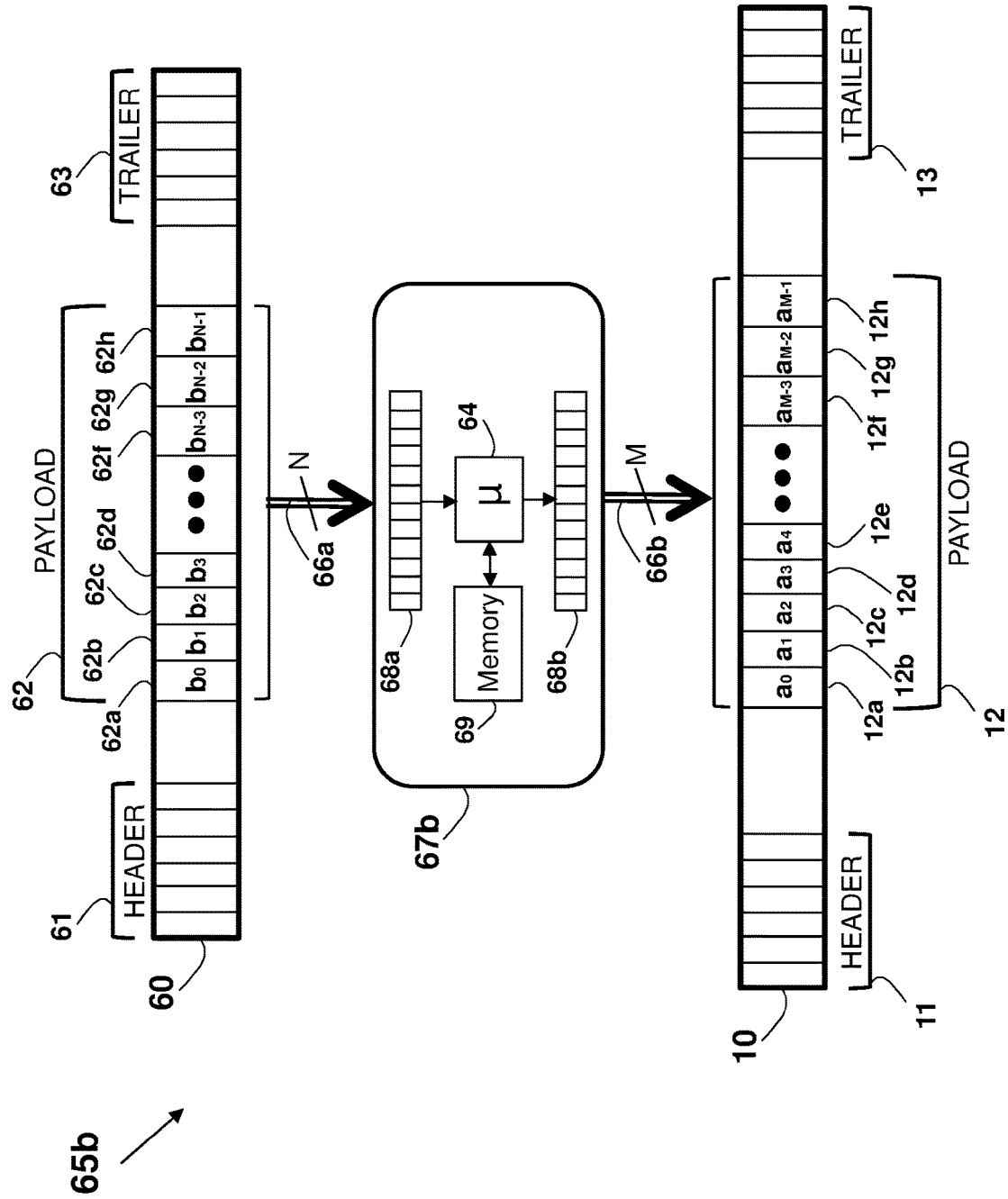
FIG. 6b illustrates schematically general reconstructing a frame from a received compressed frame using a processor.

A compression scheme typically requires compression rules or coding information that is shared by both the compressor and the de-compressor, used by the compressor for compressing the pre-compressed data into the compressed data, and used by the de-compressor for de-compressing the compressed data back into the pre-compressed data, such as by the mapping functionality 67 that is described as part of the arrangement 65 shown in FIG. 6. Such compression rules or coding information is sometimes referred to as a 'dictionary'. For example, the compression rules or coding information may be a simple memory-based mapping that is stored in a memory, such as in the memory or PLD 67*a* that is described as part of the arrangement 65*a* shown in FIG. 6*a*, stored in the memory 69 used the processor 64 that are described as part of the arrangement 65*b* shown in FIG. 6*b*, or implemented as logic circuits 72 that is described as part of the arrangement 70 shown in FIG. 7.

In one example, a forming of a coding information 160 (described in FIG. 16) is described as part of a flow chart 140 shown in FIG. 14. As part of a first step "Obtain Samples" step 141, all possible or expected possibilities or combinations of the information to be compressed are obtained. For example, all possible or expected possibilities or combinations of the payload 12 of the frame 10 may be involved.

Such combination set may be formed analytically. For example, when a specific protocol is used that defines specific fields, specific values in the fields and cross-correlation between values in various fields, the possible combinations may be calculated.

Alternatively or in addition, a simulation may generate possible or forecast values of the information to be compressed. Preferably, the samples are obtained by a real implementation, such as in a specific application or installation.

Figure 15:
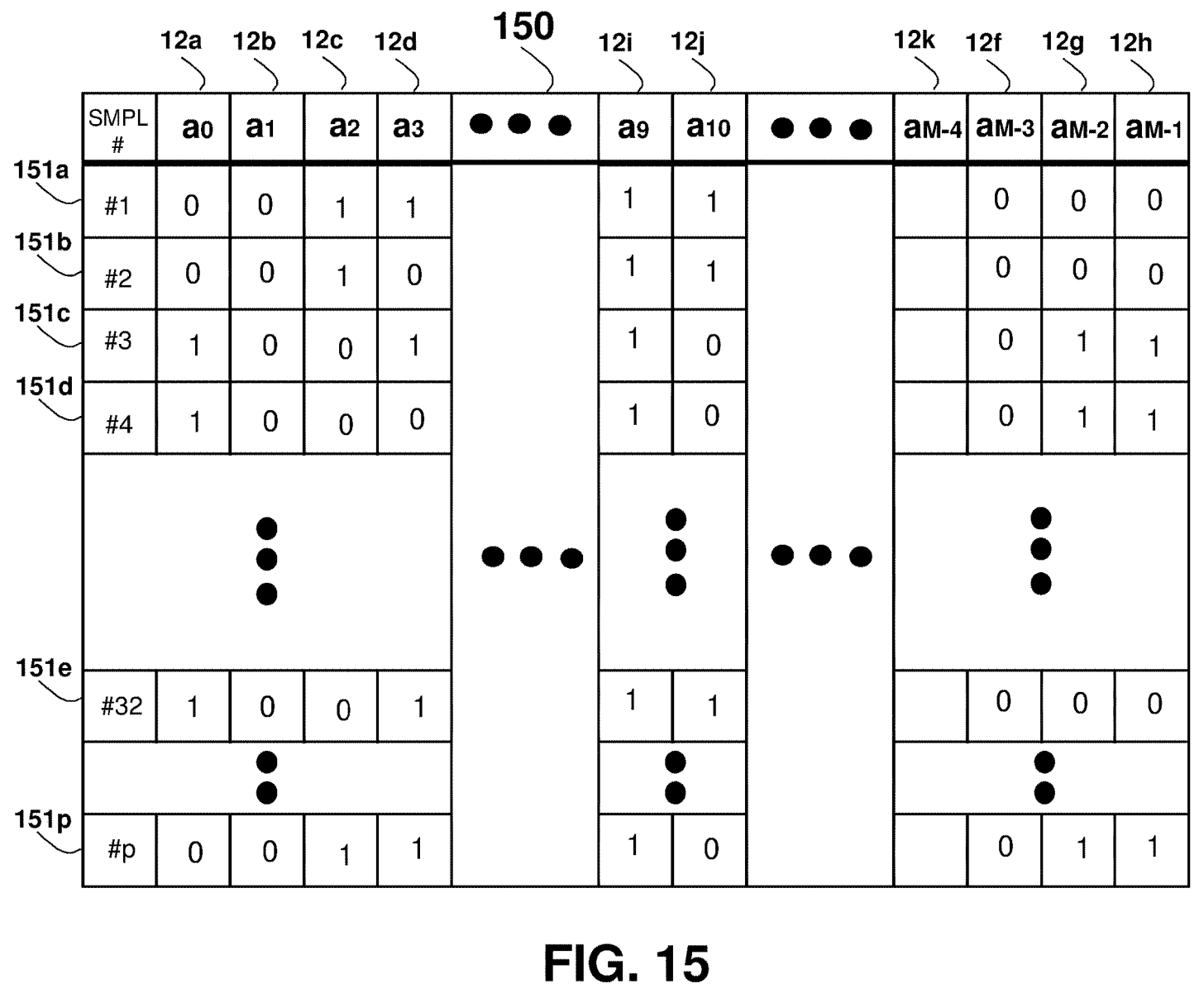

Next, as part of a "Minimize" step 147, the minimum set of combinations is formed. For example, redundant samples, such as when two or more samples are identical, only one sample combination (or value) may be used as a representative of the multiple occurrences. An example of a minimum set of combinations for the payload 12 of the frame 10 is described in a table 150 shown in FIG. 15. The columns represent the various locations in the payload 12, including the first (such as the LSB) location or bit $a_0$ 12*a*, the second location or bit $a_1$ 12*b*, the third location or bit $a_2$ 12*c*, the fourth location or bit $a_3$ 12*d*, the last (such as the MSB) location or bit $a_{M-1}$ 12*h*, the one before the last location or bit $a_{M-2}$ 12*g*, and the second before the last location or bit $a_{M-3}$ 12*f*, as well as a location or bit $a_9$ 12*i*, a location or bit $a_{10}$ 12*j*, and a location or bit $a_{M-4}$ 12*k*. Other locations or bits are not shown for the sake of simplicity.

The number of samples obtained as part of the "Obtain Samples" step 141, or the of samples remaining after removing redundancies as part of the "Minimize" step 147, may be equal to, less than, or higher than, 3, 4, 5, 7, 10, 15, 20, 30, 50, 100, 200, 500, 1,000, 2,000, 5,000, 10,000, 20,000, 50,000, 100,000, 200,000, 500,000, or 1,000,000. Alternatively or in addition, the number of samples obtained as part of the "Obtain Samples" step 141, or the of samples remaining after removing redundancies as part of the "Minimize" step 147, may be equal to, less than, or higher than, 0.1%, 0.2%, 0.5%, 1%, 2%, 3%, 5%, 10%, 15%, 20%, 30%, or 50% of the possible pre-compression combinations of $2^M$, or may be equal to, less than, or higher than, 0.1%, 0.2%, 0.5%, 1%, 2%, 3%, 5%, 10%, 15%, 20%, 30%, or 50% of the possible post-compression combinations of $2^N$.

The minimized non-overlapping 'p' combination samples are shown in rows of the table 150. A first (top) row 151*a* shows a first possible combination, a second row 151*b* shows a second possible combination, a third row 151*c* shows a third possible combination, and a fourth row 151*d* shows a fourth possible combination. Another exemplary row 151*e* shows another possible combination numbered as $32^{nd}$, and the last row 151*p* shows a last possible combination. It is assumed that the number 'p' of the possible non-redundant combinations is less than $2^M$, thus allowing a compression and representation by less than M bits. In the example above, $p<2^N$ or $p=2^N$, allowing for potential compressing to N bits, where N<M. For example, in case of equal or less than 64 possible combinations, the compressed data may include only 6 bits.

Figure 16:
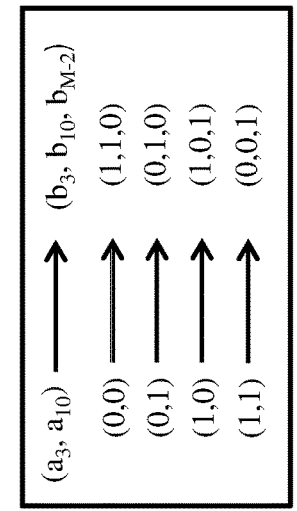
FIG. 16 illustrates schematically an example of developing compression code after various stages of compression.

Before starting the compression coding scheme, all the locations or bits of the payload 12 are considered active and carrying meaningful information, and thus all locations or bits are assigned 'S' value (S=Stay) as shown in the first row 161*a* of the coding table 160 shown in FIG. 16.

Alternatively or in addition, the elementary transformation is not a coding (01→0, and 10→1), but rather an invertible (bijective) function such as (00→01, 01→00, 10→10, 11→11), as shown in the coding table 160*a* shown in FIG. 16*a*. The total transformation (without the column elimination/removing, such as the final column number is the same) is invertible also for the data, which does not correspond to the training data. Such total transformation may be applied also to any uncompressible data, and when decompressed, the uncompressed bits may be detected in the marked ("to be removed") columns, since our compression is lossless.

The first stage (denoted J=1 since locations are analyzed individually) of the compression coding involves individual checking of the locations (or bits), and ignoring any possible correlation or redundancy between them, as is performed as part of a "(J=1) 1-Location Compression" step 142, which is further detailed in a flow chart 140*a* shown in FIG. 142*a*. All locations of the information, such as the M locations (or bits) of the payload 12 are individually checked. The values of each of the location is checked throughout the all possible samples (p samples in the example of the table 150) as part of a "Check Location" step 142*a*. As part of a "All '1' or '0'?" step 142*b*, it is verified if all samples carry the same value for the discussed location, such as all values are '0' or '1'. If there are mixed values in the samples, such as at least one '0' and at least one '1' values, the location status is unchanged (such as 'S' in the table 160), and the next location is considered as part of a "Next Location" step 142*c*. However, in case where all values are the same (either '1' or '0'), then the location affectively carries no meaningful information, and as such may be removed and not be transmitted as part of the compression, as part of a "Modify Samples" step 142*e*. As a substitute, a corresponding coding value (either '1' or '0') may be used, as part of a "Mark as '1' or '0'" step 142*d*. In the example of the table 150 shown in FIG. 15, the second location $a_1$ 12*b* carries '0' in all the p samples, the location $a_9$ 12*i* carries '1' in the p samples, and the location $a_{M-3}$ 12*f* carries '0' in all the p samples. As a result, the coefficients after the first stage of 1-Location based compression for the location $a_1$ 12*b* is assigned as '0', for the location $a_9$ 12*i* is assigned as '1', and for the location $a_{M-3}$ 12*f* is assigned as '0', as shown in a second row 161*b* in the table 160. Further, the respective three locations location $a_1$ 12*b*, $a_9$ 12*i*, and $a_{M-3}$ 12*f* are removed from the samples table 150, resulting a new table 150*a* shown in FIG. 15*a*, and are ignored and are not used in any further compression stage. Thus the current compression (after the first stage) clearly provide a compression by reducing the number of locations to be carried by 3, from uncompressed M locations to carrying compressed M−3 locations.

After the first stage (corresponding to J=1) is completed, a criterion (or multiple criteria) are checked as part of a "Compression Criteria Met?" step 143. If a pre-set criterion is met, no further compression activity are required, and the coding process ends at a "END" step 144, and the coding values in row 161*b* are used for further data compression or de-compression. However, in a case where the pre-set criterion is not met when checked as part of the "Compression Criteria Met?" step 143, then J is incremented to 2 as part of a "J←2" step 145, corresponding to the starting of the second stage of the coding (J=2).

Various criterions may be used as part of the "Compression Criteria Met?" step 143. In one example, a pre-set value of the number of stages to be performed is determined or set, and upon completing the set number of stages the coding process is determined as completed. For example, in a case where the criterion is using a first stage (J=1) coding only, the process stops after completing the "(J=1) 1-Location Compression" step 142, at the "END" step 144. Alternatively or in addition, the criterion may relates to the success or failure in the compression coding in the previous stage. For example, a minimum or maximum threshold may be set, and the coding process ends based on comparing with the set threshold, such as being below or above the set threshold. Such a threshold may relates, in one example, to the number of locations that were eliminated as part of the last stage or in total in all the previous stages. An absolute number of locations may be used, such as where the threshold is equal to, less than, or higher than, 2, 3, 5, 7, 10, 15, 20, 30, 50, 100, 200, 500, or 1000 locations. For example, if the threshold is a minimum of 5 column, and the locations eliminated in the last stage is 7, than the criterion is satisfied and no more processing is required, while if the locations eliminated in the last stage is 5, than the criterion is not satisfied and more processing is required to improve the compression scheme. Similarly, if the threshold is a minimum of 15 column, and the locations totally eliminated in all previous stages is 20, than the criterion is satisfied and no more processing is required, while if the totally eliminated locations 10, than the criterion is not satisfied and more processing is required to improve the compression scheme. Alternatively or in addition, a compression ratio may be used for a stopping criterion. For example, a number of eliminated locations relative to the pre-compression number of locations or of the number of locations before the last stage processing is performed. For example, the threshold may be equal to, less than, or higher than, 1%, 2%, 3%, 5%, 7%, 10%, 15%, 20%, 25%, 30%, or 50%, of the M locations.

At a first time when a "J-Location Compression" step 146 is executed, J equals 2, corresponding to stage 2 of the coding process. This stage involves comparing pairs of column, to check for redundancy therebetween, and is described in further detail in a flow chart 140*b* shown in FIG. 14*b*. Every possible pair of locations is checked as part of a "Check 2 Locations" step 149*a*. In case of M locations, there as M*(M−1)/2 possible pair to check. In an example of M=3 (designated as $a_0$, $a_1$, and $a_2$), there are three possible pairs, namely ($a_0$, $a_1$), ($a_0$, $a_2$), and ($a_1$, $a_2$). Similarly, in an example of M=4 (designated as $a_0$, $a_1$, $a_2$, and $a_3$), there are six possible pairs, namely ($a_0$, $a_1$), ($a_0$, $a_2$), ($a_0$, $a_3$), ($a_1$, $a_2$), ($a_1$, $a_3$), and ($a_2$, $a_3$).

Any pair of locations in the samples may be the same, may be complementary, or may be different. As part of a "Same or Complementary?" step 149*b*, each of the possible pairs are checked to be the same or complementary in all the samples. In case where the locations in the checked pair are not the same and are not complementary, the next pair is selected as part of a "Next 2 Locations" step 149*c* and then checked as part of the "Same or Complementary?" step 149*b*, until all possible location pairs are checked. In the case where a pair of locations was found to be the same, then one of the locations is redundant and does not carry any additional information, and thus may be eliminated, and may be later constructed by copying the remaining location, as part of a "Modify Samples" step 149*e*. In such a case, the respective coefficient in the code relating to the eliminating location may be set to '0' as part of a "Mark Coefficient as '1' or '0'" step 149*d*. Similarly, in the case where a pair of locations was found to be the complementary, then one of the locations is redundant and may be eliminated, and may be later constructed by copying and inverting the values of the remaining location. In such a case, the respective coefficient in the code relating to the eliminating location may be set to '1' as part of the "Mark Coefficient as '1' or '0'" step 149*d*. For example, the eliminated location may be reconstructed by applying a XOR function with the respective coefficient to the remaining location.

In the example of table 150*a* shown in FIG. 15*a*, it is exampled that the location $a_{M-4}$ 12*k* is the same as the location $a_0$ 12a, having the same value for all bits in the 'p' rows (samples). Hence, the location $a_{M-4}$ 12k is redundant and may be eliminated, and may be constructed merely by copying the content of the location $a_0$ 12a. Hence, the third row that represents the status after the second stage in the table 160 shown in FIG. 16, the coefficient relating to the location $a_{M-4}$ 12k is marked as C0=0, where the '0' suffix indicating that this location may be constructed by using the location $a_0$ 12a, and the value '0' indicates that the same values as in the location $a_0$ 12a are to be used in the construction. Further, in the example of table 150a shown in FIG. 15a, it is exampled that the location $a_2$ 12c is the complementary to the location $a_0$ 12a, having the complement value for all bits in the 'p' rows (samples). Hence, the location $a_2$ 12c is redundant and may be eliminated, and may be constructed merely by copying and inverting the content of the location $a_0$ 12a. Hence, the third row that represents the status after the second stage in the table 160 shown in FIG. 16, the coefficient relating to the location $a_2$ 12c is marked as C0=1, where the '0' suffix is indicating that this location may be constructed by using the location $a_0$ 12a, and the value '1' indicates that the complement values of the location $a_0$ 12a are to be used in the construction. Since the two locations $a_2$ 12c and $a_{M-4}$ 12k do not carry any additional information and can be formed from the values in the location $a_0$ 12a, they can be eliminated from any further consideration, as illustrated in a table 150b shown in FIG. 15b.

An example of similar handling of 3 locations is described in a flow chart 140c shown in FIG. 14c. For example, the flow chart 140c may be executed as part of the "J-Location Compression" step 146 in the flow chart 140 upon arriving at this step at the third stage where J=3. In a "Check 3 Locations" step 149a' (corresponding to the "Check 2-Locations" step 149a or the "Check Location" step 142a). In general, three locations in the samples may include 8 variants—Assuming three locations (r,p,q), then the eight possible values or variants are (0,0,0), (0,0,1), (0,1,0), (0,1,1), (1,0,0), (1,0,1), (1,1,0) and (1,1,1). However, in case of a correlation between the locations, only four or less variants may actually be found in the sample. In such a case, 2 bits may be used to represent the four possible variants, allowing for reduction from three to two locations, where the third column is removed, and may be constructed from the other two locations. The number of variants of the three locations checked is determined as part of a "4 or Less Variants?" step 149b', and upon determining that more than 4 variants exists in the samples for the checked three locations, other three locations are selected from the M locations as part of a "Next 3 Locations" step 149c', and then are checked as part of the "Check 3 Locations" step 149a'. The checking may continue until all possible three-set locations are checked, and the number of such possible sets may be calculated as M!/(3!*(M−3)!). For example, if M=4 then the number of sets to check is 4, and for M=5 the number of sets to check is 10.

In one example, the three locations checked as part of the "Check 3 Locations" step 149a' are locations $a_3$ 12d, $a_{10}$ 12j, and $a_{M-2}$ 12g. As shown in the table 150b, there are four variants or values associated with three-location set ($a_3$, $a_{10}$, $a_{M-2}$), namely the value set (1,1,0) shown in the sample or row #1 151a and in the sample or row #32 151e, the value set (0,1,0) shown in the sample or row #2 151b, the value set (1,0,1) shown in the sample or row #3 151c and in the sample or row #p 151p, and the value set (0,0,1) shown in the sample or row #4 151d. Clearly the value of the location $a_{M-2}$ 12g is '1' only when the set ($a_3$, $a_{10}$) equal (0,0) or (1,0), and can be written as a Boolean expression !$a_3$*!$a_{10}$+ $a_3$*!$a_{10}$ (where '!'='NOT'), hence the location $a_{M-2}$ 12g is redundant and may be removed (and later may be calculated based on the values of the locations $a_3$ 12d, $a_{10}$ 12j), as part of a "Modify Samples" step 149e', as shown in a table 150c shown in FIG. 15c. The compression code 160 may be updated, as part of a "Assign Coefficients" step 149d', as shown in a row 161d to reflect the coefficient of the location $a_{M-2}$ 12g as C(3, 10)={0,2}, where the prefixes '(3,10)' indicates that this location may be obtained based on location $a_3$ 12d and $a_{10}$ 12j, and the suffix {0,2} indicates that the location is logic '1' only when the set ($a_3$, $a_{10}$) equals (0,0)=0d or (1,0)=2d.

In the above example for the case of less than 4 variants, one of the locations is removed as being redundant and is being calculated from the other two locations in the set using a Boolean expression. Alternatively or in addition, the four variants may be assigned any two bits, and the Boolean expression may be calculated accordingly. For example, the four variants of the checked locations may be arbitrarily assigned two bits. For example, the value set (1,1,0) may be assigned (0,0) (=0d), the value set (0,1,0) may be assigned (0,1) (=1d), the value set (1,0,1) may be assigned (1,0) (=2d), and the value set (0,0,1) may be assigned (1,1) (=3d). In the above example, the coefficient of the location $a_{M-2}$ 12g may be C(3,10)={2,3}. Further, the values carried in the locations set ($a_3$, $a_{10}$) are changed to reflect the assigned values of the two bits, as shown in the table 150d shown in FIG. 15d. In such a case, the compression code 160 shown in FIG. 16 includes the mapping code, stating that the set ($a_3$, $a_{10}$)=(0,0) corresponds and maps the three locations ($a_3$, $a_{10}$, $a_{M-2}$) to (1,1,0), the set ($a_3$, $a_{10}$)=(0,1) corresponds and maps the three locations ($a_3$, $a_{10}$, $a_{M-2}$) to (0,1,0), the set ($a_3$, $a_{10}$)=(1,0) corresponds and maps the three locations ($a_3$, $a_{10}$, $a_{M-2}$) to (1,0,1), and the set ($a_3$, $a_{10}$)=(1,1) corresponds and maps the three locations ($a_3$, $a_{10}$, $a_{M-2}$) to (0,0,1). Such a mapping is shown marked as '*' in a row 161d in the table 160.

The general case of checking Q locations, as part of stage J=Q, is examined as a flow chart 140d shown in FIG. 14d. As part of a "Check Q Locations" step 149a'', Q locations are selected for checking redundancy therebetween. In case of M total locations (at the beginning or after compression in previous stages), there are M!/[(Q!)*(M−Q)!] possibilities of selecting Q locations from the M locations. As part of a "$2^{Q-1}$ or Less Variants?" step 149b'', the number of variants in the samples is checked. In a case where the number of variants is above $2^{Q-1}$, there is no redundant location, and a next Q locations set is selected as part of a "Next Q Locations" step 149c'' for checking them as part of the "Check Q Locations" step 149a''. However, in case of redundancy, one of the locations is removed, as part of a "Modify Samples" step 149e'', and the compression information, either as Boolean expression of the remaining locations or by assigning distinct numbers to the found variants, as part of an "Assign Coefficients" step 149d''.

In the case where the locations are being modified by assigning a distinct number to each of the variant that is found in the samples set, the modified samples may be used as a starting samples set, and then the process may be repeated to the newly formed samples set, trying to further compress the locations. For example, if the newly formed location values $a_3$ 12d is the same as the location $a_{M-1}$ 12h, as shown in the table 150d, then the location $a_{M-1}$ 12h may be removed as discussed regarding the 1-Location compression above in the flow chart 140a shown in FIG. 14a. Such iterative process is shown in a flow chart 140' shown in FIG. 14-1, which is based on the flow chart 140 shown in FIG. 14.

After the completion of a compression in the "J-Location Compression" step 146, it is checked if samples values (not only removing the redundant locations) have been modified, as part of a "Samples Modified?" step 146a. If indeed samples values have been modified, it may be that 2-Location compression may be used to further remove one of the modified locations, thus the second stage (J=2) is repeated at the "J←2" step 145, applied to the new updated samples set.

Figure 12:
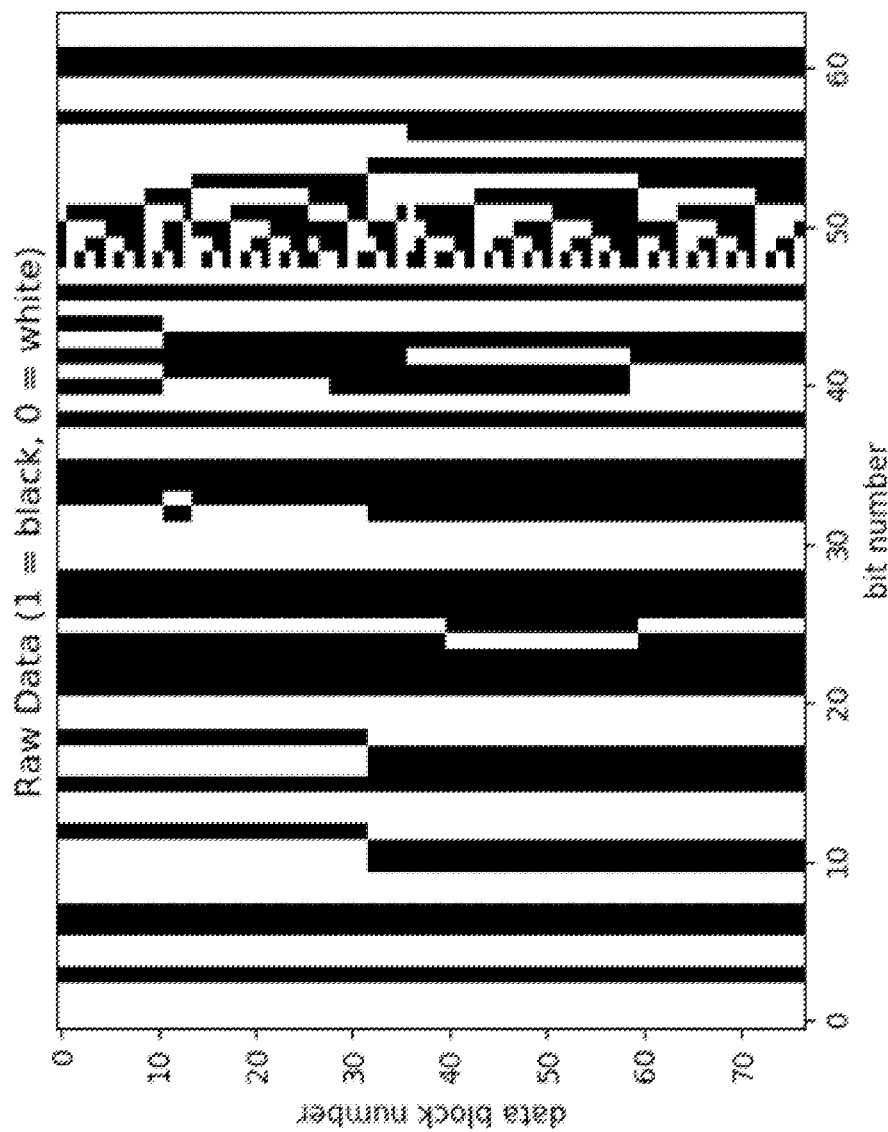
FIG. 12 depicts a data histogram of values transmitted over a CAN bus before compression.
Figure 12A:
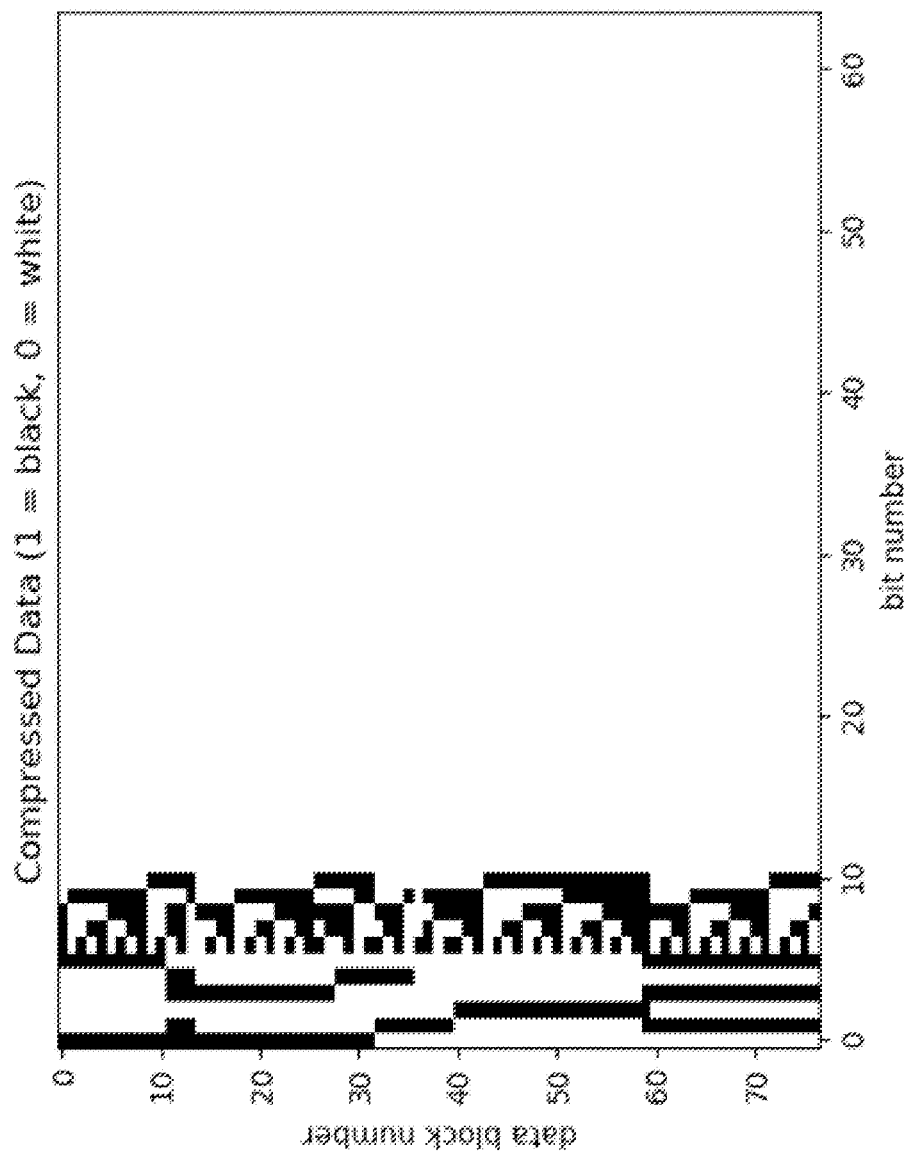
FIG. 12a depicts a data histogram of values transmitted over a CAN bus after compression.

As can be shown in the compression code table 160, after the above compression steps only four locations (columns) are not removed (designated as 'S'=Stay) and are part of the post-compression locations and are to be sent as compressed data, namely $a_0$ 12a, $a_3$ 12d, $a_{10}$ 12j, and $a_{M-1}$ 12h. An example of an actual compression is shown in FIGS. 12 and 12a. An actual data was collected from an actual installation of a CAN environment protocol (64-bit payload field), and after minimization a distinct 80 samples were found, as presented in FIG. 12. After applying an example of the compression scheme described herein, the 80 samples were found to be represented by 12 bits, as shown in FIG. 12a.

Figure 17:
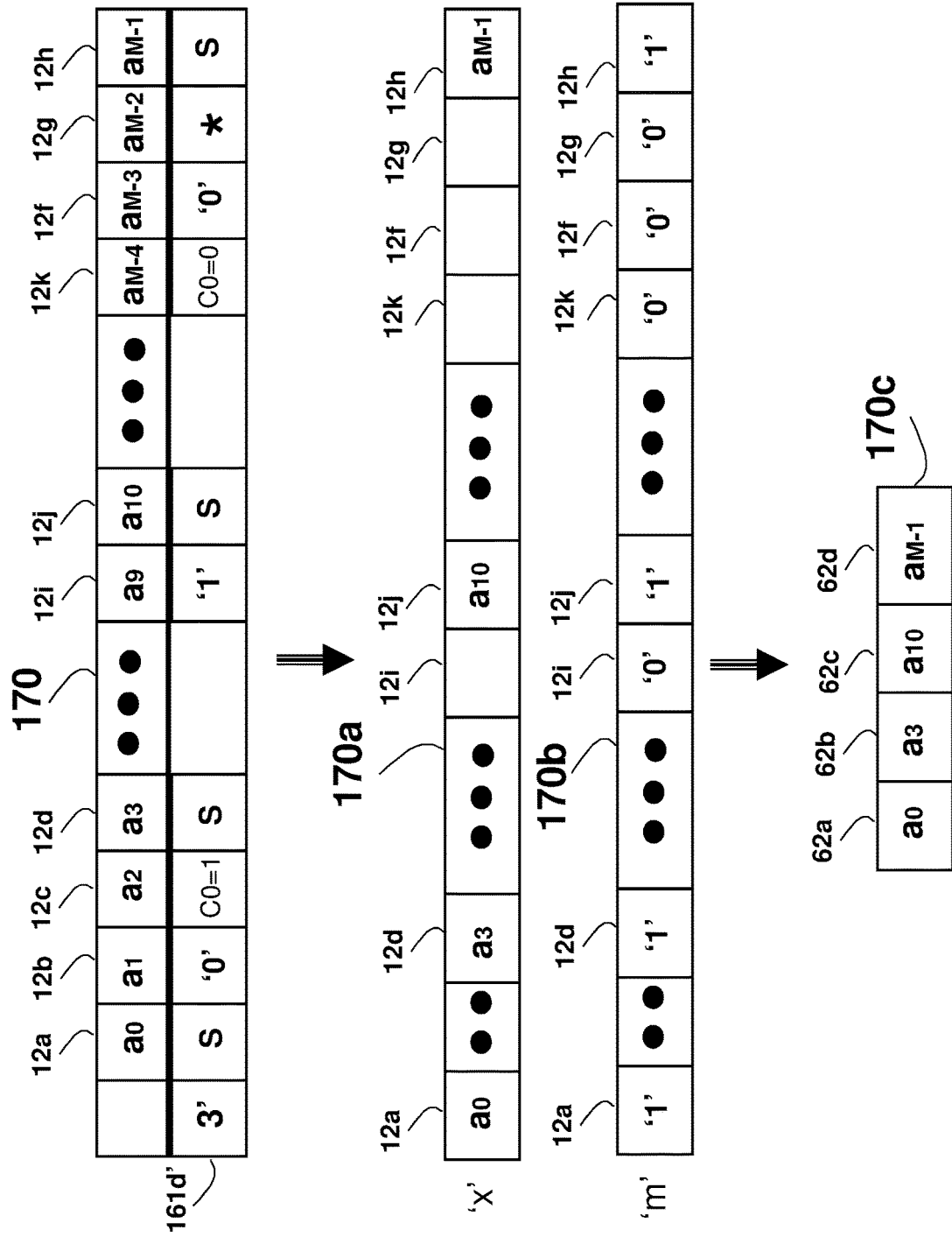
FIG. 17 depicts pictorially compressing a word having M locations into a 4 bits word.

The "Map/Code Payload" step 133 as part of the flow chart 130 shown in FIG. 13, generally performed by the coder 111, may include two steps, an "Identify Locations" step 133a followed by a "Remove Locations" step 133b, as shown in FIG. 13. An example involving execution of these steps is shown in FIG. 17. As part of the "Identify Locations" step 133a, the bit locations in the received payload 12 (as part of the frame 10) are segmented into two categories: Locations which remains after any compression action and are transmitted as part of the compressed payload 62, and locations having redundant values, that may be removed since they can be obtained by using the remaining bits, for example by employing compression according to the flow chart 140 shown in FIG. 14, according to the flow chart 140' shown in FIG. 14-1, according to the flow chart 140a shown in FIG. 14a, according to the flow chart 140b shown in FIG. 14b, according to the flow chart 140c shown in FIG. 14c, according to the flow chart 140d shown in FIG. 14d, according to any other compression scheme, or any combination thereof. In the example shown in FIG. 17, the word or vector 170 represents the word that corresponds to the bit locations 161d', that is obtained after applying the exampled compression techniques (at step 3') top the payload 161a shown as part of the table 160 in FIG. 16. As shown, the only relevant uncompressed bit locations, from which the original ion formation may be fully restored, are bit locations $a_0$ 12a, $a_3$ 12d, $a_{10}$ 12j, and $a_{M-1}$ 12h, totaling 4 bits of the received M bits payload (N=4). The rest of the bit locations are not required to be transmitted and are reconstructed from the compressed payload 12 as part of the "Map Payload" step 83 generally performed by the Mapping functionality 67. The bit locations that are to be transmitted after compression are shown as part of a word 'x' 170a. In one example, a mask vector of work 170b may be used, having '1' in any bit location that is not removed as part of the compression, and '0' in any bit location that is to be removed as part of the compression.

The word or vector 'x' 170a is M bits long, however the compression goal is to reduce the compressed word or vector length to N (N<M). Such length reduction is performed as part of the "Remove Locations" step 133b, in which the relevant bits that are to be sent after compression are shrink into a word or vector having N bit locations, thus achieving the compression goal. In the example shown in FIG. 17, N=4, and thus a payload 170c (corresponding to payload 62) of only 4 bits is generated, carrying only the minimum number of bits that allow to reconstruct the original payload 12. Similarly, the "Map Payload" step 83 involves the opposite activity, where first the additional locations are added to form a payload having M bit location and embedding the received bits in the appropriate bit locations, and then calculating the bit values of the locations that were removed as part of the "Remove Locations" step 133b.

Figure 17A:
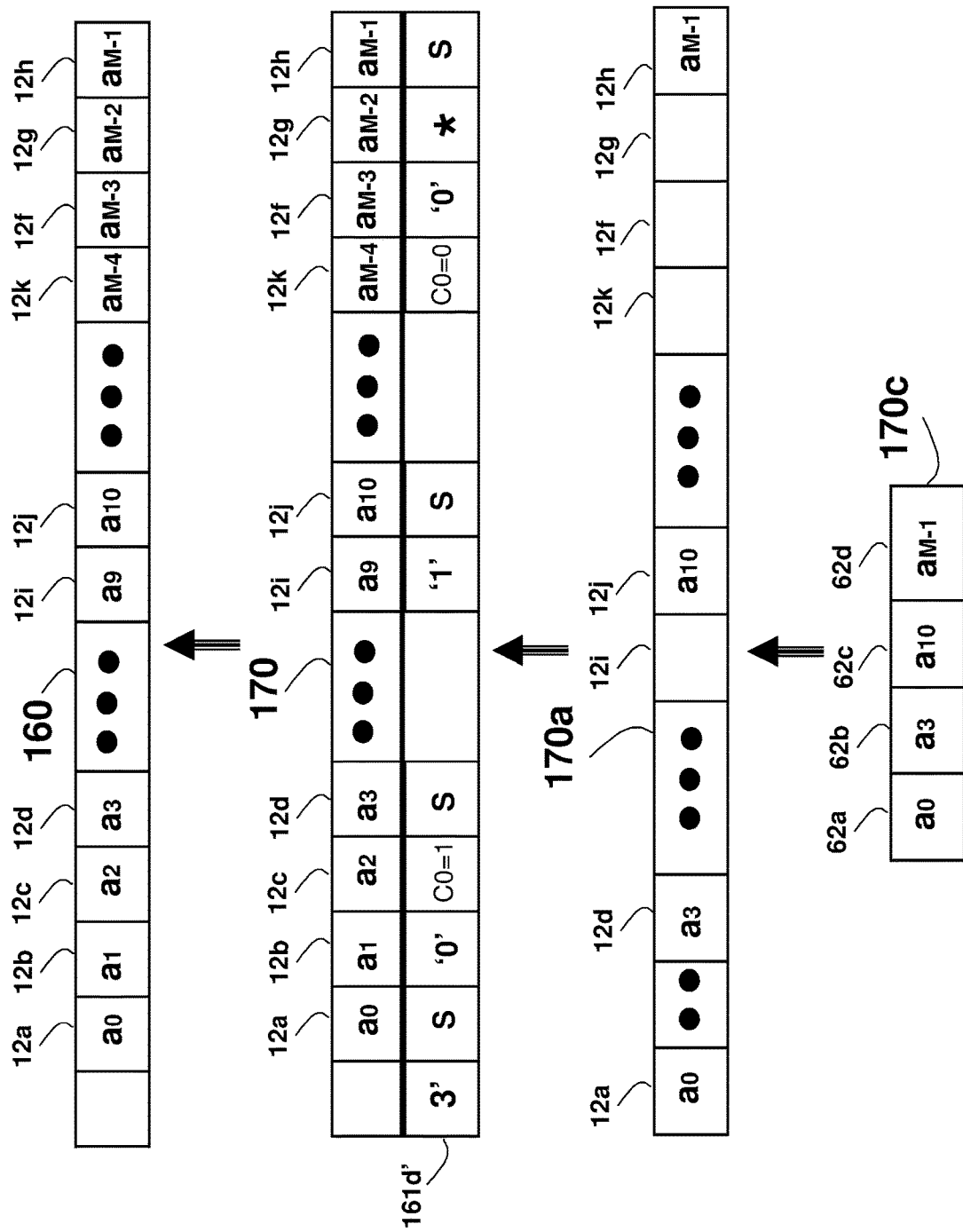
FIG. 17a depicts pictorially uncompressing a 4 bits word into a word having M locations.

The uncompressing actions are exampled in FIG. 17a, which is based on the example shown in FIG. 17. The 4-bits vector or word 170c (corresponding to the received payload 62) is first translated or converted to the M-bits length word 170a, having the received bits in the proper bit locations. Then the rest of the bit locations are calculated according to the compression rules to obtain the word 160 (corresponding to the payload 12), which is the original payload before the compression.

The compacting the M-bit length word of the uncompressed payload 12 before compression to the N-bit length word of the compressed payload 62 after compression, such as from the word 'x' 170a to the 4-bit length word 170c shown in FIG. 17, performed as part of the "Remove Location" step 133b, may be using any known technique of such compacting. For example, the word 'x' 170a may be in a register that is shifted right one bit at a time (together with the register holding the mask 'm' word 170b), and according to the corresponding value of the bit in the mask 'm' word 170b, the bit location value may be discarded (if the respective bit in '0'), or shifted to the output word 170c (in the respective bit in '1').

A collection of small programming tricks are described in a book entitled: "*Hacker's Delight*", Second Edition, by Henry S. Warren, Jr., published 2013 by Pearson Education, Inc. [ISBN-13: 978-0-321-84268-8], which is incorporated in its entirety for all purposes as if fully set forth herein.

An example of a program (generalized extract) for compacting (compressing) a word 'x' 170a using a mask 'm' 170b, with minimum worst-case execution time, is provided in chapter 7-4 of the book, as follows:

```
// ---------------------------- cut --------------------------------
unsigned compress2(unsigned x, unsigned m) {
    unsigned r, s, b;         // Result, shift, mask bit.
    r = 0;
    s = 0;
    do {
        b = m & 1;
        r = r | ((x & b) << s);
        s = s + b;
        x = x >> 1;
        m = m >> 1;
    } while (m != 0);
    return r;
}
// -------------------------- end cut ----------------------------
```

Another example of a program (generalized extract) for compacting (compressing) a word 'x' 170a using a mask 'm' 170b, with substantial reduced number of instructions to be executed, is further provided in chapter 7-4 of the book, as follows:

```
#include <stdio.h>
#include <stdlib.h>
#include <time.h>
char * binary(unsigned k);              // Is below.
```

```
unsigned compress_left(unsigned x, unsigned m) {
    unsigned mk, mp, mv, t;
    int i;
    x = x & m;              // Clear irrelevant bits.
    mk = ~m >> 1;           // We will count 0's to left.
    printf("\n\n            m = %s\n", binary(m));
    printf("            x = %s\n", binary(x));
    for (i = 0; i < 5; i++)  {
        printf("\ni = %d,        mk = %s\n", i, binary(mk));
        mp = mk ^ (mk >> 1);                // Parallel prefix.
        mp = mp ^ (mp >> 2);
        mp = mp ^ (mp >> 4);
        mp = mp ^ (mp >> 8);
        mp = mp ^ (mp >> 16);
        printf("After PP,    mp = %s\n", binary(mp));
        mv = mp & m;                        // Bits to move.
        printf("            mv =%s\n", binary(mv));
        m = m ^ mv | (mv << (1 << i));      // Compress m.
        t = x & mv;
        x = x ^ t | (t << (1 << i));        // Compress x.
        printf("            m = %s\n", binary(m));
        printf("            x = %s\n", binary(x));
        mk = mk & ~mp;
    }
    return x;
}
int errors;
void error (unsigned x, unsigned m, unsigned got, unsigned shdbe) {
    errors = errors + 1;
    printf("Error for x = %08X, m = %08x, got %08X, should be %08X\n",
        x, m, got, shdbe);
}
int main (void)
{
    int i, n;
    unsigned r;
    static unsigned test[ ] = {
        0xFFFFFFFF,     0x80000000,     0x80000000,
        0xFFFFFFFF,     0x0010084A,     0xF8000000,
        0xFFFFFFFF,     0x55555555,     0xFFFF0000,
        0xFFFFFFFF,     0x88E00F55,     0xFFF80000,
        0x01234567,     0x0000FFFF,     0x45670000,
        0x01234567,     0xFFFF0000,     0x01230000,
        0xFFFFFFFF,     0xFFFFFFFF,     0xFFFFFFFF,
        0,              0,              0,
        0,              0xFFFFFFFF,     0,
        0xFFFFFFFF,     0,              0,
        0x80000000,     0x80000000,     0x80000000,
        0x55555555,     0x55555555,     0xFFFF0000,
        0x55555555,     0xAAAAAAAA,     0,
        0x789ABCDE,     0x0F0F0F0F,     0x8ACE0000,
        0x789ABCDE,     0xF0F0F0F0,     0x79BD0000,
        0x92345678,     0x80000000,     0x80000000,
        0x12345678,     0xF0035555,     0x13B00000,   /* Was 000004ec */
        0x80000000,     0xF0035555,     0x80000000,
    };
    n = sizeof(test)/sizeof(test[0]);
    printf("compress_left:\n");
    for (i = 0; i < n; i += 3) {
        r = compress_left(test[i], test[i+1]);
        if (r != test[i+2])
            error(test[i], test[i+1], r, test[i+2]);
    }
    if (errors == 0)
        printf("Passed all %d cases.\n", n/3);
    return errors;
}
/* Converts the unsigned integer k to binary character form with a blank
after every fourth digit.   Result is in string s of length 39.  Caution:
If you want to save the string, you must move it.   This is intended for
use with printf, and you can have only one reference to this in each
printf statement. */
char * binary (unsigned k) {
    int i, j;
    static char s[40] = "0000 0000 0000 0000 0000 0000 0000 0000";
    j = 38;
    for (i = 31; i >= 0; i--)  {
        if (k & 1) s[j] = '1';
        else       s[j] = '0';
```

```
        j = j - 1;
        k = k >> 1;
        if ((i & 3) == 0) j = j - 1;
    }
    return s;
}
```

Similarly, the expanding action, such as from the word 170c into the word 170a shown in the FIG. 17a may use a program provided in chapter 7-4 of the book, as follows:

```
/* Inverse of compress (right). */
#include <stdio.h>
/* Inverse of compress2 (HD page 151). This version has
no branches in the loop. Eight insns in the loop, giving
8*32 + 2 = 258 insns worst case. */
unsigned expand2(unsigned x, unsigned m) {
    unsigned r, s, b;    // Result, shift, mask bit.
    r = 0;
    s = 0;
```

-continued

```
    do {
        b = m & 1;
        r = r | ((x & b) << s);
        s = s +1;
        x = x >> b;
        m = m >> 1;
    } while (m != 0);
    return r;
}
```

Alternatively or in addition, the expanding action, such as from the word 170c into the word 170a shown in the FIG. 17a may use another program provided in chapter 7-4 of the book, as follows:

```
// ----------------------------- cut ----------------------------------
unsigned expand4(unsigned x, unsigned m) {
    unsigned m0, mk, mp, mv, t;
    unsigned array[5];
    int i;
    m0 = m;                    // Save original mask.
    mk = ~m << 1;              // We will count 0's to right.
    for (i = 0; i < 5; i++) {
        mp = mk ^ (mk << 1);                // Parallel suffix.
        mp = mp ^ (mp << 2);
        mp = mp ^ (mp << 4);
        mp = mp ^ (mp << 8);
        mp = mp ^ (mp << 16);
        mv = mp & m;                        // Bits to move.
        array [i] = mv;
        m = (m ^ mv) | (mv >> (1 << i));    // Compress m.
        mk = mk & ~mp;
    }
    for (i = 4; i >= 0; i--) {
        mv = array[i];
        t = x << (1 << i);
        x = (x & ~mv) | (t & mv);
//      x = ((x ^ t) & mv) ^ x;             // Alternative for above line.
    }
    return x & m0;              // Clear out extraneous bits.
}
// --------------------------- end cut -----------------------------
int errors;
void error(unsigned x, unsigned m, unsigned got, unsigned shdbe) {
    errors = errors + 1;
    printf("Error for x = %08X, m = %08x, got %08X, should be %08X\n",
        x, m, got, shdbe);
}
int main (void)
{
    int i, n;
    unsigned r;
    static unsigned test[ ] = {
//      Data          Mask          Result
        0x00000001,   0x80000000,   0x80000000,    // These first 4 cases will
        0x0000001F,   0x0010084A,   0x0010084A,    // work with Allen's "scatter"
        0x0000FFFF,   0x55555555,   0x55555555,    // function, because the
        0x00001FFF,   0x88E00F55,   0x88E00F55,    // irrelevant HO bits are 0.
        0xFFFFFFFF,   0x80000000,   0x80000000,
        0xFFFFFFFF,   0x0010084A,   0x0010084A,
        0xFFFFFFFF,   0x55555555,   0x55555555,
        0xFFFFFFFF,   0x88E00F55,   0x88E00F55,
        0x01234567,   0x0000FFFF,   0x00004567,
        0x01234567,   0xFFFF0000,   0x45670000,
        0xFFFFFFFF,   0xFFFFFFFF,   0xFFFFFFFF,
        0,            0,            0,
```

```
      0,            0xFFFFFFFF,    0,
      0xFFFFFFFF,   0,             0,
      0x80000000,   0x80000000,    0,
      0x55555555,   0x55555555,    0x11111111,
      0x55555555,   0xAAAAAAAA,    0x22222222,
      0x789ABCDE,   0x0F0F0F0F,    0x0B0C0D0E,
      0x789ABCDE,   0xF0F0F0F0,    0xB0C0D0E0,
      0x92345678,   0x80000000,    0,
      0x12345678,   0xF0035555,    0x50021540,
      0x80000000,   0xF0035555,    0,
   };
   n = sizeof(test)/sizeof(test[0]);
   printf("expand2:\n");
   for (i = 0; i < n; i += 3) {
      r = expand2(test[i], test[i+1]);
      if (r != test[i+2])
         error(test[i], test[i+1], r, test[i+2]);
   }
   printf("expand4:\n");
   for (i = 0; i < n; i += 3) {
      r = expand4(test[i], test[i+1]);
      if (r != test[i +2])
         error(test[i], test[i+1], r, test[i+2]);
   }
   if (errors == 0)
      printf("Passed all %d cases.\n", n/3);
   return errors;
}
```

Any wired network herein may be a Personal Area Network (PAN), any connector herein may be a PAN connector, and any transceiver herein may be a PAN transceiver. Alternatively or in addition, any network herein may be a Local Area Network (LAN) that may be Ethernet-based, ant connector herein may be a LAN connector, and any transceiver herein may be a LAN transceiver. The LAN may be according to, may be compatible with, or may be based on, IEEE 802.3-2008 standard. Alternatively or in addition, the LAN may be according to, may be compatible with, or may be based on, 10Base-T, 100Base-T, 100Base-TX, 100Base-T2, 100Base-T4, 1000Base-T, 1000Base-TX, 10GBase-CX4, or 10GBase-T; and the LAN connector may be an RJ-45 type connector. Alternatively or in addition, the LAN may be according to, may be compatible with, or may be based on, 10Base-FX, 100Base-SX, 100Base-BX, 100Base-LX10, 1000Base-CX, 1000Base-SX, 1000Base-LX, 1000Base-LX10, 1000Base-ZX, 1000Base-BX10, 10GBase-SR, 10GBase-LR, 10GBase-LRM, 10GBase-ER, 10GBase-ZR, or 10GBase-LX4, and the LAN connector may be a fiber-optic connector. Alternatively or in addition, any network herein may be a packet-based or switched-based Wide Area Network (WAN), any connector herein may be a WAN connector, and any transceiver herein may be a WAN transceiver. Alternatively or in addition, any network herein may be according to, may be compatible with, or may be based on, a Serial Peripheral Interface (SPI) bus or Inter-Integrated Circuit (PC) bus.

Any processor or logic herein, such as the processor 64 may be based on a discrete logic or an integrated device, such as a processor, microprocessor or microcomputer, and may include a general-purpose device or may be a special purpose processing device, such as an ASIC, PAL, PLA, PLD, Field Programmable Gate Array (FPGA), Gate Array, or other customized or programmable device. In the case of a programmable device as well as in other implementations, a memory is required. Any processor herein may include a memory that may include a static RAM (random Access Memory), dynamic RAM, flash memory, ROM (Read Only Memory), or any other data storage medium. The memory may include data, programs, and/or instructions and any other software or firmware executable by the processor. Control logic can be implemented in hardware or in software, such as a firmware stored in the memory.

Any one of the apparatuses described herein, such as a device, module, or system, may be integrated or communicating with, or connected to, the vehicle self-diagnostics and reporting capability, commonly referred to as On-Board Diagnostics (OBD), to a Malfunction Indicator Light (MIL), or to any other vehicle network, sensors, or actuators that may provide the vehicle owner or a repair technician access to health or state information of the various vehicle sub-systems and to the various computers in the vehicle. Common OBD systems, such as the OBD-II and the EOBD (European On-Board Diagnostics), employ a diagnostic connector, allowing for access to a list of vehicle parameters, commonly including Diagnostic Trouble Codes (DTCs) and Parameters IDentification numbers (PIDs). The OBD-II is described in the presentation entitled: "*Introduction to On Board Diagnostics (II)*" downloaded on November 2012 from: http://groups.engin.umd.umich.edu/vi/w2_workshops/OBD_ganesan_w2.pdf, which is incorporated in its entirety for all purposes as if fully set forth herein. The diagnostic connector commonly includes pins that provide power for the scan tool from the vehicle battery, thus eliminating the need to connect a scan tool to a power source separately. The status and faults of the various sub-systems accessed via the diagnostic connector may include fuel and air metering, ignition system, misfire, auxiliary emission control, vehicle speed and idle control, transmission, and the on-board computer. The diagnostics system may provide access and information about the fuel level, relative throttle position, ambient air temperature, accelerator pedal position, air flow rate, fuel type, oxygen level, fuel rail pressure, engine oil temperature, fuel injection timing, engine torque, engine coolant temperature, intake air temperature, exhaust gas temperature, fuel pressure, injection pressure, turbocharger pressure, boost pressure, exhaust pressure, exhaust gas temperature, engine run time, NOx sensor, manifold surface temperature, and the Vehicle Identification Number (VIN). The OBD-II specifications defines the interface and the physical diagnostic connector to be according to the Society of Automotive Engineers (SAE) J1962 standard, the protocol may use SAE J1850 and may be based on, or may be compatible with, SAE J1939 Surface Vehicle Recommended Practice entitled: "*Recommended Practice for a Serial Control and Communication Vehicle Network*" or SAE J1939-01 Surface Vehicle Standard entitled: "*Recommended Practice for Control and Communication Network for On-Highway Equipment*", and the PIDs are defined in SAE International Surface Vehicle Standard J1979 entitled: "*E/E Diagnostic Test Modes*", which are all incorporated in their entirety for all purposes as if fully set forth herein. Vehicle diagnostics systems are also described in the International Organization for Standardization (ISO) 9141 standard entitled: "*Road vehicles—Diagnostic systems*", and the ISO 15765 standard entitled: "*Road vehicles—Diagnostics on Controller Area Networks (CAN)*", which are all incorporated in their entirety for all purposes as if fully set forth herein.

The physical layer of the in-vehicle network may be based on, compatible with, or according to, J1939-11 Surface Vehicle Recommended Practice entitled: "*Physical Layer, 250K bits/s, Twisted Shielded Pair*" or J1939-15 Surface Vehicle Recommended Practice entitled: "*Reduced Physical Layer, 250K bits/s, Un-Shielded Twisted Pair (UTP)*", the data link may be based on, compatible with, or according to, J1939-21 Surface Vehicle Recommended Practice entitled: "*Data Link Layer*", the network layer may be based on, compatible with, or according to, J1939-31 Surface Vehicle Recommended Practice entitled: "*Network Layer*", the network management may be based on, compatible with, or according to, J1939-81 Surface Vehicle Recommended Practice entitled: "*Network Management*", and the application layer may be based on, compatible with, or according to, J1939-71 Surface Vehicle Recommended Practice entitled: "*Vehicle Application Layer (through December 2004)*", J1939-73 Surface Vehicle Recommended Practice entitled: "*Application Layer—Diagnostics*", J1939-74 Surface Vehicle Recommended Practice entitled: "*Application—Configurable Messaging*", or J1939-75 Surface Vehicle Recommended Practice entitled: "*Application Layer—Generator Sets and Industrial*", which are all incorporated in their entirety for all purposes as if fully set forth herein.

Any wired network herein may be a Local Area Network (LAN) to provide a data communication connection to a compatible LAN. For example, Ethernet connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 2099), "*Internetworking Technologies Handbook*", Chapter 7: "*Ethernet Technologies*", pages 7-1 to 7-38, which is incorporated in its entirety for all purposes as if fully set forth herein. In such a case, a LAN transceiver or a modem may be used, such as a Standard Microsystems Corporation (SMSC) LAN91C111 10/100 Ethernet transceiver, described in the Standard Microsystems Corporation (SMSC) data-sheet "*LAN91C111 10/100 Non-PCI Ethernet Single Chip MAC+PHY*" Data-Sheet, Rev. 15 (Feb. 20, 2004), which is incorporated in its entirety for all purposes as if fully set forth herein.

The topology of any wired network herein may be based on, or may use, point-to-point, bus, star, ring or circular, mesh, tree, hybrid, or daisy chain topology. Any two nodes may be connected in a point-to-point topology, and any communication herein between two nodes may be unidirectional, half-duplex, or full-duplex. Any medium herein may comprise, or may consist of, an unbalanced line, and any signals herein may be carried over the medium employing single-ended signaling, that may be based on, may be according to, or may be compatible with, RS-232 or RS-423 standards. Alternatively or in addition, any medium herein may comprises, or may consist of, a balanced line, and any signals herein may be carried over the medium employing differential signaling, that may be based on, may be according to, or may be compatible with, RS-232 or RS-423 standards. Any communication over a medium herein may use serial or parallel transmission.

Any vehicle herein may be a ground vehicle adapted to travel on land, such as a bicycle, a car, a motorcycle, a train, an electric scooter, a subway, a train, a trolleybus, and a tram. Alternatively or in addition, the vehicle may be a buoyant or submerged watercraft adapted to travel on or in water, and the watercraft may be a ship, a boat, a hovercraft, a sailboat, a yacht, or a submarine. Alternatively or in addition, the vehicle may be an aircraft adapted to fly in air, and the aircraft may be a fixed wing or a rotorcraft aircraft, such as an airplane, a spacecraft, a glider, a drone, or an Unmanned Aerial Vehicle (UAV). Any apparatus or device herein may be used for measuring or estimating an altitude, a pitch, or a roll of the aircraft, and may be operative to notify or indicate to a person that may be the vehicle operator or controller in response to the first distance (d1) or any function thereof, the second distance (d2) or any function thereof, or the estimated first angle (a) or any function thereof. Alternatively or in addition, any apparatus or device herein may be used for measuring or estimating the apparatus or device speed, positioning, pitch, roll, or yaw of the mobile apparatus or device.

Any apparatus or device herein may be operative to connected to, coupled to, communicating with, an automotive electronics in a vehicle, or may be part of, or may be integrated with, an automotive electronics in a vehicle. An Electronic Control Unit (ECU) may comprise, or may be part of, any apparatus or device herein. Alternatively or in addition, any apparatus or device herein may consist of, may be part of, may be integrated with, may be connectable to, or may be couplable to, an Electronic Control Unit (ECU) in the vehicle, and the Electronic Control Unit (ECU) may be Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, or a control module. Alternatively or in addition, the Electronic Control Unit (ECU) may comprise, may use, may be based on, or may execute a software, an operating-system, or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard. Any software herein may comprise, may use, or may be based on, an operating-system or a middleware, that may comprise, may be based on, may be according to, or may use, OSEK/VDX, International Organization for Standardization (ISO) 17356-1, ISO 17356-2, ISO 17356-3, ISO 17356-4, ISO 17356-5, or AUTOSAR standard.

Any network herein may be a vehicle network, such as a vehicle bus or any other in-vehicle network. A connected element comprises a transceiver for transmitting to, and receiving from, the network. The physical connection typically involves a connector coupled to the transceiver. The vehicle bus may consist of, may comprise, may be compatible with, may be based on, or may use a Controller Area Network (CAN) protocol, specification, network, or system. The bus medium may consist of, or comprise, a single wire, or a two-wire such as an UTP or a STP. The vehicle bus may employ, may use, may be compatible with, or may be based on, a multi-master, serial protocol using acknowledgement, arbitration, and error-detection schemes, and may further use synchronous, frame-based protocol. Further, any network herein may use an OSI layer 3 (Network Layer) or Layer 4 (Transport Layer) standard or non-standard protocol. In one example, the protocol may be according to, compatible with, based on, or use, ISO 15765-2 protocol.

The network data link and physical layer signaling may be according to, compatible with, based on, or use, ISO 11898-1:2015. The medium access may be according to, compatible with, based on, or use, ISO 11898-2:2003. The vehicle bus communication may further be according to, compatible with, based on, or use, any one of, or all of, ISO 11898-3:2006, ISO 11898-2:2004, ISO 11898-5:2007, ISO 11898-6:2013, ISO 11992-1:2003, ISO 11783-2:2012, SAE J1939/11_201209, SAE J1939/15_201508, or SAE J2411_200002 standards. The CAN bus may consist of, may be according to, may be compatible with, may be based on, or may use a CAN with Flexible Data-Rate (CAN FD) protocol, specification, network, or system.

Alternatively or in addition, the vehicle bus may consist of, may comprise, may be based on, may be compatible with, or may use a Local Interconnect Network (LIN) protocol, network, or system, and may be according to, may be compatible with, may be based on, or may use any one of, or all of, ISO 9141-2:1994, ISO 9141:1989, ISO 17987-1, ISO 17987-2, ISO 17987-3, ISO 17987-4, ISO 17987-5, ISO 17987-6, or ISO 17987-7 standards. The battery powerlines or a single wire may serve as the network medium, and may use a serial protocol where a single master controls the network, while all other connected elements serve as slaves.

Alternatively or in addition, the vehicle bus may consist of, may comprise, be compatible with, may be based on, or may use a FlexRay protocol, specification, network or system, and may be according to, may be compatible with, may be based on, or may use any one of, or all of, ISO 17458-1:2013, ISO 17458-2:2013, ISO 17458-3:2013, ISO 17458-4:2013, or ISO 17458-5:2013 standards. The vehicle bus may support a nominal data rate of 10 Mb/s, and may support two independent redundant data channels, as well as independent clock for each connected element.

Alternatively or in addition, any vehicle bus herein may consist of, may comprise, or may be based on, an avionics data bus standard, such as Aircraft Data Network (ADN), Avionics Full-Duplex Switched Ethernet (AFDX), Aeronautical Radio INC. (ARINC) 664, ARINC 629, ARINC 708, ARINC 717, ARINC 825, MIL-STD-1553, MIL-STD-1760, or Time-Triggered Protocol (TTP).

Alternatively or in addition, the vehicle bus may consist of, comprise, be compatible with, may be based on, or may use a Media Oriented Systems Transport (MOST) protocol, network or system, and may be according to, may be compatible with, may be based on, or may use any one of, or all of, MOST25, MOST50, or MOST150. The vehicle bus may employ a ring topology, where one connected element may be the timing master that continuously transmits frames where each comprises a preamble used for synchronization of the other connected elements. The vehicle bus may support both synchronous streaming data as well as asynchronous data transfer. The network medium may be wires (such as UTP or STP), or may be an optical medium such as Plastic Optical Fibers (POF) connected via an optical connector. In one example, the vehicle bus may consists of, comprises, or may be based on, automotive Ethernet, may use only a single twisted pair, and may consist of, employ, use, may be based on, or may be compatible with, IEEE802.3 100BaseT1, IEEE802.3 1000BaseT1, BroadR-Reach®, or IEEE 802.3bw-2015 standard.

Any of the methods and compression/de-compression schemes herein may be used to provide lossless compression that is based on statistics of messages or frames actually used in a specific application or installation. The compression/de-compression schemes herein typically is stateless and may not require any storing of any former messages or frames, but is performed on frame-by-frame basis. Further, the compression/de-compression schemes herein may be implemented using low-sized memory and minimally increasing CPU workload or processing time. In one example, the methods and compression/de-compression schemes herein may be used to shorten a message payload, such as in a CAN protocol, allowing for reduction of the overall traffic carried over the bus or network. Such shortening of a frame payload allows for inserting, without changing a frame limitation, a cryptographic signature the frame. The shortening of the frame may be used for adding additional information in the frame without elongating it, such as information or code for implementing additional features such as error detection, error correction, encryption, authentication, and any other OSI Layer-3 or above features or functionalities.

Any apparatus herein, may comprise any element or functionality, described in the "BACKGROUND" section above, and included in any of the documents incorporated therein. Further, any method or step herein may comprise any element or functionality, or may execute any step, method, or action, described in the "BACKGROUND" section above, including in any of the documents incorporated therein. In one example, any compression herein may include, may comprise, ort may be based on, any compression scheme described in the "BACKGROUND" section above including in any of the documents incorporated therein. Further, any method herein may be integrated, used with, combined with, or coupled to, any feature or functionality described in the "BACKGROUND" section above, including in any of the documents incorporated therein.

Electronic circuits and components are described in a book by Wikipedia entitled: "*Electronics*" downloaded from en.wikibooks.org dated Mar. 15, 2015, and in a book authored by Owen Bishop entitled: "*Electronics—Circuits and Systems*" Fourth Edition, published 2011 by Elsevier Ltd. [ISBN—978-0-08-096634-2], which are both incorporated in their entirety for all purposes as if fully set forth herein.

The term 'message' is used herein to include any type of information or one or more datagram, handled as a single, as a set or as a group of datagrams. The datagram may be a packet or a frame, or any other type of group of data bytes (or bits) which represent an information unit.

In the case where dedicated PCB is used, the electrical connection may use an edge connector, relating to the portion of a printed circuit board (PCB) consisting of traces leading to the edge of the board that are intended to plug into a matching socket. Such connectors are used in computers for expansion slots for peripheral cards, such as PCI, PCI Express, and AGP cards. Edge connector sockets consist of a plastic "box" open on one side, with pins on one or both side(s) of the longer edges, sprung to push into the middle of the open center. Connectors are often keyed to ensure the correct polarity, and may contain bumps or notches both for polarity, and to ensure that the wrong type of device is not inserted. The socket width is chosen to fit to the thickness of the connecting PCB.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for software compatibility with variants of Unix and other operating systems, such as POSIX.1-2008 that is simultaneously IEEE STD. 1003.1™—2008 entitled: "*Standard for Information Technology—Portable Operating System Interface (POSIX®) Description*", and The Open Group Technical Standard Base Specifications, Issue 7, IEEE STD. 1003.1™, 2013 Edition.

Any part of, or whole of, any of the methods described herein may be implemented by a processor such as processor 64, and may further be used in conjunction with various devices and systems, for example a device may be a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, or a non-mobile or non-portable device.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Any device herein may be integrated with a part of or in an entire appliance. The primary function of the appliance may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffee-maker, or an iced-tea maker. Alternatively or in addition, the primary function of the appliance may be associated with an environmental control such as temperature control, and the appliance may consist of, or may be part of, an HVAC system, an air conditioner or a heater. Alternatively or in addition, the primary function of the appliance may be associated with a cleaning action, such as a washing machine, a clothes dryer for cleaning clothes, or a vacuum cleaner. Alternatively or in addition, the primary function of the appliance may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

The steps described herein may be sequential, and performed in the described order. For example, in a case where a step is performed in response to another step, or upon completion of another step, the steps are executed one after the other. However, in the case where two or more steps are not explicitly described as being sequentially executed, these steps may be executed in any order or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions cause the processor to perform the one or more of the methods or steps described herein. Any of the disclosed flow charts or methods, or any step thereof, may be implemented in the form of software stored on a memory or a computer-readable non-transitory information storage medium such as an optical or magnetic disk, a non-volatile memory (e.g., Flash or ROM), RAM, and other forms of volatile memory. The information storage medium may be an internal part of the computer, a removable external element coupled to the computer, or unit that is remotely accessible via a wired or wireless network.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Throughout the description and claims of this specification, the word "couple", and variations of that word such as "coupling", "coupled", and "couplable", refer to an electrical connection (such as a copper wire or soldered connection), a logical connection (such as through logical devices of a semiconductor device), a virtual connection (such as through randomly assigned memory locations of a memory device) or any other suitable direct or indirect connections (including combination or series of connections), for example for allowing the transfer of power, signal, or data, as well as connections formed through intervening devices or elements.

The arrangements and methods described herein may be implemented using hardware, software or a combination of both. The term "integration" or "software integration" or any other reference to the integration of two programs or processes herein refers to software components (e.g., programs, modules, functions, processes etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "integration" or "hardware integration" or integration of hardware components herein refers to hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled by the same software or hardware. The term "integration" herein refers (as applicable) to a software integration, hardware integration, or any combination thereof.

Any network herein may be frame or packet based. Any networking protocol may be utilized for exchanging information between the network elements (e.g., clients, and servers) within the network (such as the Internet). For example, it is contemplated that communications can be performed using TCP/IP. Generally, HTTP and HTTPS are utilized on top of TCP/IP as the message transport envelope. These two protocols can deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described herein is suited for both HTTP/HTTPS, message-queuing systems, and other communications transport protocol technologies. Furthermore, depending on the differing business and technical requirements of the various partners within the network, the physical network may embrace and utilize multiple communication protocol technologies.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any device or network element herein may comprise, consists of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

As used herein, the term "Integrated Circuit" (IC) shall include any type of integrated device of any function where the electronic circuit is manufactured by the patterned diffusion of trace elements into the surface of a thin substrate of semiconductor material (e.g., Silicon), whether single or multiple die, or small or large scale of integration, and irrespective of process or base materials (including, without limitation Si, SiGe, CMOS and GAs) including without limitation applications specific integrated circuits (ASICs), field programmable gate arrays (FPGAs), digital processors (e.g., DSPs, CISC microprocessors, or RISC processors), so-called "system-on-a-chip" (SoC) devices, memory (e.g., DRAM, SRAM, flash memory, ROM), mixed-signal devices, and analog ICs. The circuits in an IC are typically contained in a silicon piece or in a semiconductor wafer, and commonly packaged as a unit. The solid-state circuits commonly include interconnected active and passive devices, diffused into a single silicon chip. Integrated circuits can be classified into analog, digital and mixed signal (both analog and digital on the same chip). Digital integrated circuits commonly contain many of logic gates, flip-flops, multiplexers, and other circuits in a few square millimeters. The small size of these circuits allows high speed, low power dissipation, and reduced manufacturing cost compared with board-level integration. Further, a Multi-Chip Module (MCM) may be used, where multiple Integrated Circuits (ICs), the semiconductor dies, or other discrete components are packaged onto a unifying substrate, facilitating their use as a single component (as though a larger IC).

The term "computer" is used generically herein to describe any number of computers, including, but not limited to personal computers, embedded processing elements and systems, control logic, ASICs, chips, workstations, mainframes, etc. Any computer herein may consist of, or be part of, a handheld computer, including any portable computer, which is small enough to be held and operated while holding in one hand, or fit into a pocket. Such a device, also referred to as a mobile device, typically has a display screen with a touch input and/or a miniature keyboard. Non-limiting examples of such devices include Digital Still Camera (DSC), Digital video Camera (DVC or digital camcorder), Personal Digital Assistant (PDA), and mobile phones and Smartphones.

The mobile devices may combine video, audio and advanced communications capabilities, such as PAN and WLAN. A mobile phone (also known as a cellular phone, cell phone and a hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi and mobile broadband access. In addition to telephony, the Smartphones may support a wide variety of other services such as text messaging, MMS, email, Internet access, short-range wireless communications (infrared, Bluetooth), business applications, gaming and photography.

As used herein, the terms "program", "programmable", and "computer program" are meant to include any sequence or human or machine cognizable steps that perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the like, as well as in firmware or other implementations. Generally, program modules include routines, programs, objects, components, data structures, etc., that performs particular tasks or implement particular abstract data types.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments of the invention are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. The invention may also be practiced in distributed computing environments where tasks are performed by remote processing devices that are linked through a communications network. In a distributed computing environment, program modules may be located in both local and remote memory storage devices.

Any wired network herein may be based on a LAN communication, such as Ethernet, and may be partly or in full in accordance with the IEEE802.3 standard. For example, Gigabit Ethernet (GbE or 1 GigE) may be used, describing various technologies for transmitting Ethernet frames at a rate of a gigabit per second (1,000,000,000 bits per second), as defined by the IEEE 802.3-2008 standard. There are five physical layer standards for gigabit Ethernet using optical fiber (1000BASE-X), twisted pair cable (1000BASE-T), or balanced copper cable (1000BASE-CX). The IEEE 802.3z standard includes 1000BASE-SX for transmission over multi-mode fiber, 1000BASE-LX for transmission over single-mode fiber, and the nearly obsolete 1000BASE-CX for transmission over balanced copper cabling. These standards use 8b/10b encoding, which inflates the line rate by 25%, from 1000 Mbit/s to 1250 Mbit/s, to ensure a DC balanced signal. The symbols are then sent using NRZ. The IEEE 802.3ab, which defines the widely used 1000BASE-T interface type, uses a different encoding scheme in order to keep the symbol rate as low as possible, allowing transmission over twisted pair. Similarly, The 10 gigabit Ethernet (10GE or 10 GbE or 10 GigE may be used, which is a version of Ethernet with a nominal data rate of 10 Gbit/s (billion bits per second), ten times faster than gigabit Ethernet. The 10 Gigabit Ethernet standard only defines full duplex point-to-point links that are generally connected by network switches. The 10 Gigabit Ethernet standard encompasses a number of different physical layers (PHY) standards. A networking device may support different PHY types through pluggable PHY modules, such as those based on SFP+.

As used herein, the terms "network", "communication link" and "communications mechanism" are used generically to describe one or more networks, communications media or communications systems, including, but not limited to, the Internet, private or public telephone, cellular, wireless, satellite, cable, data networks. Data networks include, but not limited to, Metropolitan Area Networks (MANs), Wide Area Networks (WANs), Local Area Networks (LANs), Personal Area networks (PANs), WLANs (Wireless LANs), Internet, internets, NGN, intranets, Hybrid Fiber Coax (HFC) networks, satellite networks, and Telco networks. Communication media include, but not limited to, a cable, an electrical connection, a bus, and internal communications mechanisms such as message passing, interprocess communications, and shared memory. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.). While exampled herein with regard to secured communication between a pair of network endpoint devices (host-to-host), the described method can equally be used to protect the data flow between a pair of gateways or any other networking-associated devices (network-to-network), or between a network device (e.g., security gateway) and a host (network-to-host).

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive, or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

The invention claimed is:

1. A method for a lossless and stateless de-compression scheme, for use with a group of multiple frames that are according to a first protocol and includes, in a fixed location in the frames, a fixed length payload consisting of M bits, wherein the number of values in the payload is equal to, or less than, 2N possible values, the method comprising:
calculating stateless correlation information between two or more bit-locations in multiple M-bit sets that represent all possible combinations of the payload of a first protocol;
receiving and storing the calculated correlation information;
receiving or obtaining a plurality of frames according to a second protocol that include a fixed length payload consisting of N bits, and for each of a received first frame out of the plurality of frames:
identifying and extracting a first N-bit payload from the received first frame;
mapping the first payload to a second payload consisting of M bits (M>N), by respectively associating a single M-bit value to the extracted first payload N-bit value using the stored calculated correlation information;
constructing a second frame according to the first protocol that includes the second M-bit payload and is part of the group; and
using or sending the constructed second frame.

2. The method according to claim 1, for use with a first device, wherein the steps are performed in real-time in the first device.

3. The method according to claim 2, wherein the first device comprises software and a processor for executing the software, and wherein the steps are performed in real-time by the processor.

4. The method according to claim 2, for use with a second device distinct from the first device, wherein the sending comprises sending the second frame to the second device.

5. The method according to claim 2, wherein the first device consists of, or comprises, a vehicle.

6. The method according to claim 5, wherein the vehicle is a ground vehicle adapted to travel on land.

7. The method according to claim 6, wherein the ground vehicle is selected from the group consisting of a bicycle, a car, a motorcycle, a train, an electric scooter, a subway, a train, a trolleybus, and a tram.

8. The method according to claim 5, wherein the vehicle is a buoyant or submerged watercraft adapted to travel on or in water.

9. The method according to claim 8, wherein the watercraft is selected from the group consisting of a ship, a boat, a hovercraft, a sailboat, a yacht, and a submarine.

10. The method according to claim 5, wherein the vehicle is an aircraft adapted to fly in air.

11. The method according to claim 10, wherein the aircraft is a fixed wing or a rotorcraft aircraft.

12. The method according to claim 10, wherein the aircraft is selected from the group consisting of an airplane, a spacecraft, a glider, a drone, and an Unmanned Aerial Vehicle (UAV).

13. The method according to claim 2, wherein the first device consists of, integrated with, or is part of, an Electronic Control Unit (ECU) in a vehicle.

14. The method according to claim 13, wherein the Electronic Control Unit (ECU) is selected from the group consisting of Electronic/engine Control Module (ECM), Engine Control Unit (ECU), Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), Door Control Unit (DCU), Electric Power Steering Control Unit (PSCU), Seat Control Unit, Speed Control Unit (SCU), Telematic Control Unit (TCU), Transmission Control Unit (TCU), Brake Control Module (BCM; ABS or ESC), Battery management system, control unit, and a control module.

15. The method according to claim 13, wherein the Electronic Control Unit (ECU) contains or executes software, an operating-system, or a middleware, that comprises, or uses OSEK/VDX, International Organization for Standardization (ISO) 17356-1, ISO 17356-2, ISO 17356-3, ISO 17356-4, ISO 17356-5, or AUTOSAR standard.

16. The method according to claim 15, wherein the software comprises, uses, or is based on, an operating-system or a middleware, that comprises, or uses OSEK/VDX, International Organization for Standardization (ISO) 17356-1, ISO 17356-2, ISO 17356-3, ISO 17356-4, ISO 17356-5, or AUTOSAR standard.

17. The method according to claim 1, wherein at least one of the received first frames comprises Q N-bit first payloads.

18. The method according to claim 17, wherein each of most of, or all of, the received first frames comprise multiple N-bit first payloads.

19. The method according to claim 17, wherein the identifying and extracting comprises identifying and extracting of the Q first N-bit payloads from the received first frame, and wherein mapping the first payload to a second payload consisting of M bits.

20. The method according to claim 19, wherein the constructing comprises constructing multiple second frame according to the first protocol each including respective one of the second M-bit payloads.

21. The method according to claim 19, wherein the using or sending comprises using or sending each of the multiple constructed second frames.

22. The method according to claim 21, wherein the multiple constructed second frames are carried using a standard protocol that consists of, includes, is based on, or is according to, an Open Systems Interconnection (OSI) Layer-3 or Layer-4 standard protocol.

23. The method according to claim 22, wherein the standard protocol consists of, includes, is based on, or is according to, ISO 15765-2:2004 ISO-TP (Transport Layer) standard.

24. The method according to claim 1, wherein the first protocol is identical to the second protocol.

25. The method according to claim 1, wherein the first protocol is different from the second protocol.

26. The method according to claim 1, wherein each of the first and second protocols includes, or is based on, or is according to, an Open Systems Interconnection (OSI) Layer-2 protocol.

27. The method according to claim 26, wherein the OSI layer-2 protocol that consists of, or is part of, the first protocol, is identical to the OSI layer-2 protocol that consists of, or is part of, the second protocol.

28. The method according to claim 26, wherein the OSI layer-2 protocol that consists of, or is part of, the first protocol, is different from the OSI layer-2 protocol that consists of, or is part of, the second protocol.

29. The method according to claim 1, wherein the first or the second protocol consists of, includes, is based on, or is according to, an Open Systems Interconnection (OSI) Layer-3 or Layer-4 standard protocol.

30. The method according to claim 29, wherein the standard protocol consists of, includes, is based on, or is according to, ISO 15765-2:2004 ISO-TP (Transport Layer) standard.

31. The method according to claim 1, wherein the ratio M/N is equal to, or is more than, 1.1, 1.2, 1.5, 2, 2.5, 3, 3.5, 5, 7, 10, 15, 20, 30, 50, or 100.

32. The method according to claim 1, wherein the ratio M/N is less than 1.2, 1.5, 2, 2.5, 3, 3.5, 5, 7, 10, 15, 20, 30, 50, or 100.

33. The method according to claim 1, wherein the ratio $2^M/2^N=2^{M-N}$ is equal to, or is more than, 2, 4, 8, 16, 32, 64, 128, 256, 512, 1024, or 2048.

34. The method according to claim 1, wherein the ratio $2^M/2^N=2^{M-N}$ is less than 4, 8, 16, 32, 64, 128, 256, 512, 1024, or 2048.

35. The method according to claim 1, wherein N is equal to, or is more than, 4, 8, 12, 16, 32, 64, 128, 256, 512, or 1024.

36. The method according to claim 1, wherein N is less than 8, 12, 16, 32, 64, 128, 256, 512, or 1024.

37. The method according to claim 1, wherein M is equal to, or is more than, 4, 8, 12, 16, 32, 64, 128, 256, 512, or 1024.

38. The method according to claim 1, wherein M is less than 8, 12, 16, 32, 64, 128, 256, 512, or 1024.

39. The method according to claim 1, for use with a memory having N address lines or bits input and M data lines or bits output, wherein the mapping comprises applying or writing the N-bit payload value as address and reading the M-bit value as output data.

40. The method according to claim 39, wherein the memory is a non-volatile memory.

41. The method according to claim 39, wherein the memory is a volatile memory.

42. The method according to claim 39, wherein the memory consists of, or comprises, Hard Disk Drive (HDD), Solid State Drive (SSD), Random Access Memory (RAM), SRAM, Dynamic RAM (DRAM), Transistor RAM (TTRAM), Zero-capacitor RAM (Z-RAM), Read-Only Memory (ROM), Programmable ROM (PROM), EPROM, EEPROM, Flash-based memory, Compact Disc-ReWritable (CD-RW), Digital Versatile Disk, or Digital Video Disk RW (DVD-RW), DVD+RW, DVD-RAM BD-RE, Compact Disc ROM (CD-ROM), BD-ROM, or DVD-ROM.

43. The method according to claim 39, wherein the mapping is using, or is based on, a combinatorial logic that uses logic gates.

44. The method according to claim 43, wherein the combinatorial logic comprises, or consists of, a Programmable Logic Device (PLD).

45. The method according to claim 44, wherein the PLD comprises, consists of, or is based on, Programmable Array Logic (PAL), Generic Array Logic (GAL), Complex Programmable Logic Device (CPLD), or Field-Programmable Gate Array (FPGA).

46. The method according to claim 43, for use with software or firmware and a processor that executes the software or firmware, and wherein the combinatorial logic is calculated or performed by the processor.

47. The method according to claim 1, wherein the mapping comprises calculating a Boolean logic using logic gates for each one of the M bits or locations of the second payload that is based on one or more of the N bits or locations of the first payload.

48. The method according to claim 1, wherein at least one of the M bits or locations of the second payload is assigned as '0' or '1' for any received first payload.

49. The method according to claim 1, wherein at least one of the M bits or locations of the second payload is calculated using two of the N bits or locations of the first payload.

50. The method according to claim 1, wherein at least one of the M bits or locations of the second payload is calculated using three or more of the N bits or locations of the first payload.

51. The method according to claim 1, wherein at least one of the M bits or locations of the second payload is calculated using all of the N bits or locations of the first payload.

* * * * *